(12) United States Patent
Braslau et al.

(10) Patent No.: US 10,927,245 B2
(45) Date of Patent: Feb. 23, 2021

(54) NON-MIGRATORY INTERNAL PLASTICIZERS ATTACHED TO A PENDANT COVALENT LINKAGE

(71) Applicant: The Regents of the University of California, Oakland, CA (US)

(72) Inventors: Rebecca L. Braslau, Santa Cruz, CA (US); Chad M. Higa, Santa Cruz, CA (US)

(73) Assignee: The Regents of the University of California, Oakland, CA (US)

( * ) Notice: Subject to any disclaimer, the term of this patent is extended or adjusted under 35 U.S.C. 154(b) by 171 days.

(21) Appl. No.: 16/265,197

(22) Filed: Feb. 1, 2019

(65) Prior Publication Data

US 2019/0241727 A1 Aug. 8, 2019

Related U.S. Application Data

(60) Provisional application No. 62/625,969, filed on Feb. 2, 2018.

(51) Int. Cl.
| | |
|---|---|
| *C08F 14/06* | (2006.01) |
| *C08L 27/22* | (2006.01) |
| *C08K 5/00* | (2006.01) |
| *C08F 8/30* | (2006.01) |
| *C08F 214/06* | (2006.01) |
| *C08K 5/3472* | (2006.01) |
| *C08F 226/06* | (2006.01) |

(52) U.S. Cl.
CPC .............. *C08L 27/22* (2013.01); *C08F 8/30* (2013.01); *C08F 14/06* (2013.01); *C08F 214/06* (2013.01); *C08K 5/0016* (2013.01); *C08F 226/06* (2013.01); *C08K 5/3472* (2013.01)

(58) Field of Classification Search
CPC ........ C08L 27/22; C08F 214/06; C08F 14/06; C08F 8/30; C08F 226/06; C08F 2810/30; C08F 8/46; C08F 8/48; C08F 114/06; C08K 5/0016; C08K 5/3472; C08G 81/025

See application file for complete search history.

(56) References Cited

U.S. PATENT DOCUMENTS

| | | | |
|---|---|---|---|
| 3,277,152 | A | 10/1966 | Steinberg |
| 3,901,840 | A | 8/1975 | Irvin et al. |
| 4,347,346 | A | 8/1982 | Eckberg |
| 6,333,441 | B1 | 12/2001 | Sato et al. |
| 8,865,125 | B2 | 10/2014 | Avory et al. |
| 2011/0077365 | A1 | 3/2011 | Yu et al. |

(Continued)

FOREIGN PATENT DOCUMENTS

| | | |
|---|---|---|
| CN | 102241820 A | 11/2011 |
| GB | 1422655 A | 1/1976 |

(Continued)

OTHER PUBLICATIONS

Takeishi et al., "Synthesis and Reaction of Poly(Vinyl Chloride) Containing Azide Group", Polymer Letters, vol. 7, pp. 201-203 (1969).

(Continued)

*Primary Examiner* — Robert C Boyle
(74) *Attorney, Agent, or Firm* — Panitch Schwarze Belisario & Nadel LLP; Lars H. Genieser

(57) ABSTRACT

The present invention relates to polymers functionalized with non-migratory internal plasticizers.

39 Claims, 22 Drawing Sheets

(56) References Cited

U.S. PATENT DOCUMENTS

2015/0299343 A1* 10/2015 Braslau .................. C08L 25/18
525/225
2018/0155464 A1 6/2018 Braslau

FOREIGN PATENT DOCUMENTS

SU              578885 A3      10/1977
WO         2014071347 A1       5/2014

OTHER PUBLICATIONS

USPTO Office Action dated Mar. 10, 2020 for U.S. Appl. No. 15/823,551.
USPTO Office Action dated Sep. 27, 2019 for U.S. Appl. No. 15/823,551.
Wang et al., "Enable PVC plastic for a novel role: its functionalisation with diiron models of the sub-unit of [FeFe]-hydrogenase, assembly of film electrodes, and electrochemical investigations", RSC Adv., vol. 1, pp. 1211-1219 (2011) (24 pages) doi: 10.1039/C1RA0034G.
Wang et al., "Migration of Additives from Poly(vinyi chloride) (PVC) Tubes into Aqueous Media", Macromol. Symp., vol. 225, pp. 191-203 (2005).
Yang et al., "Novel environmentally sustainable cardanol-based plasticizer covalently bound to PVC via click chemistry: synthesis and properties", RSC Adv., vol. 5; 16980-16985 (2015) doi:10.1039/C4RA15527K (12 pages).
Abdelaal et al., "Chemical Modification of PVC into Polymer-Supported Oxazolinones and Triazoles", J. Appl. Polymer Sci., vol. 104, pp. 2304-2309 (2007).
Abdel-Bary et al., "Evaluation of some organic compounds as antioxidants in rubber", Polym. Degrad. Stab., vol. 57, pp. 283-292 (1997).
Akat et al., "Synthesis and characterization of poly(vinylchloride) type macrophotoinitiator comprising side-chain thioxanthone via click chemistry", eXPRESS Polymer Letters, vol. 5, No. 4, pp. 318-326 (2011).
Balakrishnan et al., "Chemical modification of poly(vinyl chloride) resin using poly(ethylene glycol) to improve blood compatibility", Biomaterials, vol. 26, pp. 3495-3502 (2005).
Braslau et al., "Polymeric Phthalates: Potential Nonmigratory Macromolecular Plasticizers", J. Polym. Sci. Part A: Polym. Chem., vol. 51, pp. 1175-1184 (2013).
Cohen et al., "The Preparation and Reactions of Polymeric Azides, II. The Preparation and Reactions of Various Polymeric Azides", J. Polym. Sci.: Polym. Chem. Ed., vol. 19, pp. 3269-3284 (1981).
Corey et al., "Total Synthesis of (±)-Forskolin", J. Am. Chem. Soc., vol. 110, pp. 3672-3673 (1988).
Demirci et al., "Synthesis and characterization of graft copolymers by photoinduced CuAAC click chemistry", Eur. Polym. J., vol. 66, pp. 282-289 (2015) doi: 10.1016/j.eurpolymj.2015.02.029.
Ermakova et al., "Modification of Poly(vinyl chloride) with Sodium Salts of Triazoles", Doklady Chemistry, vol. 474, Part 1, pp. 109-112 (2017).
Guo et al, "Antigen detection with thermosensitive hydrophilicity of poly(N-isopropylacrylamide)-grafted poly(vinyi chloride) fibrous mats", J. Mater. Chem. B, vol. 6, pp. 3486-3496 (2018) doi: 10.1039/c8tb00870a.
Hoogenboom et al., "Synthesis and crystal structures of Multifunctional tosylates as basis for star-shaped poly(2-ethyl-2-oxazoline)s", Beilstein J. Org. Chem., vol. 6, pp. 773-783 (2010).
Huang et al., "Construction of Nontoxic Polymeric UV-Absorber with Great Resistance to UV-Photoaging", Sci. Rep., vol. 6, p. 25508 (2016) (12 pages) doi: 10.1038/srep25508.
International Search Report and Written Opinion dated Mar. 6, 2014 for International Application PCT/US2013/068410.

Jia et al., "A Strategy for Nonmigrating Plasticized PVC Modified with Mannich base of Waste Cooking Oil Methyl Ester", Sci. Rep., vol. 8, p. 1589 (2018) (8 pages) doi:10.1038/s41598-018-19958-y.
Jia et al., "Internally plasticized PVC materials via covalent attachment of aminated tung oil methyl ester", RSC Adv., vol. 7, pp. 30101-30108 (2017).
Jia et al., "Phosphorus containing castor oil based derivatives: Potential non-migratory flame retardant plasticizer", Eur. Polym. J., vol. 87, pp. 209-220 (2017) doi: 10.1016/jeurpolymj.2016.12.023.
Jia et al., "Self-Plasticization of PVC Materials via Chemical Modification of Mannich Base of Cardanol Butyl Ether", ACS Sustain. Chem. Eng., vol. 5, pp. 6665-6673 (2017) doi: 10.1021/acssuschemeng.7b00900.
Jia et al., "Self-Plasticization of PVC via click reaction of a monooctyl phthalate derivative", Polish J. Chem. Tech., vol. 19, No. 3, pp. 16-19 (2017).
Kameda et al., "Antibacterial effect of thiocyanate substituted poly(vinyl chloride)", J. Polym. Res., vol. 18, pp. 945-947 (2011).
Kameda et al., "Chemical Modification and Dechlorination of Polyvinyl Chloride by Substitution With Thiocyanate as a Nucleophile", Polym. Engineering Sci., vol. 50, Iss. 1, pp. 69-75 (2010) doi: 10.1002/pen.21512.
Kameda et al., "Chemical modification of flexible and rigid poly(vinyl chloride) by nucleophilic substitution with thiocyanate using a phase-transfer catalyst", Mat. Chem, Phys., vol. 124, pp. 163-167 (2010) doi 10.1016/j.matchemphys.2016.06.011.
Kameda et al., "Chemical modification of poly(vinyl chloride) by nucleophilic substitution", Polym. Degrad. Stab., vol. 94, pp. 107-112 (2009) doi: 10.1016/J.polymdegradstab.2008.10.006.
Kameda et al., "Chemical Modification of Rigid Poly(vinyl chloride) by the Substitution with Nucleophiles", J. Appl. Polym. Sci., vol. 116, pp. 36-44 (2010) doi: 10.1002/app31452.
Kameda et al., "Effect of a phase-transfer catalyst on the chemical modification of poly(vinyl chloride) by substitution with thiocyanate as a nucleophile", Mat. Chem. Phys., vol. 118, Iss. 2-3, pp. 362-366 (2009) doi: 10.1016/jmatchemphys.2009.07.066.
Kameda et al., "Kinetics of the dehydrochlorination of poly(vinyl chloride) in the presence of NaOH and various diols as solvents", Polym. Degrad. Stab., vol. 94, pp. 1595-1597 (2009) doi: 10.1016/j.polymdegradstab.2009.05.006.
Kiskan et al., "Thermally Curable Polyvinylchloride via Click Chemistry", J. Polym. Sci. A: Polym. Chem., vol. 46, Iss. 11, pp. 3512-3518 (2008) doi: 10.1002/pola.22685.
Kruglova et al., "Synthesis of N-Vinylazole Polymers via Chemical Modification of Poly(vinyl halides)", Polym, Sci. A, vol. 49, No. 4, pp. 407-411 (2007).
Lamanna et al., "New Copolymers with Heterocyclic Pendant Groups Obtained from PVC Using Microwave-Assisted Process", J. Appl. Polym. Sci., vol. 121, pp. 951-956 (2011).
Lee et al., "Structurally Enhanced Self-Plasticization of Poly(vinyl chloride) via Click Grafting of Hyperbranched Polyglycerol", Macromol. Rapid Commun., vol. 37, pp. 2045-2051 (2016) doi: 10.1002/marc.201600533.
Lindstrom et al., "Environmentally Friendly Plasticizers for Poly(vinyl chloride)—Improved Mechanical Properties and Compatibility by Using Branched Poly(butylene adipate) as a Polymeric Plasticizer", J. Appl. Polym. Sci., vol. 100, pp. 2180-2188 (2006).
Liu et al., "Click-immobilized K+-selective ionophore for potentiometric and optical sensors", Sensors and Actuators B, vols. 171-172, pp. 556-562 (2012).
Marqués et al., "PVC bearing primary aliphatic or aromatic amine groups", J. Polym. Res., vol. 23, p. 246 (2016) (6 pages) doi: 10.1007/s10965-016-1145-8.
Martínez et al., "Local chain configuration dependence of the mechanisms of analogous reactions of PVC, 7: Nucleophilic substitution with potassium 2-ethylhexylthioglycolate and related effects on Tg", Macromol. Chem. Phys., vol. 201, pp. 1709-1717 (2000).
Martínez, "Synthesis of PVC-g-PS Through Stereoselective Nucleophilic Substitution on PVC", J. Polym. Sci. A: Polym. Chem., vol. 44, Iss. 8, pp. 2476-2486 (2006) doi: 10.1002/pola.21346.
Mekki et al., "Preparation of vinyl chloride—vinyl ether copolymers via partial etherification from PVC", eXPRESS Polymer Letters, vol. 1, No. 8, pp. 495-498 (2007).

(56) References Cited

OTHER PUBLICATIONS

Mijangos et al., "Fonctionnalisation du Polychlorure de Vinyle", Eur. Polym. J., vol. 22, pp. 417-421 (1986) (includes English-language abstract).
Navarro et al., "Highly Flexible PVC Materials without Plasticizer Migration as Obtained by Efficient One-Pot Procedure Using Trichlorotriazine Chemistry", Macromols., vol. 49, pp. 2224-2227 (2016) doi: 10.1021/acs.macromol.6b00214.
Navarro et al., "Modification of poly(vinyl chloride with new aromatic thiol compounds. Synthesis and characterization", Polym. Degrad. Stab., vol. 93, pp. 585-591 (2008).
Navarro et al., "Opening New Gates for the Modification of PVC or Other PVC Derivatives: Synthetic Strategies for the Covalent Binding of Molecules to PVC", Polymers, vol. 8, p. 152 (2016) (13 pages) doi:10.3390/polym8040152.
Office Action dated Feb. 24, 2016 for U.S. Appl. No. 14/440,840.
Office Action dated Jun. 26, 2017 for U.S. Appl. No. 14/440,840.
Office Action dated Aug. 31, 2016 for U.S. Appl. No. 14/440,840.
Ouerghui et al., "Chemical modifications of poly(vinyl chloride) to poly(vinyl azide) and 'clicked' triazole bearing groups for application in metal cation extraction", React. Funct. Polym., vol. 100, pp. 191-197 (2016) doi: 10.1016/j.reactfunctpolym.2016.01.016.
Pant et al., "Management of waste poly vinyl chloride (PVC) through chemical modification", J. Sci. Ind. Res., vol. 71, pp. 181-186 (2012).
Prozorova et al., "Sulfur-Containing Polymer and Carbon Materials Based on Poly(vinyl chloride)", Doklady Chemistry, vol. 473, Part 1, pp. 53-56 (2017).
Rathwell et al., "Synthesis of triazole analogues of the nanaomycin antibiotics using 'click chemistry'", Tetrahedron, vol. 66, pp. 4002-4009 (2010).
Reddy et al., "Surface Treatment of Plasticized Poly(vinyl chloride) to Prevent Plasticizer Migration", J. Appl. Polym. Sci., vol. 115, pp. 1589-1597 (2010).
Rusen et al., "The Synthesis and Characterization of Poly Vinyl Chloride Chemically Modified with C60", Fullerenes, Nanotubes, & Carbon Nanostruct., vol. 16, pp. 178-185 (2008) doi: 10.1080/15363830802042563.
Souad et al., "Synthesis of Some 1,4,5-Trisubstituted 1,2,3-Triazoles by 1,3-Dipolar Cycloaddition of 2-Substituted Phenyl Azides to Dimethyl Acetylene Dicarboxylate (DMAD), Regular Stirring Versus Microwave Irradiation: A Comparative Study," Rasayan J. Chem., vol. 4, No. 4, pp. 806-809 (2011).
Takeishi et al., "Reaction of Poly(Vinyl Chloride) Containing Azide Groups", Polymer Letters, vol. 8, pp. 829-833 (1970).
Charlton, J. L. & Chee, G., "Synthesis of Chiral Esters of Acetylenedicarboxylic Acid", Tetrahedron Letters, 35(34) (1994) 6243-6246.
Charlton, J.L. et al., "Synthesis of Acetylenedicarboxylic Acid Esters and Asymmetric Diels-Alder Reactions of the Bis (methyl (S)-lactyl) Ester", Canadian Journal of Chemistry, 73(9) (1995) 1454-1462.
Earla, et al, "Covalently Linked Plasticizers: Triazole Analogues of Phthalate Plasticizers Prepared by Mild Copper-Free 'Click' Reactions with Azide-Functionalized PVC", Macromolecular Rapid Communications, 35(6) (2014) 666-671.
Earla, A., "Plasticization of PVC: Covalently Linked Plasticizers Using Thermal or Copper-Catalyzed Azide-Alkyne Cycloadditions", Doctoral Thesis, University of California, Santa Cruz, Table of Contents, List of Figures, Schemes, and Tables, Abstract, (2016), pp. 52-115, 121-127.
Earla, et al., "Phthalate Plasticizers Covalently Linked to PVC via Copper-Free or Copper Catalyzed Azide-Alkyne Cycloadditions", Polymer, 2017, 109, 1-12.
Gonzaga et al., "Versatile, efficient derivatization of polysiloxanes via click technology", Chemical Communications, (13) (2009) 1730-1732.
Grande et al., "Testing the functional tolerance of the Piers-Rubinsztajn reaction: a new strategy for functional silicones", Chemical Communications, 46(27) (2010) 4988-4990.
International Search Report and Written Opinion dated Apr. 2, 2019 for International Patent Application PCT/US2019/016248.
Jia, P. et al., PVC materials without migration obtained by chemical modification of azide-functionalized PVC and triethyl citrate plasticizer, Materials Chemistry and Physics 190 (2017) pp. 25-30.
Navarro et al., "Phthalate Plasticizers Covalently Bound to PVC: Plasticization with Suppressed Migration", Macromolecules, 43 (2010) 2377-2381.
Ott, E., "Über Symmetrische und Asymmetrische Dicarbonsaurechloride", Justus Liebigs Annalen der Chemie, 392(3) (1912) 245-285.
Pak, H.K. et al., "Synthesis of Enamides by Ruthenium-Catalyzed Reaction of Alkyl Azides with Acid Anhydrides in Ionic Liquid", ChemCatChem, 7(24) (2015) 4030-4034.
Pawlak et al., "Ferrocene Bound Poly(vinyl chloride) as Ion to Electron Transducer in Electrochemical Ion Sensors", Analytical Chemistry, 82(16) (2010) 6887-6894.
Pawlak et al., "In situ surface functionalization of plasticized poly(vinylchloride) membranes by 'click chemistry'", Journal of Materials Chemistry, 22(25) (2012) 12796-12801.
Yang, P. et al., Novel Environmentally Sustainable Cardanol-based Plasticizer Covalently Bound to PVC via Click Chemistry: Synthesis and Properties, Royal Society of Chemistry Advances, pp. 1-8, 2013; Retrieved from the Internet at https://pubs.rsc.org/en/content/getauthorversionpdf/c4ra15527k.
Earla, A. et al., "Phthalate Plasticizers Covalently Linked to PVC via Copper-Free or Copper Catalyzed Azide-Alkyne Cycloadditions", pp. 1-16, Web publication, 2017; Retrieved from the Internet at https://escholarship.org/cantent/qt23z0d7rd/qt23z0d7rd.pdf.

* cited by examiner

NON-MIGRATORY INTERNAL PLASTICIZERS ATTACHED TO A PENDANT COVALENT LINKAGE

This application claims the benefit of U.S. Provisional Application 62/625,969, filed Feb. 2, 2018, which is hereby incorporated by reference in its entirety herein.

This invention was made with government support under Grant No. DMR-1404550 awarded by the National Science Foundation. The government has certain rights in the invention.

FIELD OF THE INVENTION

The present invention relates to non-migratory internal plasticizers attached to a pendant covalent linkage and methods for synthesizing them and substituting them onto a polymer.

BACKGROUND OF THE INVENTION

Plasticizers are compounds added to a material to decrease brittleness and increase the plasticity or fluidity of the material. Plasticizers are applied in plastics, such as thermoplastic polymers, for example, polyvinyl chloride (PVC). Conventional, exogenous plasticizers work by embedding themselves between chains of polymers, with no covalent bonds being formed, thereby spacing the polymer chains apart and increasing the "free volume", thereby lowering the glass transition temperature ($T_g$) of the plastic and making it softer. An exogenous plasticizer is a molecule separate and distinct from the polymer molecules it is intended to plasticize by lowering the $T_g$ of the aggregation of polymer molecules.

Phthalates, also called phthalate esters, are esters of phthalic acid (1,2-benzenedicarboxylic acid) that are used as exogenous plasticizers. When added to a thermoplastic polymer, plasticizers can alter the flexibility, transparency, durability, stiffness, and longevity of the thermoplastic polymer, and can alter plastic qualities, for example, by increasing malleability and decreasing brittleness. Exogenous plasticizers, such as phthalates, are used to soften PVC, with almost 90% of the market for exogenous plasticizers being used for PVC, providing improved flexibility and durability of PVC products.

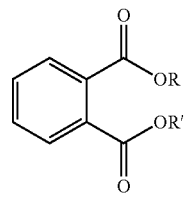

Shown above is a generic chemical structure of a phthalate. R and R' can be $CnH_{2n+1}$, with, for example, n=4-15.

Since the 1930's small molecule phthalate esters have been used (approximately 6 million tons per year) for the formulation of PVC consumer products. Phthalates can leach from the plastic matrix into the environment, because there is no covalent bond between the phthalates and the plastics with which they are mixed. As a plastic ages and breaks down, the rate of release of phthalates accelerates.

In use, phthalate esters leach from the polymer matrix and, when metabolized, can give rise to molecules that can bind to and act upon the endocrine receptors of mammals, reptiles, amphibians, and birds. This is because the leached phthalate esters may structurally and functionally resemble hormones and, therefore, act as endocrine disruptors.

Endocrine disruptors may cause serious health problems including male and female reproductive tract abnormalities, feminization, miscarriage, menstrual problems, changes in hormone levels, early puberty, brain and behavioral problems, impaired immune function, developmental abnormalities, infertility, and cancer. These risks have been recognized, and the incorporation of phthalate plasticizers into certain products, including child care products and some toys, has been restricted. The use of the specific phthalate esters DEHP, DBP (dibutyl phthalate) and BBP (butylbenzyl phthalate) in toys and other child care articles was banned by the European Union in 2005 and was restricted in the United States in 2008 for toys marketed to children 12 years of age or younger and child care articles for children 3 years of age or younger. But phthalate plasticizers continue to be used in medical devices, some toys, articles such as raincoats, and cosmetics. Alternative plasticizers that do not pose such risks could find application in a range of consumer, household, and industrial products.

SUMMARY OF THE INVENTION

In an embodiment of the invention, a polymer having a polyvinylchloride (PVC) backbone includes the structure

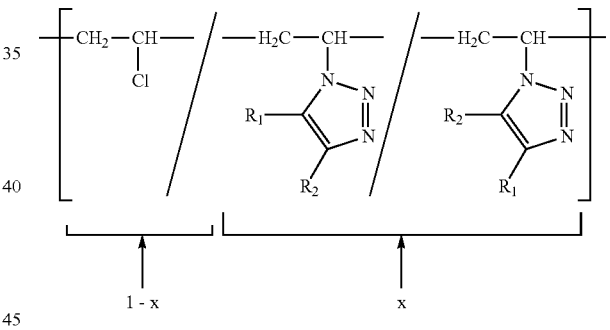

$R_1$ can include

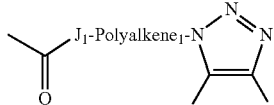

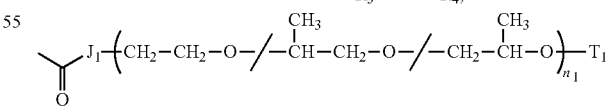

(which includes one or more oxyethylene units and/or one or more oxypropylene units in any order, i.e., can be a "mixed" poly(oxyethylene) (poly(ethylene oxide) (PEO) or polyethylene glycol (PEG))—poly(oxypropylene (poly(propylene oxide) (PPO) or polypropylene glycol (PPG)) polymer, with the oxyethylene units and/or the oxypropylene units in a random, block, or other configuration),

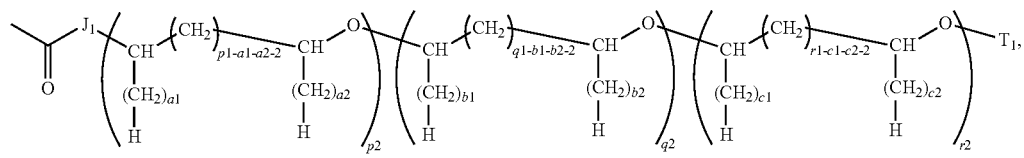

$R_3$ can be hydrogen (H),

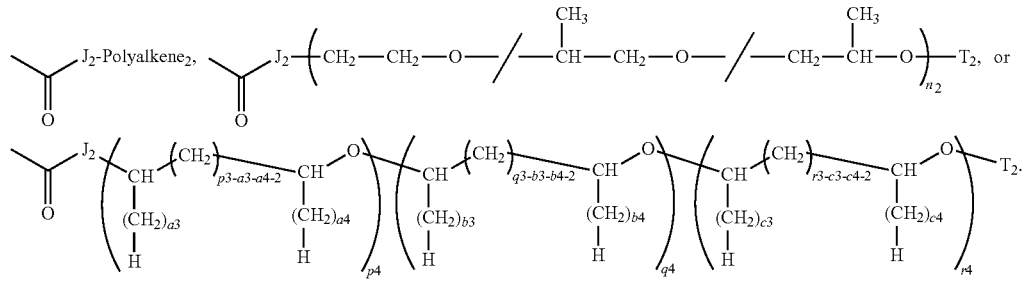

$R_4$ can be hydrogen (H),

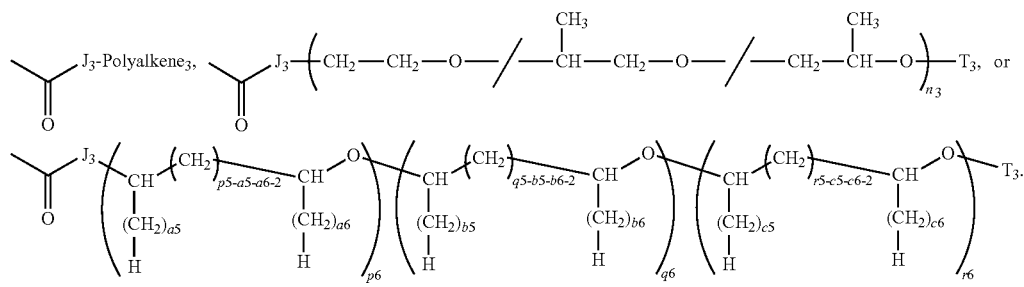

$J_1$, $J_2$, and $J_3$ can be each independently selected as oxygen (O) (so that an ester results) or NH (so that an amide results). $T_1$, $T_2$, and $T_3$ are end or capping groups that can be each independently selected from hydrogen (H) (so that a terminal alcohol results), methyl ($CH_3$) (so that a terminal methyl ether results), a linear or branched polyalkene of from 2 to 40 carbons (so that a terminal ether results), an acetyl ($(C=O)CH_3$) (so that a terminal acetoxy results), or a carbonyl (CO)=bound to a linear or branched polyalkene of from 2 to 40 carbons (so that a terminal ester results). $n_1$, $n_2$, and $n_3$ each can be independently selected as an integer that is at least 1. Polyalkene$_1$ can be methylene ($CH_2$) or a linear or branched polyalkene of from 2 to 40 carbons. Polyalkene$_2$ and Polyalkene$_3$ can be each independently selected from methyl ($CH_3$) or a linear or branched polyalkene of from 2 to 40 carbons.

$p_1$, $q_1$, and $r_1$ can be each independently selected as 2, 3, or 4. When $p_1$ is 2 or 4, then $a_1$ and $a_2$ each can be 0. When $p_1$ is 3, then at and $a_2$ each can be 0, or $a_1$ can be 1 and $a_2$ can be 0, or $a_1$ can be 0 and $a_2$ can be 1. When $q_1$ is 2 or 4, then $b_1$ and $b_2$ each can be 0. When $q_1$ is 3, then $b_1$ and $b_2$ each can be 0, or $b_1$ can be 1 and $b_2$ can be 0, or $b_1$ can be 0 and $b_2$ can be 1. When $r_1$ is 2 or 4, then $c_1$ and $c_2$ each can be 0. When $r_1$ is 3, then $c_1$ and $c_2$ each can be 0, or $c_1$ can be 1 and $c_2$ can be 0, or $c_1$ can be 0 and $c_2$ can be 1. $p_2$, $q_2$, and $r_2$ each can be independently selected as an integer that is at least 0, and the sum $p_2+q_2+r_2$ can be at least 1.

$p_3$, $q_3$, and $r_3$ each can be independently selected as 2, 3, or 4. When $p_3$ is 2 or 4, then $a_3$ and $a_4$ each can be 0. When $p_3$ is 3, then $a_3$ and $a_4$ each can be 0, or $a_3$ can be 1 and $a_4$ can be 0, or $a_3$ can be 0 and $a_4$ can be 1. When $q_3$ is 2 or 4, then $b_3$ and $b_4$ each can be 0. When $q_3$ is 3, then $b_3$ and $b_4$ each can be 0, or $b_3$ can be 1 and $b_a$ can be 0, or $b_3$ can be 0 and $b_4$ can be 1. When $r_3$ is 2 or 4, then $c_3$ and $c_4$ each can be 0. When $r_3$ is 3, then $c_3$ and $c_4$ each can be 0, or $c_3$ can be 1 and $c_4$ can be 0, or $c_3$ can be 0 and $c_4$ can be 1. $p_4$, $q_4$, and $b_4$ each can be independently selected as an integer that is at least 0, and the sum $p_4+q_4+r_4$ can be at least 1.

$p_5$, $q_5$, and $r_5$ each can be independently selected as 2, 3, or 4. When $p_5$ is 2 or 4, then $a_5$ and $a_6$ each can be 0. When $p_5$ is 3, then $a_5$ and $a_6$ each can be 0, or $a_5$ can be 1 and $a_6$ can be 0, or as can be 0 and $a_6$ can be 1. When $q_5$ is 2 or 4, then $b_5$ and $b_6$ each can be 0. When $q_5$ is 3, then $b_5$ and $b_6$ each can be 0, or $b_5$ can be 1 and $b_6$ can be 0, or $b_5$ can be 0 and $b_6$ can be 1. When $r_5$ is 2 or 4, then $c_5$ and $c_6$ each can be 0. When $r_5$ is 3, then $c_5$ and $c_6$ each can be 0, or $c_5$ can be 1 and $c_6$ can be 0, or $c_5$ can be 0 and $c_6$ can be 1. $p_6$, $q_6$, and $r_6$ each can be independently selected as an integer that is at least 0, and the sum $p_6+q_6+r_6$ can be at least 1.

$R_2$ can include hydrogen (H),

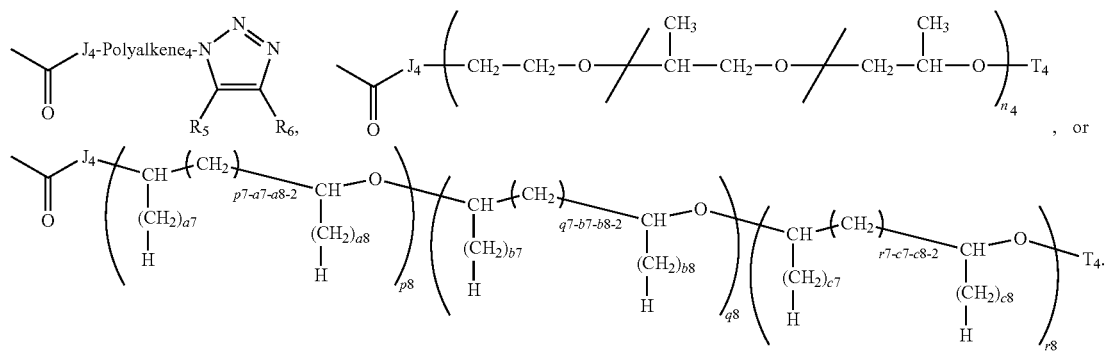

, or $R_5$ can be hydrogen,

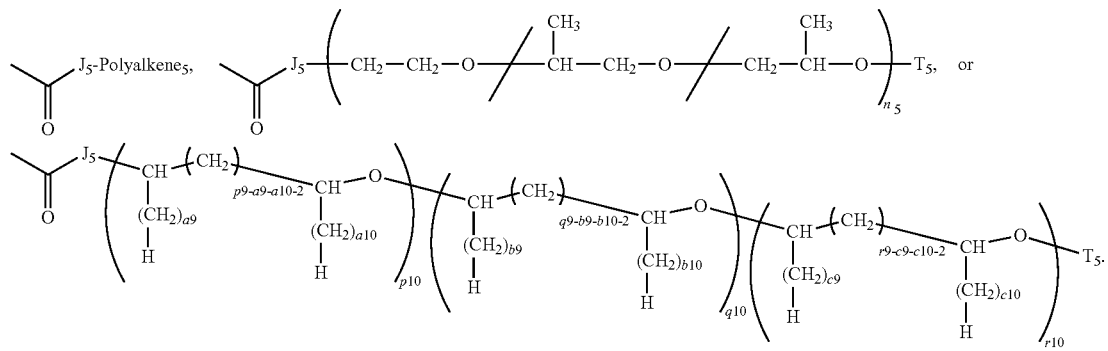

, or $R_6$ can be hydrogen,

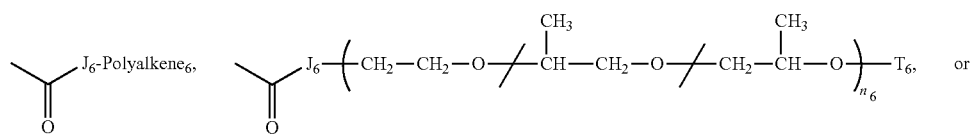

, or

-continued

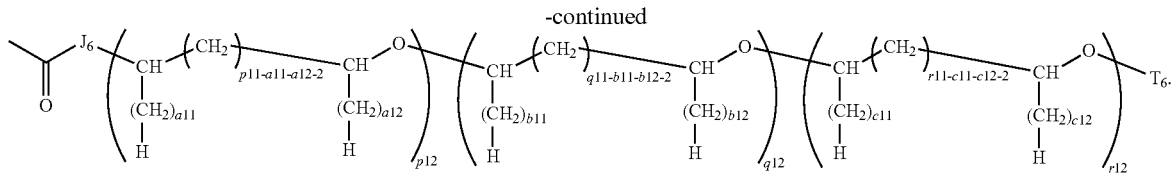

$J_4$, $J_5$, and $J_6$ can be each independently selected as oxygen (O) or NH. $T_4$, $T_5$, and $T_6$ are each independently selected from the group consisting of hydrogen (H), methyl ($CH_3$), a linear or branched polyalkene of from 2 to 40 carbons, an acetyl ((C=O)$CH_3$), and a carbonyl (C=O) bound to a linear or branched polyalkene of from 2 to 40 carbons. $n_4$, $n_5$, and $n_6$ each can be independently selected as an integer that is at least 1. Polyalkene$_4$ can be methylene ($CH_2$) or a linear or branched polyalkene of from 2 to 40 carbons. Polyalkene$_5$ and Polyalkene$_6$ can be independently selected from methyl ($CH_3$) or a linear or branched polyalkene of from 2 to 40 carbons.

$p_7$, $q_7$, and r each can be independently selected as 2, 3, or 4. When $p_7$ is 2 or 4, then $a_7$ and as each can be 0. When $p_7$ is 3, then $a_7$ and as each can be 0, or $a_7$ can be 1 and as can be 0, or $a_7$ can be 0 and as can be 1. When $q_7$ is 2 or 4, then $b_7$ and $b_8$ each can be 0. When $q_7$ is 3, then $b_7$ and $b_8$ each can be 0, or $b_7$ can be 1 and $b_8$ can be 0, or $b_7$ can be 0 and $b_8$ can be 1. When $r_7$ is 2 or 4, then $c_7$ and $c_8$ each can be 0. When r is 3, then $c_7$ and $c_8$ each can be 0, or $c_7$ can be 1 and $c_8$ can be 0, or $c_7$ can be 0 and $c_8$ can be 1. $p_8$, $c_8$, and $r_8$ each can be independently selected as an integer that is at least 0, and the sum $p_8+q_8+r_8$ can be at least 1.

$p_9$, $q_9$, and $r_9$ each can be independently selected as 2, 3, or 4. When $p_9$ is 2 or 4, then $a_9$ and $a_{10}$ each can be 0. When $p_9$ is 3, then $a_9$ and $a_{10}$ each can be 0, or $a_9$ can be 1 and am can be 0, or $a_9$ can be 0 and am can be 1. When $q_9$ is 2 or 4, then $b_9$ and $b_{10}$ each can be 0. When $q_9$ is 3, then $b_9$ and $b_{10}$ each can be 0, or $b_9$ can be 1 and $b_{10}$ can be 0, or $b_9$ can be 0 and $b_{10}$ can be 1. When $r_9$ is 2 or 4, then $c_9$ and cm each can be 0. When $r_9$ is 3, then $c_9$ and $c_{10}$ each can be 0, or $c_9$ can be 1 and $c_{10}$ can be 0, or $c_9$ can be 0 and $c_{10}$ can be 1. $p_{10}$ $q_{10}$, and $r_{10}$ each can be independently selected as an integer that is at least 0, and the sum $p_{10}+q_{10}+r_{10}$ can be at least 1.

$p_{11}$, $q_{11}$, and $r_{11}$ each can be independently selected as 2, 3, or 4. When $p_{11}$ is 2 or 4, then $a_{11}$ and $a_{12}$ each can be 0. When $p_{11}$ is 3, then $a_{11}$ and $a_{12}$ each can be 0, or $a_{11}$ can be 1 and $a_{12}$ can be 0, or $a_{11}$ can be 0 and $a_{12}$ can be 1. When $q_{11}$ is 2 or 4, then $b_{11}$ and $b_{12}$ each can be 0. When $q_{11}$ is 3, then $b_{11}$ and $b_{12}$ each can be 0, or $b_{11}$ can be 1 and $b_{12}$ can be 0, or $b_{11}$ can be 0 and $b_{12}$ can be 1. When $r_{11}$ is 2 or 4, then $c_{11}$ and $c_{12}$ each can be 0. When $r_{11}$ is 3, then $c_{11}$ and $c_{12}$ each can be 0, or $c_{11}$ can be 1 and $c_{12}$ can be 0, or $c_{11}$ can be 0 and $c_{12}$ can be 1. $p_{12}$, $q_{12}$, and $r_{12}$ each can be independently selected as an integer that is at least 0, and the sum $p_{12}+q_{12}+r_{12}$ can be at least 1.

As indicated above, $p_1$, $q_1$, $r_1$, $p_3$, $q_3$, $r_3$, $p_5$, $q_5$, $r_5$, $p_7$, $q_7$, $r_7$, $p_9$, $q_9$, $r_9$, $p_{11}$, $q_{11}$, and $r_{11}$ each can be independently selected as 2, 3, or 4. A selection of 2 corresponds to the mer (repeat unit) being oxyethylene (derived from ethylene oxide), and the corresponding block is then poly(oxyethylene) (i.e., polyethylene glycol (PEG) or poly(ethylene oxide) (PEO)). A selection of 3 corresponds to the mer (repeat unit) being oxytrimethylene, with the corresponding block then being poly(oxytrimethylene) (i.e., poly(trimethylene glycol)), or to the mer (repeat unit) being oxypropylene (derived from propylene oxide), with the corresponding block then being poly(oxypropylene) (i.e., polypropylene glycol (PPG) or poly(propylene oxide) (PPO)). A selection of 4 corresponds to the mer (repeat unit) being oxytetramethylene, with the corresponding block then being poly(oxytetramethylene) (i.e., poly(tetrahydrofuran) or poly(tetramethylene oxide)), or to the mer (repeat unit) being oxybutylene, with the corresponding block then being poly(oxybutylene) (i.e., polybutylene glycol or poly(butylene oxide)).

$\underline{x}$ is the fraction of groups substituted for chlorine atoms on the poly(vinylchloride) (PVC) backbone and can be from 0.001 to 1. $1-\vec{x}$ is the fraction of residual chlorine atoms on the PVC backbone.

In an embodiment of the invention, the sum $p_2+q_2+r_2$ is an integer in the range of from 1 to 200, the sum $p_4+q_4+r_4$ is an integer in the range of from 1 to 200, the sum $p_6+q_6+r_6$ is an integer in the range of from 1 to 200, the sum $p_4+q_4+r_4$ is an integer in the range of from 1 to 200, the sum $p_{10}+q_{10}+r_{10}$ is an integer in the range of from 1 to 200, the sum $p_{12}+q_{12}+r_{12}$ is an integer in the range of from 1 to 200, and $n_1$, $n_2$, $n_3$, $n_4$, $n_5$, and $n_6$ are each independently selected as an integer in the range of from 1 to 200.

In an embodiment of the invention, $\underline{x}$ is from 0.001 to 0.5, from 0.01 to 0.4, or from 0.02 to 0.3.

In an embodiment of the invention, $p_1$, $q_1$, and $r_1$ are each independently selected as 2 or 3, $p_3$, $q_3$, and $r_3$ are each independently selected as 2 or 3, $p_5$, $q_5$, and $r_5$ are each independently selected as 2 or 3, $p_7$, $q_7$, and $r_7$ are each independently selected as 2 or 3, $p_9$, $q_9$, and $r_9$ are each independently selected as 2 or 3, and $p_{11}$, $q_{11}$, and $r_{11}$ are each independently selected as 2 or 3.

In an embodiment of the invention, the following is the case: when $p_1$ is 3, then $a_1$ is 1 and $a_2$ is 0, or $a_1$ is 0 and $a_2$ is 1; when $q_1$ is 3, then $b_1$ is 1 and $b_2$ is 0, or $b_1$ is 0 and $b_2$ is 1; when $r_1$ is 3, then $c_1$ is 1 and $c_2$ is 0, or $c_1$ is 0 and $c_2$ is 1; when $p_3$ is 3, then $a_3$ is 1 and $a_4$ is 0, or $a_3$ is 0 and $a_4$ is 1; when $q_3$ is 3, then $b_3$ is 1 and 13.4 is 0, or $b_3$ is 0 and 13.4 is 1; when $r_3$ is 3, then $c_3$ is 1 and $c_4$ is 0, or $c_3$ is 0 and $c_4$ is 1; when $p_5$ is 3, then $a_5$ is 1 and $a_6$ is 0, or as is 0 and $a_6$ is 1; when $q_5$ is 3, then $b_5$ is 1 and $b_6$ is 0, or $b_5$ is 0 and $b_6$ is 1; when $r_5$ is 3, then $c_5$ is 1 and $c_6$ is 0, or $c_5$ is 0 and $c_6$ is 1; when $p_7$ is 3, then $a_7$ is 1 and as is 0, or $a_7$ is 0 and as is 1; when $q_7$ is 3, then $b_7$ is 1 and $b_8$ is 0, or $b_7$ is 0 and $b_8$ is 1; when $r_7$ is 3, then $c_7$ is 1 and $c_8$ is 0, or $c_7$ is 0 and $c_8$ is 1; when $p_9$ is 3, then $a_9$ is 1 and $a_{10}$ is 0, or $a_9$ is 0 and $a_{10}$ is 1; when $q_9$ is 3, then $b_9$ is 1 and $b_{10}$ is 0, or $b_9$ is 0 and $b_{10}$ is 1; when $r_9$ is 3, then $c_9$ is 1 and $c_{10}$ is 0, or $c_9$ is 0 and $c_{10}$ is 1; when $p_{11}$ is 3, then $a_{11}$ is 1 and $a_{12}$ is 0, or $a_{11}$ is 0 and $a_{12}$ is 1; when qui is 3, then $b_1$ t is 1 and $b_{12}$ is 0, or $b_{11}$ is 0 and $b_{12}$ is 1; and when $r_{11}$ is 3, then $c_{11}$ is 1 and $c_{12}$ is 0, or $c_{11}$ is 0 and $c_{12}$ is 1.

In an embodiment of the invention, $R_1$ is not

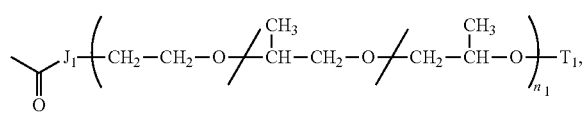

$R_3$ is not

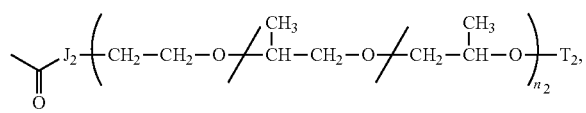

$R_4$ is not

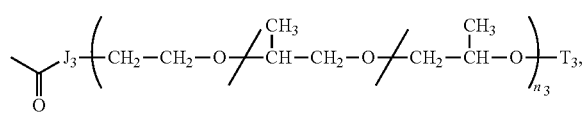

$R_2$ is not

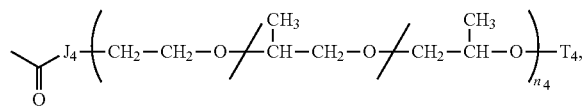

$R_5$ is not

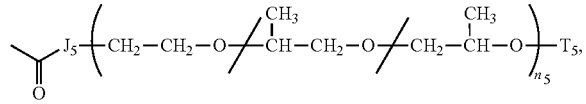

and $R_6$ is not

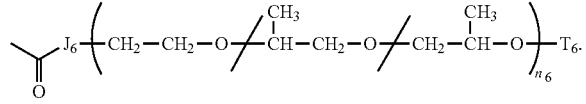

$J_1$, $J_2$, $J_3$, $J_4$, $J_5$, and $J_6$ each can be oxygen (O). $T_1$, $T_2$, $T_3$, $T_4$, $T_5$, and $T_6$ each can be methyl ($CH_3$). $q_2$, $r_2$, $q_4$, $r_4$, $q_6$, $r_6$, $q_8$, $r_8$, $q_{10}$, $r_{10}$, $q_{12}$, and $r_{12}$ each can be 0. $a_1$, $a_2$, $a_3$, $a_4$, $a_5$, $a_6$, $a_7$, $a_8$, $a_9$, $a_{10}$, $a_{11}$, and $a_{12}$ each can be 0.

In an embodiment of the invention, a polymer having a polyvinylchloride (PVC) backbone includes the structure

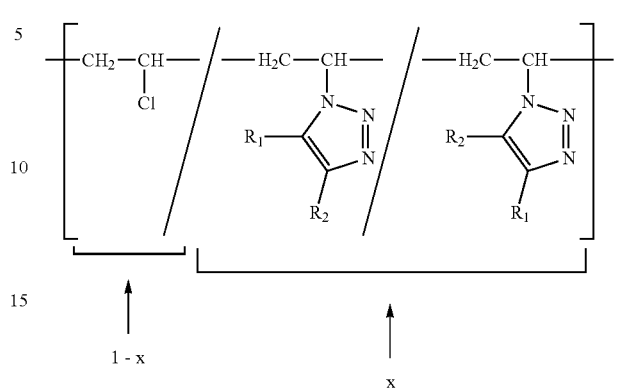

$R_1$ can include

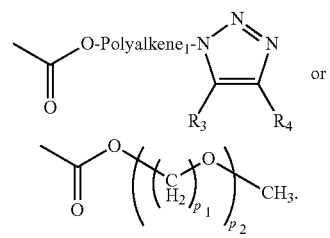

$R_3$ can be hydrogen,

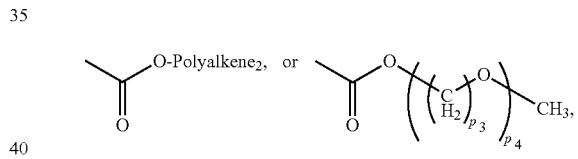

and
$R_4$ can be hydrogen,

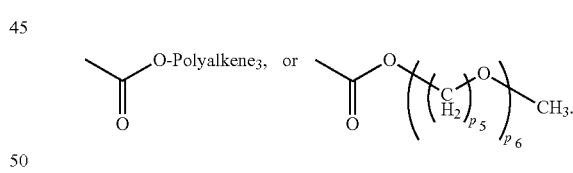

Polyalkene$_1$ can be methylene or a linear or branched polyalkene of at least 4 carbons or from 2 to 40 carbons, for example, a linear or branched polyalkene having from 2, 3, 4, 5, 8, 10, 15, 20, 25, 30, 35, 39 or any intermediate integer number of carbons to 3, 4, 5, 8, 10, 15, 20, 25, 30, 35, 40 or any intermediate integer number of carbons. For example, Polyalkene$_1$ can be methyl, ethyl, 1-methylethyl (isopropyl), n-butyl, 2-methylpropyl (isobutyl), n-hexyl, n-octyl, 2-ethylhexyl, 6-methylheptyl (isooctyl), 7-methyloctyl (isononyl), 3,3,5-trimethylhexyl, or 8-methylnonyl (isodecyl). Polyalkene$_2$ and Polyalkene$_3$ can be each independently selected from methyl or a linear or branched polyalkene of from 2 to 40 carbons, for example, a linear or branched polyalkene having from 2, 3, 4, 5, 8, 10, 15, 20, 25, 30, 35, 39 or any intermediate integer number of carbons to 3, 4, 5, 8, 10, 15, 20, 25, 30, 35, 40 or any intermediate integer number of carbons. For example, Polyalkene$_2$ and Polyalkene$_3$ can be methyl, ethyl, 1-methylethyl (isopropyl), n-butyl, 2-methylpropyl (isobutyl), n-hexyl, n-octyl, 2-ethylhexyl, 6-methylheptyl (isooctyl), 7-methyloctyl (isononyl), 3,3,5-trimethylhexyl, or 8-methylnonyl (isodecyl). $p_1$, $p_3$, and $p_5$ can be each independently selected as 2 (corresponding to oxyethylene (ethylene glycol (ethylene oxide)) or poly(oxyethylene) (polyethylene glycol (poly(ethylene oxide)), 3 (corresponding to oxypropylene (propylene glycol (propylene oxide)) or oxytrimethylene or poly(oxypropylene) (polypropylene glycol (poly(propylene oxide)) or poly(oxytrimethylene) (poly(trimethylene glycol))), or 4 (corresponding to oxybutylene (butylene glycol (butylene oxide)) or oxytetramethylene or polybutylene glycol (poly(butylene oxide)) or poly(oxytetramethylene) (poly(tetrahydrofuran) (poly(tetramethylene oxide)))). $p_2$, $p_4$, and $p_6$ represent the degree of polymerization of the corresponding part and can be each independently selected as an integer that is at least 1, at least 4, or an integer in the range of from 1 to 200, for example, from 1, 2, 3, 4, 5, 7, 10, 12, 15, 20, 22, 30, 32, 34, 35, 40, 44, 45, 50, 54, 100, 199 or any intermediate integer to 2, 3, 4, 5, 7, 10, 12, 15, 20, 22, 30, 32, 34, 35, 40, 44, 45, 50, 54, 100, 200 or any intermediate integer.

$R_2$ can include hydrogen,

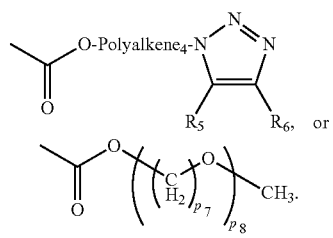

$R_5$ can be hydrogen,

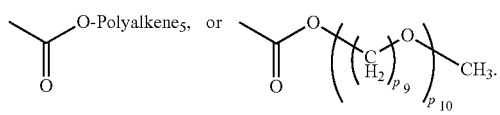

$R_6$ can be hydrogen,

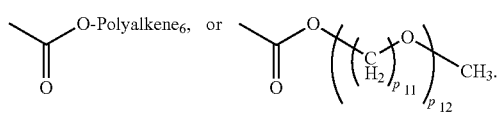

Polyalkene$_4$ can be methylene or a linear or branched polyalkene of at least 4 carbons or from 2 to 40 carbons, for example, a linear or branched polyalkene having from 2, 3, 4, 5, 8, 10, 15, 20, 25, 30, 35, 39 or any intermediate integer number of carbons to 3, 4, 5, 8, 10, 15, 20, 25, 30, 35, 40 or any intermediate integer number of carbons. For example, Polyalkene$_4$ can be methyl, ethyl, 1-methylethyl (isopropyl), n-butyl, 2-methylpropyl (isobutyl), n-hexyl, n-octyl, 2-ethylhexyl, 6-methylheptyl (isooctyl), 7-methyloctyl (isononyl), 3,3,5-trimethylhexyl, or 8-methylnonyl (isodecyl). Polyalkene$_5$ and Polyalkene$_6$ can be independently selected from methyl or a linear or branched polyalkene of from 2 to 40 carbons, for example, a linear or branched polyalkene having from 2, 3, 4, 5, 8, 10, 15, 20, 25, 30, 35, 39 or any intermediate integer number of carbons to 3, 4, 5, 8, 10, 15, 20, 25, 30, 35, 40 or any intermediate integer number of carbons. For example, Polyalkene$_5$ and Polyalkene$_6$ can be methyl, ethyl, 1-methylethyl (isopropyl), n-butyl, 2-methylpropyl (isobutyl), n-hexyl, n-octyl, 2-ethylhexyl, 6-methylheptyl (isooctyl), 7-methyloctyl (isononyl), 3,3,5-trimethylhexyl, or 8-methylnonyl (isodecyl). $p_7$, $p_9$, and $p_{11}$ can be each independently selected as 2, 3, or 4. $p_8$, $p_{10}$, and $p_{12}$ can be each independently selected as an integer that is at least 1, at least 4, or an integer in the range of from 1 to 200, for example, from 1, 2, 3, 4, 5, 7, 10, 12, 15, 20, 30, 32, 34, 35, 40, 44, 45, 50, 54 100, 199 or any intermediate integer to 2, 3, 4, 5, 7, 10, 12, 15, 20, 22, 30, 32, 34, 35, 40, 44, 45, 50, 54, 100, 200 or any intermediate integer. $\underline{x}$ represents the fraction of groups substituted for chlorine atoms on the PVC backbone and can be from 0.0001 to 1 (substitution of all chlorine atoms). For example, $\underline{x}$ can be at least 0.05, at least 0.15, or from 0.0001, 0.0002, 0.0005, 0.001, 0.002, 0.005, 0.01, 0.02, 0.03, 0.04, 0.05, 0.06, 0.07, 0.08, 0.09, 0.10, 0.11, 0.12, 0.13, 0.14, 0.15, 0.16, 0.17, 0.18, 0.19, 0.20, 0.22, 0.25, 0.30, 0.35, 0.40, 0.45, 0.50, 0.55, 0.60, 0.70, 0.80, 0.90, 0.95, or 0.99 to 0.0002, 0.0005, 0.001, 0.002, 0.005, 0.01, 0.02, 0.03, 0.04, 0.05, 0.06, 0.07, 0.08, 0.09, 0.10, 0.11, 0.12, 0.13, 0.14, 0.15, 0.16, 0.17, 0.18, 0.19, 0.20, 0.22, 0.25, 0.30, 0.35, 0.40, 0.45, 0.50, 0.55, 0.60, 0.70, 0.80, 0.90, 0.95, or 1.

1−$\underline{x}$ represents the fraction of residual chlorine atoms on the PVC backbone.

In an embodiment of the invention, a composition includes a polymer of an embodiment of the invention (a polymer set forth herein) and (untreated) poly(vinyl chloride) (PVC). For example, the polymer of an embodiment of the invention (a polymer set forth herein) can be from 0.001, 0.002, 0.005, 0.01, 0.02, 0.05, 0.1, 0.2, 0.5, 1, 2, 3, 4, 5, 6, 7, 8, 9, 10, 11, 12, 13, 14, 15, 16, 17, 18, 19, 20, 22, 25, 30, 35, 40, 45, 50, 55, 60, 70, 80, 90, 95, or 99 wt % (weight %) to 0.002, 0.005, 0.01, 0.02, 0.05, 0.1, 0.2, 0.5, 1, 2, 3, 4, 5, 6, 7, 8, 9, 10, 11, 12, 13, 14, 15, 16, 17, 18, 19, 20, 22, 25, 30, 35, 40, 45, 50, 55, 60, 70, 80, 90, 95, 99, or 100 wt % of the composition.

In this text, unless otherwise indicated, the terms polyethylene glycol, poly(ethylene glycol), PEG, poly(ethylene oxide), PEO, and poly(oxyethylene) are used interchangeably. In this text, unless otherwise indicated, the terms polypropylene glycol, poly(propylene glycol), PPG, poly(propylene oxide), PPO, and poly(oxypropylene) are used interchangeably.

DETAILED DESCRIPTION

Figure 1:
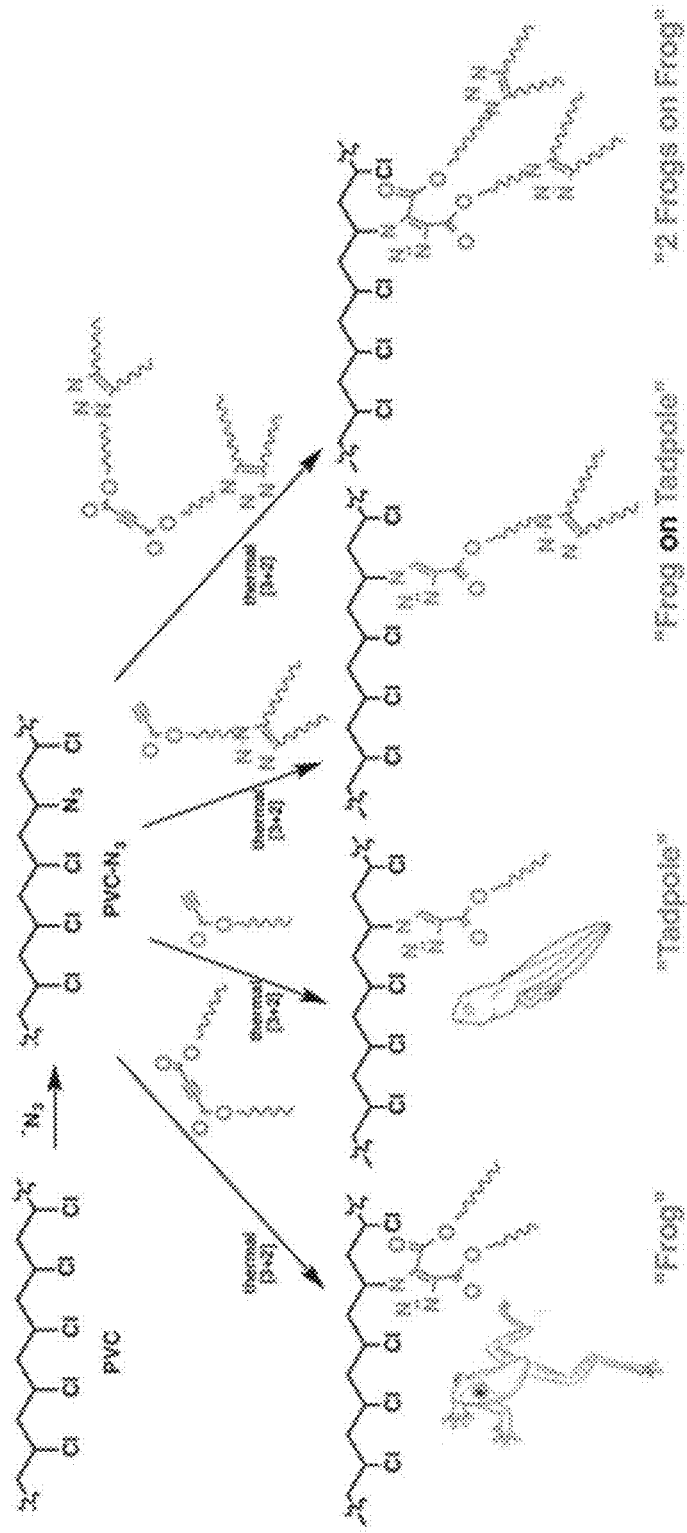
FIG. 1 provides an overview of a synthetic approach according to the invention.

Embodiments of the invention are discussed in detail below. In describing embodiments, specific terminology is employed for the sake of clarity. However, the invention is not intended to be limited to the specific terminology so selected. A person skilled in the relevant art will recognize that other equivalent parts can be employed and other methods developed without parting from the spirit and scope of the invention. All references cited herein are incorporated by reference as if each had been individually incorporated.

Several publications specifically incorporated by reference include: Navarro et al., "Phthalate Plasticizers Covalently Bound to PVC: Plasticization with Suppressed Migration", Macromolecules, 43 (2010) 2377-2381; Pawlak et al., "Terrocene Bound Poly(vinyl chloride) as Ion to Electron Transducer in Electrochemical Ion Sensors", Analytical Chemistry, 82(16) (2010) 6887-6894; Pawlak et al., "In situ surface functionalization of plasticized poly(vinyl chloride) membranes by 'click chemistry'", Journal of Materials Chemistry, 22(25) (2012) 12796-12801; Gonzaga et al., "Versatile, efficient derivatization of polysiloxanes via click technology", Chemical Communications, (13) (2009) 1730-1732; and Grande et al., "Testing the functional tolerance of the Piers-Rubinsztajn reaction: a new strategy for functional silicones", Chemical Communications, 46(27) (2010) 4988-4990.

The embodiments disclosed in this specification are exemplary and do not limit the invention. Other embodiments can be utilized and changes can be made. As used in this specification, the singular forms "a", "an", and "the" include plural reference unless the context clearly dictates otherwise. Thus, for example, a reference to "a part" includes a plurality of such parts, and so forth. The term "comprises" and grammatical equivalents thereof are used in this specification to mean that, in addition to the features specifically identified, other features are optionally present. Where reference is made in this specification to a method comprising two or more defined steps, the defined steps can be carried out in any order or simultaneously (except where the context excludes that possibility), and the method can optionally include one or more other steps which are carried out before any of the defined steps, between two of the defined steps, or after all the defined steps (except where the context excludes that possibility). Where reference is made herein to "first" and "second" features, this is generally done for identification purposes; unless the context requires otherwise, the first and second features can be the same or different, and reference to a first feature does not mean that a second feature is necessarily present (though it may be present). Where reference is made herein to "a" or "an" feature, this includes the possibility that there are two or more such features.

The invention encompasses methods of forming functional groups and covalently attaching them to polymers such as polyvinyl chloride (PVC), with these functional groups acting to plasticize PVC and other polymers. These functional groups can act as "phthalate ester mimics," in that they can plasticize a plastic; however, these functional groups are covalently bound to the backbone of the polymer that they are intended to plasticize, unlike conventional, exogenous phthalate plasticizer molecules. That is, these functional groups are covalently bound to the backbone of the polymer that they are intended to plasticize and act as "internal plasticizers." Commercial polymers containing such internal plasticizers will not leach endocrine disruption chemicals (or leach such chemicals only in very small quantities) (i.e., endocrine disruption chemicals will not leach, or leach only in very small quantities, from the matrix of polymers with internal plasticizers according to the invention). The invention also encompasses the products of such reactions, for example, PVC with internal plasticizers, and methods of using such products. For example, the invention encompasses polymer blends formed by blending PVC with internal plasticizers with unfunctionalized PVC.

The invention encompasses polymer (or copolymer) compounds in which an internal plasticizer, such as a triazole, which acts as a plasticizing agent, is covalently bonded to the polymer (or copolymer) backbone, such as a polyvinyl chloride (PVC) backbone, so that the polymer (or copolymer) backbone is plasticized. The internal plasticizer can include pendant groups, e.g., groups pendant from a triazole. For example, an internal plasticizer can include a triazole having pendant branched or unbranched alkyl or polyether (e.g., polyethylene oxide (PEO) (polyethylene glycol (PEG)), polypropylene oxide (PPO), poly(oxytrimethylene), polybutylene oxide, or polytetrahydrofuran (PTHF)) groups of a selected length or such groups in which a "node" group, such as a triazole, causes branching, with further branched or unbranched alkyl or polyether chains pendant from such a node group. One or more types of internal plasticizer can be covalently bonded to the polymer (or copolymer) backbone. Because of the covalent bond, the internal plasticizer does not leach (or only leaches in very small quantities) from the polymer matrix into the environment. Thus, the invention encompasses a new form of plasticized PVC that does not pose the risks of conventional plasticized PVC. The invention further encompasses compositions in which a polymer with an internal plasticizer covalently bonded to the polymer (or copolymer) backbone is blended with another polymer (or copolymer), such as the unfunctionalized polymer (or copolymer). For example, the invention encompasses PVC with covalently-bonded triazole groups blended with unfunctionalized PVC. The invention comprises articles made with such an internally-plasticized polymer (or copolymer) or compositions of the internally-plasticized polymer (or copolymer) blended with another polymer (or copolymer). The invention further encompasses methods of making such internally-plasticized polymer (or copolymer) compounds in which an internal-plasticizer is covalently bonded to the polymer (or copolymer) backbone, methods of making compositions in which the internally-plasticized polymer (or copolymer) is blended with another polymer (or copolymer), and methods of making articles, such as consumer and industrial products, from such internally-plasticized polymer (or copolymer) compounds and blended compositions.

The internally-plasticized polymer (or copolymer) according to the invention can be produced to have a certain (e.g., a predetermined) degree of polymerization or molar mass (molecular weight), for example, a certain number-average molar mass (number-average molecular weight, $M_n$), weight-average molar mass ($M_w$), or higher-moment-average molecular weight, and a certain (e.g., a predetermined) degree (percentage) of functionalization of the polymer backbone with the internal plasticizer functional group. The polymer microstructure, such as the degree of polymerization, the structure of the internal plasticizer (e.g., the length of a polyethylene oxide group pendant from a triazole and the number of branches from that polyethylene oxide group), and the degree of functionalization can be adjusted to obtain desired physiochemical properties of the internally-plasticized polymer, such as glass-transition temperature ($T_g$), modulus of elasticity, and tensile strength.

The composition according to the invention in which a polymer in which the internally-plasticized polymer (or copolymer) is blended with another polymer (or copolymer) can be produced to have a certain (e.g., a predetermined) ratio of the internally-plasticized polymer to the other polymer. For example, the composition can have a certain ratio of the mass of triazole-functionalized PVC to the mass of unfunctionalized PVC. The microstructure of the internally-plasticized polymer, the microstructure of the other polymer, and the ratio at which the internally-plasticized polymer and the other polymer are blended can be adjusted to obtain desired physiochemical properties of the blended composition. For example, a certain grade of unfunctionalized, commercially-produced PVC can be selected, and this can be blended with a proportion of triazole-functionalized PVC, with the triazole-functionalized PVC acting as a "macro-plasticizer," so that the Tg of the blended composition is lower than the Tg of the unfunctionalized, commercially-produced PVC that is used. For example, the blending can be done by a plastics compounding operation, such as melt mixing in a twin-screw extruder, or by solution casting. The proportion of triazole-functionalized PVC in the blended composition can be from 0.01 to 99 wt % of the composition. For example, the proportion of triazole-functionalized PVC in the blended composition can be from 0.01, 0.02, 0.05, 0.1, 0.2, 0.5, 1, 2, 5, 8, 10, 12, 15, 20, 22, 25, 30, 35, 40, 45, 50, 55, 60, 65, 70, 75, 80, 85, 90, 95, or 98 wt % to 0.02, 0.05, 0.1, 0.2, 0.5, 1, 2, 5, 8, 10, 12, 15, 20, 22, 25, 30, 35, 40, 45, 50, 55, 60, 65, 70, 75, 80, 85, 90, 95, or 99 wt %.

Figure 5A:
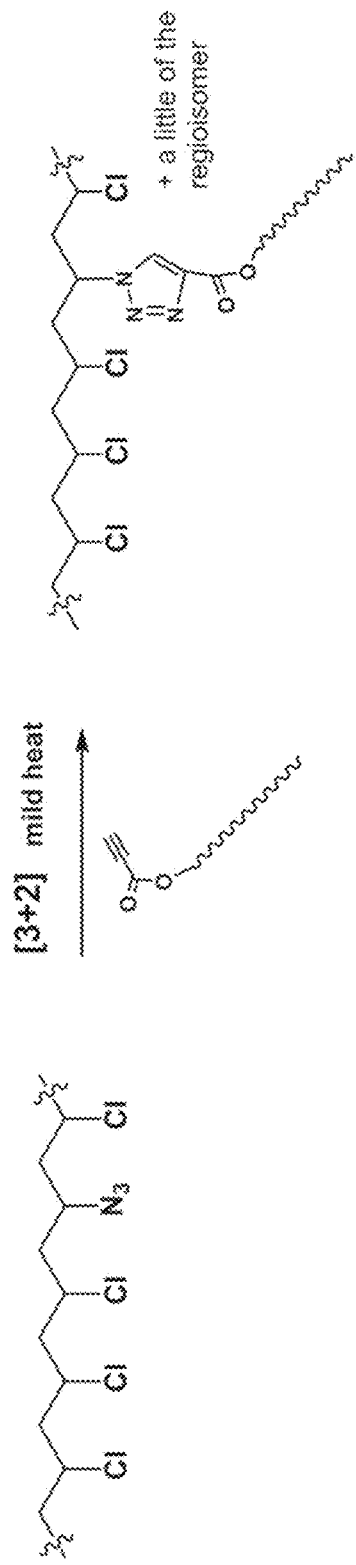
FIG. 5A shows a synthetic scheme according to the invention for producing alkoxy-polyether-carbonyltriazole functionalized internally-plasticized PVCs.

Miscibility within the functionalized polyvinyl chloride (PVC) and in blends of the functionalized PVC and the unfunctionalized PVC can be determined by IR-spectroscopy and differential scanning calorimetry (DSC). Interactions between the $CH_2$—Cl groups of PVC and, for example, carbonyl groups of the functionalized PVC are indicated by a shift of the carbonyl peak to lower wavenumbers in IR spectra. The existence of a single glass transition temperature ($T_g$) generally indicates full miscibility of regions within a polymer and/or between polymers in a blend. (There can be exceptions to this. For example, the polymer in which 15% of the chloride groups (atoms) in the PVC were replaced with methoxy-poly(ethylene glycol) 2000-carbonyl)-triazole groups (PVC 15% Tri-PEG2000Me) (the "poly(ethylene glycol)2000" ("PEG2000") is a chain segment of an approximate average molecular weight of 2000 g/mol that is pendant from the PVC backbone) (see below the synthetic description M63 and, in the "Results of Characterization of Products (Compounds Synthesized)" section, the description of FIG. 5C) exhibited a second "pseudo" $T_g$ at approximately 23° C. Without being bound by theory, this may have been the result of the abundance of the pendant PEG2000 polyether chains in the polymer as a whole, resulting in those PEG2000 polyether chains forming regions of crystallinity. That is, this "pseudo" $T_g$ may have been the result of formation of these regions of crystallinity at about 23° C. However, this "pseudo" $T_g$ at 23° C. was not necessarily part of the actual glass transition temperature ($T_g$) of the PVC 15% Tri-PEG2000Me polymer as a whole; the PVC 15% Tri-PEG2000Me polymer as a whole had a $T_g$ of −42° C., as indicated in FIG. 5C. Notwithstanding the observed "pseudo" $T_g$, it appeared that the various portions of the PVC 15% Tri-PEG2000Me polymer were miscible.)

The mechanical properties of functionalized PVC or blends of functionalized and unfunctionalized PVC can be investigated by forming films on which tensile strength analysis is conducted, for example, to determine elastomeric behavior. The plasticizing properties of the functionalized PVC and the polymer blends according to the invention can be investigated by measuring the glass transition temperature, for example, by DSC. For example, a $T_g$ below −30° C. can be desirable. The stability and migration of plasticizers can be assessed through hydrolysis of films made from the functionalized PVC or the polymer blends of the invention, by aging the films for 10 weeks at 37° C. in water. The degradation product can be analyzed by GC-MS, and mass loss and water absorption of the films can be measured. The functionalized PVC and the polymer blends according to the invention can be compared with PVC containing conventional, exogenous phthalate plasticizers.

The term "Plasticizer" is used herein to describe any substance added to a polymer to change brittleness, plasticity, viscosity, fluidity, hardness, or alter another physical or mechanical quality or property of the polymer.

The term "Exogenous plasticizer" is used herein to refer to a molecule separate and distinct from the polymer molecules it is intended to plasticize by lowering the $T_g$ of the aggregation of polymer molecules. Conventional low- or medium-molecular weight phthalate molecules added to (and not covalently bonded to) PVC to plasticize it are exogenous plasticizers.

The term "Internal plasticizer" is used herein to refer to a functional group that is covalently bound to a polymer backbone and acts to plasticize the polymer to which it is covalently bound.

The term "Plastic" is used herein to refer to any polymeric organic amorphous (or semicrystalline) solid compound that is moldable when heated and includes, for example, halogenated plastics, such as polyvinyl chloride (PVC) and its derivatives.

The term "Macro-plasticizer" is used herein to refer to a high molecular weight polymer or oligomer that when blended with a second polymer acts to plasticize that second polymer.

The term "Hormone" is used herein to describe any compound that interacts with the endocrine system, target organs of the endocrine system, or the functioning of the endocrine system or its target organs in a living organism, such as an animal.

The term "Endocrine Disruptor" is used herein to describe any compound that interferes with the normal physiological functioning of the endocrine system or its target organs in a living organism, such as an animal.

In this text, indication that a plasticizer does not release phthalate esters, derivatives of phthalate esters, or "mimics" of phthalate esters means that it does not release an appreciable amount of phthalate esters, derivatives of phthalate esters, or "mimics" of phthalate esters, or alternatively that it releases less than the amount of phthalate esters that a plastic containing a conventional, exogenous plasticizer will release over the same period of time; for example no more than 10 wt % or 20 wt % of what a plastic containing a conventional, exogenous plasticizer will release over the same period of time. In other embodiments it may release no more than 30 wt %, 40 wt %, 50 wt %, 60 wt %, 70 wt % or no more than 80 wt % of phthalate esters that a plastic containing a conventional, exogenous plasticizer will release over the same period of time.

The term "Phthalate ester mimic" is used herein to refer to a compound or functional group that can plasticize a plastic, and may bear some structural resemblance to a phthalate ester, but is not a phthalate ester.

The term "'click' reaction" is used herein to describe certain azide-alkyne cycloadditions.

The term "external chain" is used herein to describe an oligomeric or polymeric chain, such as an alkyl, alkoxy, polyether, or alkyoxy-polyether that is farthest removed from the point to which it is covalently bound to a polymer backbone.

In a method of the invention, an azide-alkyne Huisgen cycloaddition using dialkyl acetylenedicarboxylates allows cycloaddition to occur under mild thermal conditions, such as room temperature, such as between 10° C. and 20° C., for example, below 120° C., 110° C., 105° C., 100° C., 95° C., 90° C., 85° C., 80° C., 70° C., 60° C., 50° C., 40° C., below 30° C., below 20° C., below 15° C., or below 10° C. In certain embodiments the method is carried out in the absence of a catalyst, for example in the absence of a metal catalyst, for example in the absence of a copper (Cu) catalyst.

A route to covalently attach a functional group that is an internal plasticizer to PVC is described, allowing plasticization of PVC without the danger of endocrine disruption chemicals leaching from the polymer matrix. An azide-alkyne Husigen cycloaddition (in the absence of a metal catalyst, e.g., a copper catalyst) using dialkyl acetylenedicarboxylates allows cycloaddition to occur under very mild thermal conditions.

In methods according to the invention, the azide-alkyne Huisgen cycloaddition is copper free and is performed at low temperatures, e.g., below 20° C. or 10° C., but in other embodiments the reaction is carried out using a catalyst, such as using a metal catalyst, e.g., copper (Cu), and may (separately or in addition) be carried out at higher temperatures, for example, between 20° C. and 100° C. or above 10° C., above 15° C., above 20° C., above 30° C., above 40° C., above 50° C., above 60° C., above 70° C., above 80° C., above 85° C., above 90° C., above 95° C., above 100° C., above 105° C., above 110° C., or above 115° C.

For example, the method of the invention may be performed by the chemical modification of already-formed polymers such as (unfunctionalized) polyvinyl chloride (PVC).

The invention includes products-by-process comprising a polymer plasticized by the method of the invention.

Azide-alkyne Huisgen 1,3-dipolar cycloaddition reactions utilizing very electron deficient acetylenes with alkyl azides can take place at room temperature in the absence of a metal catalyst. Electron-poor alkynes bearing esters, carboxylic acids, amides and sulfones used in Cu-free "click"⁻ cycloadditions at ambient temperature can be used.

In an embodiment of the invention, 1,2,3-triazole functional groups that act as internal plasticizers are covalently-bound to polyvinyl chloride (PVC), so that the PVC is plasticized, but endocrine disrupters do not leach from the plasticized PVC. The PVC is functionalized with an azide group, for example, by treatment with an azide compound, such as an alkali metal azide. Treatment of PVC with sodium azide produces PVC in which some of the chloride has been replaced with azide. Subsequent reaction of the azide-functionalized PVC with an acetylene-group containing compound in a thermal azide-alkyne Huisgen cycloaddition yields 1,2,3-triazoles that are covalently bonded to the PVC backbone. Such triazoles can have covalently-bonded esters (e.g., esters made from branched alcohols), with these triazoles covalently linked to the PVC backbone. Migration of these triazole internal plasticizers is suppressed; hydrolysis releases alcohols rather than endocrine-disrupting phthalates. These covalently-bonded triazoles bearing branched esters are effective internal plasticizers.

For the thermal azide-alkyne Huisgen cycloaddition the acetylene-group containing compound can be, for example, dialkyl acetylene-dicarboxylate, a dialkyl acetylene-dicarboxylate derivative, propiolic acid, or a propiolic acid derivative. For example, use of the acetylene-group containing compound dialkyl acetylene-dicarboxylate yields 1,2,3-triazoles bearing ortho esters that are covalently bonded to the PVC backbone.

Azide is a fairly good nucleophile. The polarity of the solvent, temperature, reaction time, and stoichiometry of azide utilized can be used to control the amount of $S_N2$ substitution reaction compared to elimination. DMF (dimethylformamide) is usually the solvent of choice; however, use of the less polar solvent cyclohexanone results in a slower reaction, allowing stereoselective displacement to occur at the mm triad of mmmr tetrads, and the rm diad of rrmr pentads.

The use of a copper catalyst can be avoided, for example, in the production of polymers intended for commodity products with applications in the construction of medical devices and food and drink packaging. By utilizing alkynes substituted on both ends by an ester, the alkyne partner becomes extremely electrophilic, lowering the LUMO, and thus enhancing the 1,3-dipolar cycloaddition. For example, Brimble utilized dimethyl acetylenedicarboxylate to carry out thermal Huisgen cycloaddition in neat excess alkyne at 100° C. to form triazole (6).

Azidization of PVC can be monitored by IR. In addition, 1H-NMR and elemental analysis can be further used to determine conversion.

The thermal cycloaddition between the alkyne, such as a dialkyl acetylenedicarboxylate, and the azide groups pendant from the PVC can be carried out in solution, followed by precipitation of the polymer. For example, the PVC can be dissolved in THF and precipitated by addition of methanol; alternatively, the PVC can be dissolved in 1,2-dichlorobenzene and precipitated by addition of toluene.

Characterization of the Modified (Functionalized) PVC Polymers and their Plasticizing Properties IR (infrared) and 1H NMR (nuclear magnetic resonance) spectroscopy and GPC (gel permeation chromatography, a type of size exclusion chromatography (SEC)) can be used to determine the percent conversion (substitution of chloride with triazole groups), molecular weight, and polydispersity of the PVC polymers with covalently linked triazoles (functionalized (derivatized) PVC).

The functionalized PVC can be analyzed for miscibility and homogeneity over time, as well as chemical stability and resistance to migration through the following methods. Miscibility (measured by IR) of the derivatized PVC with untreated PVC can be determined by IR spectroscopy. Furthermore, the existence of a single glass transition temperature determined by differential scanning calorimetry (DSC) for a polymer blend provides evidence for miscibility. (As discussed above, there can be exceptions to this. For example, the PVC 15% Tri-PEG2000Me functionalized polymer exhibited a glass transition temperature (Tg) of −42° C., but also a "pseudo" $T_g$ at approximately 23° C.; however, the various portions of the PVC 15% Tri-PEG2000Me polymer appeared to be miscible.) Additional information regarding miscibility and morphology can be obtained using scanning electron microscopy (SEM). The plasticizing properties of the triazole groups covalently bonded to PVC or of the triazole-functionalized PVC mixed with untreated PVC in a blend can be assessed by measuring the: depression of the Tg quantitatively indicates increased flexibility or softening of the functionalized polymer or the blend of functionalized and untreated polymers.

The stability and migration resistance of internal plasticizers according to the invention and their possible degradation products can be assessed as follows. Hydrolysis of modified PVC (e.g., triazole-functionalized PVC) films can be performed by aging the films for 10 weeks at 37° C., and at 70° C. in water at neutral and low pH following ASTM methods for extractability in hexanes and methanol. The degradation products can be analyzed by gas chromatography—mass spectrometry (GC-MS). Mass loss and water absorption of the films can be measured.

The stability of modified PVC materials can studied as a function of time, to determine if phase separation occurs with aging, thus assessing the long-term homogeneity of blends of internally-plasticized PVC with untreated PVC.

Overview of Synthetic Approach and Internally-Plasticized Polymers Produced

FIG. 1 provides an overview of the synthetic approach used to produced internally-plasticized polyvinyl chloride (PVC) polymers. As a first step, PVC was azidified, in that a fraction of the chloride groups on the PVC were replaced with azide groups to form PVC Azide (PVC—$N_3$). The PVC Azide was then reacted with a compound including an alkyne (—C≡C—) group in an azide-alkyne Huisgen cycloaddition "click" chemistry reaction. This resulted in replacement of the azide groups with a triazole group bearing one or more further pendant group(s), such as alkyl-ester group(s), polyether-carbonyl group(s) (such as poly(ethylene glycol) group(s)-carbonyl) (which could be capped with a methoxy group), alkyl-ester group(s) with a further bonded triazole group bearing one or more further pendant alkyl-ester group(s), or alkyl-ester group(s) with a further bonded triazole group bearing one or more further pendant—polyether-carbonyl group(s) (which could be capped with a methoxy group). The triazole and its pendant group(s) was covalently bonded (attached) to the PVC backbone, thereby eliminating or greatly reducing its ability to migrate from the PVC backbone. Because of this covalent bonding to the PVC backbone, the triazole and its pendant group(s) is referred to as an "internal plasticizer."

The various types of internally-plasticized polyvinyl chloride (PVC) polymers formed can be illustratively described as shown in FIG. 1 and as follows. A "tadpole" type has a triazole covalently bonded to the PVC backbone and a single alkyl-ester or polyether-carbonyl group covalently bonded to the triazole. A "frog" type has a triazole covalently bonded to the PVC backbone and two alkyl-ester or polyether-carbonyl groups covalently bonded to the triazole. A "frog-on-tadpole" type has a first triazole covalently bonded to the PVC backbone, an oligomeric chain, such as an oligoalkyl, covalently bonded to that first triazole, a second triazole covalently bonded to the oligoalkyl, and two alkyl-ester or polyether-carbonyl groups covalently bonded to the triazole. A "two-frogs-on-frog" type has a first triazole covalently bonded to the PVC backbone, two oligomeric chains, such as oligoalkyls, covalently bonded to that first triazole, a second and a third triazole covalently bonded to each of the oligoalkyls, and two alkyl-ester or polyether-carbonyl groups covalently bonded to each of the second and the third triazole. Additional variations of internally-plasticized polyvinyl chloride (PVC) polymer types were envisioned, such as a "tadpole-on-tadpole" type or "two-tadpoles on frog" type.

Overviews of the synthetic methods used to produce internally-plasticized polyvinyl chloride (PVC) polymer types, as well as detailed descriptions of the individual syntheses, are provided below.

Preparation of PVC Azide

Polyvinyl chloride (PVC) was azidified as follows. PVC was dissolved in solvent and an alkali metal azide was added. The degree of functionalization with azide (substitution of azide for chloride groups) was controlled by through the time the PVC and the alkali metal azide were allowed to react. A detailed description of the preparation of PVC 5% Azide (PVC with 5% of the chloride groups substituted with azide) is provided in synthetic method M28 below, and a detailed description of the preparation of PVC 15% Azide (PVC with 15% of the chloride groups substituted with azide) is provided in synthetic method M29 below.

Preparation of Direct Di(Alkoxy-Carbonyl) Triazole Functionalized PVC

Figure 3A:
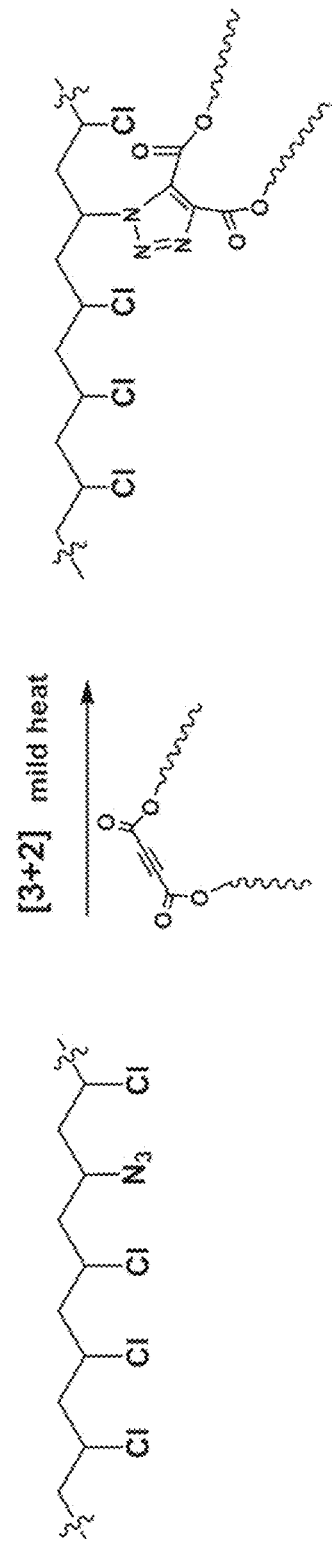
FIG. 3A shows a synthetic scheme according to the invention for producing di(alkoxy-carbonyl) triazole functionalized and di(alkoxy-polyether-carbonyl) triazole functionalized internally-plasticized PVCs.

PVC Azide was reacted with dialkyl acetylenedicarboxylate without metal catalyst to yield PVC with di(alkoxy-carbonyl) triazole groups directly and covalently bonded to the PVC backbone through an azide-alkyne Huisgen cycloaddition "click" chemistry reaction. The general scheme of the reaction is shown in FIG. 3A.

The reaction was carried out with PVC 5% Azide (see M28) and Dimethyl acetylenedicarboxylate (see M30), with 1,4-Dibutyl but-2-ynedioate (see M32), and with 1,4-Bis(2ethylhexyl) but-2-ynedioate (see M34) to yield PVC with 5% of the chloride groups substituted with 4,5-bis(methyl)-1H-1,2,3-triazole-4,5-dicarboxylate (PVC 5% Tri-DiMe), 4,5-bis(n-butyl)-1H-1,2,3-triazole-4,5-dicarboxylate (PVC 5% Tri-DiBu), and 4,5-bis(2-ethylhexyl)-1H-1,2,3-triazole-4,5-dicarboxylate (PVC 5% Tri-DiEH), respectively. (These abbreviations are formed with the "Tri" indicating the triazole covalently bonded to the PVC backbone, the subsequent "Di" indicating that there are two carboxyl groups pendant from the triazole formed, and the subsequent "Me", "Bu", or "EH" indicating that a methoxy, n-butoxyl, or 2-ethylhexyloxy group is bonded to those carbonyl groups.) The reaction was also carried out with PVC 15% Azide (see M29) and Dimethyl acetylenedicarboxylate (see M31), with 1,4-Dibutyl but-2-ynedioate (see M33), and with 1,4-Bis(2ethylhexyl) but-2-ynedioate (see M35), to yield PVC 15% Tri-DiMe, PVC 15% Tri-DiBu, and PVC 15% Tri-DiEH, respectively.

Preparation of Direct Di(Methoxy-Polyethylene-Oxide-Carbonyl) Triazole Functionalized PVC PVC Azide was reacted with 1,4-Bis-[methoxy-poly(ethylene oxide)]-but-2-ynedioate (also termed 1,4-Bis-[methoxy-poly(ethylene glycol)]-but-2-ynedioate) without metal catalyst to yield PVC with di(methoxy-(poly(ethylene oxide))-carbonyl triazole groups directly and covalently bonded to the PVC backbone through an azide-alkyne Huisgen cycloaddition "click" chemistry reaction. The general scheme of the reaction is shown in FIG. 3A. The di(methoxy-polyethylene-oxide) carbonyl triazole functionalized PVC product can be represented as

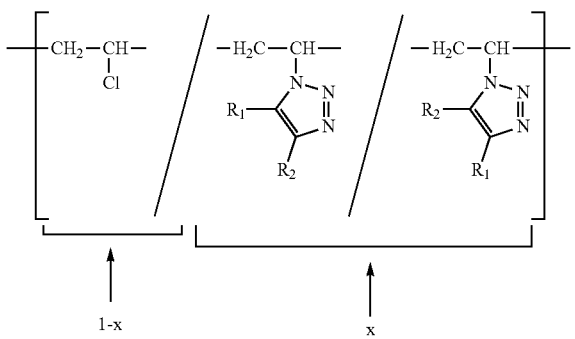

with $R_1$ being

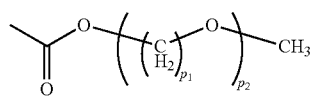

and $p_1$ being 2, with $R_2$ being

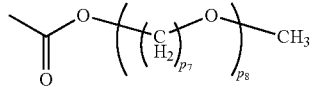

and $p_7$ being 2, with $p_2$ and $p_8$ representing the number of monomeric units in the polyethylene oxide (polyethylene glycol) chains, each ranging from 1 to 200, and with $\underline{x}$ representing the fraction of chloride groups on the PVC backbone replaced with triazole groups, ranging from 0.001 to 1.

(In this text, the substituted polyether group is generally referred to as a "methoxy-polyether." With this naming convention, the individual ether monomeric units, such as —[$CH_2$—$CH_2$—O]—, are considered to start adjacent to the methoxy ($CH_3$—O—) cap; the polyether chain then ends adjacent to (and is covalently bonded to) the carbonyl (—(C=O)—) group that is covalently bonded to the triazole. However, in certain representations, such as in FIG. 3A and in certain pictorial chemical structure representations, such as that above, the polyether chain, with ether monomeric units such as —[O—$CH_2$—$CH_2$]— is considered to start adjacent to a methyl ($CH_3$—) cap; the polyether chain then ends adjacent to (and is covalently bonded to) the ester (—O—(C=O)—) group that is covalently bonded to the triazole. With either convention for naming/representation, the actual chemical entity (i.e., the actual structure) is the same; the naming/representation convention used is clear from the context.)

The reaction was carried out with PVC 5% Azide (see M28) and 1,4-Bis({2-[2-(2-methoxyethoxy)ethoxy]ethyl}) but-2-ynedioate (see M48), with 1,4-Bis-[methoxy-poly (ethylene glycol)350]-but-2-ynedioate (see M54), and with 1,4-Bis-[methoxy-poly(ethylene glycol)550]-but-2-ynedioate (see M58) to yield PVC with 5% of the chloride groups substituted with di(methoxy-triethyleneglycol-carbonyl) triazole groups (PVC 5% Tri-DiTEGMe), di(methoxy-poly (ethylene glycol)350-carbonyl) triazole groups (PVC 5% Tri-DiPEG350Me), and di(methoxy-poly(ethylene glycol) 550-carbonyl) triazole groups (PVC 5% Tri-DiPEG550Me), respectively. The number following "methoxy-poly(ethylene glycol)" or "PEG" indicates the approximate molecular weight of the methoxy-polyethylene glycol segment. For example, "methoxy-poly(ethylene glycol)350" or "PEG350Me" indicates a methoxy-poly(ethylene glycol) segment of approximately 350 g/mol molecular weight and an average of approximately 7-8 ethylene glycol monomer units. A commercial methoxy-poly(ethylene glycol)350 was used, and included a distribution of molecular weights. For example, although the methoxy-poly(ethylene glycol)350 chains include, on average 7-8 ethylene glycol monomer units, the majority of the chains have from 2 to 12 monomer units. Similarly, the "methoxy-poly(ethylene glycol)550" indicates a methoxy-poly(ethylene glycol) segment of approximately 550 g/mol molecular weight and an average of approximately 12 ethylene glycol monomer units. A commercial methoxy-poly(ethylene glycol)550 was used and included a distribution of molecular weights. For example, although the methoxy-poly(ethylene glycol)550 chains include, on average 12 ethylene glycol monomer units, the majority of the chains have from 4 to 20 monomer units. The reaction was also carried out with PVC 15%

Azide (see M29) and 1,4-Bis({2-[2-(2-methoxyethoxy)ethoxy]ethyl})but-2-ynedioate (see M49), with 1,4-Bis-[methoxy poly(ethylene glycol) 350]-but-2-ynedioate (see M55), and with 1,4-Bis-[methoxy poly(ethylene glycol) 550]-but-2-ynedioate (see M59) to yield PVC 15% Tri-DiTEGMe, PVC 15% Tri-DiPEG350Me, and PVC 15% Tri-DiPEG550Me, respectively.

Preparation of Di(Alkoxy-Carbonyl) Triazole Alkoxy-Carbonyl Triazole Functionalized PVC Propiolic acid (HC≡C—(C=O)OH) has a single carboxyl group bonded to one carbon of an ethyne group, in contrast with acetylene dicarboxylic acid (HO(C=O)—C≡C—(C=O)OH), which has a carboxyl group bonded to each carbon of an ethyne group. Propiolic acid is less expensive that acetylene dicarboxylic acid. Acetylene dicarboxylic acid is more acidic than propiolic acid. Propiolic acid and its derivatives can be reacted with an azide group in an azide-alkyne Huisgen cycloaddition "click" chemistry reaction to form triazoles.

Figure 4A:
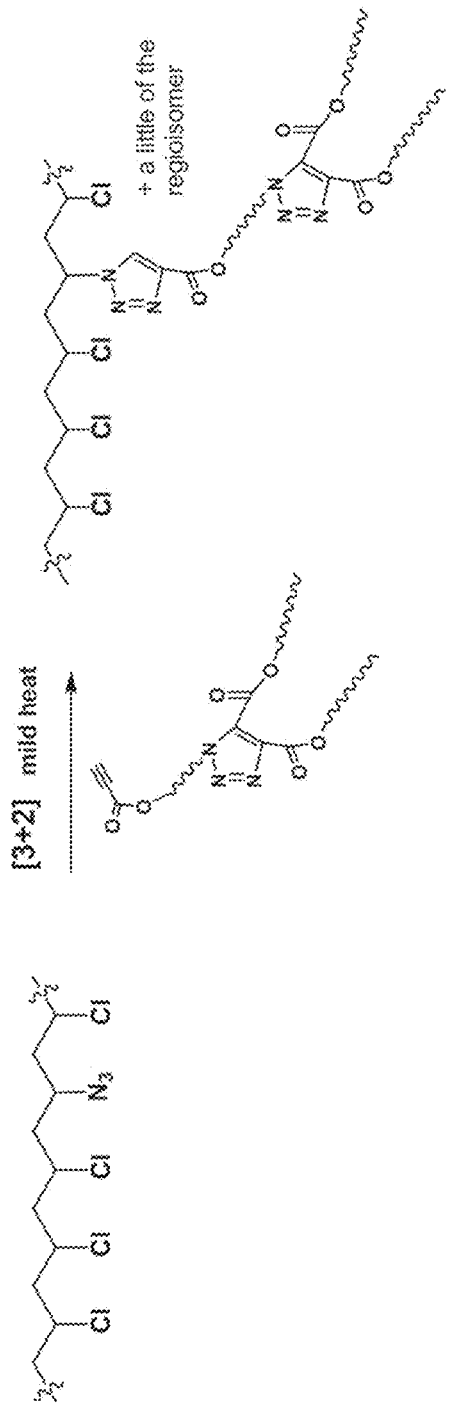
FIG. 4A shows a synthetic scheme according to the invention for producing di(alkoxy-carbonyl) triazole alkoxy-carbonyl triazole functionalized and di(alkoxy-polyether-carbonyl) triazole alkoxy-carbonyl triazole functionalized internally-plasticized PVCs.

PVC Azide was reacted with di(alkoxy-carbonyl) triazole alkyl propiolic acid without metal catalyst to yield PVC with di(alkoxy-carbonyl) triazole alkoxy-carbonyl triazole groups covalently bonded to the PVC backbone. The general scheme of the reaction is shown in FIG. 4A. The di(alkoxy-carbonyl) triazole alkoxy-carbonyl triazole functionalized PVC product can be represented as

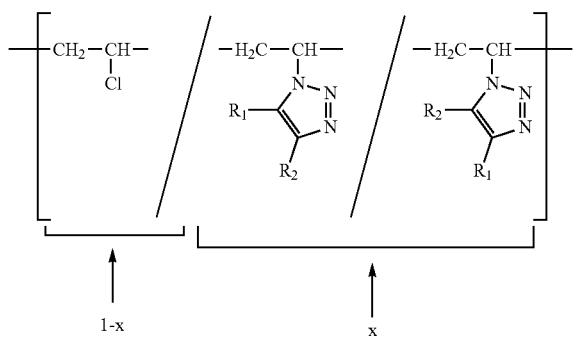

with $R_1$ being

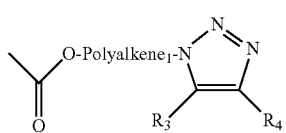

and Polyalkene$_1$ being methylene or a linear or branched polyalkene of from 2 to 40 carbons, with $R_3$ being

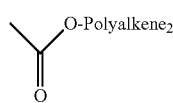

and Polyalkene$_2$ being methyl or a linear or branched polyalkene of from 2 to 40 carbons, with $R_4$ being

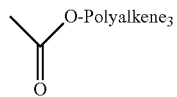

and Polyalkene$_3$ being methyl or a linear or branched polyalkene of from 2 to 40 carbons, with $R_2$ being hydrogen, with $p_2$ and $p_8$ representing the number of monomeric units in the polyethylene oxide (polyethylene glycol) chains, each ranging from 1 to 200, and with x representing the fraction of chloride groups on the PVC backbone replaced with triazole groups, ranging from 0.001 to 1.

The reaction was carried out with PVC 5% Azide (see M28) and 4,5-Dimethyl-1-[6-(prop-2-ynoyloxy)hexyl]-1H-1,2,3-triazole-4,5-dicarboxylate (see M36), with 4,5-Dibutyl-1-[6-(prop-2-ynoyloxy)hexyl]-1H-1,2,3-triazole-4,5-dicarboxylate (see M38), and with 4,5-Bis(2-ethylhexyl)-1-[6-(prop-2-ynoyloxy)hexyl]-1H-1,2,3-triazole-4,5-dicarboxylate (see M40), to yield PVC with 5% of the chloride groups substituted with di(methoxycarbonyl)-triazole-hexyloxycarbonyl-triazole groups (PVC 5% Tri-Hexyl-Tri-DiMe), di(n-butoxycarbonyl)-triazole-hexyloxycarbonyl-triazole groups (PVC 5% Tri-Hexyl-Tri-DiBu), and di(2-ethylhexyloxycarbonyl)-triazole-hexyloxycarbonyl-triazole groups (PVC 5% Tri-Hexyl-Tri-DiEH), respectively. The reaction was also carried out with PVC 15% Azide (see M29) and 4,5-Dimethyl-1-[6-(prop-2-ynoyloxy)hexyl]-1H-1,2,3-triazole-4,5-dicarboxylate (see M37), with 4,5-Dibutyl-1-[6-(prop-2-ynoyloxy)hexyl]-1H-1,2,3-triazole-4,5-dicarboxylate (see M39), and with 4,5-Bis(2-ethylhexyl)-1-[6-(prop-2-ynoyloxy)hexyl]-1H-1,2,3-triazole-4,5-dicarboxylate (see M41), to yield PVC 15% Tri-Hexyl-Tri-DiMe, PVC 15% Tri-Hexyl-Tri-DiBu, and PVC 15% Tri-Hexyl-Tri-DiEH, respectively.

Preparation of Di(Methoxy-Polyethylene-Oxide-Carbonyl) Triazole Alkoxy-Carbonyl Triazole Functionalized PVC PVC Azide was reacted with di(methoxy-polyethylene-oxide-carbonyl) triazole alkyl propiolic acid without metal catalyst to yield PVC with di(methoxy-polyethylene-oxide-carbonyl) triazole alkoxy-carbonyl triazole groups covalently bonded to the PVC backbone. The general scheme of the reaction is shown in FIG. 4A. The di(methoxy-polyethylene-oxide-carbonyl) triazole alkoxy-carbonyl triazole functionalized PVC product can be represented as

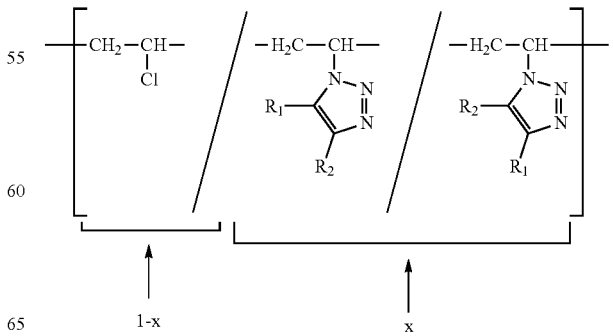

with $R_1$ being

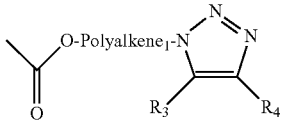

and Polyalkene$_1$ being methylene or a linear or branched polyalkene of from 2 to 40 carbons,
with $R_3$ being

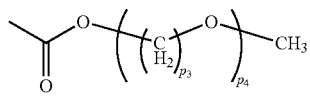

and $p_3$ being 2,
with $R_4$ being

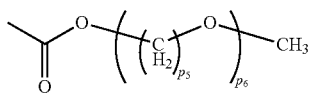

and $p_5$ being 2,
with $R_2$ being hydrogen,
with $p_4$ and $p_5$ representing the number of monomeric units in the polyethylene oxide (polyethylene glycol) chains, each ranging from 1 to 200, and
with x representing the fraction of chloride groups on the PVC backbone replaced with triazole groups, ranging from 0.001 to 1.

The reaction was carried out with PVC 5% Azide (see M28) and 4,5-Bis({2-[2-(2-methoxyethoxy)ethoxy]ethyl})-1-[6-(prop-2-ynoyloxy)hexyl]-1H-1,2,3-triazole-4,5-dicarboxylate (see M50) and with 4,5-Bis[methoxy poly(ethylene glycol)350]-1-[6-(prop-2-ynoyloxy)hexyl]-1H-1,2,3-triazole-4,5-dicarboxylate (see M56) to yield PVC with 5% of the chloride groups substituted with di(methoxy-triethyleneglycol-carbonyl)-triazole-hexyloxy-carbonyl-triazole groups (PVC 5% Tri-Hexyl-Tri-DiTEGMe) and di(methoxy-poly(ethylene glycol)350-carbonyl)-triazole-hexyloxy-carbonyl-triazole groups (PVC 5% Tri-Hexyl-Tri-DiPEG350Me), respectively. The reaction was also carried out with PVC 15% Azide (see M29) and 4,5-Bis({2-[2-(2-methoxyethoxy)ethoxy]ethyl})-1-[6-(prop-2-ynoyloxy)hexyl]-1H-1,2,3-triazole-4,5-dicarboxylate (see M51) and with 4,5-Bis[methoxy poly(ethylene glycol) 350]-1-[6-(prop-2-ynoyloxy)hexyl]-1H-1,2,3-triazole-4,5-dicarboxylate (see M57), to yield PVC 15% Tri-Hexyl-Tri-DiTEGMe and PVC 15% Tri-Hexyl-Tri-DiPEG350Me, respectively.

Preparation of Methoxy-Polyethylene-Oxide-Carbonyl Triazole Functionalized PVC

PVC Azide was reacted with methoxy-poly(ethylene oxide)-prop-2-ynoate without metal catalyst to yield PVC with methoxy-polyethylene-oxide-carbonyl triazole groups covalently bonded to the PVC backbone. The general scheme of the reaction is shown in FIG. 5A. The methoxy-polyethylene-oxide-carbonyl triazole functionalized PVC product can be represented as

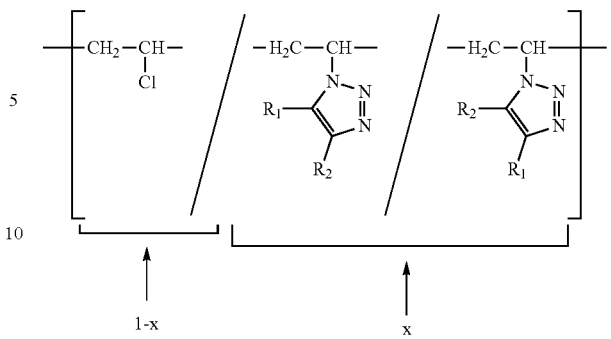

with $R_1$ being

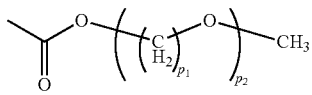

and $p_1$ being 2,
with $R_2$ being hydrogen,
with $p_2$ representing the number of monomeric units in the polyethylene oxide (polyethylene glycol) chain, ranging from 1 to 200, and
with x representing the fraction of chloride groups on the PVC backbone replaced with triazole groups, ranging from 0.001 to 1.

The reaction was carried out with PVC 5% Azide (see M28) and Methoxy-poly(ethylene glycol)1000-prop-2-ynoate (see M60) and with Methoxy-poly(ethylene glycol) 2000-prop-2-ynoate (see M62) to yield PVC with 5% of the chloride groups substituted with methoxy-poly(ethylene glycol)1000-carbonyl)-triazole groups (PVC 5% Tri-PEG1000Me) and methoxy-poly(ethylene glycol)2000-carbonyl)-triazole groups (PVC 5% Tri-PEG2000Me), respectively. The reaction was also carried out with PVC 15% Azide (see M29) and Methoxy-poly(ethylene glycol)1000-prop-2-ynoate (see M61) and with Methoxy-poly(ethylene glycol)2000-prop-2-ynoate (see M63) to yield PVC 15% Tri-PEG1000Me and PVC 15% Tri-PEG2000Me, respectively. The number following "methoxy-poly(ethylene glycol)" or "PEG" indicates the approximate molecular weight of the polyethylene glycol segment. For example, "methoxy-poly(ethylene glycol)1000" or "PEG1000Me" indicates a methoxy-poly(ethylene glycol) segment of approximately 1000 g/mol molecular weight and an average of approximately 22 ethylene glycol monomer units. A commercial methoxy-poly(ethylene glycol)1000 was used and included a distribution of molecular weights. For example, although the methoxy-poly(ethylene glycol)1000 chains include, on average 22 ethylene glycol monomer units, the majority of the chains have from 12 to 32 monomer units. Similarly, "methoxy-poly(ethylene glycol)2000" or "PEG2000Me" indicates a methoxy-poly(ethylene glycol) segment of approximately 2000 g/mol molecular weight and an average of approximately 44-45 ethylene glycol monomer units. A commercial methoxy-poly(ethylene glycol)2000 was used and included a distribution of molecular weights. For example, although the methoxy-poly(ethylene glycol)2000 chains include, on average 44-45 ethylene glycol monomer units, the majority of the chains have from 34 to 54 monomer units.

Figure 6A:
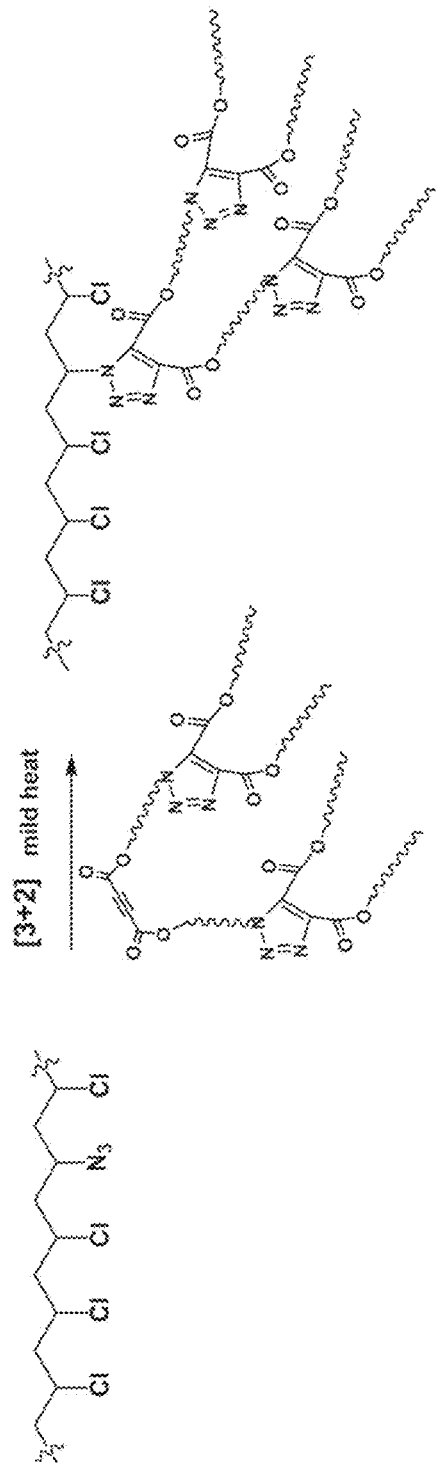
FIG. 6A shows a synthetic scheme according to the invention for producing di(di(alkoxy-carbonyl) triazole alkoxy-carbonyl) triazole functionalized and di(di(alkoxy-polyether-carbonyl) triazole alkoxy-carbonyl) triazole functionalized internally-plasticized PVCs.

Preparation of Di(Di(Alkoxy-Carbonyl) Triazole Alkyloxy-Carbonyl) Triazole Functionalized PVC PVC Azide was reacted with di(di(alkoxy-carbonyl) triazole alkyl)acetylenedicarboxylate without metal catalyst to yield PVC with di(di(alkoxy-carbonyl) triazole alkoxy-carbonyl) triazole groups covalently bonded to the PVC backbone. The general scheme of the reaction is shown in FIG. 6A. The di(di(alkoxy-carbonyl) triazole alkoxy-carbonyl) triazole functionalized PVC product can be represented as

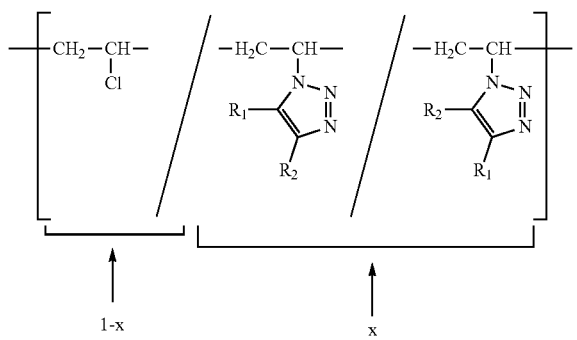

with $R_1$ being

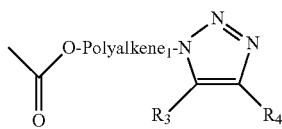

and Polyalkene$_1$ being methylene or a linear or branched polyalkene of from 2 to 40 carbons,
with $R_3$ being

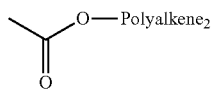

and Polyalkene$_2$ being methyl or a linear or branched polyalkene of from 2 to 40 carbons,
with $R_4$ being

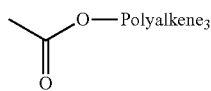

and Polyalkene$_3$ being methyl or a linear or branched polyalkene of from 2 to 40 carbons,
with $R_2$ being

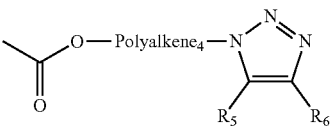

and Polyalkene$_4$ being methylene or a linear or branched polyalkene of from 2 to 40 carbons,
with $R_5$ being

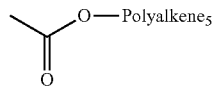

and Polyalkene$_5$ being methyl or a linear or branched polyalkene of from 2 to 40 carbons,
with $R_6$ being

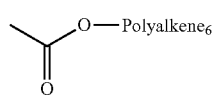

and Polyalkene$_6$ being methyl or a linear or branched polyalkene of from 2 to 40 carbons, and with $\underline{x}$ representing the fraction of chloride groups on the PVC backbone replaced with triazole groups, ranging from 0.001 to 1.

The reaction was carried out with PVC 5% Azide (see M28) and 4,5-Dimethyl 1-(6-{[4-({6-[4,5-bis(methoxycarbonyl)-1H-1,2,3-triazol-1-yl]hexyl}oxy)-4-oxobut-2-ynoyl]oxy}hexyl)-1H-1,2,3-triazole-4,5-dicarboxylate (see M42), with 4,5-Dibutyl 1-({[4-({6-[4,5-bis(butoxycarbonyl)-1H-1,2,3-triazol-1-yl]hexyl}oxy)-4-oxobut-2-ynoyl]oxy}hexyl)-1H-1,2,3-triazole-4,5-dicarboxylate (see M44), and with 4,5-Bis(2-ethylhexyl) 1-(6-{[4-({6-[4,5-bis({[(2-ethylhexyl)oxy]carbonyl})-1H-1,2,3-triazol-1-yl]hexy 1}oxy)-4-oxobut-2-ynoyl]oxy}hexyl)-1H-1,2,3-triazole-4,5-dicarboxylate (see M46) to yield PVC with 5% of the chloride groups substituted with di(di(methoxycarbonyl)-triazole-hexyloxycarbonyl)triazole groups (PVC 5% Tri-DiHexyl-Tri-DiMe), di(di(n-butoxycarbonyl)-triazole-hexyloxycarbonyl)triazole groups (PVC 5% Tri-DiHexyl-Tri-DiBu), and di(di(2-ethylhexyloxycarbonyl)-triazole-hexyloxycarbonyl) triazole groups (PVC 5% Tri-DiHexyl-Tri-DiEH). The reaction was also carried out with PVC 15% Azide (see M29) and 4,5-Dimethyl 1-(6-{[4-({6-[4,5-bis(methoxycarbonyl)-1H-1,2,3-triazol-1-yl]hexyl}oxy)-4-oxobut-2-ynoyl]oxy}hexyl)-1H-1,2,3-triazole-4,5-dicarboxylate (see M43), with 4,5-Dibutyl 1-(6-{[4-({6-[4,5-bis(butoxycarbonyl)-1H-1,2,3-triazol-1-yl]hexyl}oxy)-4-oxobut-2-ynoyl]oxy}hexyl)-1H-1,2,3-triazole-4,5-dicarboxylate (see M45), and with 4,5-Bis(2-ethylhexyl) 1-(6-{[4-({6-[4,5-bis({[(2-ethylhexyl)oxy]carbonyl})-1H-1,2,3-triazol-1-yl]hexyl}oxy)-4-oxobut-2-ynoyl]oxy}hexyl)-1H-1,2,3-triazole-4,5-dicarboxylate (see M47) to yield PVC 15% Tri-DiHexyl-Tri-DiMe, PVC 15% Tri-DiHexyl-Tri-DiBu, and PVC 15% Tri-DiHexyl-Tri-DiEH.

Preparation of Di(Di(Methoxy-Polyethylene-Oxide-Carbonyl) Triazole Alkoxy-Carbonyl) Triazole Functionalized PVC PVC Azide was reacted with di(di(methoxy-polyethylene-oxide-carbonyl) triazole alkyl) acetylenedicarboxylate without metal catalyst to yield PVC with di(di(methoxy-polyethylene-oxide-carbonyl) triazole alkyloxy-carbonyl) triazole groups covalently bonded to the PVC backbone. The general scheme of the reaction is shown in FIG. 6A. The di(di(methoxy-polyethylene-oxide-carbonyl) triazole alkoxy-carbonyl) triazole PVC product can be represented as

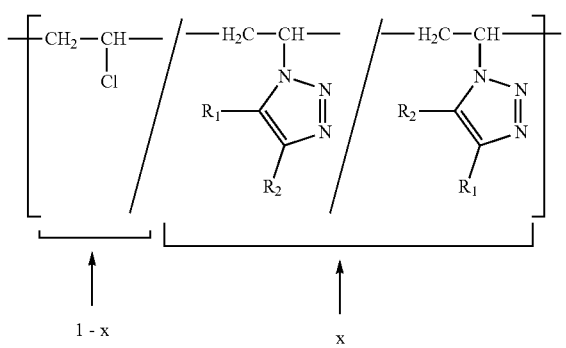

with $R_1$ being

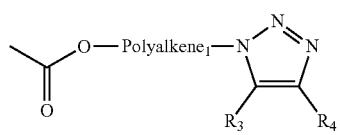

and Polyalkene$_1$ being methylene or a linear or branched polyalkene of from 2 to 40 carbons, with $R_3$ being

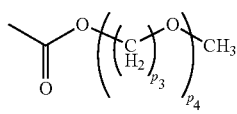

and $p_3$ being 2 and $p_4$ representing the number of monomeric units in the polyethylene oxide (polyethylene glycol) chain, ranging from 1 to 200, with $R_4$ being

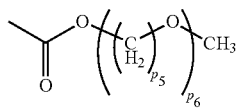

and $p_5$ being 2 and $p_6$ representing the number of monomeric units in the polyethylene oxide (polyethylene glycol) chain, ranging from 1 to 200, with $R_2$ being

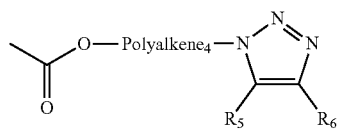

and Polyalkene$_4$ being methylene or a linear or branched polyalkene of from 2 to 40 carbons, with $R_5$ being

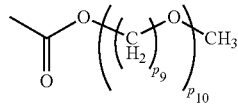

and $p_9$ being 2 and $p_{10}$ representing the number of monomeric units in the polyethylene oxide (polyethylene glycol) chain, ranging from 1 to 200, with $R_6$ being

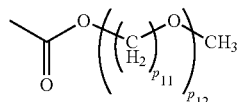

and $p_{11}$ being 2 and $p_{12}$ representing the number of monomeric units in the polyethylene oxide (polyethylene glycol) chain, ranging from 1 to 200, and with $\underline{x}$ representing the fraction of chloride groups on the PVC backbone replaced with triazole groups, ranging from 0.001 to 1.

The reaction was carried out with PVC 5% Azide (see M28) and 4,5-Bis({2-[2-(2-methoxyethoxy)ethoxy]ethyl}) 1-(6-{[4-({6-[bis(2,5,8,11-tetraoxadodecanoyl)-1H-1,2,3-triazol-1-yl]hexyl}oxy)-4-oxobut-2-ynoyl]oxy}hexyl)-1H-1,2,3-triazole-4,5-dicarboxylate (see M52) to yield PVC with 5% of the chloride groups substituted with di(di(methoxy-triethyleneglycol-carbonyl)-triazole-hexyloxy-carbonyl) triazole groups (PVC 5% Tri-DiHexyl-Tri-DiTEGMe). The reaction was also carried out with PVC 15% Azide (see M29) and 4,5-Bis({2-[2-(2-methoxyethoxy)ethoxy]ethyl}) 1-(6-{[4-({6-[bis(2,5,8,11-tetraoxadodecanoyl)-1H-1,2,3-triazol-1-yl]hexyl}oxy)-4-oxobut-2-ynoyl]oxy}hexyl)-1H-1,2,3-triazole-4,5-dicarboxylate (see M53) to yield PVC 15% Tri-DiHexyl-Tri-DiTEGMe.

Synthetic Methods

M1. Preparation of 1,4-dibutyl but-2-ynedioate

But-2-ynedioic acid (4.000 g, 35.07 mmol) was added to a 100 mL round bottom flask. n-Butanol (7.798 g, 105.21 mmol) was then added along with 4-methylbenzenesulfonic acid (0.400 g, 2.104 mmol) and 50 mL of dry toluene. Using a Dean-Stark apparatus, the reaction was heated and stirred at reflux for 1.5 h. The organic layer was concentrated in vacuo to give a crude brown oil. purified via flash chromatography using 95:5 hexanes:ethyl acetate affording 7.538 g (33.314 mmol, 94.99% yield) of the title compound as a colorless oil. (See Earla, A. & Braslau, R., "Covalently Linked Plasticizers: Triazole Analogues of Phthalate Plasticizers Prepared by Mild Copper-Free "Click" Reactions with Azide-Functionalized PVC", Macromolecular Rapid Communications, 35(6) (2014) 666-671.)

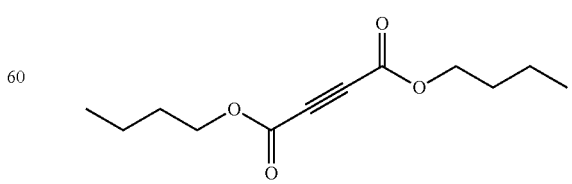

TLC: 95:5 hexanes:ethyl acetate, $R_f$=0.43, UV, KMnO$_4$ stain, p-anisealdehyde stain, blue spot.

$^1$H NMR (500 MHz, CDCl$_3$): δ 4.25 (t, J=6.6 Hz, 4H), 1.68 (p, J=6.6 Hz, 4H), 1.42 (h, J=7.3 Hz, 4H), 0.96 (t, J=7.3 Hz, 6H).

$^{13}$C NMR (125 MHz, CDCl$_3$, DEPT): δ 152.0 (C=O), 74.7 (4°), 66.8 (O—CH$_2$), 30.3 (CH$_2$), 18.9 (CH$_2$), 13.5 (CH$_3$).

IR: 2963 (s, alkane CH), 2938 (s, alkane CH), 2876 (s, alkane CH), 1728 (s, ester C=O), 1467 (s, methylene bending CH$_2$), 1252 (s, ester stretch C—O) cm$^{-1}$.

HRMS: Calcd. for C$_{12}$H$_{18}$O$_4$ [M+H]$^+$ 227.1278; Found 227.1283.

M2. Preparation of 1,4-bis(2-ethylhexyl) but-2-ynedioate

But-2-ynedioic acid (3.422 g, 30.00 mmol) was added to a 100 mL round bottom flask. 2-Ethylhexan-1-ol (8.595 g, 66.00 mmol) was then added along with 4-methylbenzenesulfonic acid (0.342 g, 1.800 mmol) and 42 mL of dry toluene. Using a Dean-Stark apparatus, the reaction was heated and stirred at reflux for 1 h. The organic layer was concentrated in vacuo to give a crude brown oil. Purification via flash chromatography using 95:5 hexanes:ethyl acetate afforded 9.211 g (27.213 mmol, 73.69% yield) of a colorless oil, as a mixture of diastereomers. (See Earla & Braslau, *Macromol. Rapid Comm.*, 35(6) (2014) 666-671.)

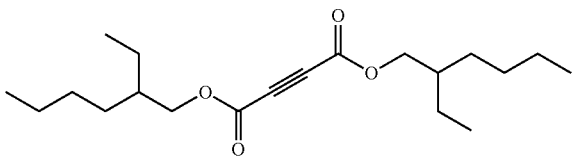 [SMILES: CCCCC(CC)COC(=O)C#CC(=O)OCC(CC)CCCC]

TLC: 95:5 hexanes:ethyl acetate, R$_f$=0.80, UV, KMnO$_4$ stain, p-anisealdehyde stain, blue spot.

$^1$H NMR (500 MHz, CDCl$_3$): δ 4.19-4.13 (m, 4H), 1.66-1.61 (m, 2H), 1.42-1.36 (m, 4H), 1.35-1.25 (m, 12H), 0.91 (t, 12H).

$^{13}$C NMR (125 MHz, CDCl$_3$, DEPT): δ 152.0 (C=O), 74.7 (4°), 69.2 (O—CH$_2$), 38.6 (CH), 30.1 (CH$_2$), 28.8 (CH$_2$), 23.5 (CH$_2$), 22.9 (CH$_2$), 14.0 (CH$_3$), 10.8 (CH$_3$).

IR: 2962 (s, alkane CH), 2932 (s, alkane CH), 2875 (s, alkane CH), 2862 (s, alkane CH), 1725 (s, ester C=O), 1464 (s, methylene bending CH$_2$), 1255 (s, ester stretch C—O) cm$^{-1}$.

HRMS: Calcd. for C$_{20}$H$_{35}$O$_4$ [M+H]$^+$ 339.2529; Found 339.2525.

M3. Preparation of 6-azidohexan-1-ol 6-chlorohexan-1-ol (1.500 g, 10.98 mmol) was added to a 100 mL round bottom flask with 20 mL of dimethyl sulfoxide. NaN$_3$ (1.071 g, 16.47 mmol) was carefully added to the reaction flask and stirred at 50° C. for 24 h. The reaction mixture was extracted five times using 30 mL each of ethyl acetate. The organic layers were washed with brine four times using 20 mL each, then dried with Na$_2$SO$_4$. The volatiles were evaporated in vacuo affording 1.572 g (10.98 mmol, quantitative yield) of the title compound as a colorless oil. (See, Pak, H. K. et al., "Synthesis of Enamides by Ruthenium-Catalyzed Reaction of Alkyl Azides with Acid Anhydrides in Ionic Liquid", *ChemCatChem*, 7(24) (2015) 4030-4034.)

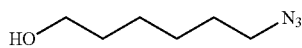

TLC: 3:2 hexanes:ethyl acetate, R$_f$=0.46, p-anisealdehyde stain, green-orange spot.

$^1$H NMR (500 MHz, CDCl$_3$): δ 3.60 (t, J=6.6 Hz, 2H), 3.24 (t, J=6.9 Hz, 2H), 1.61-1.52 (m, 4H), 1.41-1.31 (m, 4H).

$^{13}$C NMR (125 MHz, CDCl$_3$, DEPT): δ 62.7 (CH$_2$—OH), 51.4 (CH$_2$—N$_3$), 32.5 (CH$_2$), 28.8 (CH$_2$), 26.5 (CH$_2$), 25.3 (CH$_2$).

IR (Neat): 3351 (s, OH), 2937 (s, alkane CH), 2862 (s, alkane CH), 2097 (s, N$_3$), 1457 (m, methylene bending CH$_2$), 1056 (s, 1° alcohol stretch C—O) cm$^{-1}$.

HRMS: Calcd. for C$_6$H$_{13}$N$_3$O [M+H]$^+$ 144.1131; Found 144.9812.

M4. Preparation of 4,5-dimethyl 1-(6-hydroxyhexyl)-1H-1,2,3-triazole-4,5-dicarboxylate 6-Azidohexan-1-ol (1.570 g, 10.98 mmol) (see M3) was added to a 100 mL round bottom flask with 35 mL of CHCl$_3$. Dimethyl acetylenedicarboxylate (2.028 g, 14.27 mmol) was added to the reaction flask and stirred at 50° C. for 24 h. The volatiles were evaporated in vacuo affording a crude pale yellow oil. Purification via flash chromatography using 7:3 ethyl acetate:hexanes afforded 3.125 g (10.953 mmol, 99.76% yield) of the title compound as a pale yellow oil.

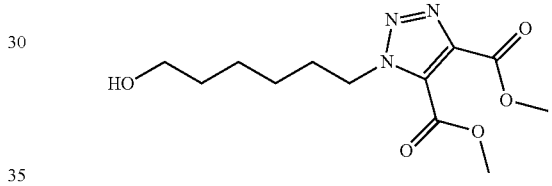

TLC: 7:3 ethyl acetate:hexanes, R$_f$=0.34, UV, p-anisealdehyde stain, purple spot.

$^1$H NMR (500 MHz, CDCl$_3$): δ 4.59 (t, J=7.3 Hz, 2H), 3.99 (s, 3H), 3.96 (s, 3H), 3.63 (t, J=6.4 Hz, 2H), 1.91 (p, J=7.3 Hz, 2H), 1.55 (p, J=6.4 Hz, 2H), 1.43-1.32 (m, 5H).

$^{13}$C NMR (125 MHz, CDCl$_3$, DEPT): δ 160.6 (C=O), 159.0 (C=O), 139.9 (4°), 129.8 (4°), 62.5 (CH$_2$), 53.5 (CH$_3$), 52.7 (CH$_3$), 50.5 (CH$_2$), 32.3 (CH$_2$), 30.1 (CH$_2$), 26.1 (CH$_2$), 25.1 (CH$_2$).

IR (Neat): 3429 (s, OH), 3006 (s, alkane CH), 2938 (s, alkane CH), 2862 (s, alkane CH), 1733 (s, ester C=O), 1555 (m, triazole C=C), 1469 (s, methylene bending CH$_2$), 1283 (s, ester stretch C—O), 1224 (s, ester stretch C—O), 1063 (s, 1° alcohol stretch C—O) cm$^{-1}$.

HRMS: Calcd. for C$_{12}$H$_{18}$N$_3$O$_5$ [M+H]$^+$ 286.1397; Found 286.1393.

M5. Preparation of 4,5-dibutyl 1-(6-hydroxyhexyl)-1H-1,2,3-triazole-4,5-dicarboxylate 6-Azidohexan-1-ol (1.570 g, 10.98 mmol) (see M3) was added to a 100 mL round bottom flask with 35 mL of CHCl$_3$. 1,4-Dibutyl but-2-ynedioate (3.229 g, 14.27 mmol) (see M1) was added to the reaction flask and stirred at 50° C. for 24 h. The volatiles were evaporated in vacuo affording a colorless crude oil. Purification via flash chromatography using 3:2 hexanes:ethyl acetate afforded 4.013 g (10.862 mmol, 98.9% yield) of the title compound as a colorless oil.

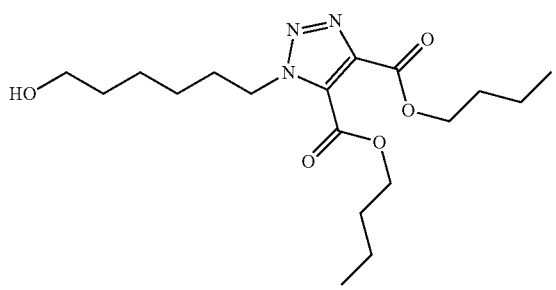 [SMILES: CCCCOC(=O)c1nnn(CCCCCCO)c1C(=O)OCCCC]

TLC: 3:2 hexanes:ethyl acetate, $R_f$=0.25, UV, p-anisealdehyde stain, purple spot.

$^1$H NMR (500 MHz, CDCl$_3$): δ 4.57 (t, J=7.2 Hz, 2H), 4.36 (overlapping t, J=6.9 Hz, 4H), 3.62 (t, J=6.4 Hz, 2H), 1.90 (p, J=7.2 Hz, 2H), 1.74 (overlapping p, J=6.9 Hz, 4H), 1.55 (p, J=6.6 Hz, 2H), 1.49-1.30 (m, 9H), 1.02-0.85 (m, 6H).

$^{13}$C NMR (125 MHz, CDCl$_3$, DEPT): δ 160.5 (C=O), 158.8 (C=O), 140.3 (4°), 129.8 (4°), 66.7 (CH$_2$), 65.7 (CH$_2$), 62.6 (CH$_2$), 50.4 (CH$_2$), 32.4 (CH$_2$), 30.6 (CH$_2$), 30.3 (CH$_2$), 30.2 (CH$_2$), 26.1 (CH$_2$), 25.1 (CH$_2$), 19.1 (CH$_3$), 19.0 (CH$_3$), 13.7 (CH$_3$), 13.6 (CH$_3$).

IR (Neat): 3439 (s, OH), 2961 (s, alkane CH), 2936 (s, alkane CH), 2874 (s, alkane CH), 1732 (s, ester C=O), 1553 (m, triazole C=C), 1467 (s, methylene bending CH$_2$), 1280 (s, ester stretch C—O), 1065 (s, 1° alcohol stretch C—O) cm$^{-1}$.

HRMS: Calcd. for C$_{18}$H$_{31}$N$_3$O$_5$ [M+H]$^+$ 370.2336; Found 370.2330.

M6. Preparation of 4,5-bis(2-ethylhexyl) 1-(6-hydroxyhexyl)-1H-1,2,3-triazole-4,5-dicarboxylate 6-Azidohexan-1-ol (1.570 g, 10.98 mmol) (see M3) was added to a 100 mL round bottom flask with 35 mL of CHCl$_3$. 1,4-Bis(2-ethylhexyl) but-2-ynedioate (4.830 g, 14.27 mmol) (see M2) was added to the reaction flask and stirred at 50° C. for 24 h. The volatiles were evaporated in vacuo affording a colorless crude oil. Purification via flash chromatography using 7:3 hexanes:ethyl acetate afforded 5.2641 g (10.929 mmol, 99.5% yield) of a colorless oil, as a mixture of diastereomers.

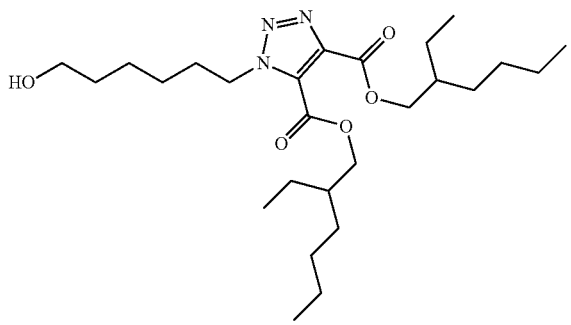 [SMILES: CCCCC(CC)COC(=O)c1nnn(CCCCCCO)c1C(=O)OCC(CC)CCCC]

TLC: 7:3 hexanes:ethyl acetate, $R_f$=0.29, UV, p-anisealdehyde stain, purple spot.

$^1$H NMR (500 MHz, CDCl$_3$): δ 4.58 (t, J=7.3 Hz, 2H), 4.33-4.22 (m, 4H), 3.63 (t, J=6.5 Hz, 2H), 1.91 (p, J=7.5 Hz, 2H), 1.77-1.64 (m, 2H), 1.55 (p, J=6.6 Hz, 2H), 1.44-1.26 (m, 21H), 0.97-0.80 (m, 12H).

$^{13}$C NMR (125 MHz, CDCl$_3$, DEPT): δ 160.5 (C=O), 158.8 (C=O), 140.4 (4°), 129.7 (4°), 69.1 (CH$_2$), 68.3 (CH$_2$), 62.5 (CH$_2$), 50.4 (CH$_2$), 38.7 (CH), 38.7 (CH), 32.4 (CH$_2$), 30.2 (CH$_2$), 28.9 (CH$_2$), 26.1 (CH$_2$), 25.1 (CH$_2$), 23.6 (CH$_2$), 23.5 (CH$_2$), 22.9 (CH$_2$), 14.0 (CH$_3$), 10.9 (CH$_3$).

IR (Neat): 3436 (s, OH), 2959 (s, alkane CH), 2932 (s, alkane CH), 2861 (s, alkane CH), 1733 (s, ester C=O), 1555 (m, triazole C=C), 1466 (s, methylene bending CH$_2$), 1279 (m, ester stretch C—O), 1060 (1° alcohol stretch C—O) cm$^{-1}$.

HRMS: Calcd. for C$_{26}$H$_{47}$N$_3$O$_5$ [M+H]$^+$ 482.3588; Found 482.3588.

M7. Preparation of 4,5-dimethyl-1-[6-(prop-2-ynoyloxy)hexyl]-1H-1,2,3-triazole-4,5-dicarboxylate Propiolic acid (0.500 g, 7.138 mmol) was added to a 25 mL round bottom flask with 7 mL of toluene. 4,5-Dimethyl 1-(6-hydroxyhexyl)-1H-1,2,3-triazole-4,5-dicarboxylate (2.6472 g, 9.279 mmol) (see M4) and 4-methylbenzenesulfonic acid (0.0815 g, 0.428 mmol) was added to the reaction flask and stirred at reflux for 2 h. The volatiles were evaporated in vacuo, affording a light brown crude oil. Purification via flash chromatography using 1:1 hexanes:ethyl acetate afforded 1.5981 g (4.738 mmol, 66.37% yield) of the title compound as a colorless oil.

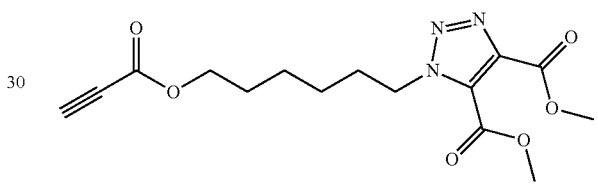

TLC: 1:1 hexanes:ethyl acetate, $R_f$=0.61, UV, KMnO$_4$ stain, p-anisealdehyde stain, yellow spot.

$^1$H NMR (500 MHz, CDCl$_3$): δ 4.62 (t, J=7.2 Hz, 2H), 4.20 (t, J=6.5 Hz, 2H), 4.03 (s, 3H), 4.00 (s, 3H), 2.90 (s, 1H), 1.95 (p, J=7.2 Hz, 2H), 1.70 (p, J=6.7 Hz, 2H), 1.47-1.36 (m, 4H).

$^{13}$C NMR (125 MHz, CDCl$_3$, DEPT): δ 160.5 (C=O), 159.0 (C=O), 152.7 (C=O), 140.0 (4°), 129.7 (4°), 74.7 (alkyne 4°), 74.67 (alkyne CH), 66.0 (CH$_2$), 53.4 (CH$_3$), 52.7 (CH$_3$), 50.4 (CH$_2$), 30.0 (CH$_2$), 28.1 (CH$_2$), 25.9 (CH$_2$), 25.2 (CH$_2$).

IR (Neat): 3255 (s, alkyne CH) 2955 (s, alkane CH), 2864 (s, alkane CH), 2117 (s, alkyne CC), 1735 (s, ester C=O), 1716 (s, ester C=O), 1554 (m, triazole C=C), 1466 (s, methylene bending CH$_2$), 1267 (s, ester stretch C—O), 1235 (s, ester stretch C—O) cm$^{-1}$.

HRMS: Calcd. for C$_{15}$H$_{20}$N$_3$O$_6$ [M+H]$^+$ 338.1347; Found 338.1340.

M8. Preparation of 4,5-dibutyl-1-[6-(prop-2-ynoyloxy)hexyl]-1H-1,2,3-triazole-4,5-dicarboxylate Propiolic acid (1.500 g, 21.413 mmol) was added to a 25 mL round bottom flask with 21 mL of toluene. 4,5-Dibutyl 1-(6-hydroxyhexyl)-1H-1,2,3-triazole-4,5-dicarboxylate (9.4935 g, 25.6956 mmol) (see M5) and 4-methylbenzenesulfonic acid (0.2443 g, 1.2847 mmol) was added to the reaction flask and stirred at reflux for 2 h. The volatiles were evaporated in vacuo, affording a light brown crude oil. Purification via flash chromatography using 7:3 hexanes:ethyl acetate afforded 6.3370 g (15.0349 mmol, 70.21% yield) of the title compound as a colorless oil.

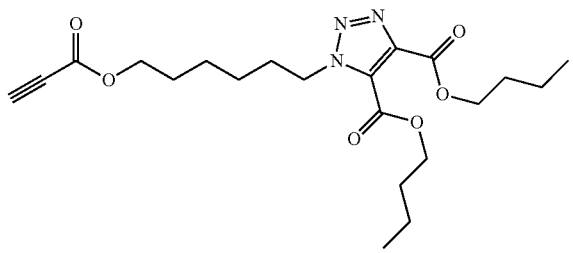 [SMILES: C#CC(=O)OCCCCCCn1nnc(C(=O)OCCCC)c1C(=O)OCCCC]

TLC: 7:3 hexanes:ethyl acetate, $R_f$=0.53, UV, KMnO$_4$ stain, p-anisealdehyde stain, yellow spot.

$^1$H NMR (500 MHz, CDCl$_3$): δ 4.60 (t, J=7.2 Hz, 2H), 4.39 (overlapping t, J=7.0 Hz, 4H), 4.20 (t, J=6.5 Hz, 2H), 2.90 (s, 1H), 1.94 (p, J=7.2 Hz, 2H), 1.77 (overlapping p, J=7.0 Hz, 4H), 1.69 (p, J=6.7 Hz, 2H), 1.51-1.35 (m, 8H), 1.00-0.96 (m, 6H).

$^{13}$C NMR (125 MHz, CDCl$_3$, DEPT): δ 160.4 (C=O), 158.7 (C=O), 152.7 (C=O), 140.4 (4°), 129.7 (4°), 74.7 (alkyne 4°), 74.6 (alkyne CH), 66.7 (CH$_2$), 66.0 (CH$_2$), 65.7 (CH$_2$), 50.3 (CH$_2$), 30.6 (CH$_2$), 30.0 (CH$_2$), 28.1 (CH$_2$), 25.9 (CH$_2$), 25.2 (CH$_2$), 19.1 (CH$_2$), 19.0 (CH$_2$), 13.6 (CH$_3$), 13.0 (CH$_3$).

IR (Neat): 3254 (s, alkyne CH), 2961 (s, alkane CH), 2937 (s, alkane CH), 2874 (s, alkane CH), 2117 (s, alkyne CC), 1718 (s, ester C=O), 1553 (m, triazole C=C), 1467 (s, methylene bending CH$_2$), 1267 (s, ester stretch C—O), 1235 (s, ester stretch C—O) cm$^{-1}$.

HRMS: Calcd. for C$_{21}$H$_{31}$N$_3$O$_6$ [M+H]$^+$ 422.2286; Found 422.2274.

M9. Preparation of 4,5-bis(2-ethylhexyl)-1-[6-(prop-2-ynoyloxy)hexyl]-1H-1,2,3-triazole-4,5-dicarboxylate Propiolic acid (0.500 g, 7.138 mmol) was added to a 25 mL round bottom flask with 7 mL of toluene. 4,5-Bis(2-ethylhexyl) 1-(6-hydroxyhexyl)-1H-1,2,3-triazole-4,5-dicarboxylate (4.1256 g, 8.5652 mmol) (see M6) and 4-methylbenzenesulfonic acid (0.0815 g, 0.428 mmol) was added to the reaction flask and stirred at reflux for 2 h. The volatiles were evaporated in vacuo, affording a light brown crude oil. Purification via flash chromatography using 4:1 hexanes:ethyl acetate afforded 2.7286 g (5.1126 mmol, 71.64% yield) of a colorless oil, as a mixture of diastereomers.

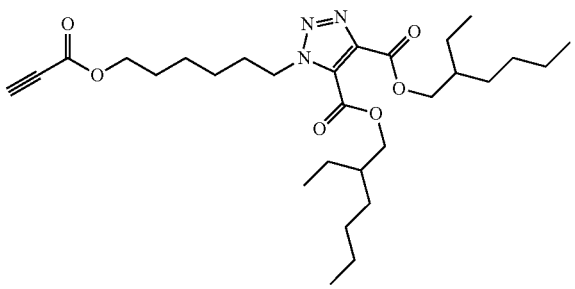 [SMILES: C#CC(=O)OCCCCCCn1nnc(C(=O)OCC(CC)CCCC)c1C(=O)OCC(CC)CCCC]

TLC: 4:1 hexanes:ethyl acetate, $R_f$=0.56, UV, KMnO$_4$ stain, p-anisealdehyde stain, blue-yellow spot.

$^1$H NMR (500 MHz, CDCl$_3$): δ 4.59 (t, J=7.3 Hz, 2H), 4.35-4.23 (m, 4H), 4.19 (t, J=6.6 Hz, 2H), 2.90 (s, 1H), 1.93 (p, J=7.3 Hz, 2H), 1.71 (m, 4H), 1.50-1.27 (m, 20H), 0.96-0.87 (m, 12H).

$^{13}$C NMR (125 MHz, CDCl$_3$, DEPT): δ 160.5 (C=O), 158.8 (C=O), 152.7 (C=O), 140.5 (4°), 129.6 (4°), 74.7 (alkyne 4°), 74.6 (alkyne CH), 69.2 (CH$_2$), 68.4 (CH$_2$), 66.0 (CH$_2$), 50.3 (CH$_2$), 38.73 (CH), 38.70 (CH), 30.20 (CH$_2$), 30.15 (CH$_2$), 30.1 (CH$_2$), 28.9 (CH$_2$), 28.9 (CH$_2$), 28.1 (CH$_2$), 26.0 (CH$_2$), 25.3 (CH$_2$), 23.6 (CH$_2$), 23.5 (CH$_2$), 22.94 (CH$_2$), 22.93 (CH$_2$), 14.0 (CH$_3$), 10.88 (CH$_3$), 10.87 (CH$_3$).

IR (Neat): 3255 (s, alkyne CH), 2960 (s, alkane CH), 2931 (s, alkane CH), 2862 (s, alkane CH), 2117 (s, alkyne CC), 1717 (s, ester C=O), 1555 (m, triazole C=C), 1465 (s, methylene bending CH$_2$), 1268 (s, ester stretch C—O), 1220 (s, ester stretch C—O) cm$^{-1}$.

HRMS: Calcd. for C$_{29}$H$_{47}$N$_3$O$_6$ [M+H]$^+$ 534.3538; Found 534.3521.

M10. Preparation of Dibromofumaric Acid

Acetylenedicarboxylic acid monopotassium salt (5.522 g, 36.30 mmol) was added to a 500 mL round bottom flask and dissolved into ~20 mL of 2M aqueous KOH solution while stirring. NaBr (102.89 g, 26.149 mmol) was dissolved in 80 mL of H$_2$O via sonication. Br$_2$ (6.381 g, 39.93 mmol) was quickly added to the NaBr aqueous solution. The resulting orange NaBr/Br$_2$ solution was subsequently added to the acetylenedicarboxylate solution. Stirring was ceased for the remainder of the reaction to prevent Br$_2$ degradation. The reaction flask was covered in aluminum foil, and an additional 50 mL of H$_2$O was added to bring the total volume to 150 mL, and was left for 24 h at room temperature. After 24 h, a transparent colorless solution was observed. To the reaction flask, 3 mL of saturated aqueous Na$_2$S$_2$O$_3$ solution was added to quench the excess Br$_2$ while stirring. The reaction was saturated with NaCl and acidified with 12 mL of concentrated HCl and extracted with 50 mL of ethyl acetate each four times. The organic layers were dried with Na$_2$SO$_4$. The volatiles were evaporated in vacuo to afford a white solid. After recrystallization in chloroform, 8.000 g (29.21 mmol, 80.47% yield) of the title compound was recovered as colorless needles: mp 239-240° C. (See, Ott, E., "Über Symmetrische and Asymmetrische Dicarbonsäure-chloride", Justus Liebigs Annalen der Chemie, 392(3) (1912) 245-285.)

Alternative Purification Method: A faster method providing purer product involved dissolving the crude solid into a minimal amount of Et$_2$O, which was subsequently slowly rotavapped to deposit solid on the sides of a pear shaped flask. The solid was washed with CHCl$_3$, carefully avoiding pushing the deposited solid down the flask. The light brown to orange mother liquor was pipetted out and placed into a beaker. This washing process was repeated three times. The dissolution-washing process was repeated until the CHCl$_3$ mother liquor became colorless.

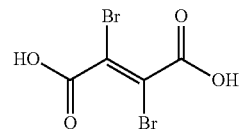

TLC: Not UV Active nor Stain Active.

$^1$H NMR (500 MHz, d$_6$-Acetone): No Detectable Protons.

$^{13}$C NMR (125 MHz, d$_6$-Acetone): δ 162.8 (C=O), 111.7 (C—Br).

IR (KBr Pellet): 3013 (s, OH stretch), 1699 (s, carboxylic acid C=O), 1405 (m, alcohol bending OH), 686 (m, C—Br) cm$^{-1}$.

HRMS: Not Detectable.

M11. Preparation of 4,5-dimethyl 1-(6-{[(2E)-4-({6-[4,5-bis(methoxycarbonyl)-1H-1,2,3-triazol-1-yl]hexyl}oxy)-2,3-dibromo-4-oxobut-2-enoyl]oxy}hexyl)-1H-1,2,3-triazole-4,5-dicarboxylate Dibromofumaric acid (1.5000 g, 5.4765 mmol) (see M10) and PCl$_5$ (2.3370 g, 11.226 mmol) was added to a 25 mL round bottom flask with 5 mL of pentane. The reaction was refluxed for 2 h while stirring. Reaction completeness was determined by observing the dissolution of solids into a clear yellow solution. After the dissolution of solids was noted, the reaction was immediately diluted with 5 mL of pentane. The diluted reaction was added slowly to a 150 mL beaker of crescent-cube ice, and was allowed to stand for 10 min with occasional swirling. The quenched reaction solution was transferred to a 150 mL separatory funnel. The organic layer was collected and dried with Na$_2$SO$_4$. The volatiles were evaporated in vacuo, affording a clear yellow oil (1.6457 g, 5.2959 mmol, 96.7% yield) of (2E)-dibromobut-2-enedioyl dichloride. The acid chloride was immediately diluted with 30 mL of CCl$_4$ under N$_2$ in a 250 mL pear flask. Next, 4,5-dimethyl 1-(6-hydroxyhexyl)-1H-1,2,3-triazole-4,5-dicarboxylate (3.1729 g, 11.121 mmol) (see M4) and pyridine (0.8797 g, 11.121 mmol) were added to a 250 mL round bottom flask with 60 mL of CCl$_4$ and cooled to 0° C. under N$_2$ with stirring. The acid chloride solution was slowly added via syringe over 10 min, noting the formation of pyridine salts in solution. After the addition of the acid chloride, the reaction was allowed to stir at 0° C. for 30 min, then at room temperature for an additional 1 h. The reaction was poured into a 500 mL separatory funnel and washed with 20 mL of 5% aqueous HCl, two times each. The organic layer was collected, dried with MgSO$_4$ and filtered. The volatiles were then evaporated in vacuo, affording a clear yellow oil. Purification via flash chromatography using 7:3 ethyl acetate:hexanes afforded 3.6947 g (4.5702 mmol, 86.29% yield) of the title compound as a clear pale yellow oil. (See, Ott, Justus Liebigs Annal. Chemie, 392(3) (1912) 245-285; Charlton, J. L. & Chee, G., "Synthesis of Chiral Esters of Acetylenedicarboxylic Acid", Tetrahedron Letters, 35(34) (1994) 6243-6246.) TLC: 7:3 ethyl acetate:hexanes, R$_f$=0.53, UV, p-anisealdehyde stain, purple spot.

(C—Br), 66.9 (CH$_2$), 53.5 (CH$_3$), 52.7 (CH$_3$), 50.4 (CH$_2$), 30.0 (CH$_2$), 28.1 (CH$_2$), 25.8 (CH$_2$), 25.2 (CH$_2$).

IR (Neat): 3003 (s, alkane CH), 2954 (s, alkane CH), 2863 (s, alkane CH), 1733 (s, ester C=O), 1554 (m, triazole C=C), 1468 (s, methylene bending CH$_2$), 1272 (s, ester stretch C—O), 1231 (s, ester stretch C—O), 914 (s, alkene bending C=C), 733 (s, alkene bending C=C) cm$^{-1}$.

HRMS: Calcd. for C$_{28}$H$_{36}$Br$_2$N$_6$O$_{12}$ [M+H]$^+$ 807.0831; Found 807.0831. (Br isotopes): 809.0804, 811.0782, 812.0808.

M12. Preparation of 4,5-dibutyl 1-(6-{[(2E)-4-({6-[4,5-bis(butoxycarbonyl)-1H-1,2,3-triazol-1-yl]hexyl}oxy)-2,3-dibromo-4-oxobut-2-enoyl]oxy}hexyl)-1H-1,2,3-triazole-4,5-dicarboxylate Dibromofumaric acid (1.5000 g, 5.4765 mmol) (see M10) and PCl$_5$ (2.3940 g, 11.496 mmol) was added to a 25 mL round bottom flask with 5 mL of pentane. The reaction was refluxed for 2 h while stirring. Reaction completeness was determined by observing the dissolution of solids into a clear yellow solution. After the dissolution of solids was noted, the reaction was immediately diluted with 5 mL of pentane. The diluted reaction was added slowly to a 150 mL beaker of crescent-cube ice, and was allowed to stand for 10 min with occasional swirling. The quenched reaction solution was transferred to a 150 mL separatory funnel. The organic layer was collected and dried with Na$_2$SO$_4$. The volatiles were evaporated in vacuo, affording a clear yellow oil (1.6605 g, 5.3434 mmol, 97.5% yield) of (2E)-dibromobut-2-enedioyl dichloride. The acid chloride was immediately diluted with 30 mL of CCl$_4$ under N$_2$ in a 250 mL pear flask. Next, 4,5-dibutyl 1-(6-hydroxyhexyl)-1H-1,2,3-triazole-4,5-dicarboxylate (4.1457 g, 11.221 mmol) (see M5) and pyridine (0.8870 g, 11.221 mmol) were added to a 250 mL round bottom flask with 60 mL of CCl$_4$ and cooled to 0° C. under N$_2$ with stirring. The acid chloride solution was slowly added via syringe over 10 min, noting an orange color and the formation of pyridine salts in solution. After the addition of the acid chloride, the reaction was allowed to stir at 0° C. for 30 min, then at room temperature for an additional 2 h. The reaction was poured into a 500 mL separatory funnel and washed with 20 mL of 5% aqueous HCl, two times each. The organic layer was collected, dried with MgSO$_4$ and

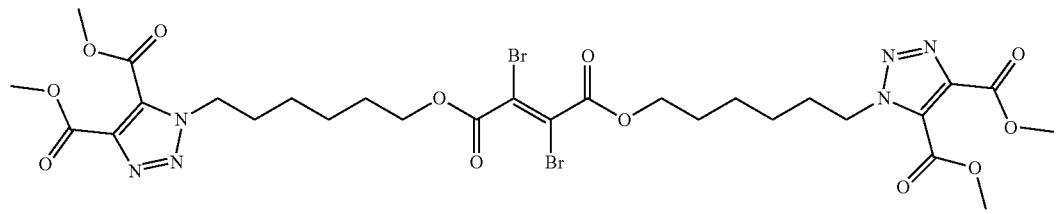

$^1$H NMR (500 MHz, CDCl$_3$): δ 4.55 (t, J=7.2 Hz, 4H), 4.23 (t, J=6.5 Hz, 4H), 3.95 (s, 6H), 3.92 (s, 6H), 1.88 (p, J=7.3 Hz, 4H), 1.68 (p, J=6.5 Hz, 4H), 1.45-1.39 (m, 4H), 1.36-1.30 (m, 4H).

$^{13}$C NMR (125 MHz, CDCl$_3$, DEPT): δ 162.2 (C=O), 160.5 (C=O), 159.0 (C=O), 140.0 (4°), 129.7 (4°), 112.7 filtered. The volatiles were then evaporated in vacuo, affording a dark red oil. Purification via flash chromatography using 1:1 hexanes:ethyl acetate was performed, affording 4.4136 g (4.5186 mmol, 84.56% yield) of the title compound as a colorless oil. (See, Ott, Justus Liebigs Annal. Chemie, 392(3) (1912) 245-285; Charlton & Chee, Tetrahedron Lett., 35(34) (1994) 6243-6246.)

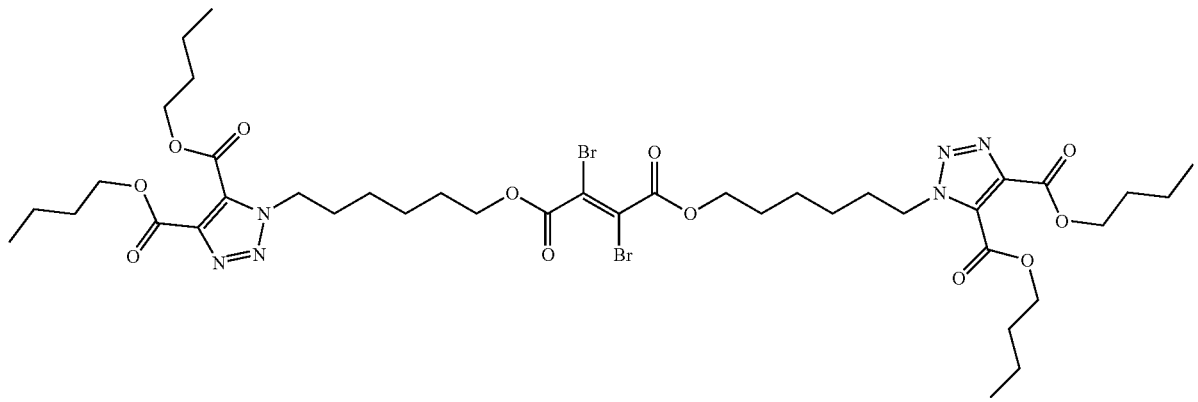 [SMILES: CCCCOC(=O)c1nnn(CCCCCCOC(=O)/C(Br)=C(\Br)C(=O)OCCCCCCn2nnc(C(=O)OCCCC)c2C(=O)OCCCC)c1C(=O)OCCCC]

TLC: 1:1 hexanes:ethyl acetate, $R_f$=0.78, UV, p-anisealdehyde stain, purple spot.

$^1$H NMR (500 MHz, CDCl$_3$): δ 4.56 (t, J=7.2 Hz, 4H), 4.34 (overlapping t, J=6.8 Hz, 8H), 4.25 (t, J=6.4 Hz, 4H), 1.90 (p, J=7.2 Hz, 41-1), 1.77-1.63 (m, 12H), 1.48-1.30 (m, 16H), 0.99-0.75 (m, 12H).

$^{13}$C-NMR (125 MHz, CDCl$_3$, DEPT): δ 162.2 (C=O), 160.4 (C=O), 158.7 (C=O), 140.4 (4°), 129.6 (4°), 112.7 (C—Br), 66.9 (CH$_2$), 66.7 (CH$_2$), 65.7 (CH$_2$), 50.3 (CH$_2$), 30.6 (CH$_2$), 30.3 (CH$_2$), 30.0 (CH$_2$), 28.1 (CH$_2$), 25.9 (CH$_2$), 25.2 (CH$_2$), 19.1 (CH$_2$), 19.0 (CH$_2$), 13.7 (CH$_3$), 13.6 (CH$_3$).

IR (Neat): 2961 (s, alkane CH), 2937 (s, alkane CH), 2873 (s, alkane CH), 1733 (s, ester C=O), 1553 (m, triazole C=C), 1467 (s, methylene bending CH$_2$), 1267 (s, ester stretch C—O), 1214 (s, ester stretch C—O), 755 (m, alkene bending C=C) cm$^{-1}$.

HRMS: Calcd. for C$_{40}$H$_{60}$Br$_2$N$_6$O$_{12}$ [M+H]$^+$ 975.2708; Found 975.2708. (Br isotopes): 976.2737, 977.2684, 979.2668, 980.2695.

M13. Preparation of 4,5-bis(2-ethylhexyl) 1-(6-{[(2E)-4-({6-[4,5-bis({[(2-ethylhexyl)oxy]carbonyl})-1H-1,2,3-triazol-1-yl]hexyl}oxy)-2,3-dibromo-4-oxobut-2-enoyl]oxy}hexyl)-1H-1,2,3-triazole-4,5-dicarboxylate Dibromofumaric acid (1.5200 g, 5.5502 mmol) (see M10) and PCl$_5$ (2.4270 g, 11.655 mmol) was added to a 25 mL round bottom flask with 5 mL of pentane. The reaction was refluxed for 2 h while stirring. Reaction completeness was determined by observing the dissolution of solids into a clear yellow solution. After the dissolution of solids was noted, the reaction was immediately diluted with 5 mL of pentane. The diluted reaction was added slowly to a 150 mL beaker of crescent-cube ice, and was allowed to stand for 10 min with occasional swirling. The quenched reaction solution was transferred to a 150 mL separatory funnel. The organic layer was collected and dried with Na$_2$SO$_4$. The volatiles were evaporated in vacuo, affording a clear yellow oil (1.6563 g, 5.3299 mmol, 96.0% yield) of (2E)-dibromobut-2-enedioyl dichloride. The acid chloride was immediately diluted with 30 mL of CCl$_4$ under N$_2$ in a 250 mL pear flask. Next, 4,5-bis(2-ethylhexyl) 1-(6-hydroxyhexyl)-1H-1,2,3-triazole-4,5-dicarboxylate (5.3913 g, 11.193 mmol) (see M6) and pyridine (0.8853 g, 11.193 mmol) were added to a 250 mL round bottom flask with 60 mL of CCl$_4$ and cooled to 0° C. under N$_2$ with stirring. The acid chloride solution was slowly added via syringe over 10 min, noting an orange-brown color and the formation of pyridine salts in solution. After the addition of the acid chloride, the reaction was allowed to stir at 0° C. for 30 min, then at room temperature for an additional 2 h. The reaction was poured into a 500 mL separatory funnel and washed with 20 mL of 5% aqueous HCl, two times each. The organic layer was collected, dried with MgSO$_4$ and filtered. The volatiles were then evaporated in vacuo, affording a dark red oil. Purification via flash chromatography using 7:3 hexanes:ethyl acetate was performed, affording 5.1462 g (4.2842 mmol, 80.38% yield) of a colorless oil, as a mixture of diastereomers. (See, Ott, Justus Liebigs Annal. Chemie, 392(3) (1912) 245-285; Charlton & Chee, Tetrahedron Lett., 35(34) (1994) 6243-6246.)

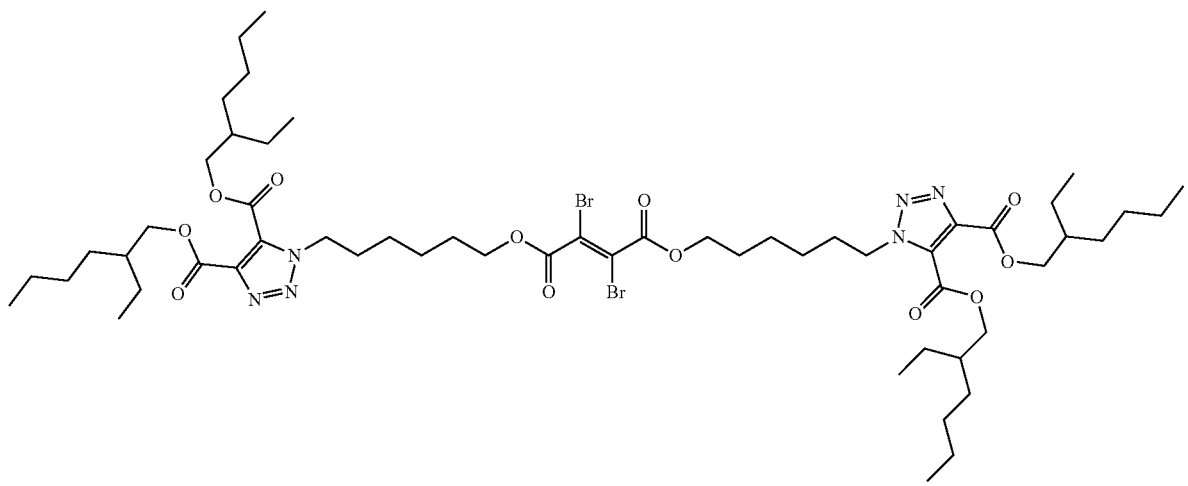 [SMILES: CCCCC(CC)COC(=O)c1nnn(CCCCCCOC(=O)/C(Br)=C(\Br)C(=O)OCCCCCCn2nnc(C(=O)OCC(CC)CCCC)c2C(=O)OCC(CC)CCCC)c1C(=O)OCC(CC)CCCC]

TLC: 7:3 hexanes:ethyl acetate, $R_f$=0.64, UV, p-anisealdehyde stain, blue spot.

$^1$H NMR (500 MHz, CDCl$_3$): δ 4.55 (t, J=7.3 Hz, 4H), 4.30-4.19 (m, 12H), 1.89 (p, J=7.4 Hz, 4H), 1.73-1.62 (m, 8H), 1.47-1.21 (m, 40H), 0.93-0.79 (m, 24H).

$^{13}$C-NMR (125 MHz, CDCl$_3$, DEPT): δ 162.2 (C=O), 160.6 (C=O), 158.8 (C=O), 140.5 (4°), 129.6 (4°), 112.7 (C—Br), 69.1 (CH$_2$), 68.4 (CH$_2$), 66.9 (CH$_2$), 50.3 (CH$_2$), 38.7 (CH), 30.2 (CH$_2$), 30.2 (CH$_2$), 30.1 (CH$_2$), 28.9 (CH$_2$), 28.1 (CH$_2$), 25.9 (CH$_2$), 25.2 (CH$_2$), 23.6 (CH$_2$), 23.5 (CH$_2$), 22.9 (CH$_2$), 14.0 (CH$_3$), 10.9 (CH$_3$).

IR (Neat): 2959 (s, alkane CH), 2932 (s, alkane CH), 2872 (s, alkane CH), 2861 (s, alkane CH), 1736 (s, ester C=O), 1554 (m, triazole C=C), 1466 (s, methylene bending CH$_2$), 1267 (s, ester stretch C—O), 1235 (s, ester stretch C—O), 758 (m, alkene bending C=C) cm$^{-1}$.

HRMS: Calcd. for C$_{56}$H$_{92}$Br$_2$N$_6$O$_{12}$ [M+H]$^+$ 1199.5213; Found 1199.5212. (Br isotopes): 1201.5193, 1203.5179, 1204.5198.

M14. Preparation of 4,5-dimethyl 1-(6-{[4-({6-[4,5-bis(methoxycarbonyl)-1H-1,2,3-triazol-1-yl]hexyl}oxy)-4-oxobut-2-ynoyl]oxy}hexyl)-1H-1,2,3-triazole-4,5-dicarboxylate To a 250 mL round bottom flask, 4,5-dimethyl 1-(6-{[(2E)-4-({6-[4,5-bis(methoxycarbonyl)-1H-1,2,3-triazol-1-yl]hexyl}oxy)-2,3-dibromo-4-oxobut-2-enoyl]oxy}hexyl)-1H-1,2,3-triazole-4,5-dicarboxylate (1.000 g, 1.236 mmol) (see M11) was added to 12 mL of anhydrous THF. Subsequently, Zn metal (0.4849 g, 7.416 mmol) and 12 (0.020 g, 0.0787 mmol) were added and stirred at reflux for 5 h under N$_2$. The reaction was cooled and filtered through CELITE™. The volatiles were evaporated in vacuo and subsequently diluted with 80 mL of ethyl acetate. The solution was poured into a 500 mL separatory funnel and washed with 20 mL of 10% aqueous Na$_2$S$_2$O$_3$, two times each. The organic layer was collected and dried with MgSO$_4$. The volatiles were then evaporated in vacuo, and immediately purified via flash chromatography using 7:3 ethyl acetate:hexanes, affording 0.711 g (1.0928 mmol, 88.41% yield) of the title compound as a viscous clear yellow oil. (See, Charlton, J. L. et al., "Synthesis of Acetylenedicarboxylic Acid Esters and Asymmetric Diels-Alder Reactions of the Bis(methyl (S)-lactyl) Ester", Canadian Journal of Chemistry, 73(9) (1995) 1454-1462.)

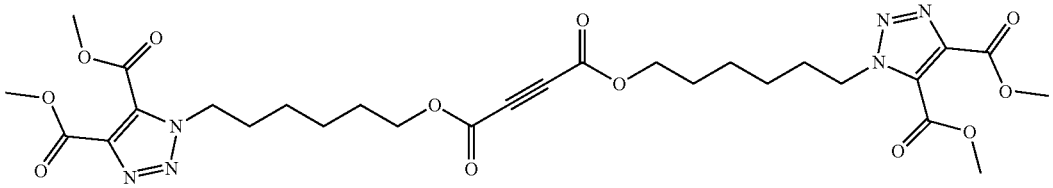

TLC: 7:3 ethyl acetate:hexanes, UV, $R_f$=0.54, KMnO$_4$ stain, p-anisealdehyde stain, blue spot.

$^1$H NMR (500 MHz, CDCl$_3$): δ 4.59 (t, J=7.2 Hz, 4H), 4.21 (t, J=6.5 Hz, 4H), 4.00 (s, 6H), 3.97 (s, 6H), 1.92 (p, J=7.3 Hz, 4H), 1.67 (p, J=6.6 Hz, 4H), 1.44-1.33 (m, 8H).

$^{13}$C-NMR (125 MHz, CDCl$_3$, DEPT): δ 160.5 (C=O), 159.0 (C=O), 151.8 (C=O), 139.9 (4°), 129.7 (4°), 74.7 (alkyne 4°), 66.6 (CH$_2$), 53.4 (CH$_3$), 52.7 (CH$_3$), 50.4 (CH$_2$), 29.9 (CH$_2$), 28.0 (CH$_2$), 25.8 (CH$_2$), 25.1 (CH$_2$).

IR (Neat): 3010 (s, alkane CH), 2954 (s, alkane CH), 2863 (s, alkane CH), 1729 (s, ester C=O), 1552 (m, triazole C=C), 1468 (methylene bending CH$_2$), 1259 (s, ester stretch C—O), 1227 (s, ester stretch C—O) cm$^{-1}$.

HRMS: Calcd. for C$_{28}$H$_{36}$N$_6$O$_{12}$ [M+H]$^+$ 649.2463; Found 649.2463.

M15. Preparation of 4,5-dibutyl 1-(6-{[4-({6-[4,5-bis(butoxycarbonyl)-1H-1,2,3-triazol-1-yl]hexyl}oxy)-4-oxobut-2-ynoyl]oxy}hexyl)-1H-1,2,3-triazole-4,5-dicarboxylate To a 250 mL round bottom flask, 4,5-dibutyl 1-(6-{[(2E)-4-({6-[4,5-bis(butoxycarbonyl)-1H-1,2,3-triazol-1-yl]hexyl}oxy)-2,3-dibromo-4-oxobut-2-enoyl]oxy}hexyl)-1H-1,2,3-triazole-4,5-dicarboxylate (7.780 g, 8.057 mmol) (see M12) was added to 70 mL of anhydrous THF. Subsequently, Zn metal (3.1607 g, 48.343 mmol) and 12 (0.1226 g, 0.48342 mmol) were added and stirred at reflux for 5 h under $N_2$. The reaction was cooled and filtered through CELITE™. The reaction was concentrated in vacuo and diluted with 80 mL of ethyl acetate. The solution was poured into a 500 mL separatory funnel and washed with 20 mL of 10% aqueous $Na_2S_2O_3$, two times each. The organic layer was collected and dried with $MgSO_4$. The volatiles were then evaporated in vacuo, and immediately purified via flash chromatography using 7:3 hexanes:ethyl acetate, affording 5.2953 g (6.4817 mmol, 80.44% yield) of the title compound as a viscous colorless oil. (See, Charlton et al., Canadian J. Chem., 73(9) (1995) 1454-1462.)

HRMS: Calcd. for $C_{40}H_{60}N_6O_{12}$ $[M+H]^+$ 817.4342; Found 817.4326.

M16. Preparation of 4,5-bis(2-ethylhexyl) 1-(6-{[4-({6-[4,5-bis({[(2-ethylhexyl)oxy]carbonyl})-1H-1,2,3-triazol-1-yl]hexyl}oxy)-4-oxobut-2-ynoyl]oxy}hexyl)-1H-1,2,3-triazole-4,5-dicarboxylate To a 250 mL round bottom flask, 4,5-bis(2-ethylhexyl) 1-(6-{[(2E)-4-({6-[4,5-bis({[(2-ethylhexyl)oxy]carbonyl})-1H-1,2,3-triazol-1-yl]hexyl}oxy)-2,3-dibromo-4-oxobut-2-enoyl]oxy}hexyl)-1H-1,2,3-triazole-4,5-dicarboxylate

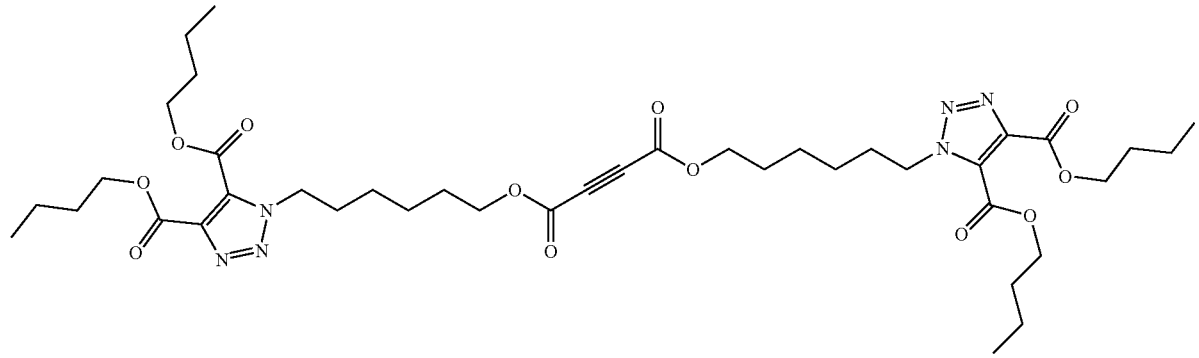 [SMILES: CCCCOC(=O)c1nnn(CCCCCCOC(=O)C#CC(=O)OCCCCCCn2nnc(C(=O)OCCCC)c2C(=O)OCCCC)c1C(=O)OCCCC]

TLC: 7:3 hexanes:ethyl acetate, $R_f$=0.39, UV, $KMnO_4$ stain, p-anisealdehyde stain, blue spot.

$^1$H NMR (500 MHz, $CDCl_3$): δ 4.55 (t, J=7.3 Hz, 4H), 4.34 (overlapping t, J=6.7 Hz, 8H), 4.18 (t, J=6.6 Hz, 4H), 1.89 (p, J=7.3 Hz, 4H), 1.72 (overlapping p, J=6.7, 8H), 1.65 (p, J=6.6, 4H), 1.45-1.32 (m, 16H), 0.98-0.88 (m, 12H).

$^{13}$C-NMR (125 MHz, $CDCl_3$, DEPT): δ 160.2 (C=O), 158.7 (C=O), 151.8 (C=O), 140.4 (4°), 129.7 (4°), 74.7 (alkyne 4°), 66.7 ($CH_2$), 66.7 ($CH_2$), 65.7 ($CH_2$), 50.3 ($CH_2$), 30.6 ($CH_2$), 30.3 ($CH_2$), 30.0 ($CH_2$), 28.1 ($CH_2$), 25.9 ($CH_2$), 25.2 ($CH_2$), 19.1 ($CH_2$), 19.0 ($CH_2$), 13.7 ($CH_3$), 13.6 ($CH_3$).

IR (Neat): 2961 (s, alkane CH), 2937 (s, alkane CH), 2873 (s, alkane CH), 1725 (s, ester C=O), 1553 (triazole alkene, C=C), 1467 (methylene bending $CH_2$), 1259 (s, ester stretch C—O), 1207 (s, ester stretch, C—O) $cm^{-1}$.

(7.207 g, 6.0 mmol) (see M13) was added to 60 mL of anhydrous THF. Subsequently, Zn metal (2.353 g, 36.0 mmol) and 12 (0.1827 g, 0.72 mmol) were added and stirred at reflux for 5 h under $N_2$. The reaction was cooled and filtered through CELITE™. The reaction was concentrated in vacuo and diluted with 80 mL of ethyl acetate. The solution was poured into a 500 mL separatory funnel and washed with 20 mL of 10% aqueous $Na_2S_2O_3$, two times each. The organic layer was collected and dried with $MgSO_4$. The volatiles were then evaporated in vacuo, and immediately purified via flash chromatography using 7:3 hexanes:ethyl acetate, affording 5.3218 g (5.1104 mmol, 85.17% yield) of a colorless oil, as a mixture of diastereomers. (See, Charlton et al., Canadian J. Chem., 73(9) (1995) 1454-1462.)

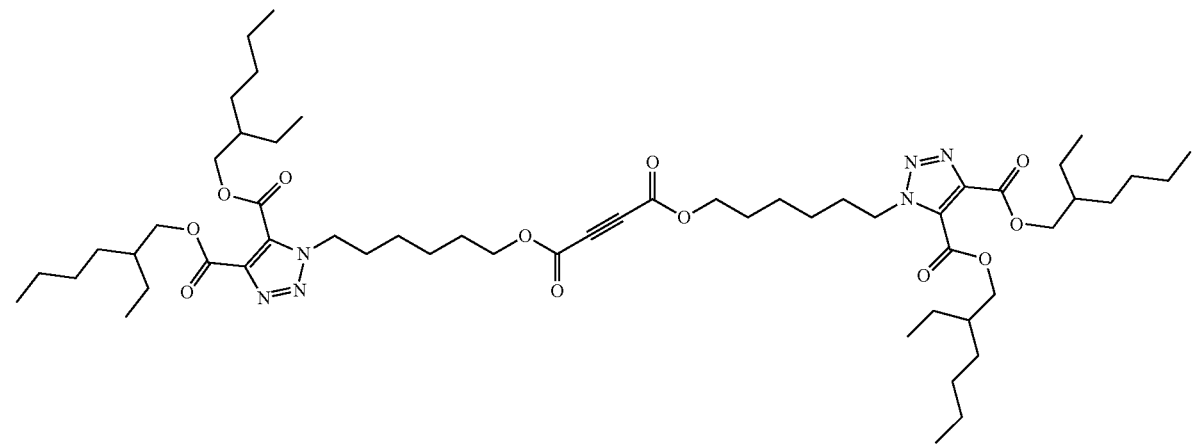 [SMILES: CCCCC(CC)COC(=O)c1nnn(CCCCCCOC(=O)C#CC(=O)OCCCCCCn2nnc(C(=O)OCC(CC)CCCC)c2C(=O)OCC(CC)CCCC)c1C(=O)OCC(CC)CCCC]

TLC: 7:3 hexanes:ethyl acetate, $R_f$=0.63, UV, KMnO$_4$ stain, p-anisealdehyde stain, blue spot.

$^1$H NMR (500 MHz, CDCl$_3$): δ 4.56 (t, J=7.2 Hz, 4H), 4.31-4.22 (m, 8H), 4.19 (t, J=6.6 Hz, 4H), 1.90 (p, J=7.2 Hz, 4H), 1.74-1.63 (m, 8H), 1.48-1.28 (m, 40H), 0.91-0.87 (m, 24H).

$^{13}$C-NMR (125 MHz, CDCl$_3$, DEPT): δ 160.6 (C=O), 158.8 (C=O), 151.8 (C=O), 140.5 (4°), 129.6 (4°), 74.7 (alkyne 4°), 69.2 (CH$_2$), 68.4 (CH$_2$), 66.7 (CH$_2$), 50.3 (CH$_2$), 38.7 (CH), 30.2 (CH$_2$), 30.2 (CH$_2$), 30.0 (CH$_2$), 28.9 (CH$_2$), 28.1 (CH$_2$), 25.9 (CH$_2$), 25.2 (CH$_2$), 23.6 (CH$_2$), 23.6 (CH$_2$), 23.0 (CH$_2$), 14.1 (CH$_3$), 10.9 (CH$_3$).

IR (Neat): 2959 (s, alkane CH), 2932 (s, alkane CH), 2872 (s, alkane CH), 2862 (s, alkane CH), 1727 (s, ester C=O), 1554 (m, triazole C=C), 1466 (s, methylene bending CH$_2$), 1256 (s, ester stretch C—O), 1215 (s, ester stretch C—O) cm$^{-1}$.

HRMS: Calcd. for C$_{56}$H$_{92}$N$_6$O$_{12}$ [M+H]$^+$ 1041.6846; Found 1041.6843.

M17. Preparation of 1,4-Bis({2-[2-(2-methoxyethoxy) ethoxy]ethyl}but-2-ynedioate But-2-ynedioic acid (1.0000 g, 8.767 mmol) was added to a 50 mL round bottom flask. Triethylene glycol monomethyl ether (3.1670 g, 19.290 mmol) was then added along with 4-methylbenzenesulfonic acid (0.1667 g, 0.876 mmol) and 13 mL of dry toluene. Using a Dean-Stark apparatus, the reaction was heated and stirred at reflux for 5 h. The reaction was transferred to a 150 mL separatory funnel and diluted with 40 mL of toluene and washed with 20 mL of saturated NaHCO$_3$ three times each. The aqueous layer was extracted with 60 mL of ethyl acetate, three times each. The combined organic layers were dried with MgSO$_4$, filtered, and concentrated in vacuo. Purification via flash chromatography using 95:5 CH$_2$Cl$_2$:MeOH afforded 2.673 g (6.576 mmol, 75.02% yield) of the title compound as a colorless oil.

reaction flask and stirred at 50° C. for 24 h. The volatiles were evaporated in vacuo affording a colorless crude oil. Purification via flash chromatography using 95:5 CH$_2$Cl$_2$: MeOH afforded 2.8533 g (5.191 mmol, 74.34% yield) of the title compound as a colorless oil.

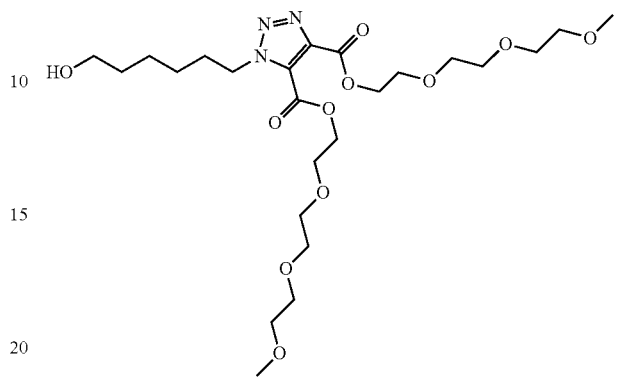

TLC: 95:5 CH$_2$Cl$_2$:MeOH, $R_f$=0.48, UV, KMnO$_4$ stain, p-anisealdehyde stain, dark blue spot.

$^1$H NMR (500 MHz, CDCl$_3$): δ 4.60 (t, J=7.2 Hz, 2H), 4.55 (t, J=4.5, 2H), 4.51 (t, J=4.9 Hz, 2H), 3.82 (overlapping t, J=4.8 Hz, 4H), 3.72-3.60 (m, 14H), 3.56-3.53 (m, 4H), 3.37-3.36 (m, 6H), 1.93 (p, J=7.2 Hz, 2H), 1.69 (s, 1H), 1.56 (p, J=6.7 Hz, 2H), 1.47-1.30 (m, 4H).

$^{13}$C NMR (125 MHz, CDCl$_3$, DEPT): δ 160.1 (C=O), 158.5 (C=O), 140.0 (4°), 130.1 (4°), 71.9 (CH$_2$), 70.7 (CH$_2$), 70.6 (CH$_2$), 70.6 (CH$_2$), 70.6 (CH$_2$), 70.5 (CH$_2$), 68.8 (CH$_2$), 68.5 (CH$_2$), 65.6 (CH$_2$), 64.8 (CH$_2$), 62.5 (CH$_2$), 59.0 (CH$_3$), 50.5 (CH$_2$), 32.4 (CH$_2$), 30.1 (CH$_2$), 26.0 (CH$_2$), 25.1 (CH$_2$).

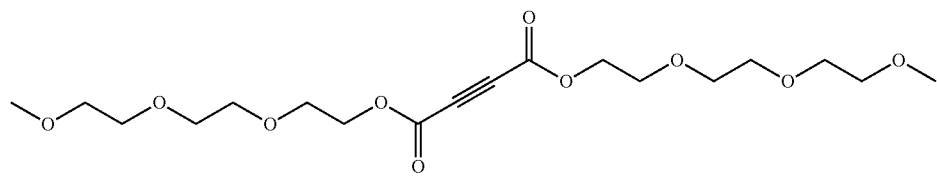

TLC: 95:5 CH$_2$Cl$_2$:MeOH, $R_f$=0.53, UV, KMnO$_4$ stain, p-anisealdehyde stain, blue spot. Blue fluorescence at 395 nm.

$^1$H NMR (500 MHz, CDCl$_3$): δ 4.39-4.31 (m, 4H), 3.74-3.70 (m, 4H), 3.65-3.60 (m, 12H), 3.56-3.49 (m, 4H), 3.37-3.33 (m, 6H).

$^{13}$C NMR (125 MHz, CDCl$_3$, DEPT): δ 151.6 (C=O), 74.7 (alkyne 4°), 71.9 (CH$_2$), 70.7 (CH$_2$), 70.6 (CH$_2$), 68.4 (CH$_2$), 65.8 (CH$_2$), 58.9 (CH$_3$).

IR (Neat): 2879 (s, alkane CH), 1725 (s, ester C=O), 1259 (s, ester stretch C—O), 1110 (s, ether stretch C—O) cm$^{-1}$.

HRMS: Calcd. for C$_{18}$H$_{30}$O$_{10}$ [M+H]$^+$ 407.1912; Found 407.1895. [M+Na]$^+$429.1731; Found 429.1708.

M18. Preparation of 4,5-bis({2-[2-(2-methoxyethoxy) ethoxy]ethyl}) 1-(6-hydroxyhexyl)-1H-1,2,3-triazole-4,5-dicarboxylate 6-Azidohexan-1-ol (1.0000 g, 6.983 mmol) (see M3) was added to a 100 mL round bottom flask with 30 mL of CHCl$_3$. 1,4-Bis({2-[2-(2-methoxyethoxy)ethoxy]ethyl})but-2-yne-dioate (3.4061 g, 8.381 mmol) (see M17) was added to the IR (Neat): 3472 (s, OH), 2930 (s, alkane CH), 2874 (s, alkane CH), 1733 (s, ester C=O), 1552 (m, triazole C=C), 1468 (s, methylene bending CH$_2$), 1281 (s, ester stretch C—O), 1247 (s, ether stretch C—O), 1111 (s, ether stretch C—O), 1067 (s, 1° alcohol stretch C—O) cm$^{-1}$.

HRMS: Calcd. for C$_{24}$H$_{43}$N$_3$O$_{11}$[M+H]$^+$ 550.2970; Found 550.2948.

M19. Preparation of 4,5-Bis({2-[2-(2-methoxyethoxy) ethoxy]ethyl})-1-[6-(prop-2-ynoyloxy)hexyl]-1H-1,2,3-triazole-4,5-dicarboxylate Propiolic acid (1.0000 g, 14.2755 mmol) was added to a 50 mL round bottom flask with 14 mL of toluene. 4,5-Bis ({2-[2-(2-methoxyethoxy)ethoxy]ethyl})-1-(6-hydroxyhexyl)-1H-1,2,3-triazole-4,5-dicarboxylate (9.4152 g, 17.1306 mmol) and 4-methylbenzenesulfonic acid (0.2715 g, 1.4275 mmol) was added to the reaction flask and stirred at reflux for 3 h. The volatiles were evaporated in vacuo, affording a light brown crude oil. Purification via flash chromatography using 95:5 CH$_2$Cl$_2$:MeOH afforded 6.6122 g (10.9902 mmol, 76.99% yield) of the title compound as a colorless oil.

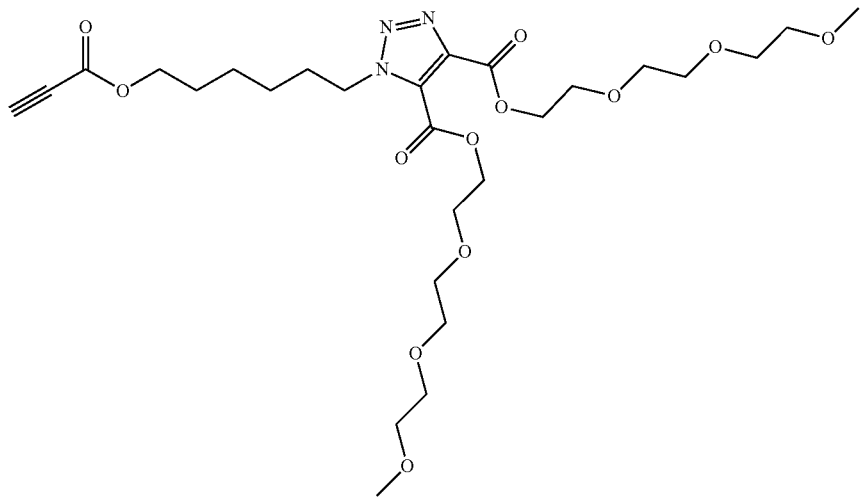 [SMILES: C#CC(=O)OCCCCCCn1nnc(C(=O)OCCOCCOCCOC)c1C(=O)OCCOCCOCCOC]

TLC: 95:5 CH$_2$Cl$_2$:MeOH, R$_f$=0.50, UV, KMnO$_4$ stain, p-anisealdehyde stain, blue-yellow spot.

$^1$H NMR (500 MHz, CDCl$_3$): δ 4.59 (t, J=7.2 Hz, 2H), 4.54 (t, J=4.8, 2H), 4.50 (t, J=4.9 Hz, 2H), 4.18 (t, J=6.5 Hz, 2H), 3.82 (overlapping t, J=4.9 Hz, 4H), 3.72-3.60 (m, 12H), 3.57-3.49 (m, 4H), 3.37 (s, 3H), 3.36 (s, 3H), 2.93 (s, 1H), 1.93 (p, J=7.2 Hz, 2H), 1.68 (p, J=6.5 Hz, 2H), 1.45-1.34 (m, 4H).

$^{13}$C NMR (125 MHz, CDCl$_3$, DEPT): δ 160.1 (C=O), 158.4 (C=O), 152.7 (C=O), 140.0 (4°), 129.6 (4°), 74.7 (alkyne 4°), 74.6 (alkyne CH), 71.9 (CH$_2$), 70.7 (CH$_2$), 70.60 (CH$_2$), 70.56 (CH$_2$), 68.8 (CH$_2$), 68.5 (CH$_2$), 66.0 (CH$_2$), 65.6 (CH$_2$), 64.8 (CH$_2$), 59.0 (CH$_3$), 50.4 (CH$_2$), 30.0 (CH$_2$), 28.1 (CH$_2$), 25.9 (CH$_2$), 25.2 (CH$_2$).

IR (Neat): 3220 (m, alkyne CH), 2874 (s, alkane CH), 2114 (s, alkyne CC), 1732 (s, ester C=O), 1715 (s, ester C=O), 1552 (triazole C=C), 1469 (methylene bending CH$_2$), 1271 (m, ester stretch C—O), 1235 (s, ester stretch C—O), 1108 (s, ether stretch C—O) cm$^{-1}$.

HRMS: Calcd. for C$_{27}$H$_{43}$N$_3$O$_{12}$ [M+H]$^+$ 602.2920; Found 602.2917. [M+Na]+624.2739; Found 624.2720.

M20. Preparation of 4,5-bis({2-[2-(2-methoxyethoxy)ethoxy]ethyl}) 1-(6-{[(2E)-4-({6-[bis(2,5,8,11-tetraoxadodecanoyl)-1H-1,2,3-triazol-1-yl]hexyl}oxy)-2,3-dibromo-4-oxobut-2-enoyl]oxy}hexyl)-1H-1,2,3-triazole-4,5-dicarboxylate Dibromofumaric acid (1.5000 g, 5.4765 mmol) (see M10) and PCl$_5$ (2.394 g, 11.5007 mmol) was added to a 25 mL round bottom flask with 5 mL of pentane. The reaction was refluxed for 2 h while stirring. Reaction completeness was determined by observing the dissolution of solids into a clear yellow solution. After the dissolution of solids was noted, the reaction was immediately diluted with 5 mL of pentane. The diluted reaction was added slowly to a 150 mL beaker of crescent-cube ice, and was allowed to stand for 10 min with occasional swirling. The quenched reaction solution was transferred to a 150 mL separatory funnel. The organic layer was collected and dried with Na$_2$SO$_4$. The volatiles were evaporated in vacuo affording a clear yellow oil (1.701 g, 5.4765 mmol, quantitative yield) of (2E)-dibromobut-2-enedioyl dichloride. The acid chloride was immediately diluted with 30 mL of CCl$_4$ under N$_2$ in a 250 mL pear flask. Next, 4,5-bis({2-[2-(2-methoxyethoxy)ethoxy]ethyl})-1-(6-hydroxyhexyl)-1H-1,2,3-triazole-4,5-dicarboxylate (6.3208 g, 11.5007 mmol) and pyridine (0.9097 g, 11.5007 mmol) were added to a 250 mL round bottom flask with 60 mL of CCl$_4$ and cooled to 0° C. under N$_2$ with stirring. The acid chloride solution was slowly added via syringe over 10 min, noting a light-yellow color and the formation of pyridine salts in solution. After the addition of the acid chloride, the reaction was allowed to stir at 0° C. for 2 hours, then at room temperature for an additional 22 hours. The reaction was poured into a 500 mL separatory funnel and washed with 20 mL 5% aqueous HCl two times each. The organic layer was collected, dried with MgSO$_4$ and filtered. The volatiles were then evaporated in vacuo. Purification via flash chromatography using 95:5 CH$_2$Cl$_2$:MeOH was performed, affording 5.2615 g (3.9350 mmol, 71.85% yield) of the title compound as a colorless oil. See, Ott, Justus Liebigs Annal. Chemie, 392(3) (1912) 245-285; Charlton & Chee, Tetrahedron Lett., 35(34) (1994) 6243-6246.)

TLC: 95:5 CH$_2$Cl$_2$:MeOH, R$_f$=0.47, UV, p-anisealdehyde stain, blue spot.

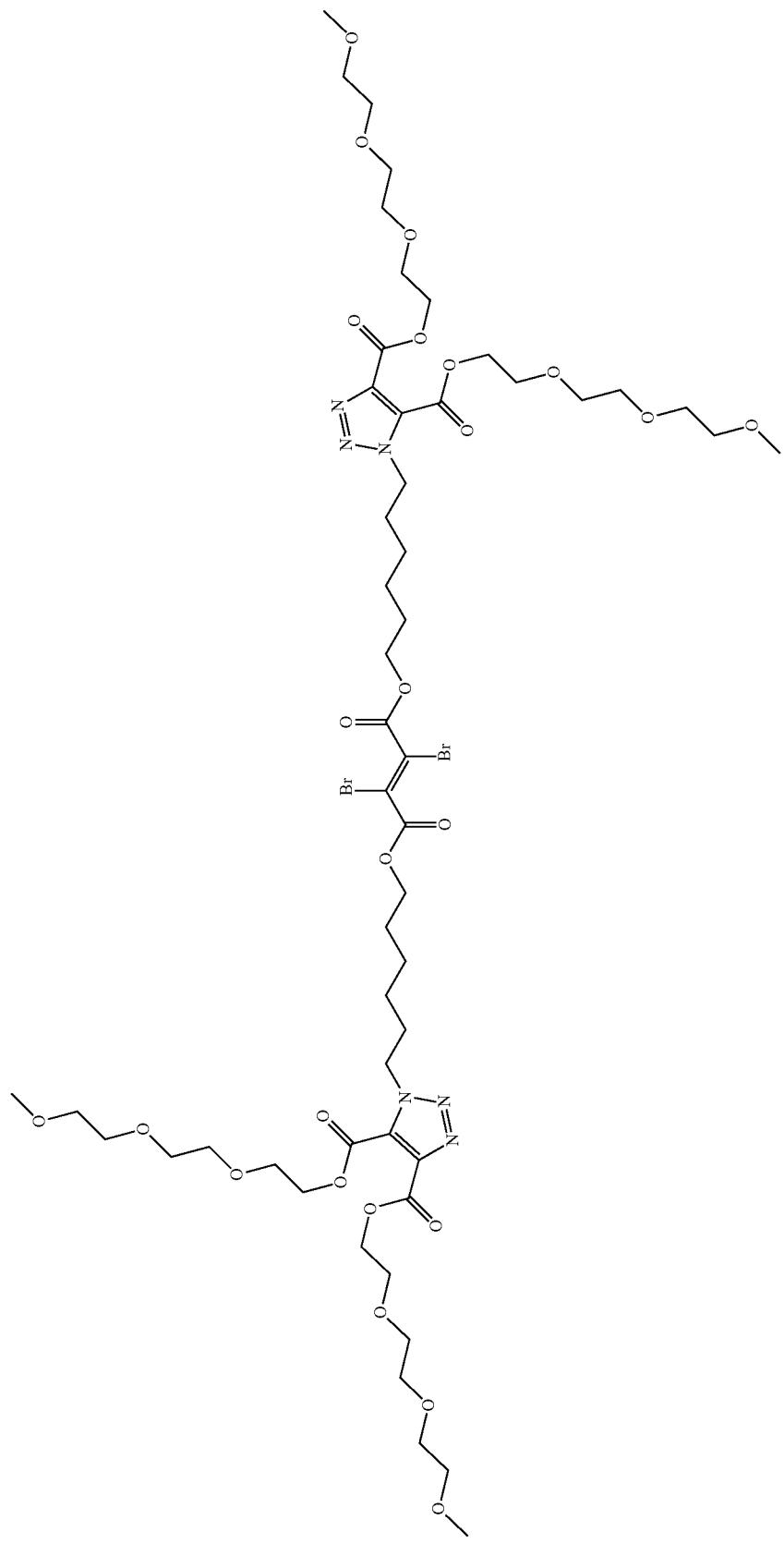

¹H NMR (500 MHz, Benzene-d₆): δ 4.36 (t, J=4.9, 4H), 4.30 (t, 4H), 4.11 (t, J=7.3 Hz, 4H), 3.91 (t, J=6.5 Hz, 4H), 3.50-3.45 (m, 8H), 3.45-3.39 (m, 24H), 3.36-3.30 (m, 8H), 3.13 (s, 6H), 3.12 (s, 6H), 1.49 (p, J=7.4 Hz, 4H), 1.22 (p, J=6.6 Hz, 4H), 1.00-0.84 (m, 8H).

¹³C NMR (125 MHz, Benzene-d₆, DEPT): δ 162.0 (C=O), 160.6 (C=O), 158.5 (C=O), 141.0 (4°), 129.5 (4°), 112.9 (C—Br), 72.0 ($CH_2$), 71.98 ($CH_2$), 70.63 ($CH_2$), 70.59 ($CH_2$), 70.51 ($CH_2$), 70.50 ($CH_2$), 70.47 ($CH_2$), 68.7 ($CH_2$), 68.3 ($CH_2$), 66.7 ($CH_2$), 65.3 ($CH_2$), 64.7 ($CH_2$), 58.3 ($CH_3$), 49.7 ($CH_2$), 29.6 ($CH_2$), 27.8 ($CH_2$), 25.5 ($CH_2$), 24.9 ($CH_2$).

IR (Neat): 2874 (s, alkane CH), 1733 (s, ester C=O), 1552 (m, triazole C=C), 1468 (methylene bending $CH_2$), 1270 (s, ester stretch C—O), 1242 (s, ester stretch C—O), 1111 (s, ether stretch C—O), 755 (m, alkene bending C=C) $cm^{-1}$.

HRMS: Calcd. for $C_{52}H_{84}Br_2N_6O_{24}[M+H]^+$ 1335.3976; Found 1335.3981.

M21. Preparation of 4,5-bis({2-[2-(2-methoxyethoxy)ethoxy]ethyl}) 1-(6-{[4-({6-[bis(2,5,8,11-tetraoxadodecanoyl)-1H-1,2,3-triazol-1-yl]hexyl}oxy)-4-oxobut-2-ynoyl]oxy}hexyl)-1H-1,2,3-triazole-4,5-dicarboxylate To a 250 mL round bottom flask, 4,5-bis({2-[2-(2-methoxyethoxy)ethoxy]ethyl}) 1-(6-{[(2E)-4-({6-[bis(2,5,8,11-tetraoxadodecanoyl)-1H-1,2,3-triazol-1-yl]hexyl}oxy)-2,3-dibromo-4-oxobut-2-enoyl]oxy}hexyl)-1H-1,2,3-triazole-4,5-dicarboxylate (5.2210 g, 3.9048 mmol) (see M20) was added to 40 mL of anhydrous THF. Subsequently, Zn metal (1.5317 g, 23.4288 mmol) and $I_2$ (0.0471 g, 0.1857 mmol) were added and stirred at reflux for 5 h under $N_2$. The reaction was cooled and filtered through CELITE™. The reaction was concentrated in vacuo and diluted with 80 mL of ethyl acetate. The solution was poured into a 500 mL separatory funnel and washed with 10 mL of 10% aqueous $Na_2S_2O_3$, two times each. The organic layer was collected and dried with $MgSO_4$. The volatiles were then evaporated in vacuo, and immediately purified via flash chromatography using 95:5 $CH_2Cl_2$:MeOH, affording 3.8523 g (3.2723 mmol, 83.80% yield) of the title compound as a pale yellow oil. (See, Charlton et al., Canadian J. Chem., 73(9) (1995) 1454-1462.)

TLC: 95:5 $CH_2Cl_2$:MeOH, $R_f$=0.47, UV, $KMnO_4$ stain, p-anisealdehyde stain, blue spot.

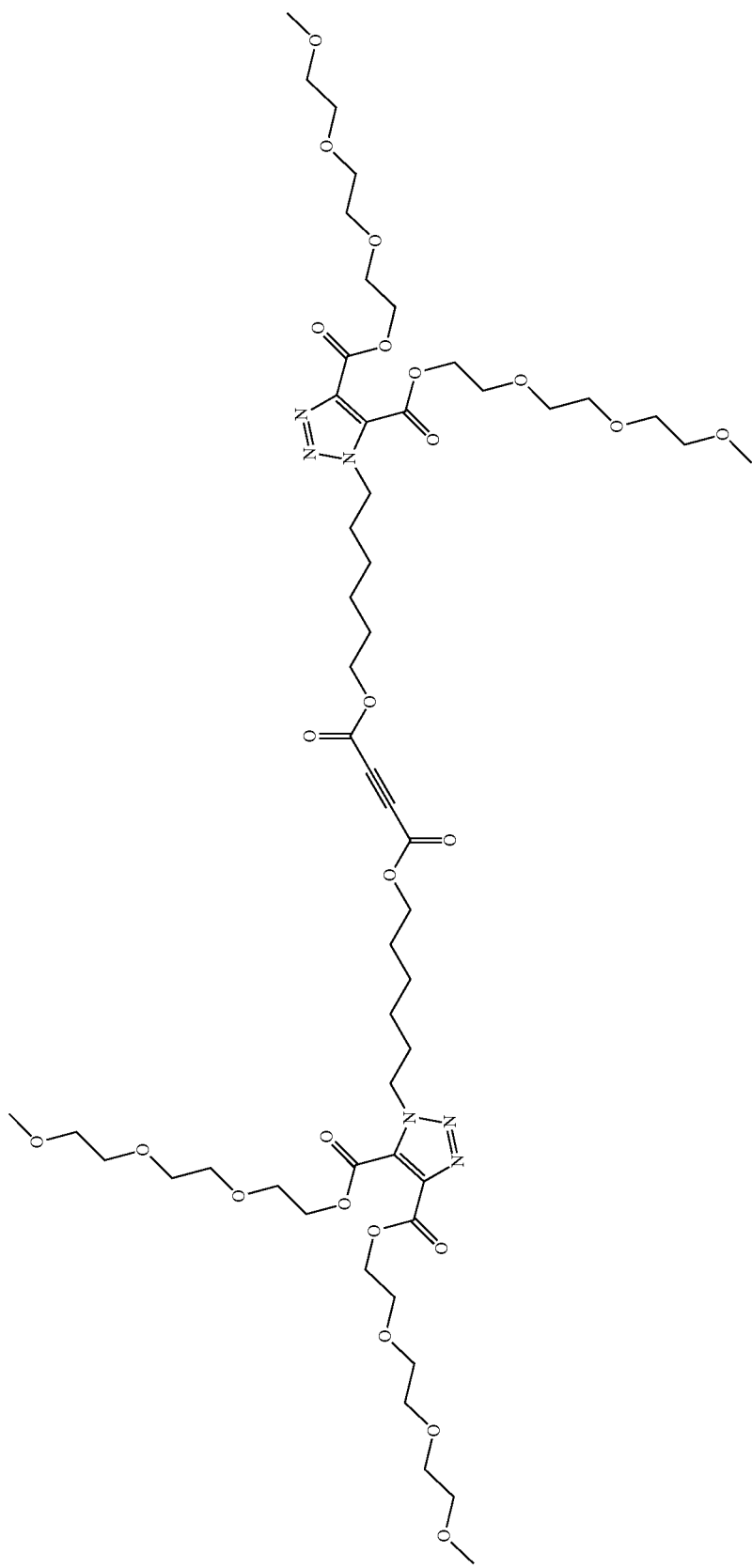

¹H NMR (500 MHz, Benzene-d₆) δ 4.36 (t, J=4.9 Hz, 4H), 4.31 (t, J=4.8 Hz, 4H), 4.09 (t, J=7.3 Hz, 4H), 3.76 (t, J=6.6 Hz, 4H), 3.47 (t, J=4.9 Hz, 8H), 3.45-3.39 (m, 24H), 3.35-3.30 (m, 8H), 3.13 (s, 6H), 3.12 (s, 6H), 1.45 (p, J=7.2 Hz, 4H), 1.10 (p, J=6.7 Hz, 4H), 0.87-0.80 (m, 8H).

¹³C-NMR (125 MHz, Benzene-d₆, DEPT): δ 160.6 (C=O), 158.5 (C=O), 151.6 (C=O), 140.9 (4°), 129.5 (4°), 74.9 (alkyne 4°), 72.0 ($CH_2$), 70.6 ($CH_2$), 70.6 ($CH_2$), 70.49 ($CH_2$), 70.48 ($CH_2$), 70.46 ($CH_2$), 68.7 ($CH_2$), 68.3 ($CH_2$), 66.3 ($CH_2$), 65.3 ($CH_2$), 64.7 ($CH_2$), 58.3 ($CH_3$), 49.7 ($CH_2$), 29.6 ($CH_2$), 27.7 ($CH_2$), 25.5 ($CH_2$), 24.7 ($CH_2$).

IR (Neat): 2874 (s, alkane CH), 1727 (s, ester C=O), 1552 (m, triazole C=C), 1469 (s, methylene bending $CH_2$), 1259 (s, ester stretch C—O), 1110 (s, ether stretch C—O) cm⁻¹.

HRMS: Calcd. for $C_{52}H_{84}N_6O_{24}$ [M+H]⁺ 1177.5610; Found 1177.5616. [M+Na]⁺1199.5429; Found 1199.5411.

M22. Preparation of 1,4-bis-[methoxy poly(ethylene glycol) 350]-but-2-ynedioate

But-2-ynedioic acid (4.000 g, 35.069 mmol) was added to a 250 mL round bottom flask. Poly(ethylene glycol) monomethyl ether 350 (28.231 g, 80.659 mmol) was added along with 0.2 mL $H_2SO_4$ and 40 mL of dry toluene. Using a Dean-Stark apparatus, the reaction was heated and stirred at reflux for 2 h. The reaction was concentrated in vacuo, and diluted with 100 mL ethyl acetate. The solution was transferred to a 500 mL separatory funnel and washed with 10 mL of saturated $NaHCO_3$ three times each. The aqueous layer was extracted with 60 mL of ethyl acetate, three times each. The combined organic layers were dried with $MgSO_4$, filtered, and concentrated in vacuo. Purification via flash chromatography using 93:7 $CH_2Cl_2$:MeOH afforded 16.750 g (21.502 mmol, 61.31% yield) of the title compound as a colorless oil.

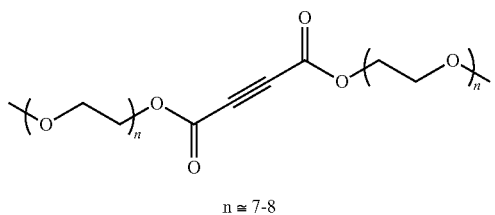

n ≅ 7-8

TLC: 93:7 $CH_2Cl_2$:MeOH, $R_f$=0.71, UV, $KMnO_4$ stain, p-anisealdehyde stain, blue spot. Blue fluorescence at 395 nm.

¹H NMR (500 MHz, CDCl₃): δ 4.39 (t, 4H), 3.75 (t, 4H), 3.67 (br s, 36H), 3.59-3.53 (m, 4H), 3.41-3.37 (m, 6H).

¹³C NMR (125 MHz, CDCl₃, DEPT): δ 151.6 (C=O), 74.9 (alkyne 4°), 71.9 ($CH_2$), 70.71 ($CH_2$), 70.66 ($CH_2$), 70.62 ($CH_2$), 70.59 ($CH_2$), 70.5 ($CH_2$), 68.4 ($CH_2$), 65.8 ($CH_2$), 59.0 ($CH_3$).

IR (Neat): 2874 (s, alkane CH), 1724 (s, ester C=O), 1257 (s, ester stretch C—O), 1107 (s, ether stretch C—O) cm⁻¹.

HRMS: Calcd. for (n=6,6) $C_{30}H_{54}O_{16}$ [M+H]⁺ 671.3485; Found 671.3477.

Calcd. for (n=6,7) $C_{32}H_{58}O_{17}$ [M+H]⁺ 715.3747; Found 715.3736.

Calcd. for (n=7,7) $C_{34}H_{62}O_{18}$ [M+H]⁺ 759.4009; Found 759.3997.

Calcd. for (n=7,8) $C_{36}H_{66}O_{19}$ [M+H]⁺ 803.4271; Found 803.4260.

Calcd. for (n=8,8) $C_{38}H_{70}O_{20}$ [M+H]⁺ 847.4533; Found 847.4520.

Calcd. for (n=8,9) $C_{40}H_{74}O_{21}$ [M+H]⁺ 891.4795; Found 891.4779.

M23. Preparation of 4,5-bis[methoxy poly(ethylene glycol) 350]-1-(6-hydroxyhexyl)-1H-1,2,3-triazole-4,5-dicarboxylate 6-Azidohexan-1-ol (3.144 g, 21.958 mmol) (see M3) was added to a 250 mL round bottom flask with 50 mL of CHCl₃. 1,4-Bis[methoxy poly(ethylene glycol) 350]-but-2-ynedioate (18.816 g, 24.154 mmol) was added to the reaction flask and stirred at 55° C. for 24 h. The volatiles were evaporated in vacuo, affording a pale yellow crude oil. Purification via flash chromatography using 93:7 $CH_2Cl_2$:MeOH afforded 17.473 g (18.947 mmol, 86.29% yield) of the title compound as a pale yellow oil.

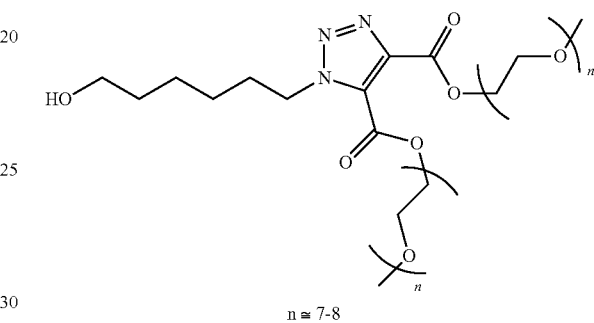

n ≅ 7-8

TLC: 93:7 $CH_2Cl_2$:MeOH, $R_f$=0.48, UV, $KMnO_4$ stain, p-anisealdehyde stain, white spot.

¹H NMR (500 MHz, CDCl₃): δ 4.59 (t, J=6.9 Hz, 2H), 4.54 (br s, 2H), 4.50 (br s, 2H), 3.81 (br s, 4H), 3.64 (br s, 50H), 3.55 (br s, 5H), 3.38 (br s, 6H), 1.98-1.87 (m, 2H), 1.55 (br s, 2H), 1.47-1.30 (m, 4H).

¹³C NMR (125 MHz, CDCl₃, DEPT): δ 160.1 (C=O), 158.4 (C=O), 140.0 (4°), 130.1 (4°), 71.9 ($CH_2$), 70.7 ($CH_2$), 70.60 ($CH_2$), 70.56 ($CH_2$), 70.5 ($CH_2$), 68.7 ($CH_2$), 68.5 ($CH_2$), 65.6 ($CH_2$), 64.8 ($CH_2$), 62.4 ($CH_2$), 59.0 ($CH_3$), 50.5 ($CH_2$), 32.4 ($CH_2$), 30.1 ($CH_2$), 26.0 ($CH_2$), 25.1 ($CH_2$).

IR (Neat): 3501 (s, OH), 2873 (s, alkane CH), 1732 (s, ester C=O), 1552 (m, triazole C=C), 1470 (s, methylene bending $CH_2$), 1283 (s, ester stretch C—O), 1249 (s, ester stretch C—O), 1108 (s, ether stretch C—O) cm⁻¹.

HRMS: Calcd. for (n=5,6) $C_{34}H_{63}N_3O_{16}$ [M+H]⁺ 770.4281; Found 770.4272.

Calcd. for (n=6,6) $C_{36}H_{67}N_3O_{17}$[M+H]⁺ 814.4543 Found 814.4531.

Calcd. for (n=6,7) $C_{38}H_{72}N_3O_{18}$ [M+H]⁺ 858.4805 Found 858.4791.

Calcd. for (n=7,7) $C_{42}H_{75}N_3O_{19}$[M+H]⁺ 902.5068; Found 902.5054.

Calcd. for (n=7,8) $C_{42}H_{79}N_3O_{20}$ [M+H]⁺ 946.5330; Found 946.5315.

Calcd. for (n=8,8) $C_{44}H_{83}N_3O_{21}$ [M+H]⁺ 990.5592; Found 990.5573.

M24. Preparation of 4,5-bis[methoxy poly(ethylene glycol) 350]-1-[6-(prop-2-ynoyloxy)hexyl]-1H-1,2,3-triazole-4,5-dicarboxylate Propiolic acid (2.543 g, 36.3044 mmol) was added to a 100 mL round bottom flask with 30 mL of toluene. 4,5-Bis [methoxy poly(ethylene glycol) 350]-1-(6-hydroxyhexyl)-1H-1,2,3-triazole-4,5-dicarboxylate (11.160 g, 12.1015 mmol) (see M23) and 0.15 mL H₂SO₄ was added to the reaction flask and stirred at reflux for 2 h. The volatiles were evaporated in vacuo, affording a light brown crude oil. Purification via flash chromatography using 95:5 CH₂Cl₂:MeOH afforded 7.073 g (7.2601 mmol, 59.97% yield) of the title compound as a pale yellow oil.

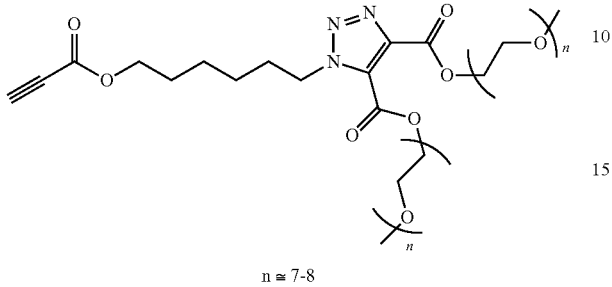

n ≅ 7-8

TLC: 95:5 CH₂Cl₂:MeOH, $R_f$=0.44, UV, KMnO₄ stain, p-anisealdehyde stain, blue-yellow spot.

¹H NMR (500 MHz, CDCl₃) δ 4.60 (t, J=6.8 Hz, 2H), 4.55 (t, 2H), 4.51 (t, J=4.2 Hz, 2H), 4.19 (t, J=6.0 Hz, 2H), 3.85-3.81 (m, 4H), 3.68-3.63 (m, 50H), 3.57-3.54 (m, 4H), 3.39 (bs, 6H), 2.96 (s, 1H), 1.94 (p, J=7.0 Hz, 2H), 1.69 (p, J=6.7 Hz, 2H), 1.48-1.34 (m, 4H).

¹³C NMR (125 MHz, CDCl₃, DEPT): δ 160.1 (C=O), 158.4 (C=O), 152.7 (C=O), 140.0 (4°), 130.0 (4°), 74.7 (alkyne 4°), 74.6 (alkyne CH), 71.9 (CH₂), 70.72 (CH₂), 70.67 (CH₂), 70.61 (CH₂), 70.58 (CH₂), 70.5 (CH₂), 68.8 (CH₂), 68.6 (CH₂), 68.5 (CH₂), 66.0 (CH₂), 65.6 (CH₂), 65.2 (CH₂), 64.8 (CH₂), 59.0 (CH₃), 50.4 (CH₂), 30.0 (CH₂), 28.1 (CH₂), 25.9 (CH₂), 25.2 (CH₂).

IR (Neat): 3214 (s, alkyne CH), 2873 (s, alkane CH), 2112 (s, alkyne CC), 1715 (s, ester C=O), 1551 (m, triazole C=C), 1467 (s, methylene bending CH₂), 1236 (s, ester stretch C—O), 1108 (s, ether stretch C—O) cm⁻¹.

HRMS: Calcd. for (n=5,5) C₃₅H₅₉N₃O₁₆ [M+H]⁺ 778.3968; Found 778.3958.

Calcd. for (n=5,6) C₃₇H₆₃N₃O₁₇ [M+H]⁺ 822.4230; Found 822.4221.

Calcd. for (n=6,6) C₃₉H₆₇N₃O₁₈ [M+H]⁺ 866.4492; Found 866.4481.

Calcd. for (n=6,7) C₄₁H₇₁N₃O₁₉ [M+H]⁺ 910.4755; Found 910.4741.

Calcd. for (n=7,7) C₄₃H₇₅N₃O₂₀ [M+H]⁺ 954.5017; Found 954.5000.

Calcd. for (n=7,8) C₄₅H₇₉N₃O₂₁ [M+H]⁺ 998.5279; Found 998.5264.

Calcd. for (n=8,8) C₄₇H₈₃N₃O₂₂ [M+H]⁺ 1042.5541; Found 1042.5521.

M25. Preparation of 1,4-bis-[methoxy poly(ethylene glycol) 550]-but-2-ynedioate

But-2-ynedioic acid (2.000 g, 17.534 mmol) was added to a 250 mL round bottom flask. Poly(ethylene glycol) monomethyl ether 550 (20.252 g, 36.821 mmol) was then added along with 0.2 mL H₂SO₄ and 40 mL of dry toluene. Using a Dean-Stark apparatus, the reaction was heated and stirred at reflux for 2 h. The reaction was concentrated in vacuo, and diluted with 100 mL ethyl acetate. The solution was transferred to a 500 mL separatory funnel and washed with 10 mL of saturated NaHCO₃ three times each. The aqueous layer was extracted with 60 mL of ethyl acetate, three times each. The combined organic layers were dried with MgSO₄, filtered, and concentrated in vacuo. Purification via flash chromatography using 93:7 CH₂Cl₂:MeOH afforded 16.153 g (13.712 mmol, 78.20% gravimetric yield) of the title compound as a colorless oil.

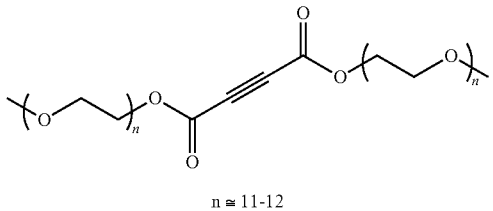

n ≅ 11-12

TLC: 93:7 CH₂Cl₂:MeOH, $R_f$=0.65, UV, KMnO₄ stain, p-anisealdehyde stain, blue spot.

¹H NMR (500 MHz, CDCl₃): δ 4.39 (m, 2H), 4.35 (m, 1H), 3.75 (m, 4H), 3.66 (br s, 84H), 3.56 (m, 4H), 3.41-3.37 (m, 6H), 2.98 (br s, 0.36H).

¹³C NMR (125 MHz, CDCl₃, DEPT): δ 152.6 (C=O, propiolic ester), 151.7 (C=O ADC ester), 75.3 (propiolic C—H), 74.9 (alkyne 4° ADC), 74.6 (alkyne 4° propiolic), 72.5 (CH₂), 71.9 (CH₂), 70.71 (CH₂), 70.66 (CH₂), 70.58 (CH₂), 70.52 (CH₂), 70.4 (CH₂), 68.6 (CH₂), 68.4 (CH₂), 65.8 (CH₂), 65.2 (CH₂), 61.8 (CH₂), 59.0 (CH₃).

IR (Neat): 2874 (s, alkane CH), 2111 (m, alkyne CH), 1720 (s, ester C=O), 1252 (s, ester stretch C—O), 1107 (s, ether stretch C—O) cm⁻¹.

HRMS: Calcd. for (n=10,11) C₄₈H₉₀O₂₅ [M+H]⁺ 1067.5844; Found 1067.5823.

Calcd. for (n=11,11) C₅₀H₉₄O₂₆ [M+H]⁺ 1111.6106; Found 1111.6086.

Calcd. for (n=11,12) C₅₂H₉₈O₂₇ [M+H]⁺ 1155.6368; Found 1155.6348.

Calcd. for (n=12,12) C₅₄H₁₀₂O₂₈ [M+H]⁺ 1199.6630; Found 1199.6608.

M26. Preparation of Methoxy poly(ethylene glycol)1000 prop-2-ynoate

Propiolic acid (4.2000 g, 60.000 mmol) was added to a 250 mL round bottom flask with 40 mL of toluene. Methoxy poly(ethylene glycol)1000 (20.0000 g, 20.000 mmol) and 0.2 mL H₂SO₄ was added to the reaction flask and stirred at reflux for 2 h. The reaction was concentrated in vacuo, and diluted with 100 mL ethyl acetate. The solution was transferred to a 500 mL separatory funnel and washed with 5 mL of saturated NaHCO₃ three times each. The aqueous layer was extracted with 60 mL of ethyl acetate, three times each. The combined organic layers were dried with MgSO₄, filtered, and concentrated in vacuo, affording 16.1738 g (15.374 mmol, 76.87% gravimetric yield) of the title compound as a white waxy solid of varying chain lengths.

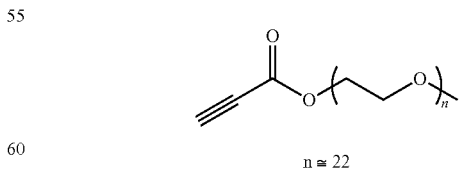

n ≅ 22

TLC: 93:7 CH₂Cl₂:MeOH, $R_f$=0.55, KMnO₄ stain, p-anisealdehyde stain, blue-yellow spot.

¹H NMR (500 MHz, CDCl₃): δ 4.37-4.32 (m, 2H), 3.76-3.72 (m, 2H), 3.72-3.58 (m, 82H), 3.58-3.53 (m, 2H), 3.42-3.35 (m, 3H), 2.99 (s, 1H).

$^{13}$C NMR (125 MHz, CDCl$_3$, DEPT): δ 152.6 (C=O), 75.3 (alkyne 4°), 74.5 (alkyne CH), 71.9 (CH$_2$), 70.7 (CH$_2$), 70.64 (CH$_2$), 70.55 (CH$_2$), 68.5 (CH$_2$), 65.2 (CH$_2$), 59.0 (CH$_3$).

IR (Neat): 3214 (m, alkyne CH), 2871 (s, alkane CH), 2112 (s, alkyne CC), 1716 (s, ester C=O), 1244 (s, ester stretch C—O), 1108 (s, ether stretch C—O) cm$^{-1}$.

HRMS: Calcd. for (n=19) C$_{42}$H$_{80}$O$_{21}$ [M+H]$^+$ 921.5265; Found 921.5288.

Calcd. for (n=20) C$_{44}$H$_{84}$O$_{22}$ [M+H]$^+$ 965.5527; Found 965.5550.

Calcd. for (n=21) C$_{46}$H$_{88}$O$_{23}$ [M+H]$^+$ 1009.5789; Found 1009.5815.

Calcd. for (n=22) C$_{48}$H$_{92}$O$_{24}$ [M+H]$^+$ 1053.6051; Found 1053.6075.

M27. Preparation of Methoxy poly(ethylene glycol)2000 prop-2-ynoate

Propiolic acid (2.1000 g, 30.000 mmol) was added to a 250 mL round bottom flask with 40 mL of toluene. Methoxy poly(ethylene glycol)2000 (20.0000 g, 10.000 mmol) and 0.2 mL H$_2$SO$_4$ was added to the reaction flask and stirred at reflux for 2 h. The reaction was concentrated in vacuo, and diluted with 100 mL ethyl acetate. The solution was transferred to a 500 mL separatory funnel and washed with 10 mL of saturated NaHCO$_3$ three times each. The aqueous layer was extracted with 100 mL ethyl acetate two times each. The organic layers were combined and dried with MgSO$_4$, filtered, and concentrated in vacuo, affording 11.5138 g (5.611 mmol, 56.11% gravimetric yield) of the title compound as a white waxy solid of varying chain lengths.

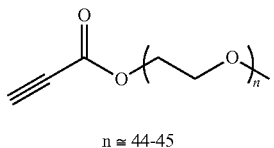

n ≈ 44-45

TLC: 93:7 CH$_2$Cl$_2$:MeOH, KMnO$_4$ stain, p-anisealdehyde stain, blue-yellow spot.

$^1$H NMR (500 MHz, CDCl$_3$): δ 4.41-4.33 (m, 2H), 3.84-3.78 (m, 1H), 3.77-3.73 (m, 2H), 3.73-3.61 (m, 176H), 3.59-3.54 (m, 2H), 3.54-3.47 (m, 1H), 3.42-3.35 (m, 2H), 2.99 (s, 1H).

$^{13}$C NMR (125 MHz, CDCl$_3$, DEPT): δ 153.4 (C=O), 75.4 (alkyne 4°), 74.7 (alkyne CH), 71.8 (CH$_2$), 70.6 (CH$_2$), 70.5 (CH$_2$), 68.5 (CH$_2$), 65.1 (CH$_2$), 60.3 (CH$_2$), 58.9 (CH$_3$).

IR (Neat): 3216 (w, alkyne CH), 2876 (s, alkane CH), 2112 (m, alkyne CC), 1715 (m, ester C=O), 1244 (m, ester stretch C—O), 1111 (s, ether stretch C—O) cm$^{-1}$.

HRMS: Calcd. for (n=39) C$_{82}$H$_{160}$O$_{41}$ [M+H]$^+$ 1824.0327; Found 1824.0298.

Calcd. for (n=40) C$_{84}$H$_{164}$O$_{42}$ [M+H]$^+$ 1868.0589; Found 1868.0557.

Calcd. for (n=41) C$_{86}$H$_{168}$O$_{43}$ [M+H]$^+$ 1912.0852; Found 1912.0814.

Calcd. for (n=42) C$_{88}$H$_{172}$O$_{44}$ [M+H]$^+$ 1956.1114; Found 1956.1077.

M28. Preparation of PVC 5% Azide

Purified poly(vinyl chloride) (2.000 g, 21.68 mmol) was added to a 100 mL round bottom flask and dissolved in 20 mL of dimethylformamide at 62° C. Sodium azide (2.000 g, 30.764 mmol) was subsequently added and stirred for 30 min. The reaction was immediately filtered through a large Buchner funnel with a WHATMAN™ grade 1 qualitative filter paper into a vacuum flask. The reaction solution was slowly precipitated into 200 mL of MeOH then filtered through a Buchner funnel and WHATMAN™ grade 1 qualitative filter paper into a vacuum flask. The polymer was dried for 15 min under house vacuum, then dissolved in 20 mL of THF. The dissolved polymer was slowly precipitated into 100 mL of MeOH then filtered through a Buchner funnel and WHATMAN™ grade 1 qualitative filter paper into a vacuum flask. This process was repeated once more with MeOH. The dissolved PVC was dissolved into 10 mL of THF and slowly precipitated in 100 mL of a 3:1 mixture of MeOH:H$_2$O, filtered and dried for 15 min under house vacuum then dissolved in 20 mL of THF. The final precipitation was performed in 100 mL of MeOH. The isolated polymer was dried under house vacuum for 5 days via Buchner funnel to give 1.4314 g of the title compound as a flocculent white solid. (See Earla & Braslau, *Macromol. Rapid Comm.*, 35(6) (2014) 666-671.)

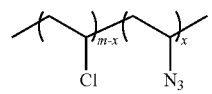

$^1$H NMR (500 MHz, CDCl$_3$): δ 4.68-4.26 (br m, Cl—C—H), 4.21 (br s, N—C—H), 4.08 (br s, N—C—H), 2.45-2.02 (br m, Cl—C—CH$_2$—C—Cl), 1.94-1.77 (br m, Cl—C—CH$_2$—C—N$_3$ and N$_3$—C—CH$_2$—C—N$_3$).

$^{13}$C NMR (125 MHz, CDCl$_3$, DEPT): δ 57.0-56.9 (CH syndio), 56.1-55.9 (CH hetero), 55.1-54.9 (CH iso), 47.3-44.8 (family of CH$_2$ peaks), 44.1 (N—C—CH$_2$).

IR (Neat): 2974 (m, alkane CH), 2911 (m, alkane CH), 2875 (m, alkane CH), 2114 (s, N$_3$), 1435 (m, methylene stretch CH$_2$), 615 (w, C—Cl) cm$^1$.

DSC (T$_g$): 83° C.

M29. Preparation of PVC 15% Azide

Purified poly(vinyl chloride) (2.000 g, 21.68 mmol) was added to a 100 mL round bottom flask and dissolved in 20 mL of dimethylformamide at 62° C. Sodium azide (2.000 g, 30.764 mmol) was subsequently added and stirred for 2 h. The reaction was immediately filtered through a large Buchner funnel with a WHATMAN™ grade 1 qualitative filter paper into a vacuum flask. The reaction solution was slowly precipitated into 200 mL of MeOH then filtered through a Buchner funnel and WHATMAN™ grade 1 qualitative filter paper into a vacuum flask. The polymer was dried for 15 min under house vacuum, then dissolved in 20 mL of THF. The dissolved polymer was slowly precipitated into 100 mL of MeOH then filtered through a Buchner funnel and WHATMAN™ grade 1 qualitative filter paper into a vacuum flask. This process was repeated once more with MeOH. The dissolved PVC was dissolved into 10 mL of THF and slowly precipitated in 100 mL of a 3:1 mixture of MeOH:H$_2$O, filtered and dried for 15 min under house vacuum then dissolved in 20 mL of THF. The final precipitation was performed in MeOH. The isolated polymer was dried under house vacuum for 5 days via Buchner funnel to give 1.2058 g of the title compound as a flocculent white solid. (See Earla & Braslau, *Macromol. Rapid Comm.*, 35(6) (2014) 666-671.)

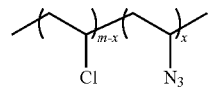

¹H NMR (500 MHz, CDCl₃): δ 4.68-4.26 (br m, Cl—C—H), 4.20 (br s, N—C—H), 4.09 (br s, N—C—H), 2.51-2.02 (br m, Cl—C—CH₂—C—Cl), 1.98-1.77 (br m, Cl—C—CH₂—C—N₃ and N₃—C—CH₂—C—N₃).

¹³C NMR (125 MHz, CDCl₃, DEPT): δ 57.0-56.9 (CH syndio), 56.1-55.7 (CH hetero), 55.1-54.9 (CH iso), 47.3-44.8 (family of CH₂ peaks), 44.0-42.8 (N—C—CH₂).

IR (Neat): 2975 (m, alkane CH), 2911 (m, alkane CH), 2114 (s, N₃), 1435 (m, methylene stretch CH₂), 615 (w, C—Cl) cm⁻¹.

DSC ($T_g$): 78° C.

M30. Preparation of PVC 5% Tri-DiMe

Poly(vinyl chloride) 5% azide (1.000 g, 16.00 mmol) (see M28) was added to a 100 mL round bottom flask and dissolved in 20 mL of 3-pentanone at 90° C. Dimethyl acetylenedicarboxylate (0.284 g, 2.0 mmol) dissolved in 10 mL 3-pentanone was added to the PVC solution and stirred for 24 h. The reaction was precipitated in 80 mL of MeOH, three times each. The isolated polymer was dried under house vacuum for 2 days to yield 0.850 g of a flocculent white solid.

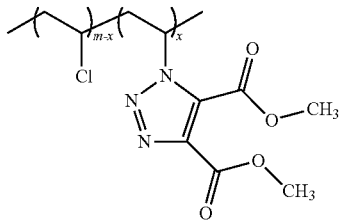

¹H NMR (500 MHz, CDCl₃): δ 5.65-5.50 (br m, C—C H-triazole), 4.66-4.24 (br m, Cl—C—H), 4.08-4.02 (br m, O-CH₃), 4.00 (br s, O—CH₃), 2.93-2.55 (br m, Cl—C—C H₂—C-triazole and triazole-C—CH₂—C-triazole), 2.50-1.90 (br m, Cl—C—CH₂—C—Cl).

¹³C NMR (125 MHz, CDCl₃): δ 139.0 (4°), 130.7 (4°), 57.0-56.9 (CH syndio), 56.1-55.9 (CH hetero), 55.1-54.9 (CH iso), 52.8 (O—CH₃), 47.3-44.8 (family of CH₂ peaks).

IR (Neat): 2976 (w, alkane CH), 2955 (w, alkane CH), 2912 (w, alkane CH), 1728 (s, ester C═O), 1556 (w, triazole C═C), 1436 (m, methylene stretch CH₂), 1268 (s, ester stretch C—O), 614 (w, C—Cl) cm⁻¹.

DSC ($T_g$): 88° C.

M31. Preparation of PVC 15% Tri-DiMe

Poly(vinyl chloride) 15% azide (1.000 g, 16.00 mmol) (see M29) was added to a 100 mL round bottom flask and dissolved in 20 mL of 3-pentanone at 90° C. Dimethyl acetylenedicarboxylate (1.023 g, 7.2 mmol) was added to the PVC solution and stirred for 24 h. The reaction was precipitated in 80 mL of MeOH, three times each. The isolated polymer was dried under house vacuum for 2 days to yield 1.1 g of a flocculent white solid.

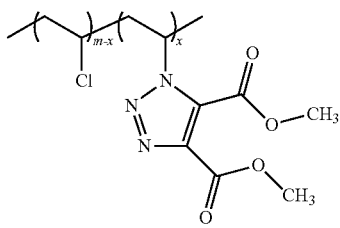

¹H NMR (500 MHz, CDCl₃): δ 5.65-5.35 (br m, C—C H-triazole), 4.65-4.15 (br m, Cl—C—H), 4.07-4.02 (br m, O—CH₃), 4.00 (br s, O—CH₃), 2.92-2.52 (br m, Cl—C—C H₂—C-triazole and triazole-C—CH₂—C-triazole), 2.50-1.85 (br m, Cl—C—CH₂—C—Cl).

¹³C NMR (125 MHz, CDCl₃, DEPT): δ 160.1 (C═O), 158.7 (C═O), 139.0 (4°), 132.9 (4°), 57.0-56.9 (CH syndio), 56.4 (CH-triazole syndio), 56.1-55.9 (CH hetero), 55.1-54.9 (CH iso), 53.9-53.8 (CH-triazole iso), 52.8 (O—CH₃), 47.3-44.8 (family of CH₂ peaks).

IR (Neat): 2956 (w, alkane CH), 2912 (w, alkane CH), 2845 (w, alkane CH), 1729 (s, ester C═O), 1556 (w, triazole C═C), 1436 (m, methylene stretch CH₂), 1269 (s, ester stretch C—O), 615 (w, C—Cl) cm⁻¹.

DSC ($T_g$): 96° C.

M32. Preparation of PVC 5% Tri-DiBu

Poly(vinyl chloride) 5% azide (1.000 g, 16.00 mmol) (see M28) was added to a 100 mL round bottom flask and dissolved in 30 mL of 3-pentanone at 90° C. 1,4-Dibutyl but-2-ynedioate (0.452 g, 2.0 mmol) (see MD was added to the PVC solution and stirred for 24 h. The reaction was concentrated to approximately half its volume in vacuo, then precipitated in 80 mL of MeOH, three times each. The isolated polymer was dried under house vacuum for 2 days to yield 0.7 g of a flocculent white solid.

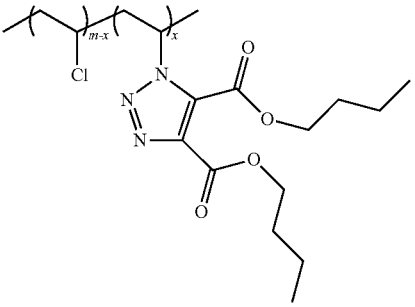

¹H NMR (500 MHz, CDCl₃): δ 5.64-5.40 (br m, C—C H-triazole), 4.65-4.42 (br m, Cl—C—H), 4.41-4.35 (br m, O—CH₂—C), 4.34-4.24 (br m, Cl—C—H), 2.92-2.81 (br t, Cl—C—CH₂—C-triazole and triazole-C—C H₂—C-triazole), 2.80-2.69 (br m, Cl—C—CH₂—C-triazole and triazole-C—CH₂—C-triazole), 2.50-1.85 (br m, Cl—C—CH₂—C—Cl), 1.82-1.72 (br m, O—C—CH₂—C), 1.52-1.40 (br m, O—C—C—CH₂—C), 0.98 (t, J=7.2, CH₃).

¹³C NMR (125 MHz, CDCl₃): δ 159.9 (C═O), 158.5 (C═O), 139.3 (4°), 132.8 (4°), 67.4 (O—CH₂), 65.8 (O—CH₂), 57.0-56.9 (CH syndio), 56.4 (CH-triazole syndio), 56.1-55.9 (CH hetero), 55.1-54.9 (CH iso), 53.9-53.8 (CH-triazole iso), 47.3-44.8 (family of CH₂ PVC peaks), 30.6 (CH₂), 30.3 (CH₂), 19.1 (CH₂), 13.74 (CH₂), 13.68 (CH₂).

IR (Neat): 2963 (w, alkane CH), 2936 (w, alkane CH), 2875 (w, alkane CH), 1723 (s, ester C═O), 1551 (w, triazole C═C), 1465 (m, methylene stretch CH₂), 1256 (s, ester stretch C—O) cm⁻¹.

DSC ($T_g$): 76° C.

M33. Preparation of PVC 15% Tri-DiBu

Poly(vinyl chloride) 15% azide (1.000 g, 16.00 mmol) (see M29) was added to a 100 mL round bottom flask and dissolved in 20 mL of 3-pentanone at 90° C. 1,4-Dibutyl but-2-ynedioate (1.6291 g, 7.2 mmol) (see MD was added to the PVC solution and stirred for 24 h. The reaction was precipitated in 80 mL of MeOH, three times each. The isolated polymer was dried under house vacuum for 2 days to yield 0.97 g of a flocculent white solid.

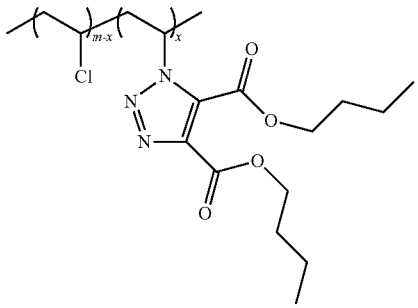

$^1$H NMR (500 MHz, CDCl$_3$): δ 5.65-5.45 (br m, C—C H-triazole), 4.67-4.41 (br m, Cl—C—H), 4.40-4.34 (br m, O—CH$_2$—C), 4.34-4.10 (br m, Cl—C—H), 2.92-2.81 (br t, Cl—C—CH$_2$—C-triazole and triazole-C—C H$_2$—C-triazole), 2.80-2.67 (br m, Cl—C—CH$_2$—C-triazole and triazole-C—CH$_2$—C-triazole), 2.50-1.85 (br m, Cl—C—CH$_2$—C—Cl), 1.82-1.65 (br m, O—C—CH$_2$—C), 1.52-1.35 (br m, O—C—C—CH$_2$—C), 0.98 (t, J=7.3, CH$_3$).

$^{13}$C NMR (125 MHz, CDCl$_3$, DEPT): δ 159.9 (C=O), 158.5 (C=O), 139.3 (4°), 132.8 (4°), 67.4 (O—CH$_2$), 67.3 (O—CH$_2$), 65.8 (O—CH$_2$), 57.0-56.9 (CH syndio), 56.4 (CH-triazole syndio), 56.1-55.9 (CH hetero), 55.1-54.9 (CH iso), 53.9-53.8 (CH-triazole iso), 47.3-44.8 (family of CH$_2$ PVC peaks), 30.6 (CH$_2$), 30.3 (CH$_2$), 19.1 (CH$_2$), 19.0 (CH$_2$), 13.73 (CH$_2$), 13.67 (CH$_2$). IR (Neat): 2963 (w, alkane CH), 2937 (w, alkane CH), 2876 (w, alkane CH), 1725 (s, ester C=O), 1552 (w, triazole C=C), 1466 (m, methylene stretch CH$_2$), 1255 (s, ester stretch C—O) cm$^{-1}$.

DSC (T$_g$): 74° C.

M34. Preparation of PVC 5% Tri-DiEH

Poly(vinyl chloride) 5% azide (1.000 g, 16.00 mmol) (see M28) was added to a 100 mL round bottom flask and dissolved in 30 mL of 3-pentanone at 90° C. 1,4-Bis (2ethylhexyl) but-2-ynedioate (0.676 g, 2.0 mmol) was added to the PVC solution and stirred for 24 h. The reaction was precipitated in 80 mL of MeOH, three times each. The isolated polymer was dried under house vacuum for 2 days to yield 0.8216 g of a flocculent white solid.

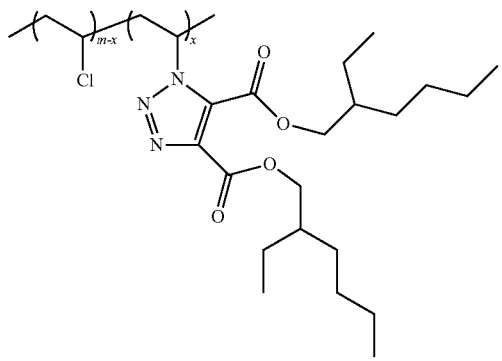

$^1$H NMR (500 MHz, CDCl$_3$): δ 5.65-5.45 (br m, C—C H-triazole), 4.66-4.40 (br m, Cl—C—H), 4.39-4.20 (br m, Cl—C—H and O—CH$_2$—C), 2.92-2.81 (br t, Cl—C—C H$_2$—C-triazole and triazole-C—CH$_2$—C-triazole), 2.81-2.67 (br m, Cl—C—CH$_2$—C-triazole and triazole-C—C H$_2$—C-triazole), 2.50-1.85 (br m, Cl—C—CH$_2$—C—Cl), 1.80-1.69 (br m, O—C—CH—C), 1.52-1.36 (br m, O—C—C—CH$_2$), 1.35-1.26 (br s, O—C—C—C—CH$_2$—CH$_2$), 0.98-0.87 (m, CH$_3$).

$^{13}$C NMR (125 MHz, CDCl$_3$): δ 160.1 (C=O), 158.7 (C=O), 139.5 (4°), 132.5 (4°), 70.1 (O—CH$_2$), 69.9 (O—CH$_2$), 68.5 (O—CH$_2$), 57.0-56.9 (CH syndio), 56.5-56.4 (CH-triazole syndio), 56.1-55.9 (CH hetero), 55.2-54.9 (CH iso), 47.3-44.8 (family of CH$_2$ PVC peaks), 38.7 (CH), 38.6 (CH), 30.2 (CH$_2$), 30.1 (CH$_2$), 28.9 (CH$_2$), 23.6 (CH$_2$), 23.5 (CH$_2$), 23.0 (CH$_2$), 14.1 (CH$_3$), 10.9 (CH$_3$).

IR (Neat): 2961 (w, alkane CH), 2931 (w, alkane CH), 2873 (w, alkane CH), 2861 (w, alkane CH), 1725 (s, ester C=O), 1553 (w, triazole C=C), 1460 (m, methylene stretch CH$_2$), 1256 (s, ester stretch C—O), 613 (w, C—Cl) cm$^{-1}$.

DSC (T$_g$): 65° C.

M35. Preparation of PVC 15% Tri-DiEH

Poly(vinyl chloride) 15% azide (1.000 g, 16.00 mmol) (see M29) was added to a 100 mL round bottom flask and dissolved in 20 mL of 3-pentanone at 90° C. 1,4-Bis (2ethylhexyl) but-2-ynedioate (2.4369 g, 7.2 mmol) was added to the PVC solution and stirred for 24 h. The reaction was precipitated in 80 mL of MeOH, three times each. The isolated polymer was dried under house vacuum for 2 days to yield 0.93 g of a flocculent white solid.

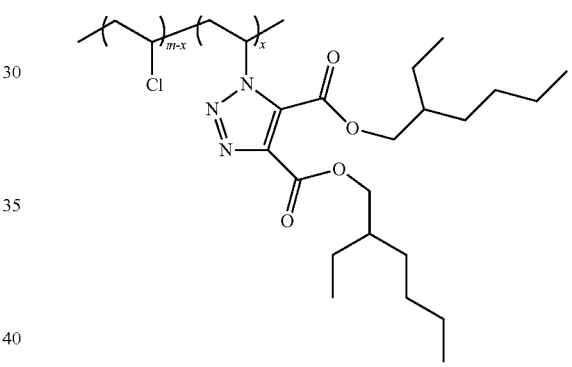

$^1$H NMR (500 MHz, CDCl$_3$): δ 5.65-5.40 (br m, C—C H-triazole), 4.67-4.40 (br m, Cl—C—H), 4.39-4.10 (br m, Cl—C—H and O—CH$_2$—C), 2.92-2.81 (br t, Cl—C—C H$_2$—C-triazole and triazole-C—CH$_2$—C-triazole), 2.81-2.67 (br m, Cl—C—CH$_2$—C-triazole and triazole-C—C H$_2$—C-triazole), 2.50-1.85 (br m, Cl—C—CH$_2$—C—Cl), 1.80-1.60 (br m, O—C—CH—C), 1.52-1.36 (br m, O—C—CH$_2$), 1.35-1.26 (br s, O—C—C—C—CH$_2$—CH$_2$), 0.97-0.85 (m, CH$_3$).

$^{13}$C NMR (125 MHz, CDCl$_3$, DEPT): δ 160.1 (C=O), 158.7 (C=O), 139.5 (4°), 132.6 (4°), 70.0 (O—CH$_2$), 69.9 (O—CH$_2$), 68.5 (O—CH$_2$), 57.0-56.9 (CH syndio), 56.4 (CH-triazole syndio), 56.1-55.9 (CH hetero), 55.2-54.9 (CH iso), 47.3-44.8 (family of CH$_2$ PVC peaks), 38.7 (CH), 38.6 (CH), 30.2 (CH$_2$), 30.1 (CH$_2$), 28.9 (CH$_2$), 28.8 (CH$_2$), 23.6 (CH$_2$), 23.5 (CH$_2$), 23.0 (CH$_2$), 14.1 (CH$_3$), 10.9 (CH$_3$).

IR (Neat): 2961 (s, alkane CH), 2932 (s, alkane CH), 2874 (s, alkane CH), 2862 (s, alkane CH), 1721 (s, ester 1555 (w, triazole C=C), 1463 (m, methylene stretch CH$_2$), 1255 (s, ester stretch C—O), 616 (w, C—Cl) cm$^{-1}$.

DSC (T$_g$): 57° C.

M36. Preparation of 5% PVC-Tri-Hexyl-Tri-DiMe

Poly(vinyl chloride) 5% azide (1.000 g, 16.00 mmol) (see M28) was added to a 100 mL round bottom flask and dissolved in 20 mL of 3-pentanone at 90° C. 4,5-Dimethyl- 1-[6-(prop-2-ynoyloxy)hexyl]-1H-1,2,3-triazole-4,5-dicarboxylate (0.674 g, 2.0 mmol) (see M7) was added to the PVC solution and stirred for 36 h. The reaction was precipitated in 80 mL of MeOH, two times each. The isolated polymer was dried under house vacuum for 2 days to yield 0.880 g of a flocculent white solid.

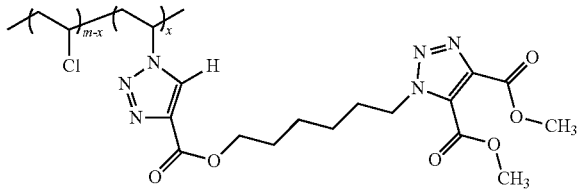

$^1$H NMR (500 MHz, CDCl$_3$): δ 8.27-8.23 (br m, PVC-triazole-H), 8.19-8.16 (br m, PVC-triazole-H), 5.31-5.18 (br m, C—CH-triazole), 4.66-4.55 (br m, Cl—C—H and PVC-linker-C—CH$_2$-triazole), 4.46 (br s, Cl—C—H), 4.40-4.34 (br m, PVC-triazole-O—CH$_2$-linker), 4.34-4.25 (br m, Cl—C—H), 4.02 (br s, O—CH$_3$), 3.98 (br s, O—CH$_3$), 2.85-2.80 (br m, Cl—C—CH$_2$—C-triazole and triazole-C—CH$_2$—C-triazole), 2.76-2.71 (br t, Cl—C—CH$_2$—C-triazole and triazole-CH$_2$—C-triazole), 2.69-2.60 (br m, Cl—C—CH$_2$—C-triazole and triazole-CH$_2$—C-triazole), 2.50-1.99 (br m, Cl—C—CH$_2$—C—Cl), 1.99-1.90 (br m, PVC-linker-CH$_2$—C-triazole), 1.85-1.75 (br m, PVC-triazole-O—C—CH$_2$-linker), 1.55-1.36 (br m, linker CH$_2$'s).

$^{13}$C NMR (125 MHz, CDCl$_3$): δ 160.6 (C=O), 159.0 (C=O), 140.0 (4°), 129.8 (4°), 65.2 (O—CH$_2$), 65.1 (O—CH$_2$), 57.0-56.9 (CH syndio), 56.1-55.9 (CH hetero), 55.2-54.9 (CH iso), 53.5 (CH$_3$), 52.7 (CH$_3$), 50.5 (CH$_2$) 47.3-44.8 (family of CH$_2$ PVC peaks), 30.0 (CH$_2$), 28.4 (CH$_2$), 26.0 (CH$_2$), 25.3 (CH$_2$).

IR (Neat): 3140 (w, triazole CH), 2975 (m, alkane CH), 2938 (m, alkane CH), 2912 (m, alkane CH), 1733 (s, ester C=O), 1714 (s, ester C=O), 1547 (w, triazole C=C), 1459 (m, methylene stretch CH$_2$), 1435 (m, methyl stretch CH), 1254 (s, ester stretch C—O), 1230 (s, ester stretch C—O), 611 (w, C—Cl) cm$^{-1}$.

DSC (T$_g$): 82° C.

M37. Preparation of 15% PVC-Tri-Hexyl-Tri-DiMe

Poly(vinyl chloride) 15% azide (1.000 g, 16.00 mmol) (see M29) was added to a 100 mL round bottom flask and dissolved in 20 mL of 3-pentanone at 90° C. 4,5-Dimethyl-1-[6-(prop-2-ynoyloxy)hexyl]-1H-1,2,3-triazole-4,5-dicarboxylate (2.4287 g, 7.2 mmol) (see M7) was added to the PVC solution and stirred for 24 h. The reaction was precipitated in 80 mL of MeOH, three times each. The isolated polymer was dried under house vacuum for 2 days to yield 0.5 g of a flocculent white solid.

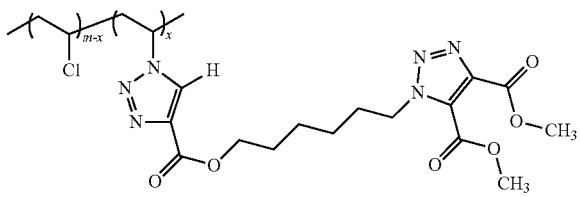

$^1$H NMR (500 MHz, CDCl$_3$): δ 8.27-8.23 (br m, PVC-triazole-H), 8.18-8.10 (br m, PVC-triazole-H), 5.31-5.10 (br m, C—CH-triazole), 4.66-4.55 (br m, Cl—C—H and PVC-linker-C—CH$_2$-triazole), 4.44 (br s, Cl—C—H), 4.40-4.25 (br m, PVC-triazole-O—CH$_2$-linker and Cl—C—H), 4.01 (br s, O—CH$_3$), 3.97 (br s, O—CH$_3$), 2.85-2.60 (br m, Cl—C—CH$_2$—C-triazole and triazole-C—CH$_2$—C-triazole), 2.50-1.99 (br m, Cl—C—CH$_2$—C—Cl), 1.94 (br s, PVC-linker-CH$_2$—C-triazole), 1.79 (br s, PVC-triazole-O—C—CH$_2$-linker), 1.49-1.41 (br m, linker CH$_2$'s).

$^{13}$C NMR (125 MHz, CDCl$_3$, DEPT): δ 160.6 (C=O), 159.0 (C=O), 139.9 (4°), 129.8 (4°), 65.2 (O—CH$_2$), 65.1 (O—CH$_2$), 57.0-56.9 (CH syndio), 56.1-55.9 (CH hetero), 55.1-54.9 (CH iso), 53.5 (CH$_3$), 52.7 (CH$_3$), 50.5 (CH$_2$) 47.3-44.8 (family of CH$_2$ PVC peaks), 30.0 (CH$_2$), 28.4 (CH$_2$), 26.0 (CH$_2$), 25.3 (CH$_2$).

IR (Neat): 3138 (w, triazole CH), 2953 (m, alkane CH), 2863 (m, alkane CH), 1734 (s, ester C=O), 1546 (w, triazole C=C), 1464 (m, methylene stretch CH$_2$), 1435 (m, methyl stretch CH), 1225 (s, ester stretch C—O), 615 (w, C—Cl) cm$^{-1}$.

DSC (T$_g$): 75° C.

M38. Preparation of 5% PVC-Tri-Hexyl-Tri-DiBu

Poly(vinyl chloride) 5% azide (1.000 g, 16.00 mmol) (see M28) was added to a 100 mL round bottom flask and dissolved in 20 mL of 3-pentanone at 90° C. 4,5-Dibutyl-1-[6-(prop-2-ynoyloxy)hexyl]-1H-1,2,3-triazole-4,5-dicarboxylate (0.8427 g, 2.0 mmol) (see M8) was added to the PVC solution and stirred for 48 h. The reaction was precipitated in 80 mL of MeOH, three times each. The isolated polymer was dried under house vacuum for 2 days to yield 0.96 g of a flocculent white solid.

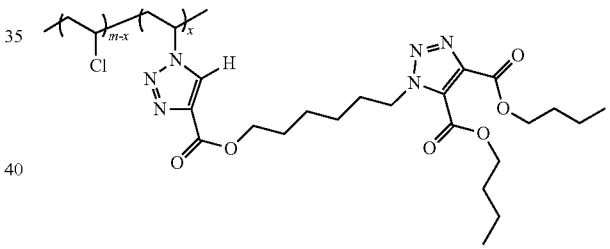

$^1$H NMR (500 MHz, CDCl$_3$): δ 8.29-8.23 (br m, PVC-triazole-H), 8.19-8.16 (br m, PVC-triazole-H), 5.30-5.20 (br m, C—CH-triazole), 4.66-4.55 (br s, Cl—C—H and PVC-linker-C—CH$_2$-triazole), 4.46 (br s, Cl—C—H), 4.42-4.35 (br m, Cl—C—H and PVC-linker-triazole-O—CH$_2$), 4.34-4.26 (br m, PVC-triazole-O—CH$_2$-linker), 2.85-2.80 (br m, Cl—C—CH$_2$—C-triazole and triazole-C—CH$_2$—C-triazole), 2.78-2.69 (br t, Cl—C—CH$_2$—C-triazole and triazole-C—CH$_2$—C-triazole), 2.68-2.60 (br m, Cl—C—CH$_2$—C-triazole and triazole-C—CH$_2$—C-triazole), 2.50-1.99 (br m, Cl—C—CH$_2$—C—Cl), 1.98-1.90 (br m, PVC-linker-CH$_2$—C-triazole), 1.80-1.72 (br m, PVC-triazole-O—C—CH$_2$-linker and linker-triazole-O—C—CH$_2$), 1.54-1.37 (br m, linker CH$_2$'s and linker-triazole-O—C—CH$_2$—CH$_2$—C), 1.01-0.95 (br m, CH$_3$).

$^{13}$C NMR (125 MHz, CDCl$_3$): δ 160.4 (C=O), 158.7 (C=O), 140.3 (4°), 129.7 (4°), 66.7 (O—CH$_2$), 65.7 (O—CH$_2$), 57.0-56.9 (CH syndio), 56.1-55.9 (CH hetero), 55.2-54.9 (CH iso), 50.4 (CH$_2$), 47.3-44.8 (family of CH$_2$ PVC peaks), 30.6 (CH$_2$), 30.3 (CH$_2$), 30.0 (CH$_2$), 28.4 (CH$_2$), 28.3 (CH$_2$), 26.0 (CH$_2$), 25.4 (CH$_2$), 25.2 (CH$_2$), 19.1 (CH$_2$), 19.0 (CH$_2$), 13.74 (CH$_3$), 13.71 (CH$_3$), 13.7 (CH$_3$), 13.6 (CH$_3$).

IR (Neat): 3140 (w, triazole CH), 2962 (m, alkane CH), 2937 (m, alkane CH), 2873 (m, alkane CH), 1732 (s, ester C=O), 1552 (w, triazole C=C), 1464 (m, methylene stretch CH$_2$), 1435 (m, methyl stretch CH$_2$), 1255 (m, ester stretch C—O), 1202 (s, ester stretch C—O) cm$^{-1}$.

DSC (T$_g$): 65° C.

M39. Preparation of 15% PVC-Tri-Hexyl-Tri-DiBu

Poly(vinyl chloride) 15% azide (1.000 g, 16.00 mmol) (see M29) was added to a 100 mL round bottom flask and dissolved in 20 mL of 3-pentanone at 90° C. 4,5-Dibutyl-1-[6-(prop-2-ynoyloxy)hexyl]-1H-1,2,3-triazole-4,5-dicarboxylate (3.0347 g, 7.2 mmol) (see M8) was added to the PVC solution and stirred for 24 h. The reaction was precipitated in 80 mL of MeOH, three times each. The isolated polymer was dried under house vacuum for 1 day, then in a vacuum oven at 40° C. for 2 days to yield 0.80 g of an off-white solid.

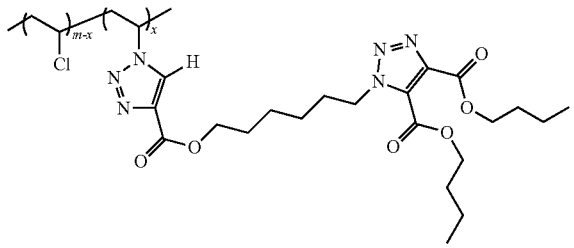

$^1$H NMR (500 MHz, CDCl$_3$): δ 8.29-8.23 (br m, PVC-triazole-H), 8.17-8.10 (br m, PVC-triazole-H), 5.30-5.10 (br m, C—CH-triazole), 4.65-4.55 (br m, Cl—C—H and PVC-linker-C—CH$_2$-triazole), 4.45 (br s, Cl—C—H), 4.42-4.34 (br m, Cl—C—H and PVC-triazole-O—CH$_2$-linker and PVC-linker-triazole-O—CH$_2$), 2.85-2.80 (br m, Cl—C—C H$_2$—C-triazole and triazole-C—CH$_2$—C-triazole), 2.78-2.69 (br t, Cl—C—CH$_2$—C-triazole and triazole-C—C H$_2$—C-triazole), 2.68-2.51 (br m, Cl—C—CH$_2$—C-triazole and triazole-C—CH$_2$—C-triazole), 2.50-1.99 (br m, Cl—C—CH$_2$—C—Cl), 1.98-1.85 (br s, PVC-linker-C H$_2$—C-triazole), 1.85-1.71 (br m, PVC-triazole-O—C—C H$_2$-linker and linker-triazole-O—C—C—CH$_2$), 1.54-1.37 (br m, linker CH$_2$'s and linker-triazole-O—C—CH$_2$—CH$_2$—C), 1.01-0.94 (br m, CH$_3$).

$^{13}$C NMR (125 MHz, CDCl$_3$, DEPT): δ 160.4 (C=O), 158.7 (C=O), 140.3 (4°), 129.7 (4°), 66.7 (O—CH$_2$), 65.7 (O—CH$_2$), 65.2 (O—CH$_2$), 57.1-56.9 (CH syndio), 56.1-55.9 (CH hetero), 55.1-54.9 (CH iso), 50.4 (CH$_2$), 47.3-44.8 (family of CH$_2$ PVC peaks), 30.6 (CH$_2$), 30.3 (CH$_2$), 30.0 (CH$_2$), 28.4 (CH$_2$), 28.3 (CH$_2$), 26.0 (CH$_2$), 25.4 (CH$_2$), 19.1 (CH$_2$), 19.0 (CH$_2$), 13.72 (CH$_3$), 13.65 (CH$_3$).

IR (Neat): 3138 (w, triazole CH), 2961 (m, alkane CH), 2937 (m, alkane CH), 2873 (m, alkane CH), 1732 (s, ester C=O), 1551 (m, triazole C=C), 1465 (m, methylene stretch CH$_2$ stretch CH$_2$), 1435 (m, methyl stretch CH), 1203 (s, ester stretch C—O), 616 (w, C—Cl) cm$^{-1}$.

DSC (T$_g$): 54° C.

M40. Preparation of 5% PVC-Tri-Hexyl-Tri-DiEH

Poly(vinyl chloride) 5% azide (1.000 g, 16.00 mmol) (see M28) was added to a 100 mL round bottom flask and dissolved in 20 mL of 3-pentanone at 90° C. 4,5-Bis(2-ethylhexyl)-1-[6-(prop-2-ynoyloxy)hexyl]-1H-1,2,3-triazole-4,5-dicarboxylate (1.0674 g, 2.0 mmol) (see M9) was added to the PVC solution and stirred for 36 h. The reaction was precipitated in 80 mL of MeOH, three times each. The isolated polymer was dried under house vacuum for 2 days to yield 0.96 g of a flocculent white solid.

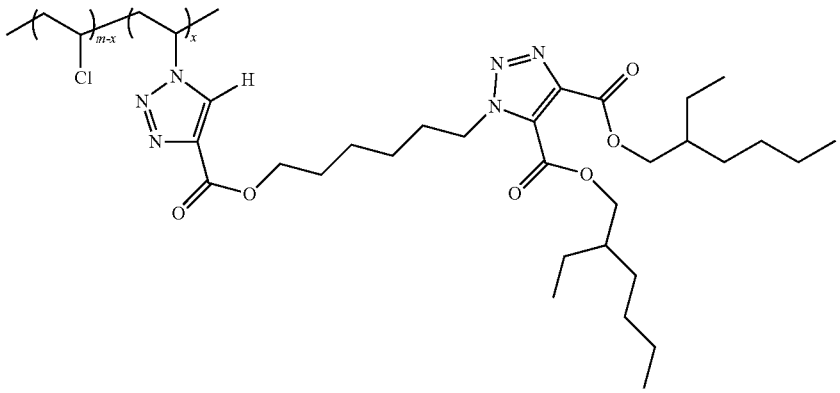

$^1$H NMR (500 MHz, CDCl$_3$): δ 8.28-8.23 (br m, PVC-triazole-H), 8.19-8.16 (br m, PVC-triazole-H), 5.25 (br s, C—CH-triazole), 4.65-4.55 (br m, Cl—C—H and PVC-linker-CH$_2$-triazole), 4.46 (br s, Cl—C—CH$_2$), 4.40-4.24 (br m, Cl—C—H and PVC-triazole-O—CH$_2$-linker and PVC-linker-triazole-O—CH$_2$), 2.88-2.79 (br m, Cl—C—C H$_2$—C-triazole and triazole-C—CH$_2$—C-triazole), 2.78-2.69 (br t, Cl—C—CH$_2$—C-triazole and triazole-C H$_2$—C-triazole), 2.68-2.51 (br m, Cl—C—CH$_2$—C-triazole and triazole-C—CH$_2$—C-triazole), 2.50-1.98 (br m, Cl—C—CH$_2$—C—Cl), 1.98-1.86 (br m, PVC-linker-C H$_2$—C-triazole), 1.85-1.77 (br m, PVC-triazole-O—C—C H$_2$-linker), 1.76-1.68 (br m, PVC-linker-triazole-O—C—C H—C), 1.54-1.29 (br m, linker CH$_2$'s and linker-triazole-O—C—C—CH$_2$—CH$_2$—CH$_2$—C), 0.96-0.89 (br m, CH$_3$).

$^{13}$C NMR (125 MHz, CDCl$_3$, DEPT): δ 160.6 (C=O), 158.8 (C=O), 140.4 (4°), 129.6 (4°), 69.2 (O—CH$_2$), 68.4 (O—CH$_2$), 65.2 (O—CH$_2$), 57.1-56.9 (CH syndio), 56.1-

55.9 (CH hetero), 55.2-54.9 (CH iso), 50.4 (CH$_2$), 47.3-44.8 (family of CH$_2$ PVC peaks), 38.73 (CH), 38.69 (CH), 30.19 (CH$_2$), 30.16 (CH$_2$), 30.1 (CH$_2$), 28.88 (CH$_2$), 28.86 (CH$_2$), 28.4 (CH$_2$), 26.1 (CH$_2$), 25.4 (CH$_2$), 23.0 (CH$_2$), 22.96 (CH$_2$), 22.95 (CH$_2$), 14.1 (CH$_3$), 14.0 (CH$_3$), 10.9 (CH$_3$).

IR (Neat): 3144 (w, triazole CH), 2960 (s, alkane CH), 2931 (s, alkane CH), 2861 (s, alkane CH), 1732 (s, ester C=O), 1553 (m, triazole C=C), 1465 (m, methylene stretch CH$_2$), 1435 (m, methyl stretch CH), 1254 (m, ester stretch C—O), 1201 (s, ester stretch C—O), 615 (w, C—Cl) cm$^{-1}$.

DSC (T$_g$): 56° C.

M41. Preparation of 15% PVC-Tri-Hexyl-Tri-DiEH

Poly(vinyl chloride) 15% azide (1.000 g, 16.00 mmol) (see M29) was added to a 100 mL round bottom flask and dissolved in 20 mL of 3-pentanone at 90° C. 4,5-Bis(2-ethylhexyl)-1-[6-(prop-2-ynoyloxy)hexyl]-1H-1,2,3-triazole-4,5-dicarboxylate (3.8426 g, 7.2 mmol) (see M9) was added to the PVC solution and stirred for 24 h. The reaction was precipitated in 80 mL of MeOH, three times each. The isolated polymer was dried under house vacuum for 1 day, then in a vacuum oven at 40° C. for 2 days to yield 1.11 g of an off-white solid.

(CH$_2$), 30.16 (CH$_2$), 30.1 (CH$_2$), 28.88 (CH$_2$), 28.86 (CH$_2$), 28.4 (CH$_2$), 26.0 (CH$_2$), 25.4 (CH$_2$), 23.6 (CH$_2$), 23.5 (CH$_2$), 22.96 (CH$_2$), 22.94 (CH$_2$), 14.1 (CH$_3$), 10.9 (CH$_3$).

IR (Neat): 3139 (w, triazole CH), 2960 (s, alkane CH), 2932 (s, alkane CH), 2861 (s, alkane CH), 1733 (s, ester C=O), 1552 (m, triazole C=C), 1465 (m, methylene stretch CH$_2$), 1436 (m, methyl stretch CH), 1202 (s, ester stretch C—O), 616 (w, C—Cl) cm$^{-1}$.

DSC (T$_g$): 41° C.

M42. Preparation of 5% PVC-Tri-DiHexyl-Tri-DiMe

Poly(vinyl chloride) 5% azide (0.500 g, 8.00 mmol) (see M28) was added to a 50 mL round bottom flask and dissolved in 20 mL of 3-pentanone at 90° C. 4,5-Dimethyl 1-(6-{[4-({6-[4,5-bis(methoxycarbonyl)-1H-1,2,3-triazol-1-yl]hexyl}oxy)-4-oxobut-2-ynoyl]oxy}hexyl)-1H-1,2,3-triazole-4,5-dicarboxylate (0.520 g, 0.80 mmol) (see M14) was added to the PVC solution and stirred for 24 h. The reaction was precipitated in 80 mL of MeOH, three times each. The isolated polymer was dried under house vacuum for 2 days to yield 0.413 g of a flocculent white solid.

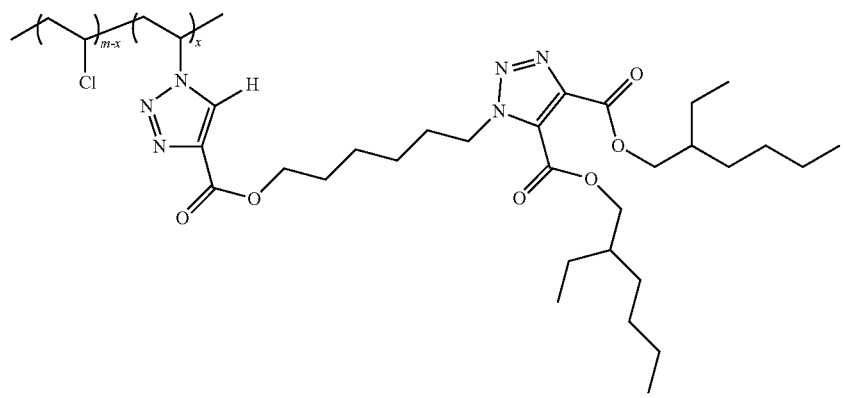

$^1$H NMR (500 MHz, CDCl$_3$): δ 8.25-8.20 (br m, PVC-triazole-H), 8.19-8.07 (br m, PVC-triazole-H), 5.26-5.10 (br m, C—CH-triazole), 4.65-4.52 (br m, Cl—C—H and PVC-linker-C—CH$_2$-triazole), 4.45 (br s, Cl—C—H), 4.40-4.22 (br m, Cl—C—H and PVC-triazole-O—CH$_2$-linker and PVC-linker-triazole-O—CH$_2$), 2.87-2.79 (br m, Cl—C—C H$_2$—C-triazole and triazole-C—CH$_2$—C-triazole), 2.78-2.69 (br s, Cl—C—CH$_2$—C-triazole and triazole-C—C H$_2$—C-triazole), 2.68-2.51 (br m, Cl—C—CH$_2$—C-triazole and triazole-C—CH$_2$—C-triazole), 2.50-1.99 (br m, Cl—C—CH$_2$—C—Cl), 1.98-1.86 (br s, PVC-linker-C H$_2$—C-triazole), 1.85-1.77 (br s, PVC-triazole-O—C—C H$_2$-linker), 1.76-1.65 (br m, PVC-linker-triazole-O—C—C H—C), 1.55-1.25 (br m, linker CH$_2$'s and linker-triazole-O—C—C—CH$_2$—CH$_2$—CH$_2$—C), 0.97-0.86 (br m, CH$_3$).

$^{13}$C NMR (125 MHz, CDCl$_3$, DEPT) δ 160.6 (C=O), 158.8 (C=O), 140.4 (4°), 129.6 (4°), 69.2 (0-CH$_2$), 68.4 (O—CH$_2$), 65.2 (O—CH$_2$), 57.1-56.9 (CH syndio), 56.1-55.9 (CH hetero), 55.0-54.9 (CH iso), 50.4 (CH$_2$), 47.3-44.8 (family of CH$_2$ PVC peaks), 38.72 (CH), 38.69 (CH), 30.19

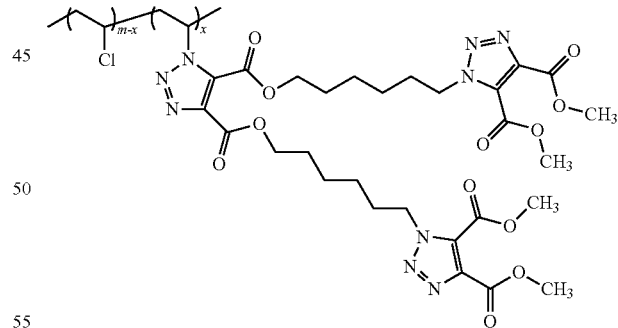

$^1$H NMR (500 MHz, CDCl$_3$): δ 5.62-5.42 (br m, C—C H-triazole), 4.66-4.54 (br m, Cl—C—H and PVC-linker-C—CH$_2$-triazole), 4.45 (br s, Cl—C—H), 4.37-4.34 (br m, PVC-triazole-O—CH$_2$-linker), 4.33-4.25 (br m, Cl—C—H), 4.01 (br s, O—CH$_3$), 3.97 (br s, O—CH$_3$), 2.91-2.80 (br m, Cl—CH$_2$—C-triazole and triazole-C—C H$_2$—C-triazole), 2.74 (br s, Cl—C—CH$_2$—C-triazole and triazole-C—CH$_2$—C-triazole), 2.49-1.99 (br m, Cl—C—C H$_2$—C—Cl), 1.98-1.89 (br m, PVC-linker-C H$_2$—C-triazole), 1.83-1.73 (br m, PVC-triazole-O—C—C H$_2$-linker), 1.55-1.36 (br m, linker CH$_2$'s).

$^{13}$C NMR (125 MHz, CDCl$_3$): δ 160.6 (C=O), 159.0 (C=O), 139.9 (4°), 129.8 (4°), 67.3 (O—CH$_2$), 65.7 (O—CH$_2$), 57.1-56.9 (CH syndio), 56.1-55.9 (CH hetero), 55.2-54.9 (CH iso), 53.5 (CH$_3$), 52.7 (CH$_3$), 50.5 (CH$_2$), 47.3-44.8 (family of CH$_2$ PVC peaks), 30.0 (CH$_2$), 28.3 (CH$_2$), 28.1 (CH$_2$), 26.0 (CH$_2$), 25.9 (CH$_2$), 25.3 (CH$_2$), 25.2 (CH$_2$).

IR (Neat): 2942 (s, alkane CH), 2864 (s, alkane CH), 1733 (s, ester C=O), 1556 (m, triazole C=C), 1462 (m, methylene stretch CH$_2$), 1436 (m, methyl stretch CH), 1230 (s, ester stretch C—O) cm$^{-1}$.

DSC (T$_g$): 66° C.

M43. Preparation of 15% PVC-Tri-DiHexyl-Tri-DiMe

Poly(vinyl chloride) 15% azide (1.000 g, 16.00 mmol) (see M29) was added to a 100 mL round bottom flask and dissolved in 20 mL of 3-pentanone at 90° C. 4,5-Dimethyl 1-(6-{[4-({6-[4,5-bis(methoxycarbonyl)-1H-1,2,3-triazol-1-yl]hexyl}oxy)-4-oxobut-2-ynoyl]oxy}hexyl)-1H-1,2,3-triazole-4,5-dicarboxylate (3.6098 g, 7.2 mmol) (see M14) was added to the PVC solution and stirred for 20 h. The reaction was concentrated to approximately half its volume in vacuo, then precipitated in 80 mL of MeOH, three times each. The isolated polymer was dried under house vacuum for 1 day, then in a vacuum oven at 40° C. for 2 days to yield 1.6847 g of an off-white solid.

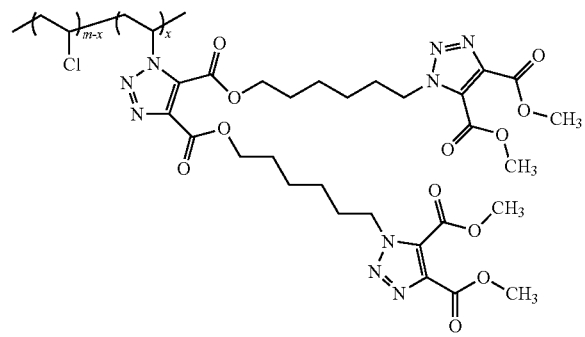

$^1$H NMR (500 MHz, CDCl$_3$): δ 5.62-5.35 (br m, C—C H-triazole), 4.66-4.54 (br m, Cl—C—H and PVC-linker-C—CH$_2$-triazole), 4.45 (br s, Cl—C—H), 4.35 (br s, PVC-triazole-O—CH$_2$-linker), 4.33-4.25 (br m, Cl—C—H), 4.00 (br s, O—CH$_3$), 3.97 (br s, O—CH$_3$), 2.91-2.80 (br m, Cl—C—CH$_2$—C-triazole and triazole-C—C H$_2$—C-triazole), 2.73 (br s, Cl—C—CH$_2$—C-triazole and triazole-C—CH$_2$—C-triazole), 2.40-1.99 (br m, Cl—C—C H$_2$—C—Cl), 1.98-1.89 (br m, PVC-linker-C H$_2$—C-triazole), 1.78 (br s, PVC-triazole-O—C—C H$_2$-linker), 1.53-1.34 (br m, linker CH$_2$'s).

$^{13}$C NMR (125 MHz, CDCl$_3$, DEPT): δ 160.6 (C=O), 159.0 (C=O), 139.9 (4°), 129.8 (4°), 67.3 (O—CH$_2$), 67.1 (O—CH$_2$), 65.7 (O—CH$_2$), 57.1-56.9 (CH syndio), 56.1-55.9 (CH hetero), 55.2-54.9 (CH iso), 53.5 (CH$_3$), 52.7 (CH$_3$), 50.5 (CH$_2$), 47.3-44.8 (family of CH$_2$ PVC peaks), 30.0 (CH$_2$), 28.3 (CH$_2$), 28.1 (CH$_2$), 26.0 (CH$_2$), 25.9 (CH$_2$), 25.3 (CH$_2$), 25.2 (CH$_2$).

IR (Neat): 2953 (s, alkane CH), 2863 (s, alkane CH), 1733 (s, ester C=O), 1553 (m, triazole C=C), 1468 (m, methylene stretch CH$_2$), 1435 (m, methyl stretch CH), 1280 (m, ester stretch C—O), 1219 (s, ester stretch C—O), 615 (w, C—Cl) cm$^{-1}$.

DSC (T$_g$): 48° C.

M44. Preparation of 5% PVC-Tri-DiHexyl-Tri-DiBu

Poly(vinyl chloride) 5% azide (1.000 g, 16.00 mmol) (see M28) was added to a 100 mL round bottom flask and dissolved in 30 mL of 3-pentanone at 90° C. 4,5-Dibutyl 1-(6-{[4-({6-[4,5-bis(butoxycarbonyl)-1H-1,2,3-triazol-1-yl]hexyl}oxy)-4-oxobut-2-ynoyl]oxy}hexyl)-1H-1,2,3-triazole-4,5-dicarboxylate (1.307 g, 1.6 mmol) (see M15) was added to the PVC solution and stirred for 24 h. The reaction was concentrated to approximately half its volume in vacuo, then precipitated in 80 mL of MeOH, three times each. The isolated polymer was dried under house vacuum for 1 day, then in a vacuum oven at 40° C. for 2 days to yield 1.2034 g of an off-white solid.

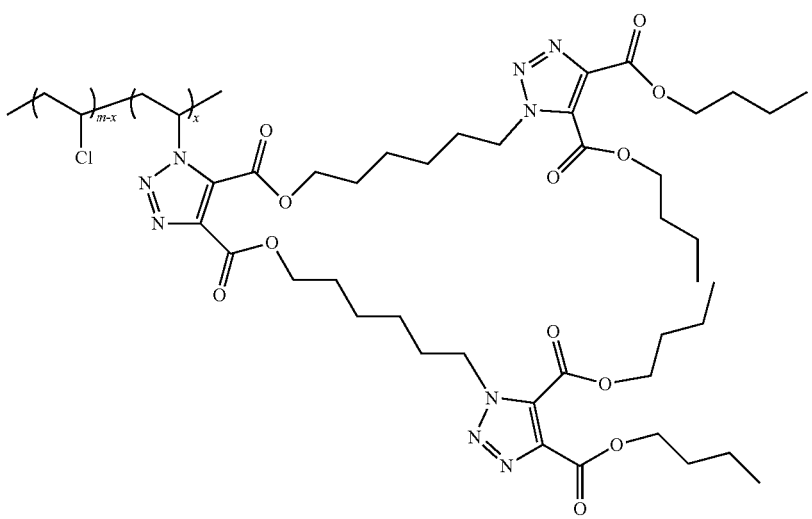

¹H NMR (500 MHz, CDCl₃): δ 5.62-5.40 (br m, C—CH-triazole), 4.65-4.55 (br m, Cl—C—H and PVC-linker-C—CH₂-triazole), 4.45 (br s, Cl—C—H), 4.40-4.24 (br m, Cl—C—H and PVC-triazole-O—CH₂-linker and PVC-linker-triazole-O—CH₂), 2.90-2.80 (br m, Cl—C—CH₂—C-triazole and triazole-C—CH₂—C-triazole), 2.74 (br s, Cl—C—CH₂—C-triazole and triazole-C—CH₂—C-triazole), 2.50-1.98 (br m, Cl—C—CH₂—C—Cl), 1.98-1.89 (br m, PVC-linker-CH₂—C-triazole), 1.85-1.71 (br m, PVC-triazole-O—C—CH₂-linker and linker-triazole-O—C—CH₂), 1.54-1.36 (br m, linker CH₂'s and linker-triazole-O—CH₂—CH₂—C), 1.01-0.94 (br t, CH₃).

¹³C NMR (125 MHz, CDCl₃): δ 160.4 (C=O), 158.7 (C=O), 140.3 (4°), 129.7 (4°), 66.7 (O—CH₂), 65.7 (O—CH₂), 57.0-56.9 (CH syndio), 56.1-55.9 (CH hetero), 55.1-54.9 (CH iso), 50.4 (CH₂), 47.3-44.8 (family of CH₂ PVC peaks), 30.6 (CH₂), 30.4 (CH₂), 30.1 (CH₂), 28.4 (CH₂), 28.1 (CH₂), 26.1 (CH₂), 26.0 (CH₂), 25.3 (CH₂), 25.2 (CH₂), 19.1 (CH₂), 19.0 (CH₂), 13.72 (CH₃), 13.65 (CH₃).

IR (Neat): 2961 (s, alkane CH), 2937 (s, alkane CH), 2873 (s, alkane CH), 1729 (s, ester C=O), 1552 (m, triazole C=C), 1466 (m, methylene stretch CH₂), 1435 (m, methyl stretch CH), 1264 (s, ester stretch C—O), 1203 (s, ester stretch C—O) cm⁻¹.

DSC (T$_g$): 43° C.

M45. Preparation of 15% PVC-Tri-DiHexyl-Tri-DiBu

Poly(vinyl chloride) 15% azide (1.000 g, 16.00 mmol) (see M29) was added to a 100 mL round bottom flask and dissolved in 20 mL of 3-pentanone at 90° C. 4,5-Dibutyl 1-(6-{[4-({6-[4,5-bis(butoxycarbonyl)-1H-1,2,3-triazol-1-yl]hexyl}oxy)-4-oxobut-2-ynoyl]oxy}hexyl)-1H-1,2,3-triazole-4,5-dicarboxylate (5.50 g, 6.73 mmol) (see M15) was added to the PVC solution and stirred for 27 h. The reaction was concentrated to approximately half its volume in vacuo, then precipitated in 80 mL of MeOH, three times each. The isolated polymer was dried under house vacuum for 1 day, then in a vacuum oven at 40° C. for 2 days to yield 2.0206 g of a flexible pale yellow solid.

¹H NMR (500 MHz, CDCl₃): δ 5.62-5.35 (br m, C—CH-triazole), 4.65-4.55 (br m, Cl—C—H and PVC-linker-C—CH₂-triazole), 4.45-4.20 (br m, Cl—C—H and PVC-triazole-O—CH₂-linker and PVC-linker-triazole-O—CH₂), 2.90-2.80 (br s, Cl—CH₂—C-triazole and triazole-C—CH₂—C-triazole), 2.79-2.64 (br s, Cl—C—CH₂—C-triazole and triazole-CH₂—C-triazole), 2.50-1.98 (br m, Cl—C—CH₂—C—Cl), 1.98-1.86 (br s, PVC-linker-CH₂—C-triazole), 1.83-1.68 (br s, PVC-triazole-O—C—CH₂-linker and linker-triazole-O—C—CH₂), 1.53-1.33 (br s, linker CH₂'s and linker-triazole-O—C—CH₂—CH₂—C), 1.02-0.91 (br s, CH₃).

¹³C NMR (125 MHz, CDCl₃, DEPT): δ 160.4 (C=O), 159.8 (C=O), 158.7 (C=O), 140.3 (4°), 129.7 (4°), 66.7 (O—CH₂), 65.7 (O—CH₂), 57.0-56.9 (CH syndio), 56.1-55.9 (CH hetero), 55.1-54.9 (CH iso), 50.4 (CH₂), 47.3-45.3 (family of CH₂ PVC peaks), 30.6 (CH₂), 30.3 (CH₂), 30.1 (CH₂), 28.3 (CH₂), 28.1 (CH₂), 26.1 (CH₂), 26.0 (CH₂), 25.3 (CH₂), 25.2 (CH₂), 19.1 (CH₂), 19.0 (CH₂), 13.7 (CH₃), 13.6 (CH₃).

IR (Neat): 2961 (s, alkane CH), 2937 (s, alkane CH), 2873 (s, alkane CH), 1732 (s, ester C=O), 1552 (s, triazole C=C), 1467 (s, methylene stretch CH₂), 1436 (m, methyl stretch CH), 1267 (s, ester stretch C—O), 1203 (s, ester stretch C—O), 615 (w, C—Cl) cm⁻¹.

DSC (T$_g$): 12° C.

M46. Preparation of 5% PVC-Tri-DiHexyl-Tri-DiEH

Poly(vinyl chloride) 5% azide (1.000 g, 16.00 mmol) (see M28) was added to a 100 mL round bottom flask and dissolved in 20 mL of 3-pentanone at 90° C. 4,5-Bis(2-ethylhexyl) 1-(6-{[4-({6-[4,5-bis({[(2-ethylhexyl)oxy]carbonyl})-1H-1,2,3-triazol-1-yl]hexyl}oxy)-4-oxobut-2-ynoyl]oxy}hexyl)-1H-1,2,3-triazole-4,5-dicarboxylate (2.0827 g, 2.0 mmol) (see M16) was diluted with 10 mL of 3-pentanone and added to the PVC solution, then stirred for

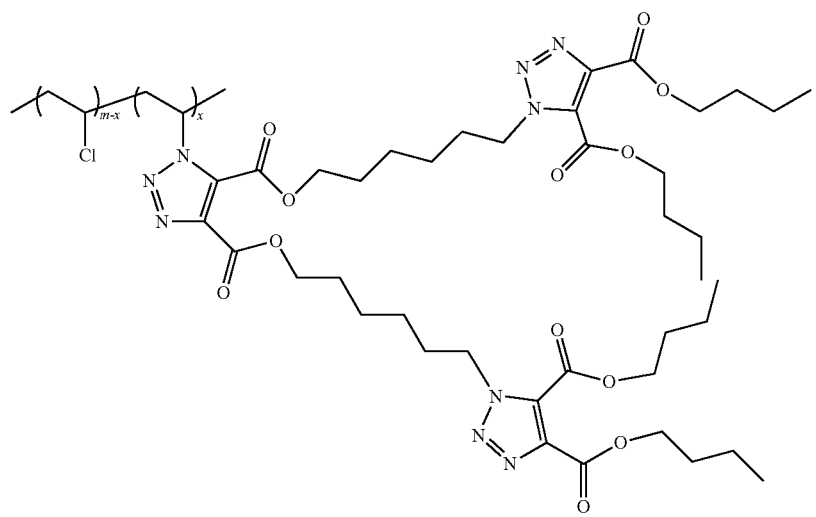

36 h. The reaction was concentrated to approximately half its volume in vacuo, then precipitated in 80 mL of MeOH, two times each. The isolated polymer was dried under house vacuum for 1 day, then in a vacuum oven at 40° C. for 2 days to yield 1.02 g of an off-white solid.

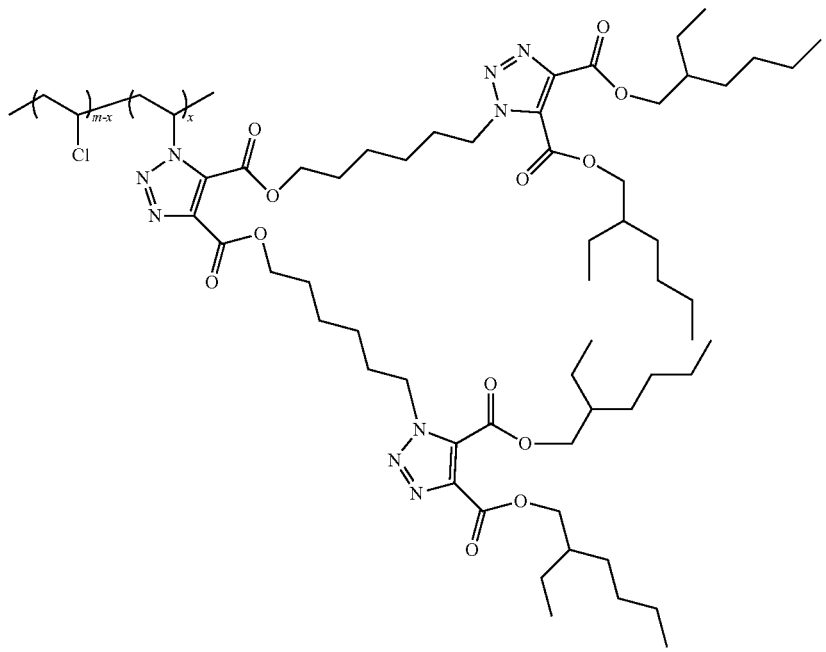

¹H NMR (500 MHz, CDCl₃): δ 5.62-5.44 (br m, C—C H-triazole), 4.67-4.56 (br m, Cl—C—H and PVC-linker-C—CH₂-triazole), 4.54-4.39 (br m, Cl—C—H and PVC-triazole-O—CH₂-linker and PVC-linker-triazole-O—C H₂—C), 4.39-4.22 (br m, Cl—C—H), 2.92-2.81 (br m, Cl—C—CH₂—C-triazole and triazole-C—C H₂—C-triazole), 2.81-2.66 (br s, Cl—C—CH₂—C-triazole and triazole-C—CH₂—C-triazole), 2.50-1.99 (br m, Cl—C—CH₂—C—Cl), 1.98-1.88 (br m, PVC-linker-C H₂—C-triazole), 1.85-1.77 (br m, PVC-triazole-O—C—C H₂-linker), 1.76-1.65 (br m, PVC-linker-triazole-O—C—C H—C), 1.54-1.26 (br m, linker CH₂'s and linker-triazole-O—C—C—CH₂—CH₂—CH₂—C), 0.97-0.88 (br m, CH₃).

¹³C NMR (125 MHz, CDCl₃): δ 160.6 (C═O), 158.8 (C═O), 140.5 (4°), 129.6 (4°), 69.2 (O—CH₂), 68.4 (O—CH₂), 65.7 (O—CH₂), 57.0-56.9 (CH syndio), 56.1-55.9 (CH hetero), 55.2-54.9 (CH iso), 50.4 (CH₂), 47.3-44.8 (family of CH₂ PVC peaks), 38.72 (CH), 38.69 (CH), 30.19 (CH₂), 30.15 (CH₂), 30.1 (CH₂), 28.88 (CH₂), 28.86 (CH₂), 28.4 (CH₂), 28.1 (CH₂), 26.1 (CH₂), 26.0 (CH₂), 25.3 (CH₂), 25.23 (CH₂), 25.16 (CH₂), 23.6 (CH₂), 23.5 (CH₂), 22.96 (CH₂), 22.95 (CH₂), 14.1 (CH₃), 10.92 (CH₃), 10.90 (CH₃).

IR (Neat): 2960 (s, alkane CH), 2932 (s, alkane CH), 2872 (s, alkane CH), 2861 (s, alkane CH), 1729 (s, ester C═O), 1554 (s, triazole C═C), 1465 (s, methylene stretch CH₂), 1436 (m, methyl stretch CH), 1260 (s, ester stretch C—O), 1203 (s, ester stretch C—O) cm⁻¹.

DSC (T_g): 43° C.

M47. Preparation of 15% PVC-Tri-DiHexyl-Tri-DiEH

Poly(vinyl chloride) 15% azide (1.000 g, 16.00 mmol) (see M29) was added to a 100 mL round bottom flask and dissolved in 20 mL of 3-pentanone at 90° C. 4,5-Bis(2-ethylhexyl) 1-(6-{[4-({6-[4,5-bis({[(2-ethylhexyl)oxy]carbonyl})-1H-1,2,3-triazol-1-yl]hexyl}oxy)-4-oxobut-2-ynoyl]oxy}hexyl)-1H-1,2,3-triazole-4,5-dicarboxylate (7.4978 g, 7.2 mmol) (see M16) was added to the PVC solution and stirred for 28 h. The reaction was concentrated to approximately half its volume in vacuo, then precipitated in 80 mL of MeOH, four times each. The isolated polymer was dried under house vacuum for 1 day, then in a vacuum oven at 40° C. for 3 days to yield 2.3972 g of a flexible pale yellow solid.

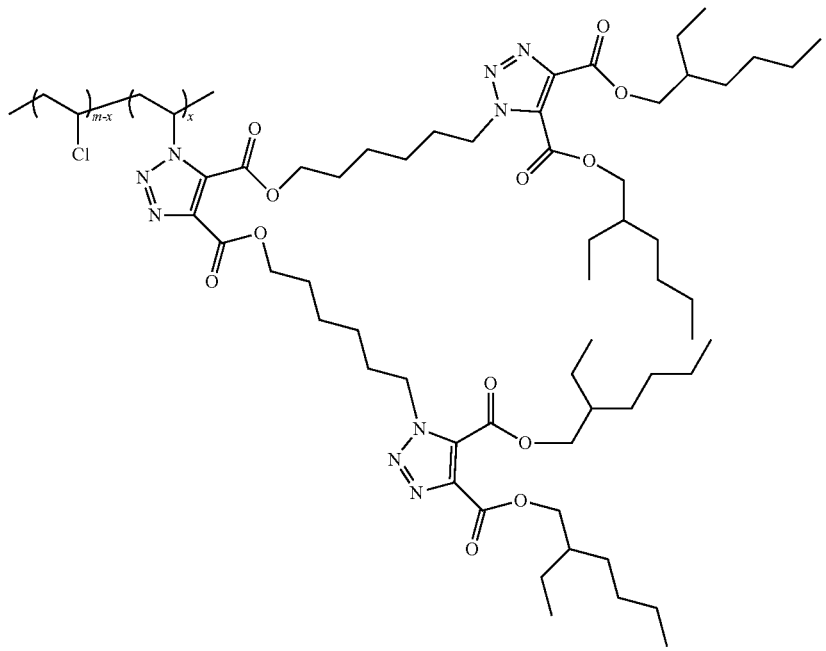

¹H NMR (500 MHz, CDCl₃): δ 5.63-5.34 (br m, C—CH-triazole), 4.67-4.52 (br m, Cl—C—H and PVC-linker-C—CH₂-triazole), 4.51-4.38 (br m, Cl—C—H and PVC-triazole-O—CH₂-linker and PVC-linker-triazole-O—CH₂—C), 4.38-4.15 (br m, Cl—C—H), 2.92-2.80 (br s, Cl—C—CH₂—C-triazole and triazole-C—CH₂—C-triazole), 2.80-2.66 (br s, Cl—C—CH₂—C-triazole and triazole-C—CH₂—C-triazole), 2.50-1.98 (br m, Cl—C—CH₂—C—Cl), 1.98-1.87 (br s, PVC-linker-CH₂—C-triazole), 1.84-1.64 (br m, PVC-triazole-O—C—CH₂-linker and PVC-linker-triazole-O—C—CH₂), 1.54-1.24 (br m, linker CH₂'s and linker-triazole-O—C—C—CH₂—CH₂—CH₂—C), 0.98-0.83 (br m, CH₃).

¹³C NMR (125 MHz, CDCl₃, DEPT): δ 160.6 (C═O), 158.8 (C═O), 140.5 (4°), 129.6 (4°), 69.1 (O—CH₂), 68.3 (O—CH₂), 66.4 (O—CH₂), 65.7 (O—CH₂), 57.0-56.9 (CH syndio), 56.1-55.9 (CH hetero), 50.4 (CH₂), 47.3-45.2 (family of CH₂ PVC peaks), 38.72 (CH), 38.68 (CH), 30.2 (CH₂), 30.14 (CH₂), 30.1 (CH₂), 28.87 (CH₂), 28.85 (CH₂), 28.4 (CH₂), 28.1 (CH₂), 26.1 (CH₂), 26.0 (CH₂), 25.3 (CH₂), 25.2 (CH₂), 25.16 (CH₂), 23.6 (CH₂), 23.5 (CH₂), 22.95 (CH₂), 22.93 (CH₂), 14.0 (CH₃), 10.90 (CH₃), 10.88 (CH₃).

IR (Neat): 2960 (s, alkane CH), 2932 (s, alkane CH), 2861 (s, alkane CH), 1729 (s, ester C═O), 1553 (s, triazole C═C), 1465 (s, methylene stretch CH₂), 1437 (m, methyl stretch CH), 1260 (s, ester stretch C—O), 1204 (s, ester stretch C—O), 616 (w, C—Cl) cm⁻¹.

DSC ($T_g$): –6° C.

M48. Preparation of PVC 5% Tri-DiTEGMe

Poly(vinyl chloride) 5% azide (1.000 g, 16.00 mmol) (see M28) was added to a 100 mL round bottom flask and dissolved in 30 mL of 3-pentanone at 90° C. 1,4-Bis({2-[2-(2-methoxyethoxy)ethoxy]ethyl})but-2-ynedioate (2.0827 g, 2.0 mmol) (see M17) was added to the PVC solution and stirred for 24 h. The reaction was concentrated to approximately half its volume in vacuo, then precipitated in 80 mL of MeOH, three times each. The isolated polymer was dried under house vacuum for 1 day, then in a vacuum oven at 40° C. for 2 days to yield 0.970 g of a flocculent white solid.

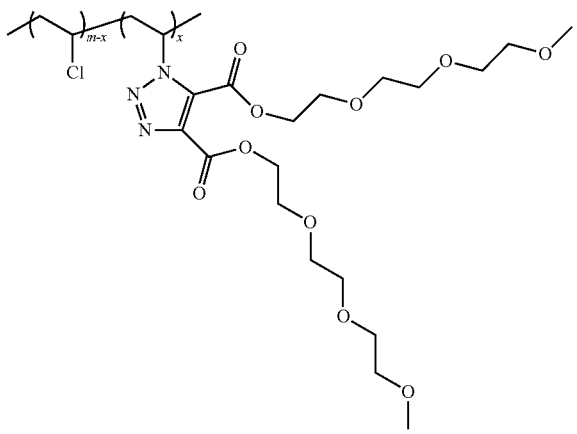

¹H NMR (500 MHz, CDCl₃): δ 5.66-5.48 (br m, C—CH-triazole), 4.66-4.55 (br s, Cl—C—H), 4.55-4.39 (br s, Cl—C—H and triazole-O—CH₂), 4.38-4.24 (br m, Cl—C—H), 3.87-3.81 (br m, triazole-O—C—CH₂—O), 3.73-3.60 (br m, triazole-O—C—C—O—CH₂—CH₂—O—CH₂—C), 3.57-3.52 (br m, C—CH₂—O—CH₃), 3.40-3.34 (br s, O—CH₃), 2.90-2.80 (br s, Cl—C—CH₂—C-triazole and triazole-C—CH₂—C-triazole), 2.80-2.66 (br s, Cl—C—CH₂—C-triazole and triazole-C—CH₂—C-triazole), 2.50-1.85 (br m, Cl—C—CH₂—C—Cl).

¹³C NMR (125 MHz, CDCl₃, DEPT): δ 159.7 (C═O), 158.3 (C═O), 139.4 (4°), 132.2 (4°), 71.9 (CH₂), 70.65 (CH₂), 70.6 (CH₂), 70.55 (CH₂), 68.7 (CH₂), 68.4 (CH₂), 66.2 (CH₂), 64.9 (CH₂), 59.0 (CH₃), 57.0-56.9 (CH syndio), 56.1-55.9 (CH hetero), 55.1-54.9 (CH iso), 47.3-44.8 (family of CH₂ peaks).

IR (Neat): 2910 (s, alkane CH), 1726 (s, ester C═O), 1551 (s, triazole C═C), 1451 (s, methylene stretch CH₂), 1437 (m, methyl stretch CH), 1256 (s, ester stretch C—O), 1200 (s, ester stretch C—O), 1107 (s, ether stretch C—O), 611 (w, C—Cl) cm⁻¹.

DSC (T_g): 61° C.

M49. Preparation of 15% PVC-Tri-DiTEGMe

Poly(vinyl chloride) 15% azide (1.000 g, 16.00 mmol) (see M29) was added to a 100 mL round bottom flask and dissolved in 20 mL of 3-pentanone at 90° C. 1,4-Bis({2-[2-(2-methoxyethoxy)ethoxy]ethyl})but-2-ynedioate (2.4238 g, 6.0 mmol) (see M17) was added to the PVC solution and stirred for 72 h. The reaction was concentrated to approximately half its volume in vacuo, then precipitated in 80 mL of MeOH, three times each. The isolated polymer was dried under house vacuum for 1 day, then in a vacuum oven at 40° C. for 3 days to yield 1.33 g of a white solid.

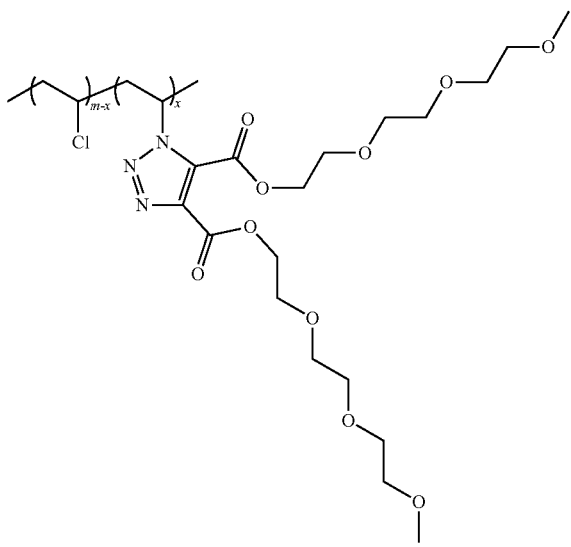

$^1$H NMR (500 MHz, CDCl$_3$): δ 5.66-5.44 (br m, C—CH-triazole), 4.63-4.54 (br s, Cl—C—H), 4.54-4.39 (br s, Cl—C—H and triazole-O—CH$_2$), 4.36-4.24 (br m, Cl—C—H), 3.87-3.79 (br m, triazole-O—C—CH$_2$—O), 3.76-3.68 (br m, triazole-O—C—CO—CH$_2$—CH$_2$—O—CH$_2$—C), 3.58-3.53 (br m, C—CH$_2$—O—CH$_3$), 3.40-3.36 (br s, O—C—H$_3$), 2.92-2.81 (br m, Cl—C—CH$_2$—C-triazole and triazole-C—CH$_2$—C-triazole), 2.80-2.66 (br m, Cl—C—CH$_2$—C-triazole and triazole-C—CH$_2$—C-triazole), 2.50-1.95 (br m, O—C—CH$_2$—C—Cl).

$^{13}$C NMR (125 MHz, CDCl$_3$, DEPT): δ 159.7 (C=O), 158.3 (C=O), 138.6 (4°), 131.7 (4°), 71.9 (CH$_2$), 70.67 (CH$_2$), 70.62 (CH$_2$), 70.57 (CH$_2$), 68.7 (CH$_2$), 68.4 (CH$_2$), 66.2 (CH$_2$), 64.9 (CH$_2$), 59.0 (CH$_3$), 57.0-56.9 (CH syndio), 56.1-55.9 (CH hetero), 55.2-54.9 (CH iso), 47.3-44.8 (family of CH$_2$ peaks).

IR (Neat): 2879 (s, alkane CH), 1734 (s, ester C=O), 1549 (s, triazole C=C), 1452 (s, methylene stretch CH$_2$), 1259 (s, ester stretch C—O), 1200 (s, ester stretch C—O), 1107 (s, ether stretch C—O), 611 (w, C—Cl) cm⁻¹.

DSC (T_g): 42° C.

M50. Preparation of 5% PVC-Tri-Hexyl-Tri-DiTEGMe

Poly(vinyl chloride) 5% azide (1.000 g, 16.00 mmol) (see M28) was added to a 100 mL round bottom flask and dissolved in 30 mL of 3-pentanone at 90° C. 4,5-Bis({2-[2-(2-methoxyethoxy)ethoxy]ethyl})-1-[6-(prop-2-ynoyloxy)hexyl]-1H-1,2,3-triazole-4,5-dicarboxylate (1.203 g, 2.0 mmol) (see M19) was added to the PVC solution and stirred for 24 h. The reaction was concentrated to approximately half its volume in vacuo, then precipitated in 80 mL of MeOH, three times each. The isolated polymer was dried under house vacuum for 1 day, then in a vacuum oven at 40° C. for 2 days to yield 0.9573 g of a flocculent white solid.

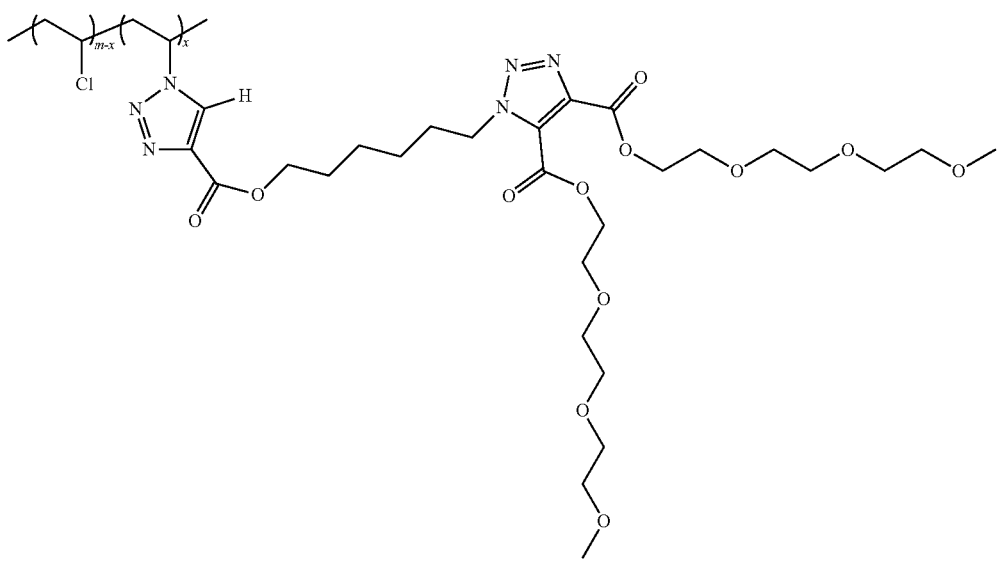

$^1$H NMR (500 MHz, CDCl$_3$): δ 8.32-8.22 (br s, PVC-triazole-H), 8.18-8.14 (br m, PVC-triazole-H), 8.11-8.07 (br m, PVC-triazole-H), 5.32-5.17 (br m, C—CH-triazole), 4.67-4.57 (br m, Cl—C—H and PVC-linker-C—CH$_2$-triazole), 4.54-4.50 (br m, Cl—C—H and PVC-triazole- O—CH$_2$-linker), 4.50-4.41 (br m, Cl—C—H), 4.40-4.24 (br m, Cl—C—H), 3.87-3.80 (br m, triazole-O—C—CH$_2$—O), 3.73-3.61 (br m, triazole-O—C—C—O—CH$_2$—CH$_2$—O—CH$_2$—C), 3.58-3.52 (br m, C—CH$_2$—O—CH$_3$), 3.384 (br s, O—CH$_3$), 3.377 (br s, O—CH$_3$), 2.87-2.78 (br m, Cl—C—CH$_2$—C-triazole and triazole-C—CH$_2$—C-triazole), 2.78-2.60 (br m, Cl—C—CH$_2$—C-triazole and triazole-C—CH$_2$—C-triazole), 2.50-1.99 (br m, Cl—C—CH$_2$—C—Cl), 1.86-1.75 (br m, PVC-linker-CH$_2$—C-triazole), 1.72-1.60 (br s, PVC-triazole-O—C—CH$_2$-linker), 1.56-1.34 (br m, linker CH$_2$'s).

$^{13}$C NMR (125 MHz, CDCl$_3$, DEPT): δ 160.1 (C=O), 158.4 (C=O), 140.0 (4°), 71.9 (CH$_2$), 70.67 (CH$_2$), 70.61 (CH$_2$), 70.57 (CH$_2$), 68.7 (CH$_2$), 68.5 (CH$_2$), 66.2 (CH$_2$), 65.6 (CH$_2$), 64.8 (CH$_2$), 59.0 (CH$_3$), 57.0-56.9 (CH syndio), 56.1-55.9 (CH hetero), 55.2-54.9 (CH iso), 50.5 (CH$_2$), 47.3-44.8 (family of CH$_2$ peaks), 30.0 (CH$_2$), 28.4 (CH$_2$), 26.0 (CH$_2$), 25.4 (CH$_2$).

IR (Neat): 3140 (w, triazole CH), 2973 (s, alkane CH), 2937 (s, alkane CH), 2911 (s, alkane CH), 1734 (s, ester C=O), 1551 (m, triazole C=C), 1459 (s, methylene stretch CH$_2$), 1435 (s, methyl stretch CH), 1254 (s, ester stretch C—O), 1201 (s, ester stretch C—O), 1121 (s, ether stretch C—O), 615 (w, C—Cl) cm$^{-1}$.

DSC (T$_g$): 57° C.

M51. Preparation of 15% PVC-Tri-Hexyl-Tri-DiTEGMe

Poly(vinyl chloride) 15% azide (1.000 g, 16.00 mmol) (see M29) was added to a 100 mL round bottom flask and dissolved in 30 mL of 3-pentanone at 90° C. 4,5-Bis({2-[2-(2-methoxyethoxy)ethoxy]ethyl})-1-[6-(prop-2-ynoyloxy)hexyl]-1H-1,2,3-triazole-4,5-dicarboxylate (3.6098 g, 6.0 mmol) (see M19) was added to the PVC solution and stirred for 24 h. The reaction was concentrated to approximately half its volume in vacuo, then precipitated in 80 mL of MeOH, three times each. The isolated polymer was dried under house vacuum for 1 day, then in a vacuum oven at 40° C. for 2 days to yield in a vacuum oven at 40° C. for 3 days to yield 1.9197 g of a white solid.

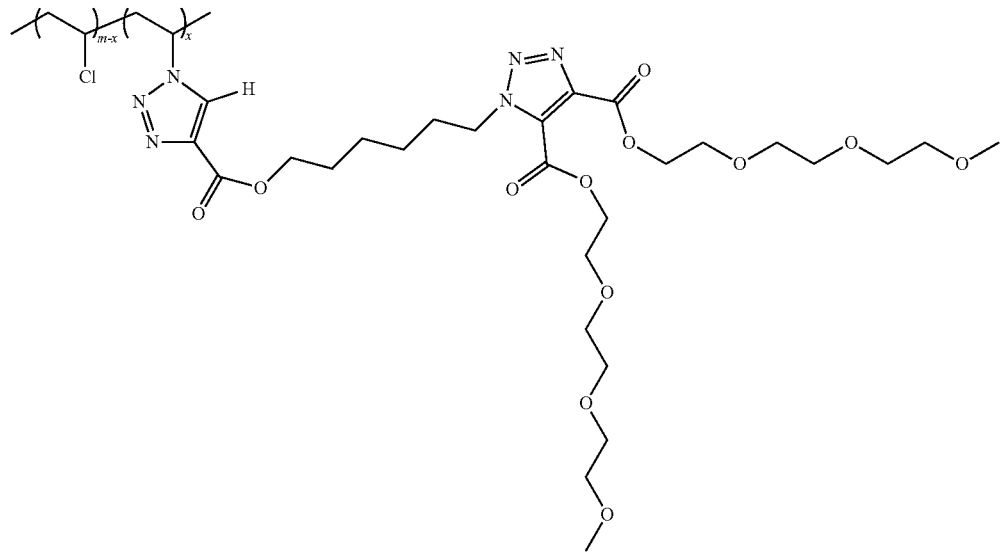

$^1$H NMR (500 MHz, CDCl$_3$): δ 8.35-8.05 (br m, PVC-triazole-H), 5.32-5.12 (br m, C—CH-triazole), 4.70-4.59 (br m, Cl—C—H and PVC-linker-C—CH$_2$-triazole), 4.58-4.54 (br s, Cl—C—H and triazole-O—CH$_2$—C—O), 4.54-4.50 (br m, Cl—C—H and triazole-O—CH$_2$—C—O), 4.49-4.42 (br s, Cl—C—H), 4.41-4.26 (br m, Cl—C—H and PVC-triazole-O—CH$_2$-linker), 3.90-3.81 (br m, triazole-O—C—CH$_2$—O), 3.73-3.62 (br m, triazole-O—C—C—O—CH$_2$—CH$_2$—O—CH$_2$—C), 3.58-3.53 (br m, C—CH$_2$—O—CH$_3$), 3.39 (br s, O—CH$_3$), 3.38 (br s, O—CH$_3$), 2.87-2.79 (br s, Cl—C—CH$_2$—C-triazole and triazole-C—CH$_2$—C-triazole), 2.78-2.61 (br m, Cl—C—CH$_2$—C-triazole and triazole-C—CH$_2$—C-triazole), 2.51-2.00 (br m, Cl—C—CH$_2$—C—Cl), 1.86-1.72 (br m, PVC-linker-CH$_2$—C-triazole), 1.72-1.62 (br s, PVC-triazole-O—C—CH$_2$-linker), 1.56-1.33 (br m, linker CH$_2$'s).

$^{13}$C NMR (200 MHz, CDCl$_3$): δ 160.2 (C=O), 158.4 (C=O), 71.9 (CH$_2$), 70.67 (CH$_2$), 70.61 (CH$_2$), 70.57 (CH$_2$), 68.8 (CH$_2$), 68.5 (CH$_2$), 65.7 (CH$_2$), 64.8 (CH$_2$), 59.0 (CH$_3$), 57.0-56.9 (CH syndio), 50.5 (CH$_2$), 47.3-44.8 (family of CH$_2$ peaks), 30.0 (CH$_2$), 28.4 (CH$_2$), 26.0 (CH$_2$), 25.4 (CH$_2$). IR (Neat): 3137 (w, triazole CH), 2936 (s, alkane CH), 2874 (s, alkane CH), 1733 (s, ester C=O), 1551 (m, triazole C=C), 1466 (s, methylene stretch CH$_2$), 1438 (s, methyl stretch CH), 1247 (s, ester stretch C—O), 1203 (s, ester stretch C—O), 1121 (s, ether stretch C—O), 615 (w, C—Cl) cm$^{-1}$.

DSC (T$_g$): 18° C.

M52. Preparation of 5% PVC-Tri-DiHexyl-Tri-DiTEGMe

Poly(vinyl chloride) 5% azide (1.000 g, 16.00 mmol) (see M28) was added to a 100 mL round bottom flask and dissolved in 30 mL of 3-pentanone at 90° C. 4,5-Bis({2-[2-(2-methoxyethoxy)ethoxy]ethyl}) 1-(6-{[4-({6-[bis(2,5,8,11-tetraoxadodecanoyl)-1H-1,2,3-triazol-1-yl]hexyl}oxy)-4-oxobut-2-ynoyl]oxy}hexyl)-1H-1,2,3-triazole-4,5-dicarboxylate (2.8253 g, 2.4 mmol) (see M21) was added to the PVC solution and stirred for 24 h. The reaction was concentrated to approximately half its volume in vacuo, then precipitated in 80 mL of MeOH, three times each. The isolated polymer was dried under house vacuum for 1 day, then in a vacuum oven at 40° C. for 2 days to yield 1.5201 g of a white solid.

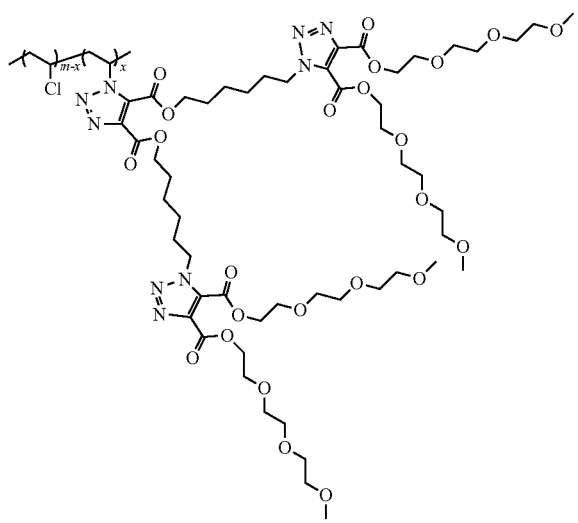

<sup>1</sup>H NMR (500 MHz, CDCl₃): δ 5.65-5.45 (br m, C—CH-triazole), 4.67-4.58 (br m, Cl—C—H and PVC-linker-C—CH₂-triazole), 4.57-4.54 (br s, Cl—C—H and triazole-O—CH₂—C—O), 4.54-4.50 (br m, triazole-O—CH₂—C—O), 4.50-4.41 (br s, Cl—C—H), 4.40-4.34 (br m, PVC-triazole-O—CH₂-linker), 4.34-4.25 (br m, Cl—C—H), 3.87-3.81 (br m, triazole-O—C—CH₂—O), 3.73-3.62 (br m, triazole-O—C—C—O—CH₂—CH₂—O—CH₂—C), 3.58-3.52 (br m, C—CH₂—O—CH₃), 3.39 (br s, O—CH₃), 3.38 (br s, O—CH₃), 2.92-2.82 (br m, Cl—C—CH₂—C-triazole and triazole-C—CH₂—C-triazole), 2.82-2.68 (br s, Cl—C—CH₂—C-triazole and triazole-C—C H₂—C-triazole), 2.50-1.99 (br m, Cl—C—CH₂—C—Cl), 1.85-1.75 (br m, PVC-linker-CH₂—C-triazole), 1.72-1.60 (br s, PVC-triazole-O—C—CH₂-linker), 1.55-1.33 (br m, linker CH₂'s).

$^{13}$C NMR (125 MHz, CDCl₃, DEPT): δ 160.1 (C=O), 158.4 (C=O), 145.5 (4°), 71.9 (CH₂), 70.67 (CH₂), 70.61 (CH₂), 70.57 (CH₂), 68.7 (CH₂), 68.5 (CH₂), 65.6 (CH₂), 64.8 (CH₂), 59.0 (CH₃), 57.0-56.9 (CH syndio), 56.1-55.9 (CH hetero), 50.5 (CH₂), 47.3-44.9 (family of CH₂ peaks), 30.0 (CH₂), 28.4 (CH₂), 27.2 (CH₂), 27.0 (CH₂).

IR (Neat): 2934 (s, alkane CH), 2875 (s, alkane CH), 1733 (s, ester C=O), 1552 (m, triazole C=C), 1467 (s, methylene stretch CH₂), 1271 (s, ester stretch C—O), 1202 (s, ester stretch C—O), 1111 (s, ether stretch C—O), 615 (w, C—Cl) cm⁻¹.

DSC (T$_g$): 24° C.

M53. Preparation of 15% PVC-Tri-DiHexyl-Tri-DiTEGMe

Poly(vinyl chloride) 15% azide (1.000 g, 16.00 mmol) (see M29) was added to a 100 mL round bottom flask and dissolved in 30 mL of 3-pentanone at 90° C. 4,5-Bis({2-[2-(2-methoxyethoxy)ethoxy]ethyl}) 1-(6-{[4-({6-[bis(2,5,8,11-tetraoxadodecanoyl)-1H-1,2,3-triazol-1-yl]hexyl}oxy)-4-oxobut-2-ynoyl]oxy}hexyl)-1H-1,2,3-triazole-4,5-dicarboxylate (7.063 g, 6.0 mmol) (see M21) was added to the PVC solution and stirred for 24 h. The reaction was concentrated to approximately one-third its volume in vacuo. To a 250 mL beaker, 100 mL of MeOH was added, then placed in a dry ice-acetone bath for 2 min. The polymer was precipitated by dropwise addition of the reaction solution in 2 mL increments into the cooled MeOH. After the addition of reaction solution, the mother liquor was decanted and replaced with 100 mL of fresh MeOH. The beaker was cooled to −78° C. for 2 min, upon which another 2 mL of reaction solution was added dropwise. This process was repeated until the entire polymer was precipitated. When all of the reaction solution was precipitated, the last volume of mother liquor was decanted. Subsequently, the neat polymer was cooled to −78° C. and washed with 50 mL of MeOH four times each. The isolated polymer was dried under house vacuum for 1 day, then in a vacuum oven at 40° C. for 3 days to yield 3.3816 g of a flexible pale yellow solid.

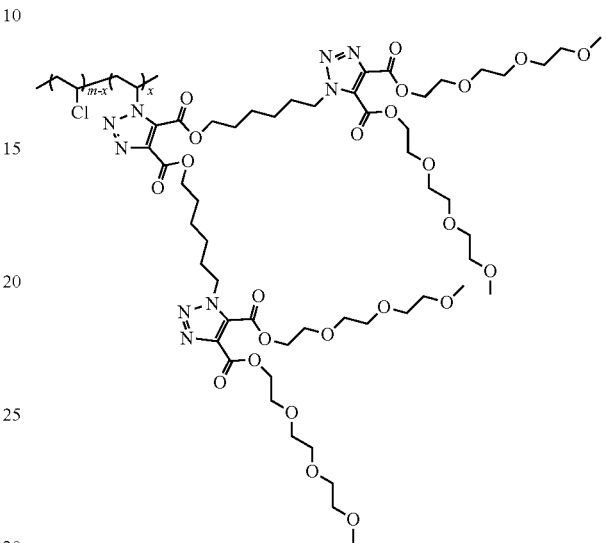

<sup>1</sup>H NMR (500 MHz, CDCl₃): δ 5.65-5.35 (br m, C—CH-triazole), 4.67-4.58 (br s, Cl—C—H and PVC-linker-C—C H₂-triazole), 4.58-4.54 (br s, Cl—C—H and triazole-O—C H₂—C—O), 4.54-4.48 (br m, Cl—C—H and triazole-O—C H₂—C—O), 4.39-4.24 (br m, Cl—C—H and PVC-triazole-O—CH₂-linker), 3.88-3.78 (br m, triazole-O—C—C H₂—O), 3.75-3.60 (br m, triazole-O—C—C—O—CH₂—C H₂—O—CH₂—C), 3.59-3.48 (br m, C—CH₂—O—CH₃), 3.43-3.31 (br s, O—CH₃), 2.90-2.80 (br s, Cl—C—C H₂—C-triazole and triazole-C—CH₂—C-triazole), 2.80-2.53 (br m, Cl—C—CH₂—C-triazole and triazole-C—C H₂—C-triazole), 2.50-1.90 (br m, Cl—CH₂—C—Cl), 1.89-1.60 (br m, PVC-linker-CH₂—C-triazole and PVC-triazole-O—C—CH₂-linker), 1.57-1.30 (br m, linker CH₂'s).

$^{13}$C NMR (200 MHz, CDCl₃): δ 160.1 (C=O), 158.4 (C=O), 140.0 (4°), 129.9 (4°), 71.9 (CH₂), 70.67 (CH₂), 70.60 (CH₂), 70.56 (CH₂), 68.8 (CH₂), 68.5 (CH₂), 66.2 (CH₂), 65.6 (CH₂), 64.8 (CH₂), 59.0 (CH₃), 56.9 (CH syndio), 55.9 (CH hetero), 55.0-54.9 (CH iso), 50.5 (CH₂), 47.3-44.8 (family of CH₂ peaks), 30.0 (CH₂), 29.7 (CH₂), 28.4 (CH₂), 28.1 (CH₂), 26.04 (CH₂), 25.96 (CH₂), 25.3 (CH₂), 25.2 (CH₂).

IR (Neat): 2928 (s, alkane CH), 2874 (s, alkane CH), 1733 (s, ester C=O), 1552 (m, triazole C=C), 1464 (s, methylene stretch CH₂), 1279 (s, ester stretch C—O), 1202 (s, ester stretch C—O), 1111 (s, ether stretch C—O), 615 (w, C—Cl) cm⁻¹.

DSC (T$_g$): −17° C.

M54. Preparation of 5% PVC-Tri-DiPEG350Me

Poly(vinyl chloride) 5% azide (1.000 g, 16.00 mmol) (see M28) was added to a 100 mL round bottom flask and dissolved in 20 mL of 3-pentanone at 90° C. 1,4-Bis-[methoxy poly(ethylene glycol) 350]-but-2-ynedioate (1.558 g, 2.0 mmol) (see M22) was added to the PVC solution and stirred for 24 h. The reaction was concentrated to approximately half its volume in vacuo, then precipitated in 80 mL of MeOH, three times each. The isolated polymer was dried under house vacuum for 1 day, then in a vacuum oven at 40° C. for 2 days to yield 1.0872 g of a white solid.

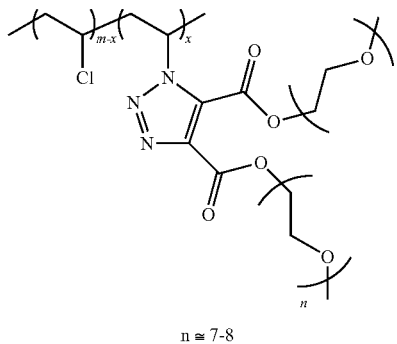

n ≅ 7-8

$^1$H NMR (500 MHz, CDCl$_3$): δ 5.69-5.40 (br m, C—C H-triazole), 4.66-4.55 (br s, Cl—C—H), 4.55-4.39 (br s, Cl—C—H and triazole-O—CH$_2$), 4.38-4.12 (br s, Cl—C—H), 3.89-3.80 (br s, triazole-O—C—CH$_2$—O), 3.72-3.59 (br m, triazole-O—C—C—O—CH$_2$—CH$_2$—O—), 3.58-3.54 (br s, C—CH$_2$—O—CH$_3$), 3.41-3.37 (br s, O—CH$_3$), 2.92-2.81 (br m, Cl—C—CH$_2$—C-triazole and triazole-C—C H$_2$—C-triazole), 2.80-2.67 (br m, Cl—C—CH$_2$—C-triazole and triazole-C—CH$_2$—C-triazole), 2.50-1.90 (br m, Cl—C—CH$_2$—C—Cl).

$^{13}$C NMR (125 MHz, CDCl$_3$, DEPT): δ 71.9 (CH$_2$), 70.61 (CH$_2$), 70.58 (CH$_2$), 70.52 (CH$_2$), 68.9 (CH$_2$), 68.7 (CH$_2$), 68.4 (CH$_2$), 64.9 (CH$_2$), 59.0 (CH$_3$), 57.1-56.9 (CH syndio), 56.1-55.9 (CH hetero), 55.2-54.9 (CH iso), 47.3-44.9 (family of CH$_2$ peaks).

IR (Neat): 2910 (s, alkane CH), 1732 (s, ester C═O), 1551 (w, triazole C═C), 1435 (s, methylene stretch CH$_2$), 1254 (s, ester stretch C—O), 1202 (m, ester stretch C—O), 1105 (s, ether stretch C—O), 615 (w, C—Cl) cm$^{-1}$.

DSC (T$_g$): 49° C.

M55. Preparation of 15% PVC-Tri-DiPEG3500Me

Poly(vinyl chloride) 15% azide (1.000 g, 16.00 mmol) (see M29) was added to a 100 mL round bottom flask and dissolved in 35 mL of 3-pentanone at 96° C. 1,4-Bis-[methoxy poly(ethylene glycol) 350]-but-2-ynedioate (5.6088 g, 7.2 mmol) (see M22) was added to the PVC solution and stirred for 48 h. The reaction was concentrated to approximately one-third its volume in vacuo. To a 250 mL beaker, 100 mL of MeOH was added, then placed in a dry ice-acetone bath for 2 min. The polymer was precipitated by dropwise addition of the reaction solution in 2 mL increments into the cooled MeOH. After the addition of reaction solution, the mother liquor was decanted and replaced with 100 mL of fresh MeOH. The beaker was cooled to −78° C. for 2 min, upon which another 2 mL of reaction solution was added dropwise. This process was repeated until the entire polymer was precipitated. When all of the reaction solution was precipitated, the last volume of mother liquor was decanted. Subsequently, the neat polymer was cooled to −78° C. and washed with 50 mL of MeOH four times each. The isolated polymer was dried under house vacuum for 1 day, then in a vacuum oven at 40° C. for 3 days to yield 2.0000 g of a flexible orange solid.

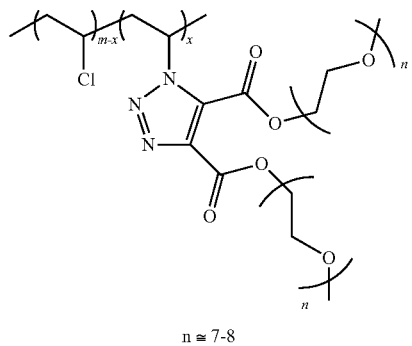

n ≅ 7-8

$^1$H NMR (500 MHz, CDCl$_3$): δ 5.67-5.40 (br m, C—CH-Triazole), 4.67-4.56 (br s, 4.56-4.50 (br s, Cl—C—H and triazole-O—CH$_2$), 4.50-4.40 (br s, Cl—C—H and triazole-O—CH$_2$), 4.38-4.15 (br m, Cl—C—H), 3.89-3.79 (br s, triazole-O—C—CH$_2$—O), 3.78-3.59 (br m, triazole-O—C—C—O—CH$_2$—CH$_2$—O—), 3.58-3.55 (br t, C—C H$_2$—O—CH$_3$), 3.41-3.38 (br s, O—CH$_3$), 2.92-2.81 (br m, Cl—C—CH$_2$—C-triazole and triazole-C—C H$_2$—C-triazole), 2.81-2.65 (br m, Cl—C—CH$_2$—C-triazole and triazole-C—CH$_2$—C-triazole), 2.50-1.85 (br m, Cl—C—CH$_2$—C—Cl).

$^{13}$C NMR (200 MHz, CDCl$_3$): δ 161.0 (C═O), 159.8 (C═O), 158.3 (C═O), 139.3 (4°), 131.7 (4°), 72.5 (CH$_2$), 71.9 (CH$_2$), 70.6 (CH$_2$), 68.9 (CH$_2$), 68.7 (CH$_2$), 68.4 (CH$_2$), 66.2 (CH$_2$), 66.1 (CH$_2$), 64.9 (CH$_2$), 63.1 (CH$_2$), 61.7 (CH$_2$), 59.0 (CH$_3$), 56.9-56.5 (CH syndio), 56.0-55.6 (CH hetero), 55.0-54.5 (CH iso), 47.3-44.8 (family of CH$_2$ peaks).

IR (Neat): 2877 (s, alkane CH), 1729 (s, ester C═O), 1548 (w, triazole C═C), 1456 (s, methylene stretch CH$_2$), 1283 (s, ester stretch C—O), 1198 (s, ester stretch C—O), 1108 (s, ether stretch C—O), 615 (w, C—Cl) cm$^{-1}$.

DSC (T$_g$): −3° C.

M56. Preparation of 5% PVC-Tri-Hexyl-Tri-DiPEG3500Me

Poly(vinyl chloride) 5% azide (1.000 g, 16.00 mmol) (see M28) was added to a 100 mL round bottom flask and dissolved in 15 mL of 3-pentanone at 90° C. 4,5-Bis[methoxy poly(ethylene glycol) 350]-1-[6-(prop-2-ynoyloxy)hexyl]-1H-1,2,3-triazole-4,5-dicarboxylate (2.3381 g, 2.4 mmol) (see M24) was added to the PVC solution and stirred for 24 h. The reaction was concentrated to approximately one-third its volume in vacuo then precipitated once in 80 mL of MeOH. The crude polymer was dissolved in 15 mL of 3-pentaone and 4,5-Bis[methoxy poly(ethylene glycol) 350]-1-[6-(prop-2-ynoyloxy)hexyl]-1H-1,2,3-triazole-4,5-dicarboxylate (2.3381 g, 2.4 mmol) (see M24) was added to the solution and stirred for 24 h. The reaction was once again concentrated to approximately one-third its volume in vacuo then precipitated once in 80 mL of MeOH, two times each. The isolated polymer was dried under house vacuum for 1 day, then in a vacuum oven at 40° C. for 2 days to yield 0.6447 of a white solid.

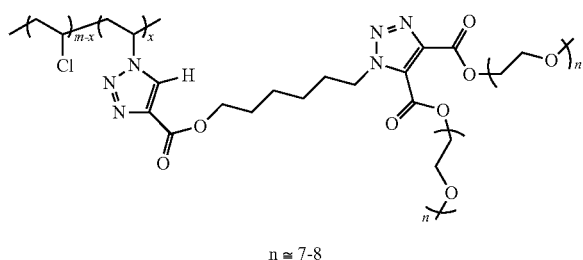

n ≅ 7-8

¹H NMR (500 MHz, CDCl₃): δ 8.37-8.21 (br m, PVC-triazole-H), 8.21-8.16 (br s, PVC-triazole-H), 8.16-8.08 (br s, PVC-triazole-H), 5.32-5.16 (br m, C—CH-triazole), 4.67-4.55 (br m, Cl—C—H and PVC-linker-C—CH₂-triazole), 4.55-4.40 (br m, Cl—C—H and PVC-triazole-O—C H₂-linker), 4.40-4.25 (br m, Cl—C—H), 3.92-3.80 (br m, triazole-O—C—CH₂—O), 3.73-3.60 (br s, triazole-O—C—C—O—CH₂—CH₂—O—), 3.58-3.55 (br m, C—C H₂—O—CH₃), 3.42-3.37 (br s, O—CH₃), 2.92-2.65 (br m, Cl—C—CH₂—C-triazole and triazole-C—C H₂—C-triazole), 2.50-1.90 (br m, Cl—C—CH₂—C—Cl), 1.86-1.74 (br s, PVC-linker-CH₂—C-triazole), 1.74-1.60 (br s, PVC-triazole-O—C—CH₂-linker), 1.56-1.34 (br m, linker CH₂'s).

¹³C NMR (125 MHz, CDCl₃, DEPT): δ 71.9 (CH₂), 70.6 (CH₂), 66.2 (CH₂), 66.0 (CH₂), 65.6 (CH₂), 64.3 (CH₂), 63.8 (CH₂), 59.0 (CH₃), 57.0-56.9 (CH syndio). 56.1-55.9 (CH hetero), 55.2-54.9 (CH iso), 50.5 (CH₂), 47.3-44.8 (family of CH₂ peaks).

IR (Neat): 3129 (w, triazole CH), 2975 (s, alkane CH), 2938 (s, alkane CH), 2911 (s, alkane CH), 1714 (s, ester C=O), 1548 (w, triazole C=C), 1459 (s, methylene stretch CH₂), 1435 (s, methyl stretch CH), 1283 (s, ester stretch C—O), 1198 (s, ester stretch C—O), 1108 (s, ether stretch C—O), 615 (w, C—Cl) cm⁻¹.

DSC (T_g): 71° C.

M57. Preparation of 15% PVC-Tri-Hexyl-Tri-DiPEG3500Me

Poly(vinyl chloride) 15% azide (1.000 g, 16.00 mmol) (see M29) was added to a 100 mL round bottom flask and dissolved in 35 mL of 3-pentanone at 96° C. 4,5-Bis[methoxy poly(ethylene glycol) 350]-1-[6-(prop-2-ynoyloxy)hexyl]-1H-1,2,3-triazole-4,5-dicarboxylate (7.014 g, 7.2 mmol) (see M24) was added to the PVC solution and stirred for 24 h. The reaction was concentrated to approximately one-third its volume in vacuo. To a 250 mL beaker, 100 mL of MeOH was added, then placed in a dry ice-acetone bath for 2 min. The polymer was precipitated by dropwise addition of the reaction solution in 2 mL increments into the cooled MeOH. After the addition of reaction solution, the mother liquor was decanted and replaced with 100 mL of fresh MeOH. The beaker was cooled to −78° C. for 2 min, upon which another 2 mL of reaction solution was added dropwise. This process was repeated until the entire polymer was precipitated. When all of the reaction solution was precipitated, the last volume of mother liquor was decanted. Subsequently, the neat polymer was cooled to −78° C. and washed with 50 mL of MeOH four times each. The isolated polymer was dried under house vacuum for 1 day, then in a vacuum oven at 40° C. for 3 days to yield 2.3169 g of a flexible orange solid.

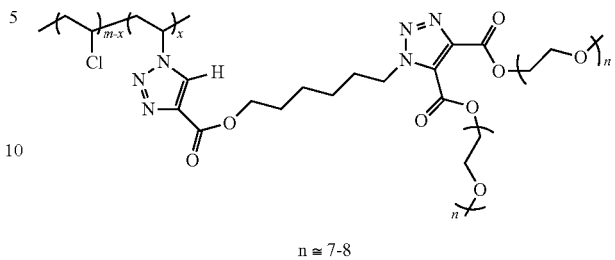

n ≅ 7-8

¹H NMR (500 MHz, CDCl₃): δ 8.29-8.24 (br m, PVC-triazole-H), 8.20-8.15 (br s, PVC-triazole-H), 8.13-8.06 (br m, PVC-triazole-H), 5.40-5.10 (br m, C—CH-triazole), 4.70-4.57 (br m, Cl—C—H and PVC-linker-C—C H₂-triazole), 4.57-4.54 (br s, Cl—C—H and PVC-triazole-O—CH₂-linker), 4.54-4.41 (br m, Cl—C—H), 4.40-4.25 (br m, PVC-triazole-O—CH₂-linker), 4.25-4.10 (br m, Cl—C—H), 3.92-3.80 (br m, triazole-O—C—CH₂—O), 3.77-3.59 (br m, triazole-O—C—C—O—CH₂—CH₂—O—CH₂—C), 3.59-3.55 (br t, C—CH₂—O—CH₃), 3.41-3.38 (br s, O—C H₃), 2.87-2.60 (br m, Cl—C—CH₂—C-triazole and triazole-C—CH₂—C-triazole), 2.50-2.01 (br m, Cl—C—C H₂—C—Cl), 2.01-1.85 (br s, PVC-linker-CH₂—C-triazole), 1.75-1.60 (br s, PVC-triazole-O—C—CH₂-linker), 1.56-1.34 (br m, linker CH₂'s).

¹³C NMR (200 MHz, CDCl₃): δ 161.0 (C=O), 160.1 (C=O), 158.4 (C=O), 140.1 (4°), 129.9 (4°), 71.9 (CH₂), 70.6 (CH₂), 68.9 (CH₂), 68.8 (CH₂), 68.5 (CH₂), 65.6 (CH₂), 64.8 (CH₂), 59.0 (CH₃), 56.9 (CH syndio), 55.9 (CH hetero), 55.0-54.9 (CH iso), 50.5 (CH₂), 47.3-44.8 (family of CH₂ peaks), 30.0 (CH₂), 29.7 (CH₂), 28.3 (CH₂), 26.01 (CH₂), 25.92 (CH₂), 25.35 (CH₂), 25.28 (CH₂).

IR (Neat): 3133 (w, triazole CH), 2878 (s, alkane CH), 1732 (s, ester C=O), 1552 (w, triazole C=C), 1456 (m, methylene stretch CH₂), 1253 (s, ester stretch C—O), 1201 (s, ester stretch C—O), 1105 (s, ether stretch C—O) cm⁻¹.

DSC (T_g): −1° C.

M58. Preparation of 5% PVC-Tri-DiPEG5500Me

Poly(vinyl chloride) 5% azide (1.000 g, 16.00 mmol) (see M28) was added to a 100 mL round bottom flask and dissolved in 20 mL of 3-pentanone at 95° C. 1,4-Bis-[methoxy poly(ethylene glycol)550]-but-2-ynedioate (2.827 g, 2.4 mmol) (see M25) was added to the PVC solution and stirred for 24 h. The reaction was concentrated to approximately half its volume in vacuo, then precipitated once in 80 mL of MeOH. The crude polymer was dissolved in 15 mL of 3-pentaone and 1,4-Bis-[methoxy poly(ethylene glycol) 550]-but-2-ynedioate (2.827 g, 2.4 mmol) (see M25) was added to the PVC solution and stirred for 24 h. The reaction was concentrated to approximately half its volume in vacuo, then precipitated in 80 mL of MeOH, two times each. The isolated polymer was dried under house vacuum for 1 day, then in a vacuum oven at 40° C. for 2 days to yield 0.704 g of an off-white solid.

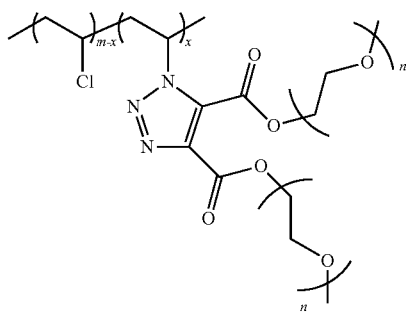

n ≈ 11-12

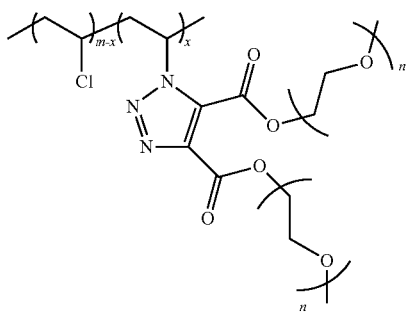

n ≈ 11-12

¹H NMR (500 MHz, CDCl₃): δ 8.30-8.20 (br m, PVC-triazole-H), 8.12-8.08 (br s, PVC-triazole-H), 5.66-5.50 (br m, C—CH-triazole), 5.30-5.15 (br m, C—CH-triazole), 4.67-4.56 (br s, Cl—C—H), 4.55-4.40 (br s, Cl—C—H and triazole-O—CH₂—C—O), 4.40-4.25 (br m, Cl—C—H and triazole-O—CH₂—C—O), 3.90-3.78 (br m, triazole-O—C—CH₂—O), 3.76-3.59 (br s, triazole-O—C—CO—C H₂—CH₂—O—), 3.58-3.54 (br m, C—CH₂—O—CH₃), 3.41-3.37 (br s, O—CH₃), 2.92-2.81 (br m, Cl—C—C H₂—C-triazole and triazole-C—CH₂—C-triazole), 2.90-2.69 (br m, Cl—C—CH₂—C-triazole and triazole-C—C H₂—C-triazole), 2.50-1.80 (br m, Cl—C—CH₂—C—Cl).

¹³C NMR (125 MHz, CDCl₃, DEPT): δ 71.9 (CH₂), 70.62 (CH₂), 70.59 (CH₂), 70.53 (CH₂), 68.9 (CH₂), 68.9 (CH₂), 68.4 (CH₂), 64.9 (CH₂), 63.1 (CH₂), 59.0 (CH₃), 57.1-56.9 (CH syndio), 56.1-55.9 (CH hetero), 55.2-54.9 (CH iso), 47.3-44.8 (family of CH₂ peaks).

IR (Neat): 2909 (s, alkane CH), 2877 (s, alkane CH), 1732 (s, ester C=O), 1551 (w, triazole C=C), 1435 (m, methylene stretch CH₂), 1254 (s, ester stretch C—O), 1200 (s, ester stretch C—O), 1106 (s, ether stretch C—O), 615 (w, C—Cl) cm⁻¹.

DSC ($T_g$): 27° C.

M59. Preparation of 15% PVC-Tri-DiPEG5500Me

Poly(vinyl chloride) 15% azide (1.000 g, 16.00 mmol) (see M29) was added to a 100 mL round bottom flask and dissolved in 40 mL of 3-pentanone at 96° C. 1,4-Bis-[methoxy poly(ethylene glycol) 550]-but-2-ynedioate (8.4816 g, 7.2 mmol) (see M25) was added to the PVC solution and stirred for 48 h. The reaction was concentrated to approximately one-third its volume in vacuo. To a 250 mL beaker, 100 mL of MeOH was added, then placed in a dry ice-acetone bath for 2 min. The polymer was precipitated by dropwise addition of the reaction solution in 2 mL increments into the cooled MeOH. After the addition of reaction solution, the mother liquor was decanted and replaced with 100 mL of fresh MeOH. The beaker was cooled to −78° C. for 2 min, upon which another 2 mL of reaction solution was added dropwise. This process was repeated until the entire polymer was precipitated. When all of the reaction solution was precipitated, the last volume of mother liquor was decanted. Subsequently, the neat polymer was cooled to −78° C. and washed with 50 mL of MeOH four times each. The isolated polymer was dried under house vacuum for 1 day, then in a vacuum oven at 40° C. for 3 days to yield 3.8272 g of a flexible orange solid.

¹H NMR (500 MHz, CDCl₃): δ 4.66-4.57 (br s, Cl—C—H), 4.56-4.50 (br s, Cl—C—H and triazole-O—C H₂—C—O), 4.49-4.43 (br m, Cl—C—H and PVC-triazole-O—CH₂—C—O), 4.37-4.28 (br m, Cl—C—H and PVC-triazole-O—CH₂—C), 3.91-3.78 (br m, triazole-O—C—C H₂—O), 3.77-3.60 (br m, triazole-O—C—C—O—C H₂—CH₂—O—), 3.59-3.55 (br m, C—CH₂—O—CH₃), 2.80-2.70 (br m, Cl—C—CH₂—C-triazole and triazole-C—CH₂—C-triazole), 2.50-1.85 (br m, Cl—C—C H₂—C—Cl).

¹³C NMR (200 MHz, CDCl₃): δ 161.0 (C=O), 158.3 (C=O), 72.5 (CH₂), 71.9 (CH₂), 70.6 (CH₂), 68.9 (CH₂), 68.7 (CH₂), 68.4 (CH₂), 66.3 (CH₂), 66.1 (CH₂), 64.9 (CH₂), 63.1 (CH₂), 61.8 (CH₂), 59.0 (CH₃), 56.9-56.5 (CH syndio), 56.0-55.6 (CH hetero), 55.0-54.5 (CH iso), 47.3-44.7 (family of CH₂ peaks).

IR (Neat): 2873 (s, alkane CH), 1732 (s, ester C=O), 1540 (w, triazole C=C), 1452 (m, methylene stretch CH₂), 1253 (s, ester stretch C—O), 1201 (s, ester stretch C—O), 1105 (s, ether stretch C—O) cm⁻¹.

DSC ($T_g$): −29° C.

M60. Preparation of 5% PVC-Tri-PEG1000Me

Poly(vinyl chloride) 5% azide (1.000 g, 16.00 mmol) (see M28) was added to a 100 mL round bottom flask and dissolved in 15 mL of 3-pentanone at 96° C. Methoxy poly(ethylene glycol)1000 prop-2-ynoate (2.524 g, 2.4 mmol) (see M26) was added to the PVC solution and stirred for 24 h. The reaction was precipitated once in 80 mL of MeOH. The crude polymer was dissolved in 15 mL of 3-pentaone and methoxy poly(ethylene glycol) 1000-prop-2-ynoate (2.524 g, 2.4 mmol) was added to the solution and stirred for 24 h. The reaction was concentrated to approximately half its volume in vacuo, then precipitated in 80 mL of MeOH, two times each. The isolated polymer was dried under house vacuum for 1 day, then in a vacuum oven at 40° C. for 2 days to yield 0.6690 g of a white solid.

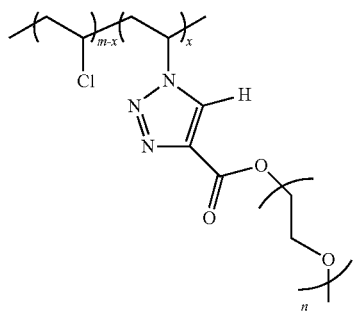

n ≈ 22

$^1$H NMR (500 MHz, CDCl$_3$): δ 8.40-8.15 (br m, PVC-triazole-H), 5.32-5.10 (br m, C—CH-triazole), 4.70-4.56 (br m, Cl—C—H), 4.56-4.40 (br s, Cl—C—H and triazole-O—CH$_2$), 4.38-4.24 (br m, Cl—C—H), 3.92-3.83 (br m, triazole-O—C—CH$_2$—O), 3.83-3.59 (br m, triazole-O—C—C—O—CH$_2$—CH$_2$—O—). 3.58-3.55 (br m, C—CH$_2$—O—CH$_3$), 3.41-3.39 (br s, O—CH$_3$), 2.87-2.78 (br m, Cl—C—CH$_2$—C-triazole and triazole-C—CH$_2$—C-triazole), 2.78-2.69 (br m, Cl—C—CH$_2$—C-triazole and triazole-C—CH$_2$—C-triazole), 2.50-1.85 (br m, Cl—C—CH$_2$—C—Cl).

$^{13}$C NMR (125 MHz, CDCl$_3$, DEPT): δ 72.0 (CH$_2$), 70.6 (CH$_2$), 59.0 (CH$_3$), 57.0-56.9 (CH syndio), 56.1-55.9 (CH hetero), 55.0-54.9 (CH iso), 47.3-44.8 (family of CH$_2$ peaks). IR (Neat): 2909 (s, alkane CH), 2874 (s, alkane CH), 1727 (s, ester C=O), 1541 (w, triazole C=C), 1435 (s, methylene stretch CH$_2$), 1253 (s, ester stretch C—O), 1199 (m, ester stretch C—O), 1106 (s, ether stretch C—O), 614 (w, C—Cl) cm$^{-1}$.

DSC (T$_g$): 65° C.

M61. Preparation of 15% PVC-Tri-PEG1000Me

Poly(vinyl chloride) 15% azide (1.000 g, 16.00 mmol) (see M29) was added to a 100 mL round bottom flask and dissolved in 30 mL of 3-pentanone at 96° C. Methoxy poly(ethylene glycol)1000 prop-2-ynoate (7.5746 g, 7.2 mmol) (see M26) was added to the PVC solution and stirred for 24 h. The reaction was concentrated to approximately one-third its volume in vacuo. To a 250 mL beaker, 100 mL of MeOH was added, then placed in a dry ice-acetone bath for 2 min. The polymer was precipitated by dropwise addition of the reaction solution in 2 mL increments into the cooled MeOH. After the addition of reaction solution, the mother liquor was decanted and replaced with 100 mL of fresh MeOH. The beaker was cooled to −78° C. for 2 min, upon which another 2 mL of reaction solution was added dropwise. This process was repeated until the entire polymer was precipitated. When all of the reaction solution was precipitated, the last volume of mother liquor was decanted. Subsequently, the neat polymer was cooled to −78° C. and washed with 50 mL of MeOH four times each. The isolated polymer was dried under house vacuum for 1 day, then in a vacuum oven at 40° C. for 3 days to yield 2.2467 g of a flexible transparent yellow solid.

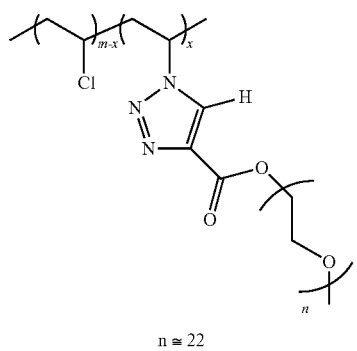

n ≅ 22

$^1$H NMR (500 MHz, CDCl$_3$): δ 8.29-8.07 (br m, PVC-triazole-H), 5.30-5.10 (br m, C—CH-triazole), 4.66-4.57 (br s, Cl—C—H), 4.56-4.50 (br s, Cl—C—H and triazole-O—CH$_2$), 4.49-4.40 (br s, Cl—C—H), 4.36-4.15 (br m, Cl—C—H), 3.95-3.82 (br s, triazole-O—C—CH$_2$—O), 3.82-3.59 (br m, triazole-O—C—C—O—CH$_2$—CH$_2$—O—), 3.58-3.54 (br m, C—CH$_2$—O—CH$_3$), 3.41-3.38 (br s, O—CH$_3$), 2.87-2.78 (br m, Cl—C—CH$_2$—C-triazole and triazole-CH$_2$—C-triazole), 2.78-2.68 (br m, Cl—C—CH$_2$—C-triazole and triazole-C—CH$_2$—C-triazole), 2.50-1.85 (br m, Cl—C—CH$_2$—C—Cl).

$^{13}$C NMR (200 MHz, CDCl$_3$): δ 161.0 (C=O), 72.5 (CH$_2$), 71.9 (CH$_2$), 70.6 (CH$_2$), 68.9 (CH$_2$), 64.3 (CH$_2$), 63.0 (CH$_2$), 61.8 (CH$_2$), 59.0 (CH$_3$), 56.9 (CH syndio), 56.1-55.9 (CH hetero), 55.0-54.9 (CH iso), 47.3-44.8 (family of CH$_2$ peaks).

IR (Neat): 2874 (s, alkane CH), 1725 (m, ester C=O), 1454 (m, methylene stretch CH$_2$), 1253 (m, ester stretch C—O), 1103 (s, ether stretch C—O) cm$^{-1}$.

DSC (T$_g$): −35° C.

M62. Preparation of 5% PVC-Tri-PEG2000Me

Poly(vinyl chloride) 5% azide (1.000 g, 16.00 mmol) (see M28) was added to a 100 mL round bottom flask and dissolved in 15 mL of 3-pentanone at 96° C. Methoxy poly(ethylene glycol)2000 prop-2-ynoate (4.9248 g, 2.4 mmol) (see M27) was added to the PVC solution and stirred for 24 h. The reaction was precipitated once in 80 mL of MeOH. The crude polymer was then dissolved in 15 mL of 3-pentaone and methoxy poly(ethylene glycol) 2000-prop-2-ynoate (4.9248 g, 2.4 mmol) was added to the solution and stirred for 24 h. The reaction was concentrated to approximately half its volume in vacuo, then precipitated in 80 mL of MeOH, two times each. The isolated polymer was dried under house vacuum for 1 day, then in a vacuum oven at 40° C. for 2 days to yield 1.0484 g of a white solid.

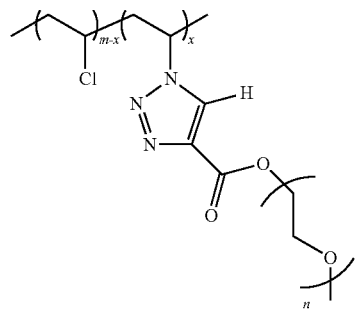

n ≅ 44-45

$^1$H NMR (500 MHz, CDCl$_3$): δ 8.32-8.18 (br m, PVC-triazole-H), 5.30-5.15 (br m, C—CH-triazole), 4.66-4.57 (br m, Cl—C—H), 4.56-4.40 (br m, Cl—C—H and triazole-O—CH$_2$), 4.39-4.15 (br m, Cl—C—H), 3.82-3.58 (br m, triazole-O—C—C—O—CH$_2$—CH$_2$—O—), 3.58-3.54 (br t, C—CH$_2$—O—CH$_3$), 3.53-3.50 (br t, C—CH$_2$—O—CH$_3$), 3.40-3.39 (br s, O—CH$_3$), 2.87-2.77 (br m, Cl—C—CH$_2$—C-triazole and triazole-C—CH$_2$—C-triazole), 2.77-2.68 (br m, Cl—C—CH$_2$—C-triazole and triazole-C—CH$_2$—C-triazole), 2.50-1.85 (br m, Cl—C—CH$_2$—C—Cl).

$^{13}$C NMR (125 MHz, CDCl$_3$, DEPT): δ 161.0 (C=O), 72.0 (CH$_2$), 70.6 (CH$_2$), 68.9 (CH$_2$), 66.7 (CH$_2$), 63.0 (CH$_2$), 61.8 (CH$_2$), 59.0 (CH$_3$), 57.0-56.9 (CH syndio), 56.1-55.9 (CH hetero), 55.1-54.9 (CH iso), 47.3-44.8 (family of CH$_2$ peaks).

IR (Neat): 3120 (w, triazole CH), 2908 (s, alkane CH), 2873 (s, alkane CH), 1728 (m, ester C=O), 1528 (w, triazole C=C), 1435 (m, methylene stretch CH$_2$), 1253 (s, ester stretch C—O), 1199 (m, ester stretch C—O), 1106 (s, ether stretch C—O), 615 (w, C—Cl) cm$^{-1}$.

DSC (T$_g$): 22° C.

M63. Preparation of 15% PVC-Tri-PEG2000Me

Poly(vinyl chloride) 15% azide (1.000 g, 16.00 mmol) (see M29) was added to a 100 mL round bottom flask and dissolved in 25 mL of 3-pentanone at 90° C. Methoxy poly(ethylene glycol)2000 prop-2-ynoate (7.387 g, 3.600 mmol) (see M27) was added to the PVC solution and stirred for 72 h. The reaction was concentrated to approximately half its volume in vacuo. To a 250 mL beaker, 100 mL of MeOH was added, then placed in a dry ice-acetone bath for 2 min. The polymer was precipitated by dropwise addition of the reaction solution in 2 mL increments into the cooled MeOH. After the addition of reaction solution, the mother liquor was decanted and replaced with 100 mL of fresh MeOH. The beaker was cooled to −78° C. for 2 min, upon which another 2 mL of reaction solution was added dropwise. This process was repeated until the entire polymer was precipitated. When all of the reaction solution was precipitated, the last volume of mother liquor was decanted. Subsequently, the neat polymer was cooled to −78° C. and washed with 50 mL of MeOH four times each. The isolated polymer was dried under house vacuum for 1 day, then in a vacuum oven at 40° C. for 3 days to yield 2.9260 g of a flexible transparent yellow solid.

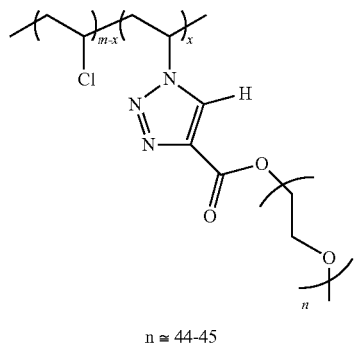

n ≅ 44-45

$^1$H NMR (500 MHz, CDCl$_3$): δ 8.40-8.15 (br m, PVC-triazole-H), 5.35-5.05 (br m, C—CH-triazole), 4.65-4.55 (br s, Cl—C—H), 4.55-4.36 (br m, Cl—C—H and triazole-O—CH$_2$), 4.36-4.15 (br m, Cl—C—H), 3.95-3.40 (br s, triazole-O—C—CH$_2$—O and triazole-O—C—C—O—C H$_2$—CH$_2$—O— and C—CH$_2$—O—CH$_3$), 3.38 (br s, O—C H$_3$), 3.36 (br s, O—CH$_3$), 2.50-1.75 (br m, Cl—C—C H$_2$—C—Cl).

$^{13}$C NMR (125 MHz, CDCl$_3$, DEPT): δ 161.0 (C=O), 72.5 (CH$_2$), 71.9 (CH$_2$), 70.6 (CH$_2$), 68.9 (CH$_2$), 63.0 (CH$_2$), 61.7 (CH$_2$), 59.0 (CH$_3$), 57.0 (CH syndio), 55.9 (CH hetero), 54.9 (CH iso), 47.3-44.8 (family of CH$_2$ peaks).

IR (Neat): 3120 (w, triazole CH), 2871 (s, alkane CH), 1726 (m, ester C=O), 1544 (w, triazole C=C), 1455 (m, methylene stretch CH$_2$), 1251 (s, ester stretch C—O), 1111 (s, ether stretch C—O), 615 (w, C—Cl) cm$^{-1}$.

DSC (T$_g$): −42° C.

Results of Characterization of Products (Compounds Synthesized)

The poly(vinyl chloride) (PVC) used in the syntheses, the PVC Azide products formed, and the products of PVC derivatized (functionalized) with triazole groups were characterized, for example, by using Differential Scanning calorimetry (DSC) to determine the glass transition temperature (T$_g$).

The DSC method used was Modulated Differential Scanning calorimetry (MDSC) performed on each polymer with heat-cool-heat protocols to erase the thermal history of the sample. Glass transition temperatures (T$_g$) were obtained on the second heat cycle. The general scanning ranges of MDSC analyses ranged from −90° C. to 200° C., at an increase of 10° C. per minute. The following protocols were utilized during MDSC analysis, depending on the physical properties of the polymer:

25° C. to 150° C. h-c-h 10° C./min
25° C. to 160° C. h-c-h 10° C./min
25° C. to 170° C. h-c-h 10° C./min
25° C. to 180° C. h-c-h 10° C./min
25° C. to 200° C. h-c-h 10° C./min
−50° C. to 150° C. h-c-h 10° C./min
−50° C. to 200° C. h-c-h 10° C./min
−90° C. to 170° C. h-c-h 10° C./min
−90° C. to 200° C. h-c-h 10° C./min
Heat cool heat=(h-c-h)

A heat-cool-reheat protocol is utilized in DSC to erase the thermal history of a polymer. The first heat assesses the "as-present" thermal properties of the sample. Workup, processing, and storage can alter the properties of a polymer, which may result in varied glass transition temperatures (T$_g$) despite being an analogous sample of the same composition. Once the polymer is heated above its melt temperature, it is cooled at a controlled rate, which erases the thermal history. Polymers were subjected to the same cooling rate to impart a consistent, known thermal history on each sample. The second heat is subsequently performed to obtain the glass transition temperature (T$_g$) of the polymer, which is a quantitative indicator of the level of plasticization imparted by the novel plasticizer: low T$_g$ values indicate high degrees of plasticization and therefore, a flexible, pliable material.

Figure 2:
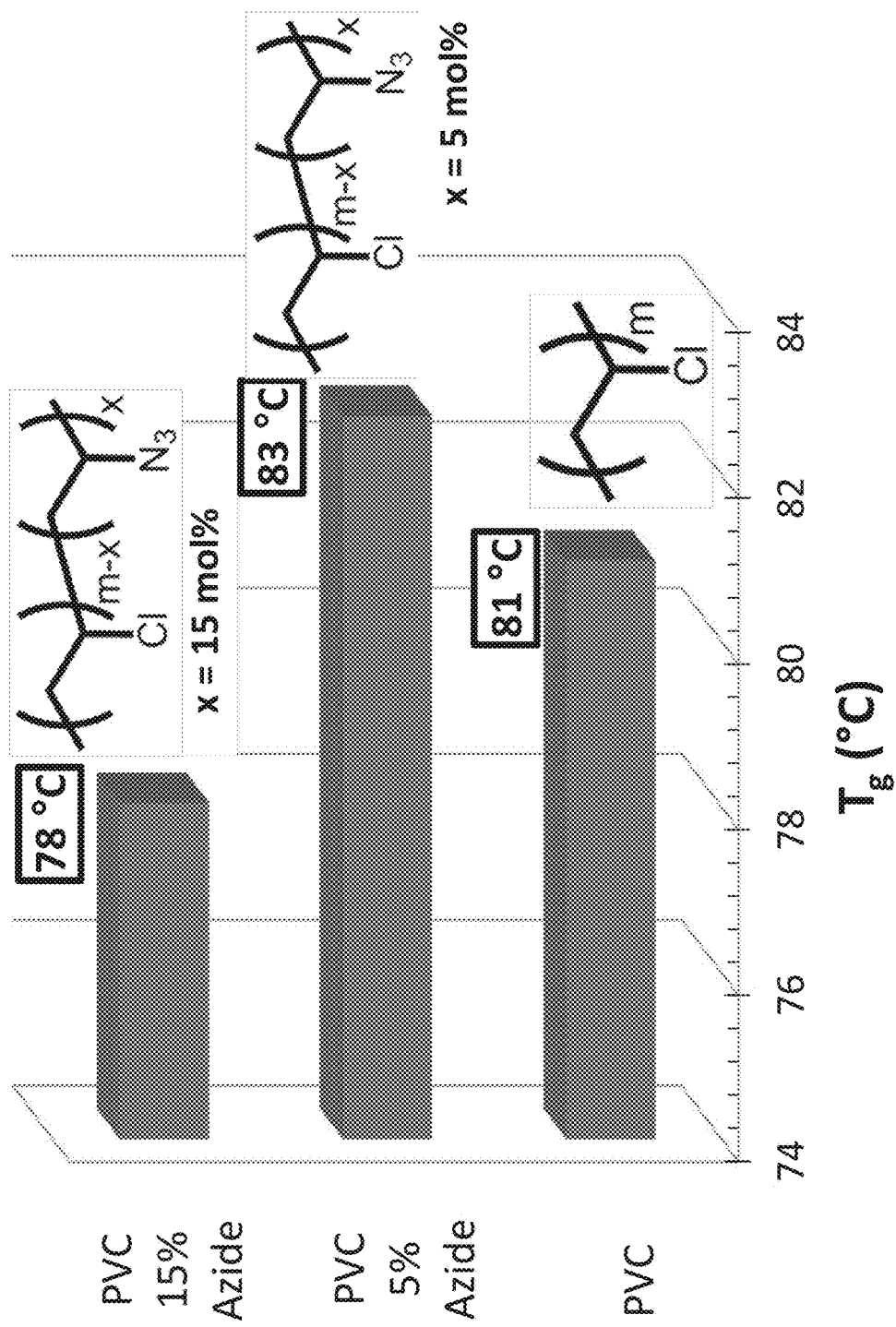
FIG. 2 shows glass transition temperatures (Tg) of polyvinyl chloride (PVC) and azide-functionalized PVCs.

FIG. 2 shows the glass transition temperature (T$_g$) for untreated PVC, PVC in which 5% of the chloride groups on the PVC backbone were replaced by azide groups with the synthesis indicated above (PVC 5% Azide), and PVC in which 15% of the chloride groups were replaced by azide groups with the synthesis indicated above (PVC 15% Azide). Structures of these polymers are shown in FIG. 2. The untreated (unmodified) PVC was found to have a T$_g$ of 81° C., the PVC 5% Azide had a T$_g$ of 83° C., and the PVC 15% Azide had a T$_g$ of 78° C.

Figure 3B:
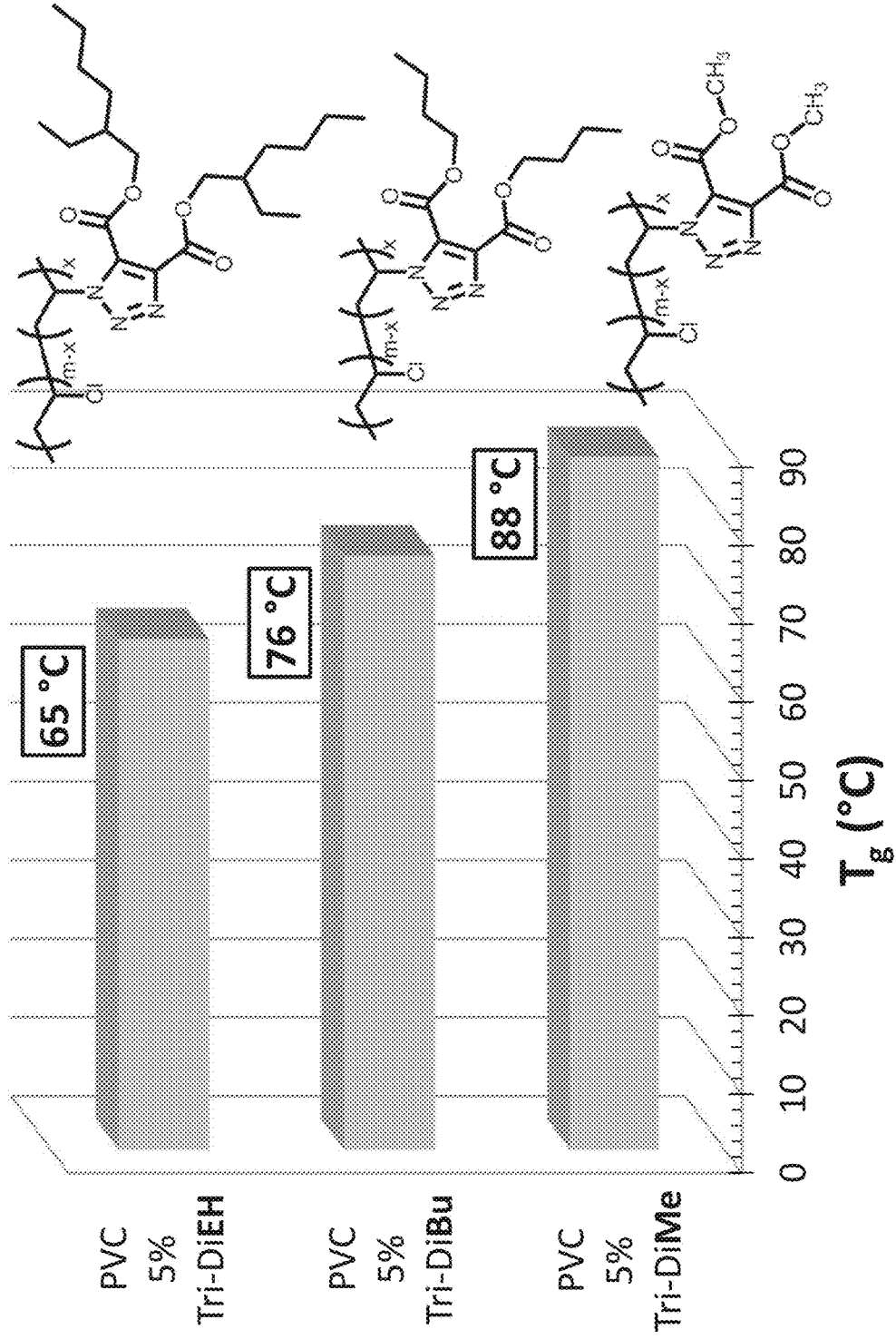
FIG. 3B shows the Tg of di(alkoxy-carbonyl) triazole functionalized internally-plasticized PVCs.

FIG. 3B shows the glass transition temperature (Tg) for PVCs in which 5% of the chloride groups were replaced with direct di-alkyloxy-carbonyl triazole groups; structures of these functionalized PVC are shown. Direct 5% di-methoxy-carbonyl triazole functionalized PVC (PVC 5% Tri-DiMe) had a Tg of 88° C., 5% di-n-butoxy-carbonyl triazole functionalized PVC (PVC 5% Tri-DiBu) had a Tg of 76° C., and 5% di-2-ethylhexyl-carbonyl triazole functionalized PVC (PVC 5% Tri-DiEH) had a Tg of 65° C. Thus, functionalization with triazole groups of greater molecular weight resulted in a greater decrease in Tg.

Figure 3C:
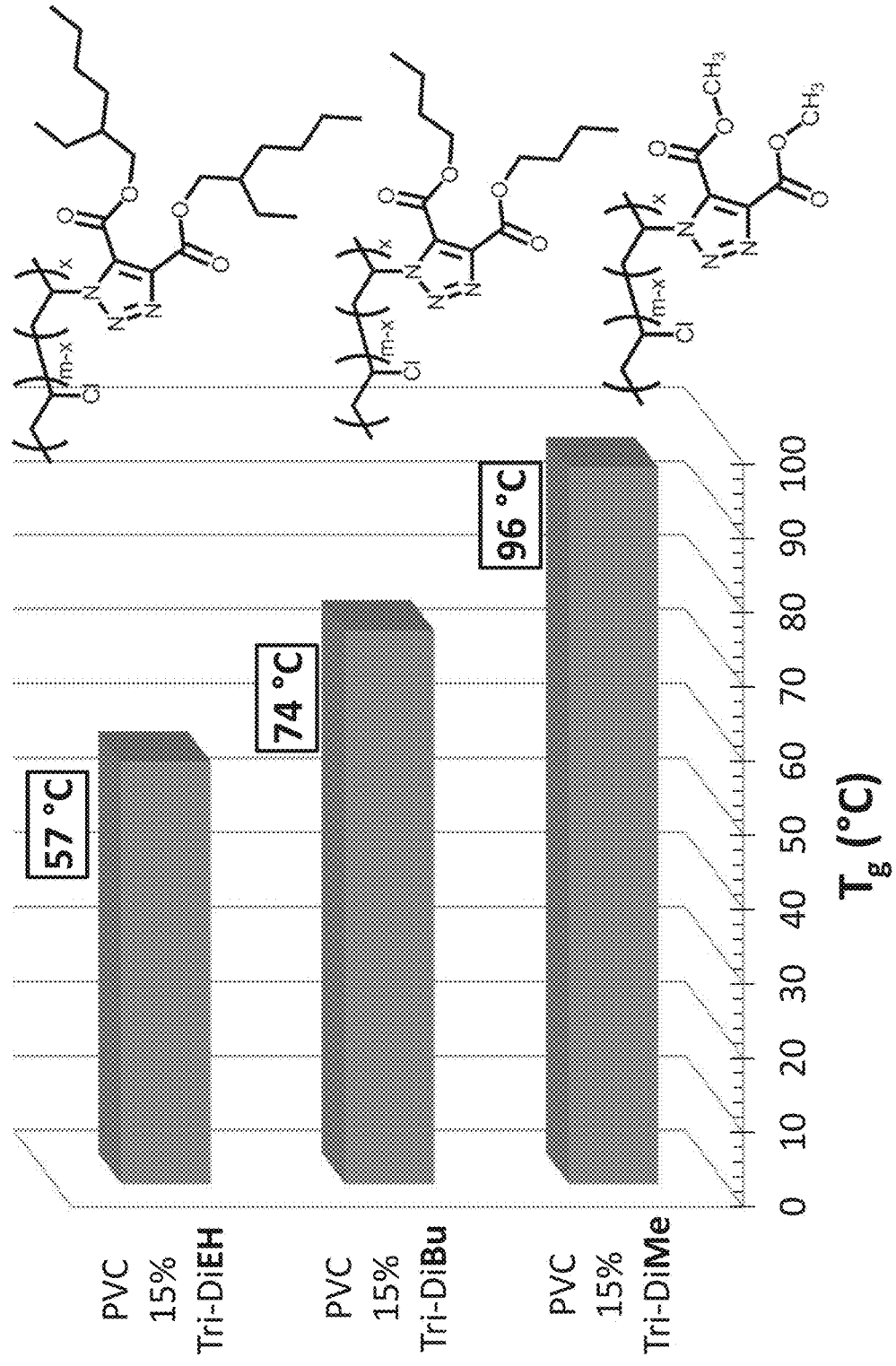
FIG. 3C shows the Tg of di(alkoxy-carbonyl) triazole functionalized internally-plasticized PVCs.

FIG. 3C shows the glass transition temperature (Tg) for PVCs in which 15% of the chloride groups were replaced with direct di-alkyloxy-carbonyl triazole groups; structures of these functionalized PVC are shown. Direct 15% di-methoxy-carbonyl triazole functionalized PVC (PVC 15% Tri-DiMe) had a Tg of 96° C., 15% di-n-butoxy-carbonyl triazole functionalized PVC (PVC 15% Tri-DiBu) had a Tg of 74° C., and 15% di-2-ethylhexyl-carbonyl triazole functionalized PVC (PVC 15% Tri-DiEH) had a Tg of 57° C. Thus, functionalization with di-alkyloxy-carbonyl triazole groups of greater molecular weight resulted in a greater decrease in Tg.

Figure 3D:
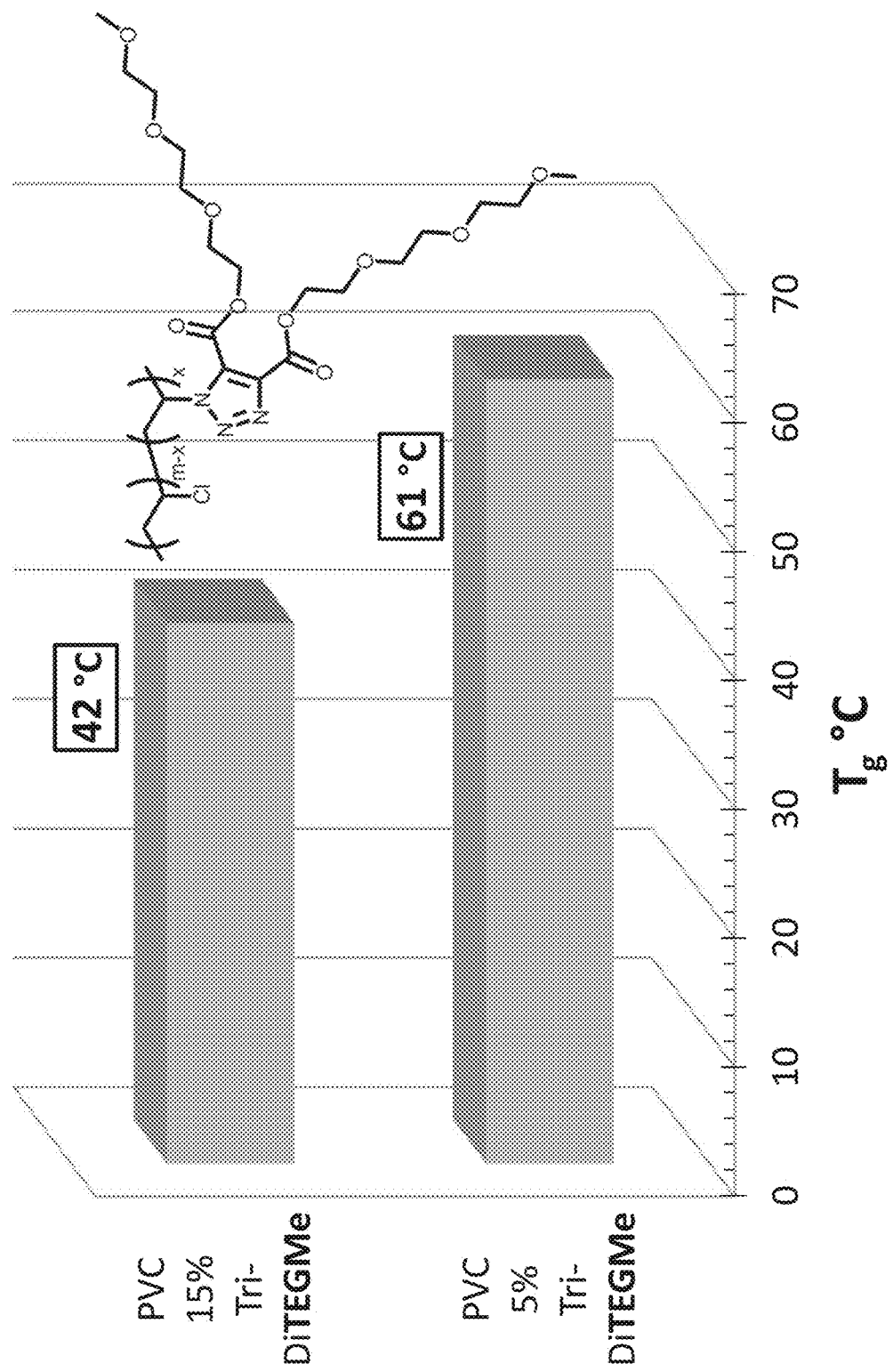
FIG. 3D shows the Tg of di(methoxy-polyether-carbonyl) triazole functionalized internally-plasticized PVCs.

FIG. 3D shows the glass transition temperature (Tg) for PVCs in which a fraction of the chloride groups were replaced with di(methoxy-triethyleneglycol-carbonyl)-triazole groups; structures of these functionalized PVC are shown. Direct 5% di(methoxy-triethyleneglycol-carbonyl)-triazole functionalized PVC (PVC 5% Tri-DiTEGMe) had a Tg of 61° C. Direct 15% di(methoxy-triethyleneglycol-carbonyl)-triazole functionalized PVC (PVC 15% Tri-DiTEGMe) had a Tg of 42° C. Thus, replacement of a greater fraction of chloride groups with di(methoxy-triethyleneglycol-carbonyl)-triazole groups resulted in a greater decrease in Tg.

Figure 3E:
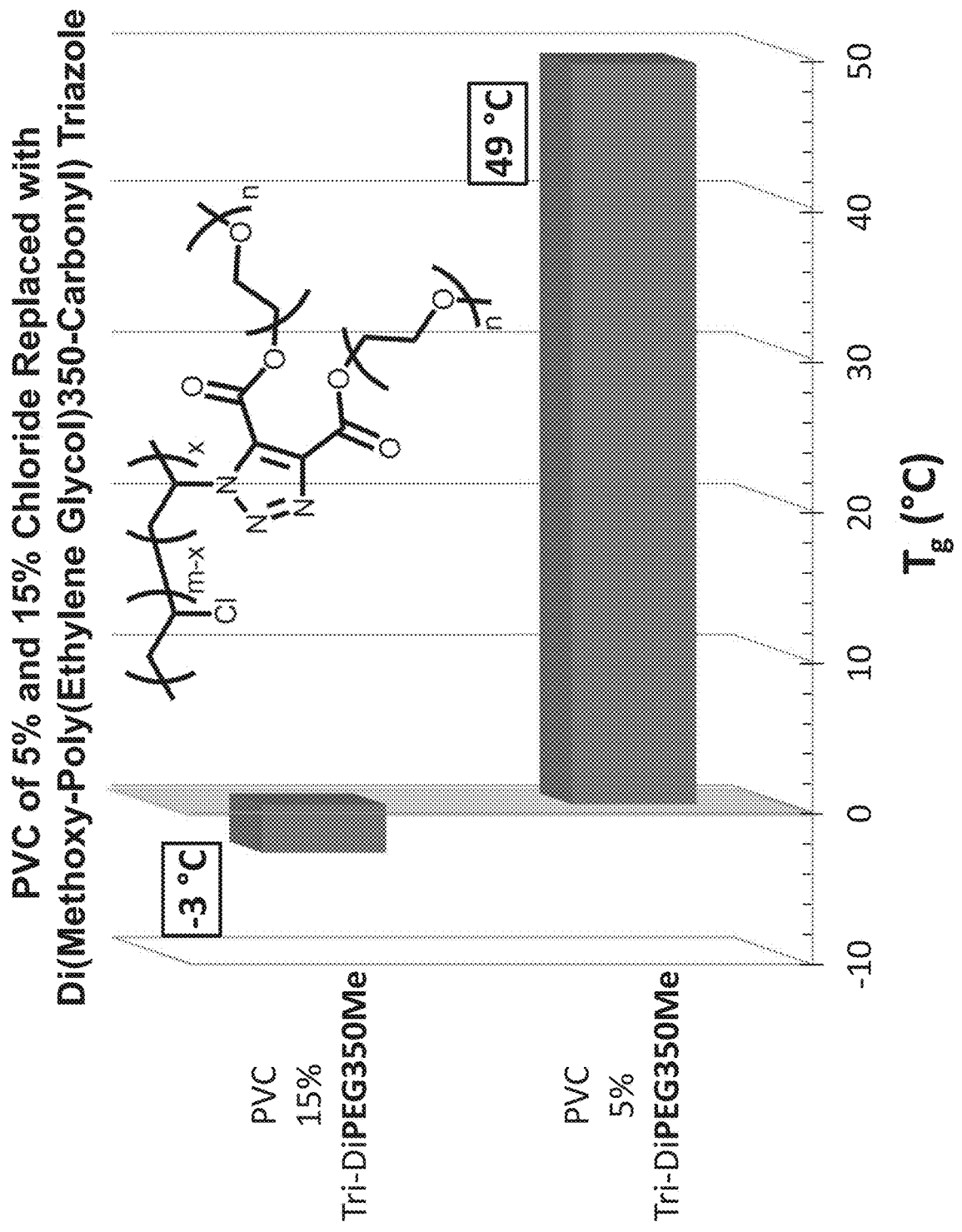
FIG. 3E shows the Tg of di(methoxy-polyether-carbonyl) triazole functionalized internally-plasticized PVCs.

FIG. 3E shows the glass transition temperature (Tg) for PVCs in which a fraction of the chloride groups were replaced with di(methoxy-poly(ethylene glycol)350-carbonyl)-triazole groups (the "350" represents the approximate molecular weight of the poly(ethylene glycol) chains, i.e., 350 g/mol, corresponding to approximately 7 to 8 ethylene glycol monomer units). Structures of these functionalized PVCs are shown. Direct 5% di(methoxy-poly(ethylene glycol)350-carbonyl)-triazole functionalized PVC (PVC 5% Tri-DiPEG350Me) had a Tg of 49° C. Direct 15% di(methoxy-poly(ethylene glycol)350-carbonyl)-triazole functionalized PVC (PVC 15% Tri-DiPEG350Me) had a Tg of −3° C. Thus, replacement of a greater fraction of chloride groups with di(methoxy-triethyleneglycol-carbonyl)-triazole groups resulted in a greater decrease in Tg.

Figure 3F:
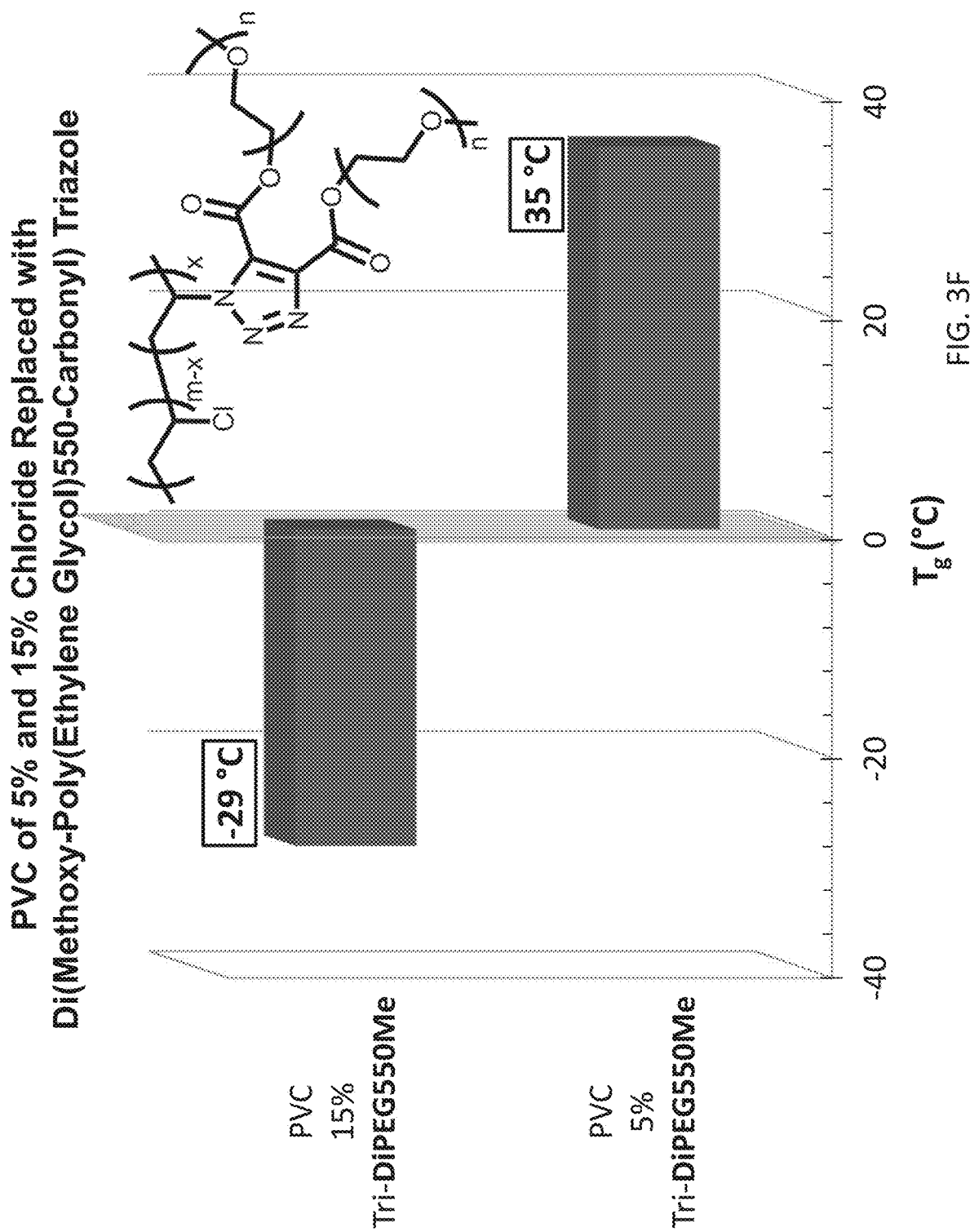
FIG. 3F shows the Tg of di(methoxy-polyether-carbonyl) triazole functionalized internally-plasticized PVCs.

FIG. 3F shows the glass transition temperature (Tg) for PVCs in which a fraction of the chloride groups were replaced with di(methoxy-poly(ethylene glycol)550-carbonyl)-triazole groups (the "550" represents the approximate molecular weight of the poly(ethylene glycol) chains, i.e., 550 g/mol, corresponding to approximately 12 ethylene glycol monomer units). Structures of these functionalized PVCs are shown. Direct 5% di(methoxy-poly(ethylene glycol)550-carbonyl)-triazole functionalized PVC (PVC 5% Tri-DiPEG550Me) had a Tg of 35° C. Direct 15% di(methoxy-poly(ethylene glycol)550-carbonyl)-triazole functionalized PVC (PVC 15% Tri-DiPEG550Me) had a Tg of −29° C. Thus, replacement of a greater fraction of chloride groups with di(methoxy-triethyleneglycol-carbonyl)-triazole groups resulted in a greater decrease in Tg. Comparison of FIGS. 3D, 3E, and 3F shows that for a given fraction of replacement of chloride groups with di(methoxy-poly(ethylene glycol)-carbonyl)-triazole groups, the triazole groups with longer pendant poly(ethylene glycol) chains resulted in a greater decrease in Tg.

Figure 4B:
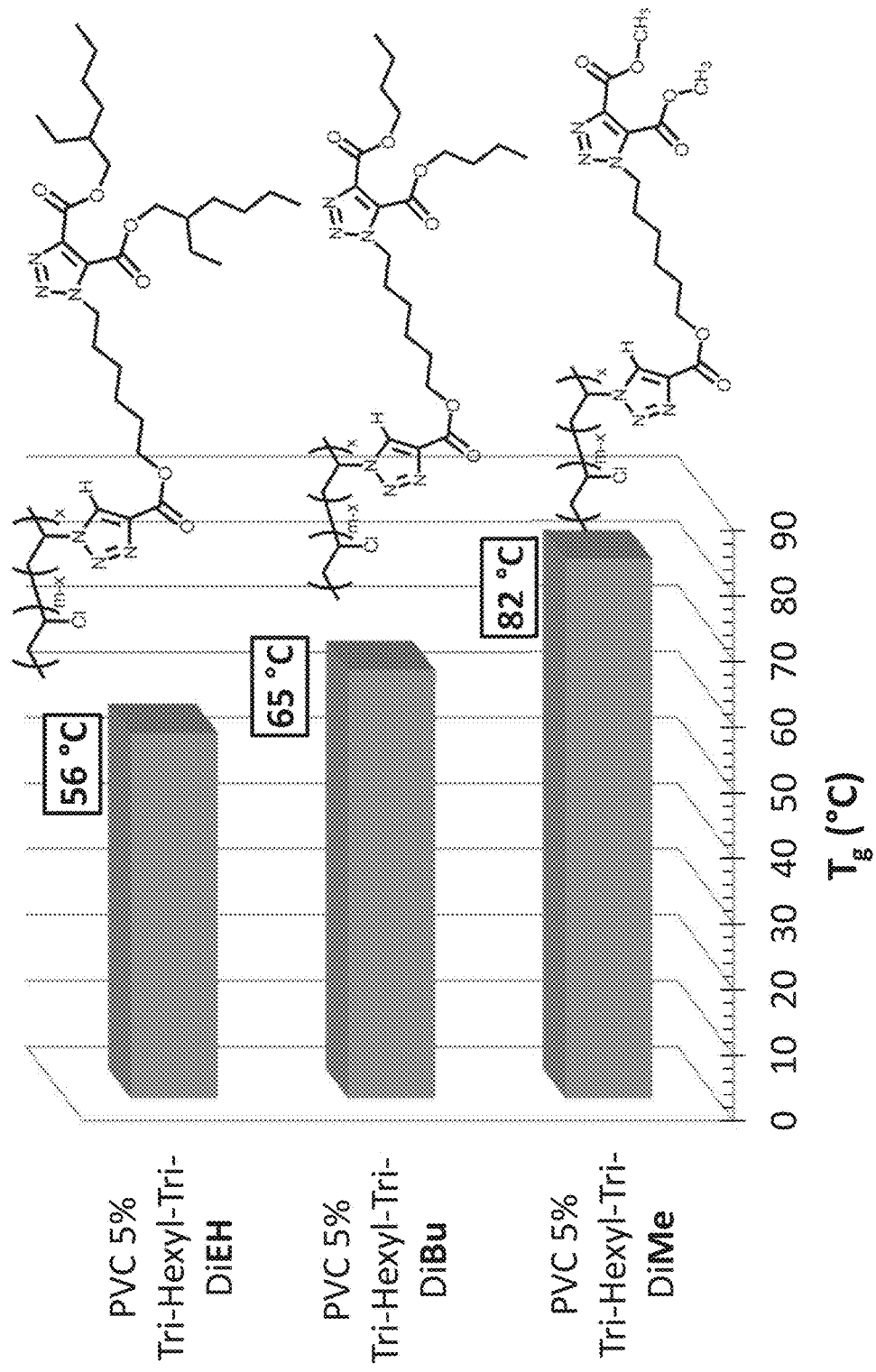
FIG. 4B shows the Tg of di(alkoxy-carbonyl) triazole hexyloxy-carbonyl triazole functionalized internally-plasticized PVCs.

FIG. 4B shows the glass transition temperature (Tg) for PVCs in which 5% of the chloride groups were replaced with dialkoxy-carbonyl triazole alkoxy-carbonyl triazole groups; structures of these functionalized PVCs are shown. 5% di(methoxycarbonyl)-triazole-hexyloxycarbonyl-triazole functionalized PVC (PVC 5% Tri-Hexyl-Tri-DiMe) had a Tg of 82° C., 5% di(butoxycarbonyl)-triazole-hexyloxycarbonyl-triazole functionalized PVC (PVC 5% Tri-Hexyl-Tri-DiBu) had a Tg of 65° C., and 5% di(2-ethylhexyloxycarbonyl)-triazole-hexyloxycarbonyl-triazole functionalized PVC (PVC 5% Tri-Hexyl-Tri-DiEH) had a Tg of 56° C. Thus, functionalization with triazole groups of greater molecular weight resulted in a greater decrease in Tg.

Figure 4C:
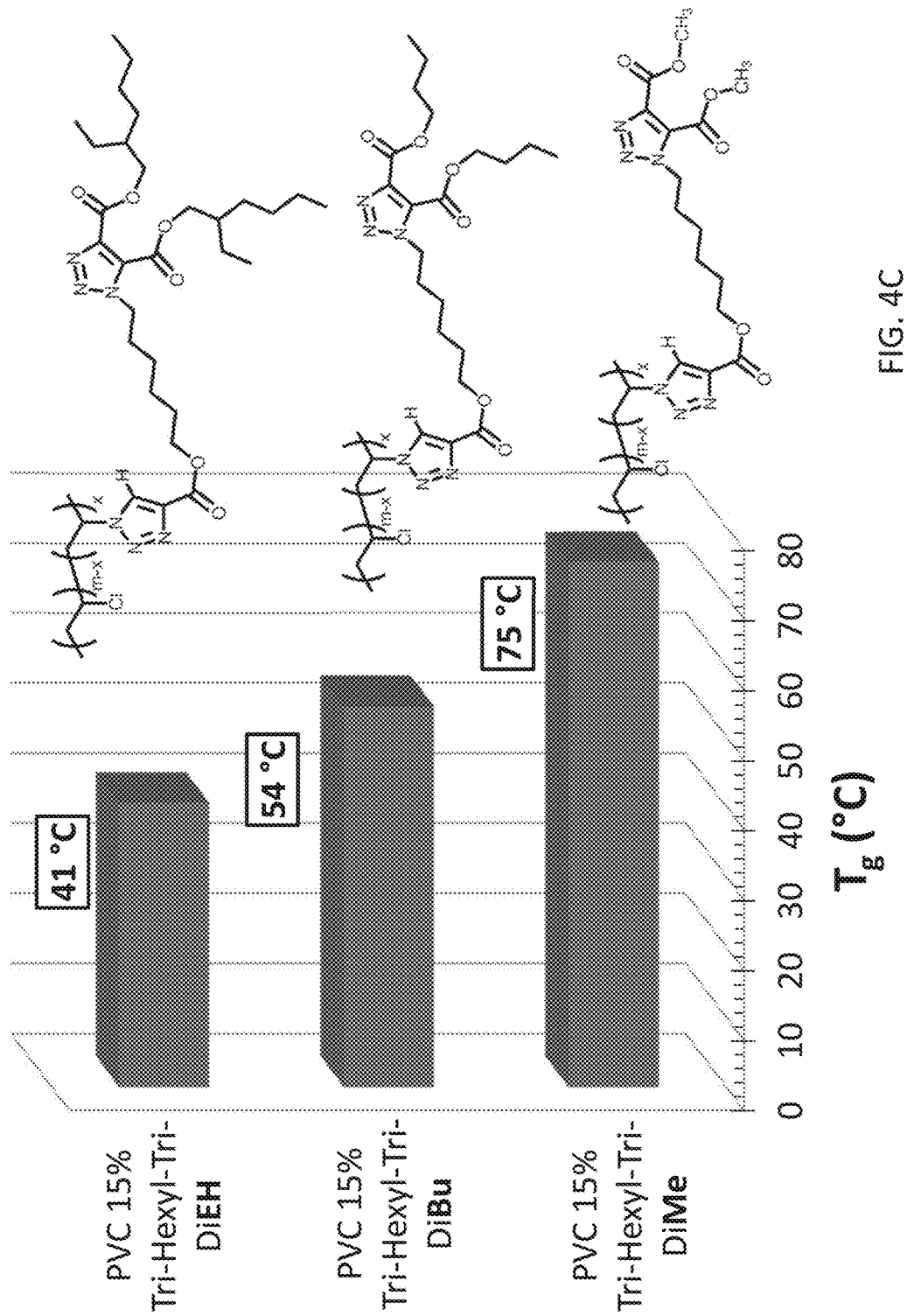
FIG. 4C shows the Tg of di(alkoxy-carbonyl) triazole hexyloxy-carbonyl triazole functionalized internally-plasticized PVCs.

FIG. 4C shows the glass transition temperature (Tg) for PVCs in which 15% of the chloride groups were replaced with dialkoxy-carbonyl triazole alkoxy-carbonyl triazole groups; structures of these functionalized PVCs are shown. 15% di(methoxycarbonyl)-triazole-hexyloxycarbonyl-triazole functionalized PVC (PVC 15% Tri-Hexyl-Tri-DiMe) had a Tg of 75° C., 15% di(butoxycarbonyl)-triazole-hexyloxycarbonyl-triazole functionalized PVC (PVC 15% Tri-Hexyl-Tri-DiBu) had a Tg of 54° C., and 15% di(2-ethylhexyloxycarbonyl)-triazole-hexyloxycarbonyl-triazole functionalized PVC (PVC 15% Tri-Hexyl-Tri-DiEH) had a Tg of 41° C. Thus, functionalization with triazole groups of greater molecular weight resulted in a greater decrease in Tg. Comparison of FIGS. 3B and 3C shows that for a given dialkoxy-carbonyl triazole alkoxy-carbonyl triazole group, a greater fraction of replacement of chloride groups on the PVC with that dialkoxy-carbonyl triazole alkoxy-carbonyl triazole group resulted in a greater decrease in Tg.

Figure 4D:
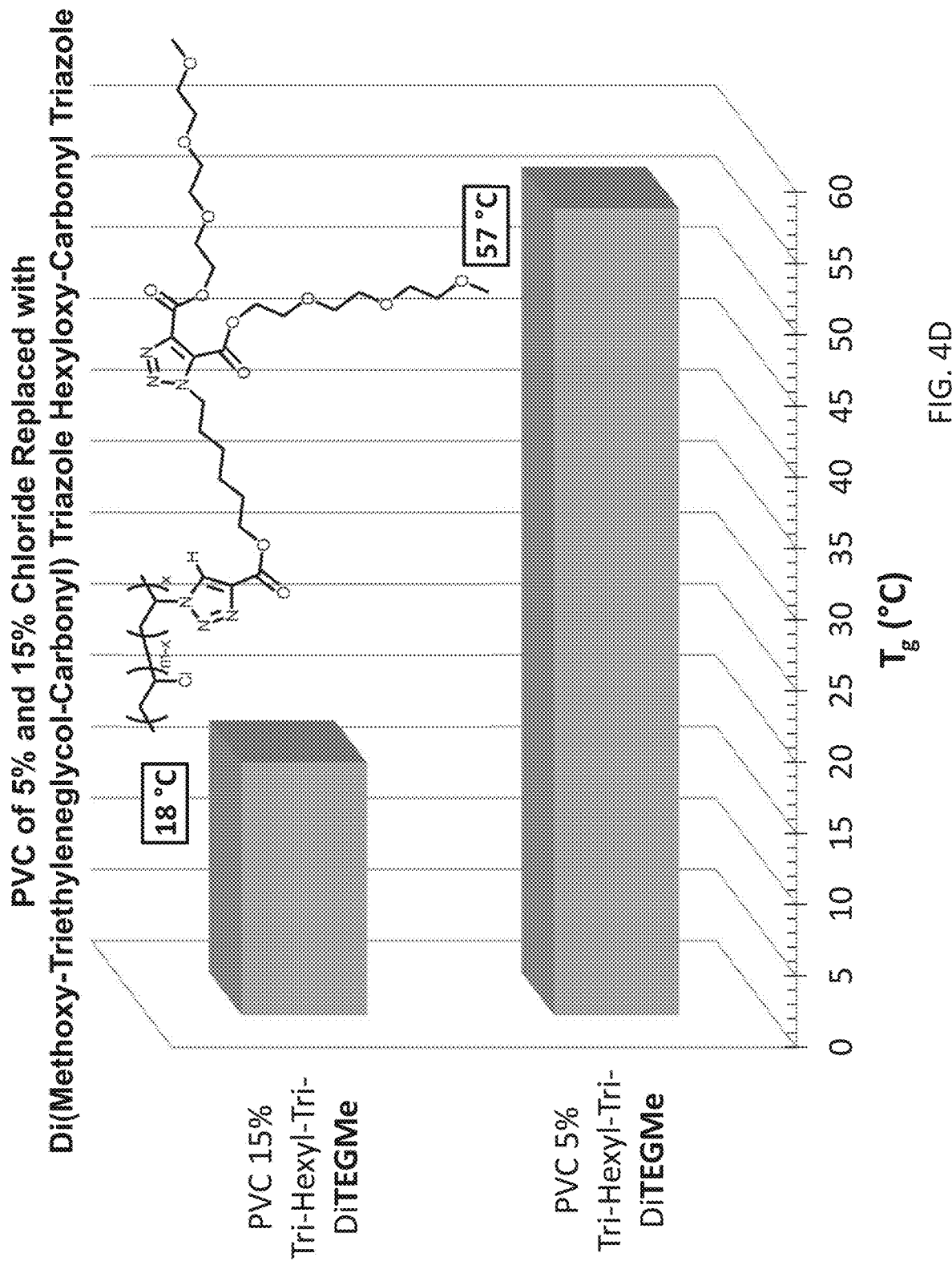
FIG. 4D shows the Tg of di(methoxy-polyether-carbonyl) triazole hexyloxy-carbonyl triazole functionalized internally-plasticized PVCs.

FIG. 4D shows the glass transition temperature (Tg) for PVCs in which a fraction of the chloride groups were replaced with di(methoxy-triethyleneglycol-carbonyl) triazole hexyloxy-carbonyl triazole groups; structures of these functionalized PVCs are shown. 5% di(methoxy-triethyleneglycol-carbonyl) triazole hexyloxy-carbonyl triazole functionalized PVC (PVC 5% Tri-Hexyl-Tri-DiTEGMe) had a Tg of 57° C. 15% di(methoxy-triethyleneglycol-carbonyl) triazole hexyloxy-carbonyl triazole functionalized PVC (PVC 15% Tri-Hexyl-Tri-DiTEGMe) had a Tg of 18° C. Thus, replacement of a greater fraction of chloride groups with di(methoxy-triethyleneglycol-carbonyl) triazole hexyloxy-carbonyl triazole groups resulted in a greater decrease in Tg.

Figure 4E:
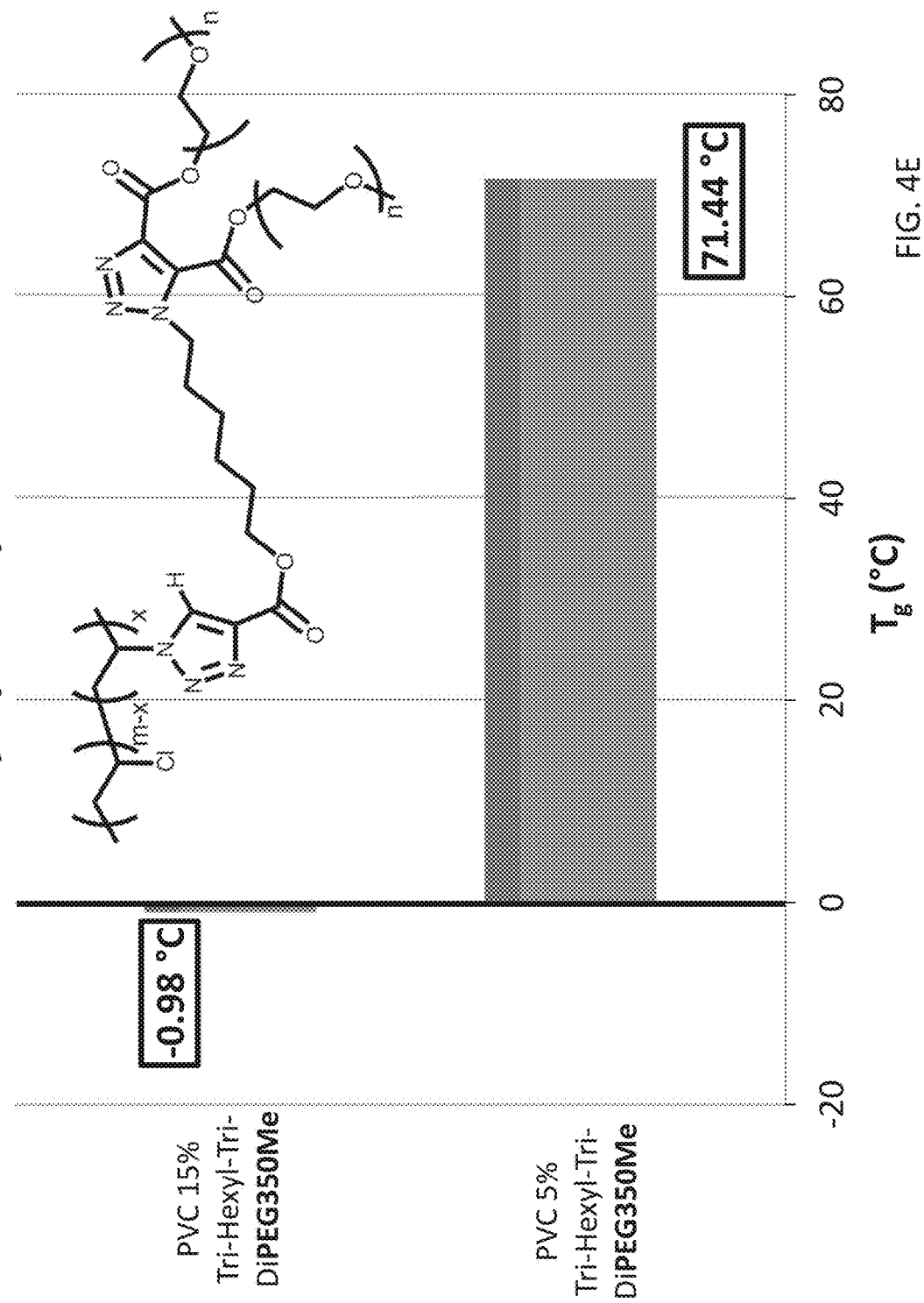
FIG. 4E shows the Tg of di(methoxy-polyether-carbonyl) triazole hexyloxy-carbonyl triazole functionalized internally-plasticized PVCs.

FIG. 4E shows the glass transition temperature (Tg) for PVCs in which a fraction of the chloride groups were replaced with di(methoxy-poly(ethylene glycol)350-carbonyl) triazole hexyloxy-carbonyl triazole groups; structures of these functionalized PVCs are shown. 5% di(methoxy-poly(ethylene glycol)350-carbonyl) triazole hexyloxy-carbonyl triazole functionalized PVC (PVC 5% Tri-Hexyl-Tri-DiPEG350Me) had a Tg of 71° C. 15% di(methoxy-poly (ethylene glycol)350-carbonyl) triazole hexyloxy-carbonyl triazole functionalized PVC (PVC 15% Tri-Hexyl-Tri-DiPEG350Me) had a Tg of −1° C. Thus, replacement of a greater fraction of chloride groups with di(methoxy-poly (ethylene glycol)350-carbonyl) triazole hexyloxy-carbonyl triazole groups resulted in a greater decrease in Tg.

Figure 5B:
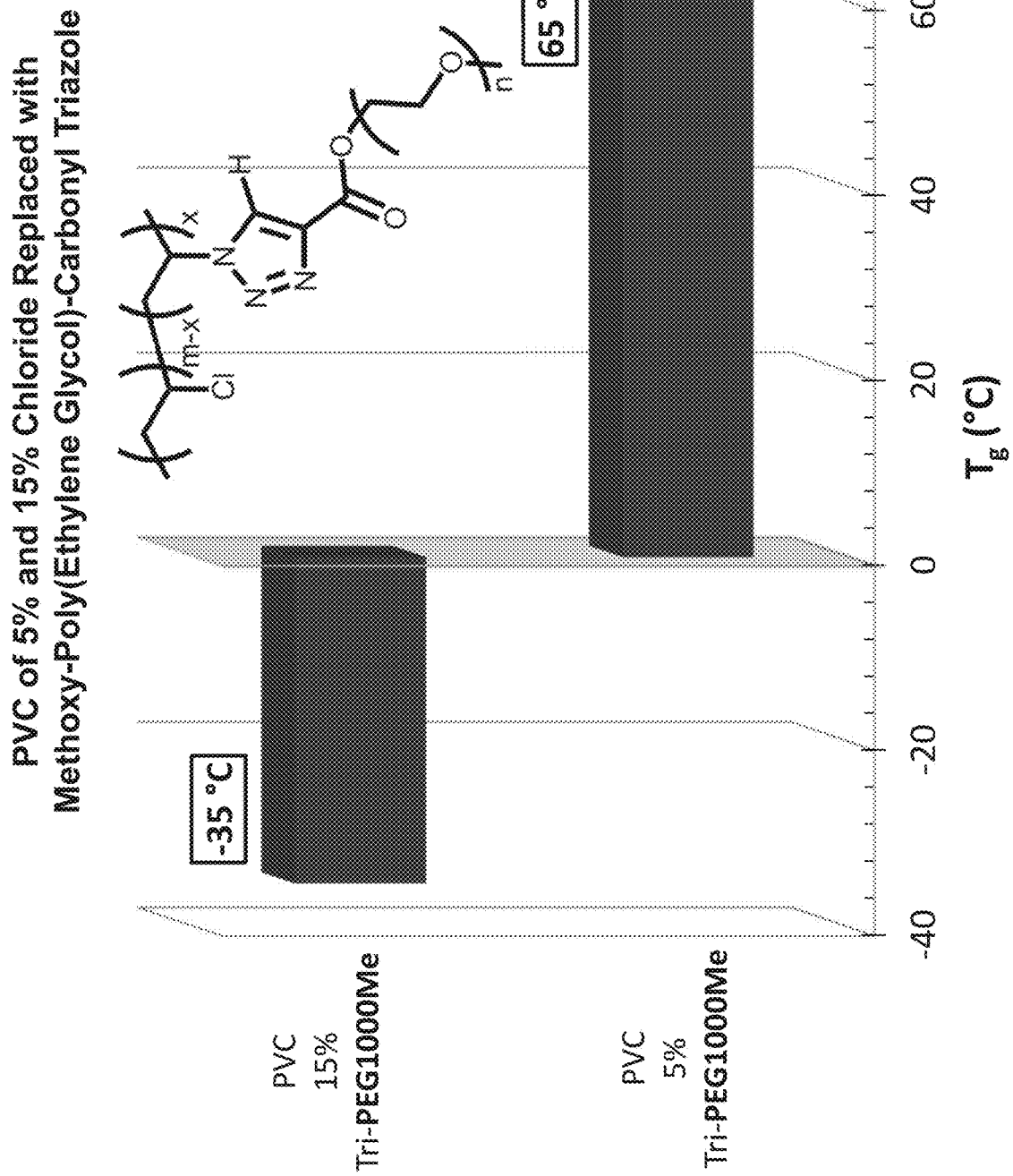
FIG. 5B shows the Tg of methoxy-polyether-carbonyl triazole functionalized internally-plasticized PVCs.
Figure 5C:
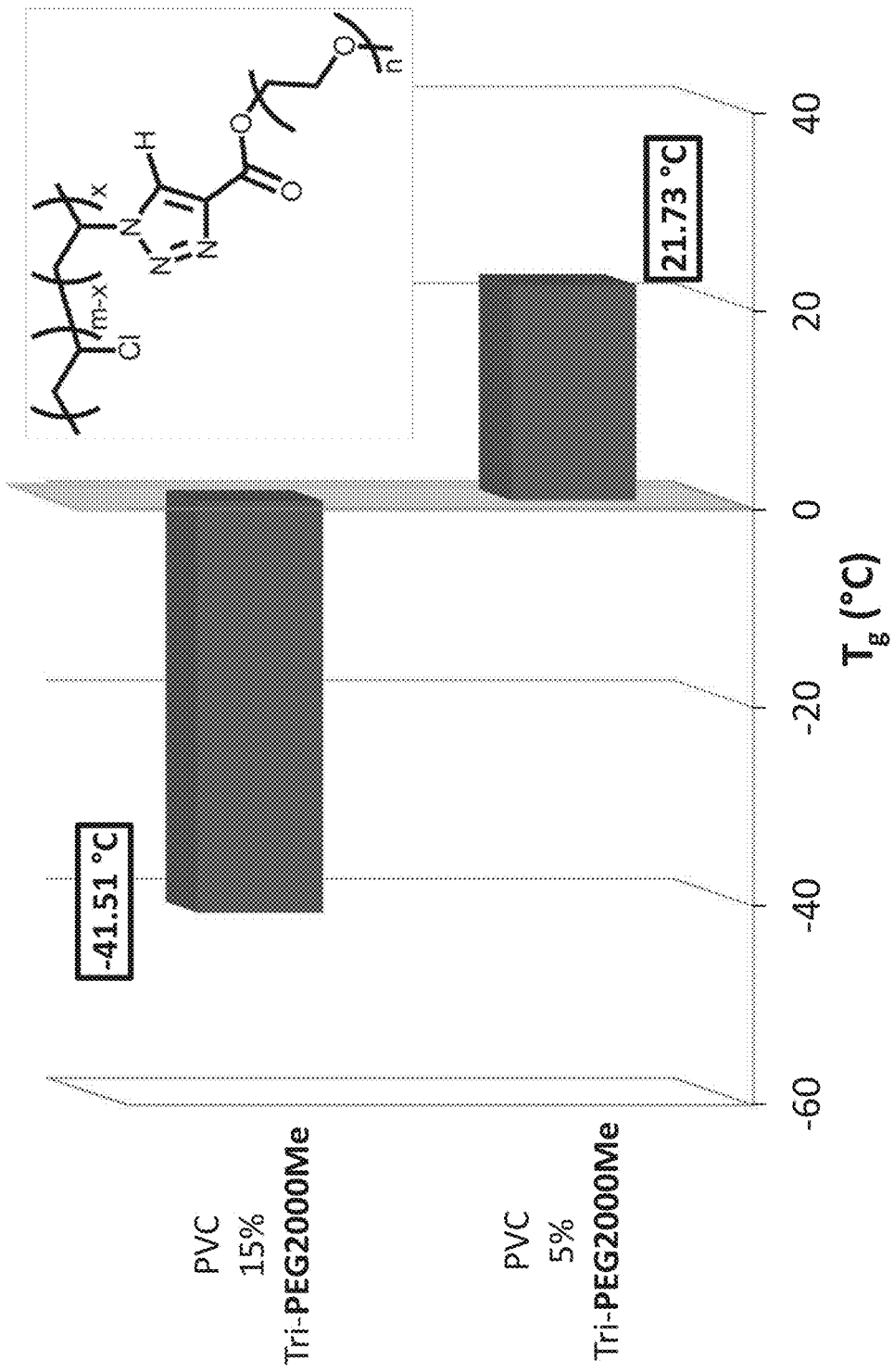
FIG. 5C shows the Tg of methoxy-polyether-carbonyl triazole functionalized internally-plasticized PVCs.

FIG. 5B shows the glass transition temperature (Tg) for PVCs in which a fraction of the chloride groups were replaced with direct methoxy-poly(ethylene glycol)1000-carbonyl triazole groups (the "1000" represents the approximate molecular weight of the poly(ethylene glycol) chain, i.e., 1000 g/mol, corresponding to approximately 22 ethylene glycol monomer units). A structure for these functionalized PVCs is shown. Direct 5% methoxy-poly(ethylene glycol)1000-carbonyl triazole functionalized PVC (PVC 5% Tri-PEG1000Me) had a Tg of 65° C. Direct 15% methoxy-poly(ethylene glycol)1000-carbonyl triazole functionalized PVC (PVC 15% Tri-PEG1000Me) had a Tg of −35° C. Thus, replacement of a greater fraction of chloride groups with methoxy-poly(ethylene glycol)1000-carbonyl triazole groups resulted in a greater decrease in Tg.

FIG. 5C shows the glass transition temperature (Tg) for PVCs in which a fraction of the chloride groups were replaced with direct methoxy-poly(ethylene glycol)2000-carbonyl triazole groups (the "2000" represents the approximate molecular weight of the poly(ethylene glycol) chain, i.e., 2000 g/mol, corresponding to approximately 44-45 ethylene glycol monomer units). A structure for these functionalized PVCs is shown. Direct 5% methoxy-poly(ethylene glycol)2000-carbonyl triazole functionalized PVC (PVC 5% Tri-PEG2000Me) had a Tg of 22° C. Direct 15% methoxy-poly(ethylene glycol)2000-carbonyl triazole functionalized PVC (PVC 15% Tri-PEG2000Me) had a Tg of −42° C. Thus, replacement of a greater fraction of chloride groups with methoxy-poly(ethylene glycol)2000-carbonyl triazole groups resulted in a greater decrease in Tg. Comparison of FIGS. 5B and 5C shows that for a given fraction of replacement of chloride groups with di(methoxy-poly (ethylene glycol)-carbonyl)-triazole groups, the triazole groups with longer pendant poly(ethylene glycol) chains resulted in a greater decrease in Tg.

Figure 6B:
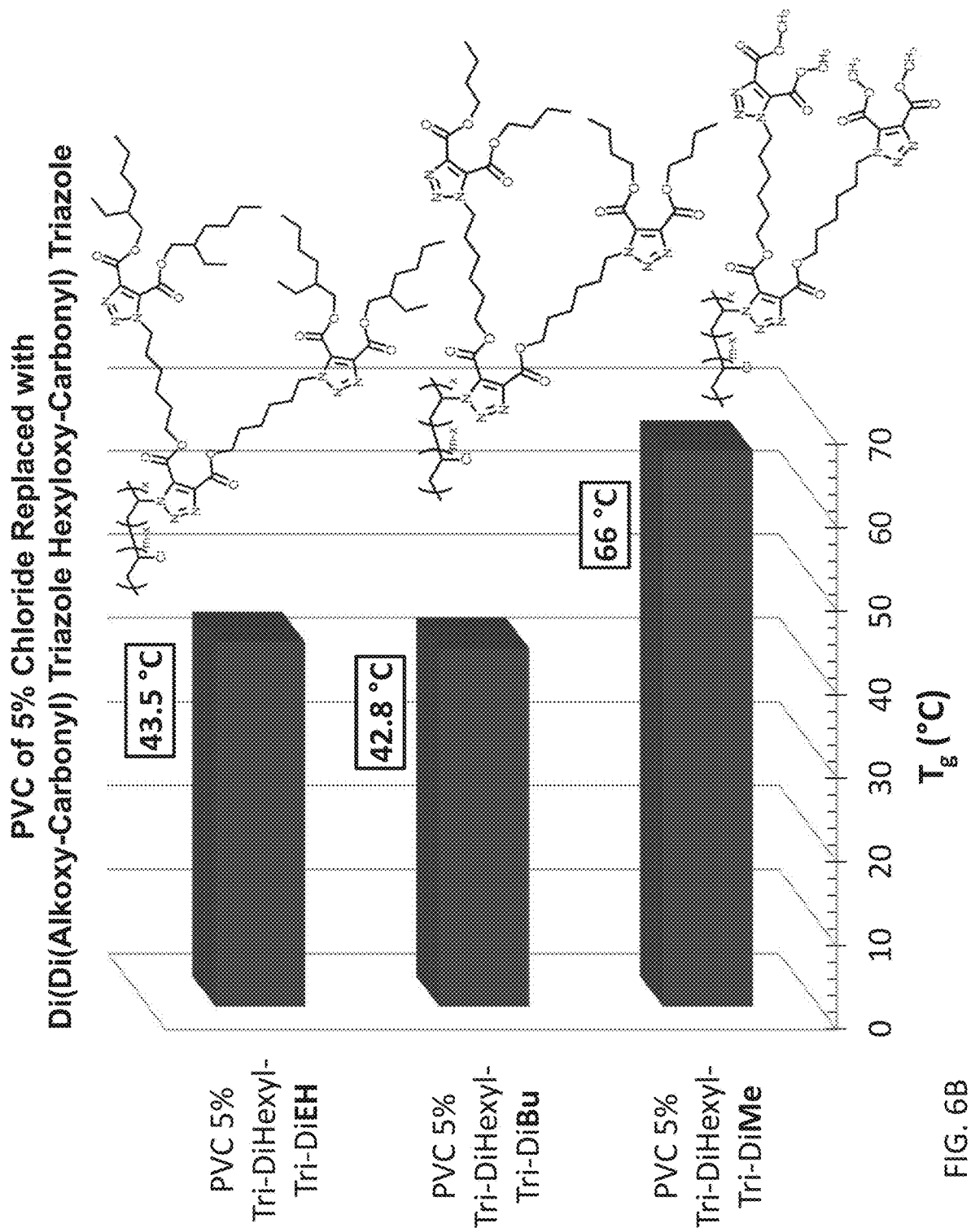
FIG. 6B shows the Tg of di(di(alkoxy-carbonyl) triazole hexyloxy-carbonyl) triazole functionalized internally-plasticized PVCs.

FIG. 6B shows the glass transition temperature (Tg) for PVCs in which 5% of the chloride groups were replaced with di(dialkyloxy-carbonyl triazole alkyloxy-carbonyl) triazole groups. Structures for these functionalized PVCs are shown. 5% Di(di(methoxycarbonyl)-triazole-hexyloxycarbonyl) triazole functionalized PVC (PVC 5% Tri-DiHexyl-Tri-DiMe) had a Tg of 66° C. 5% Di(di(n-butoxycarbonyl)-triazole-hexyloxycarbonyl) triazole functionalized PVC (PVC 5% Tri-DiHexyl-Tri-DiBu) had a Tg of 43° C. 5% Di(di(2-ethylhexyloxycarbonyl)-triazole-hexyloxycarbonyl) triazole functionalized PVC (PVC 5% Tri-DiHexyl-Tri-DiEH) had a Tg of 44° C.

Figure 6C:
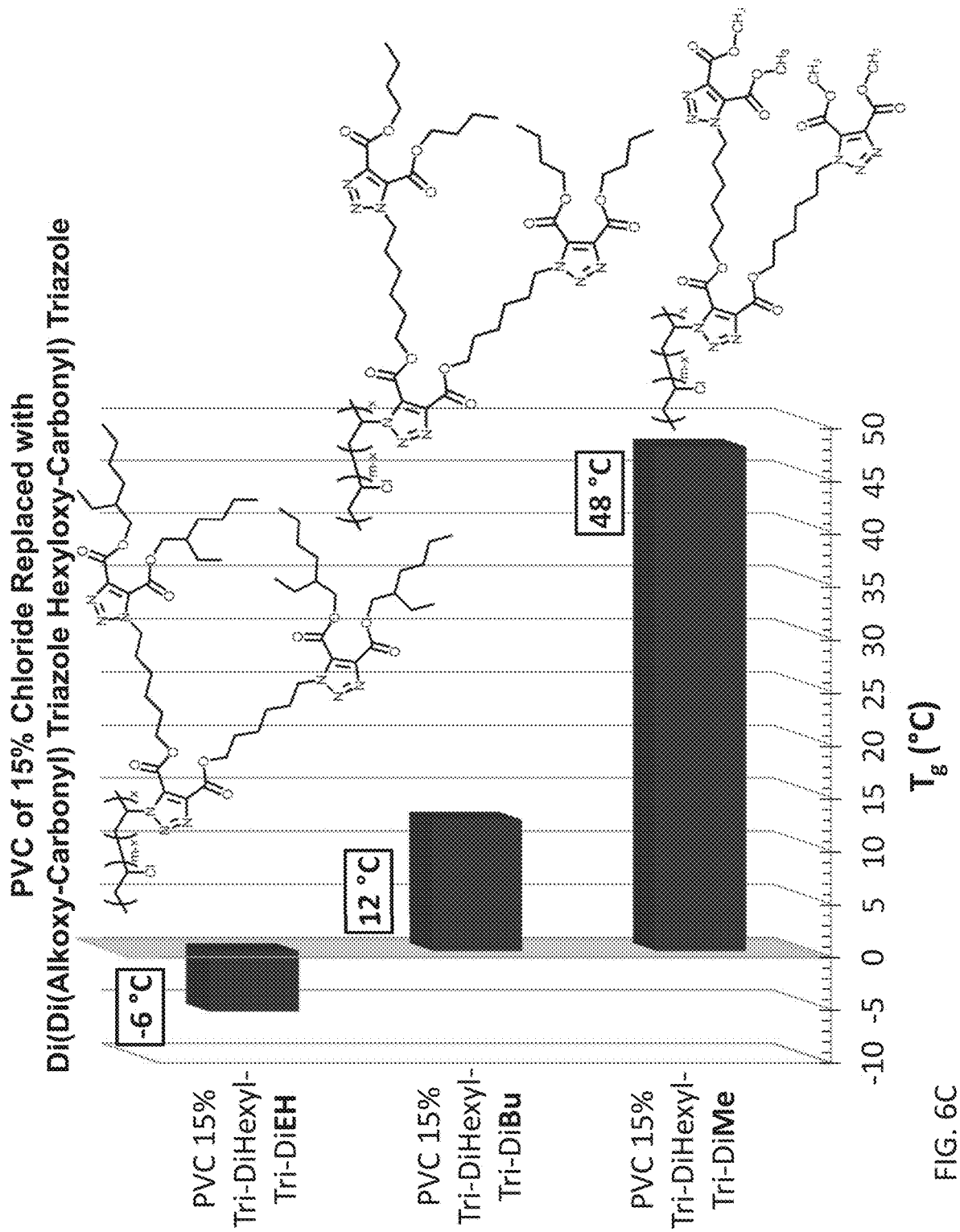
FIG. 6C shows the Tg of di(di(alkoxy-carbonyl) triazole hexyloxy-carbonyl) triazole functionalized internally-plasticized PVCs.

FIG. 6C shows the glass transition temperature (Tg) for PVCs in which 15% of the chloride groups were replaced with di(dialkyloxy-carbonyl triazole alkyloxy-carbonyl) triazole groups. Structures for these functionalized PVCs are shown. 15% Di(di(methoxycarbonyl)-triazole-hexyloxycarbonyl) triazole functionalized PVC (PVC 15% Tri-DiHexyl-Tri-DiMe) had a Tg of 48° C. 15% Di(di(n-butoxycarbonyl)-triazole-hexyloxycarbonyl) triazole functionalized PVC (PVC 15% Tri-DiHexyl-Tri-DiBu) had a Tg of 12° C. 15% Di(di(2-ethylhexyloxycarbonyl)-triazole-hexyloxycarbonyl) triazole functionalized PVC (PVC 15% Tri-DiHexyl-Tri-DiEH) had a Tg of −6° C. Thus, functionalization with di(dialkyloxy-carbonyl triazole alkyloxy-carbonyl) triazole groups of greater molecular weight resulted in a greater decrease in Tg. Comparison of FIGS. 6B and 6C shows that for a given di(di(alkoxy-carbonyl) triazole alkoxy-carbonyl) triazole group, a greater fraction of replacement of chloride groups on the PVC with that di(di(alkoxy-carbonyl) triazole alkyloxy-carbonyl) triazole group resulted in a greater decrease in Tg.

Figure 6D:
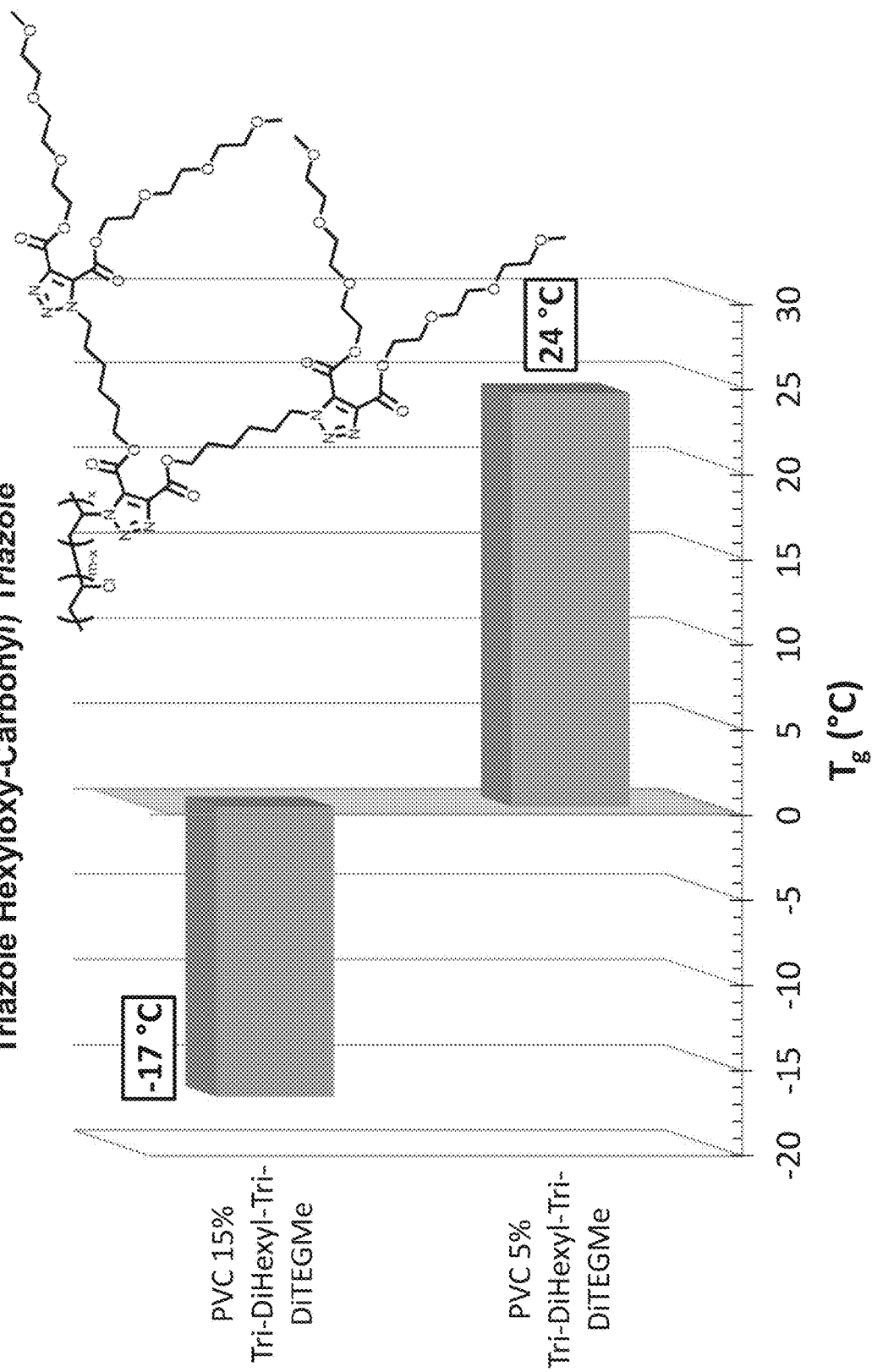
FIG. 6D shows the Tg of di(di(methoxy-triethyleneglycol-carbonyl) triazole hexyloxy-carbonyl) triazole functionalized internally-plasticized PVCs.

FIG. 6D shows the glass transition temperature (Tg) for PVCs in which a fraction of the chloride groups was replaced with Di(di(methoxy-triethylene glycol-carbonyl) triazole) hexyloxy-carbonyl triazole groups. A structure for these functionalized PVCs is shown. 5% Di(di(methoxy-triethylene glycol-carbonyl) triazole) hexyloxy-carbonyl triazole functionalized PVC (PVC 5% Tri-DiHexyl-Tri-DiTEGMe) had a Tg of 24° C. 15% Di(di(methoxy-triethylene glycol-carbonyl) triazole) hexyloxy-carbonyl triazole functionalized PVC (PVC 15% Tri-DiHexyl-Tri-DiTEGMe) had a Tg of −17° C. Thus, replacement of a greater fraction of chloride groups with Di(di(methoxy-triethylene glycol-carbonyl) triazole) hexyloxy-carbonyl triazole groups resulted in a greater decrease in Tg.

Figure 7:
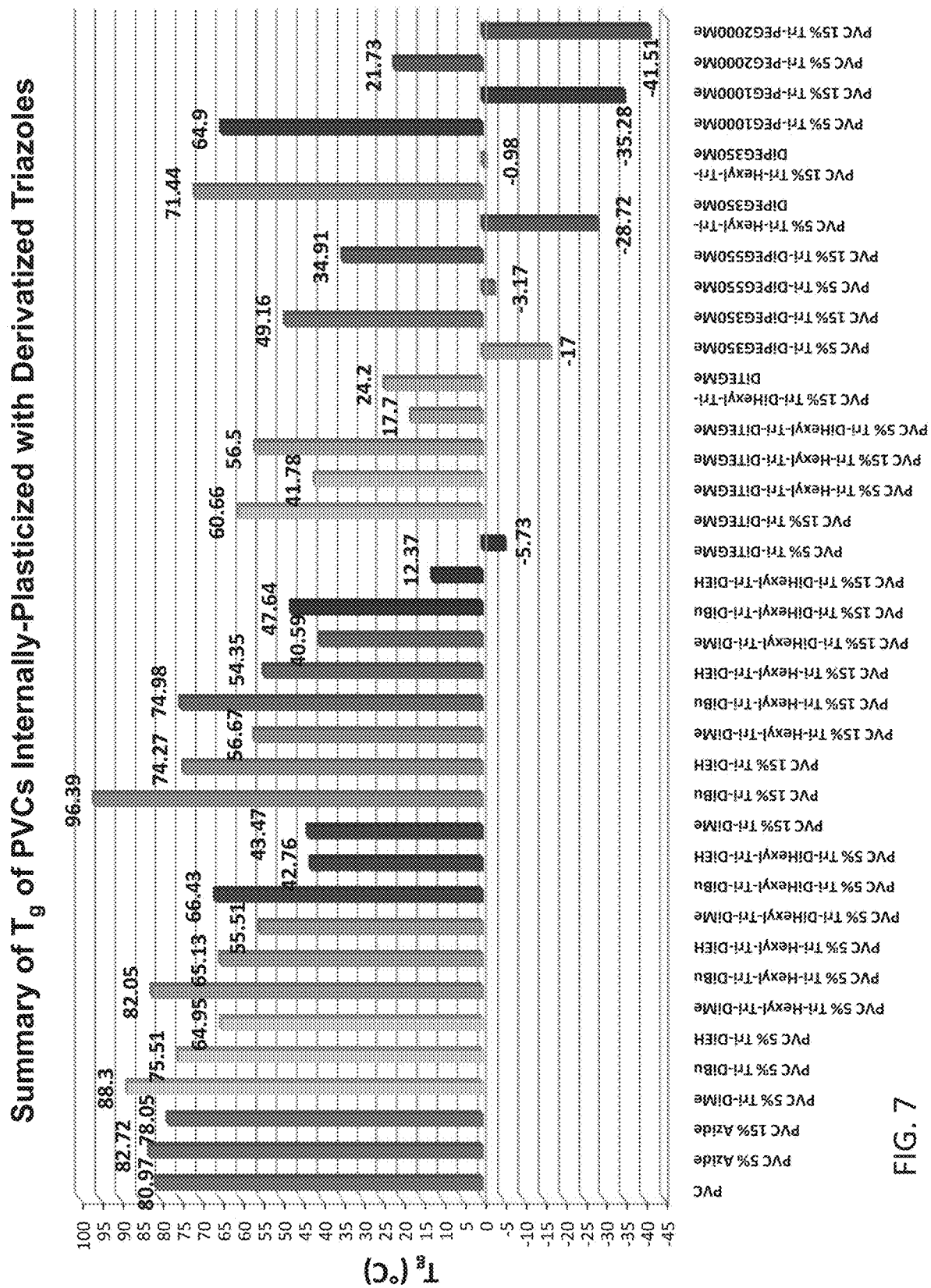
FIG. 7 shows a bar graph summarizing the glass transition temperatures (Tg) measured for poly(vinyl chloride) (PVC), PVC Azides, and the derivatized triazole functionalized PVCs synthesized.

A bar graph summarizing the glass transition temperatures (Tg) measured for poly(vinyl chloride) (PVC), PVC Azides, and the derivatized triazole functionalized PVCs synthesized is shown in FIG. 7.

Figure 8:
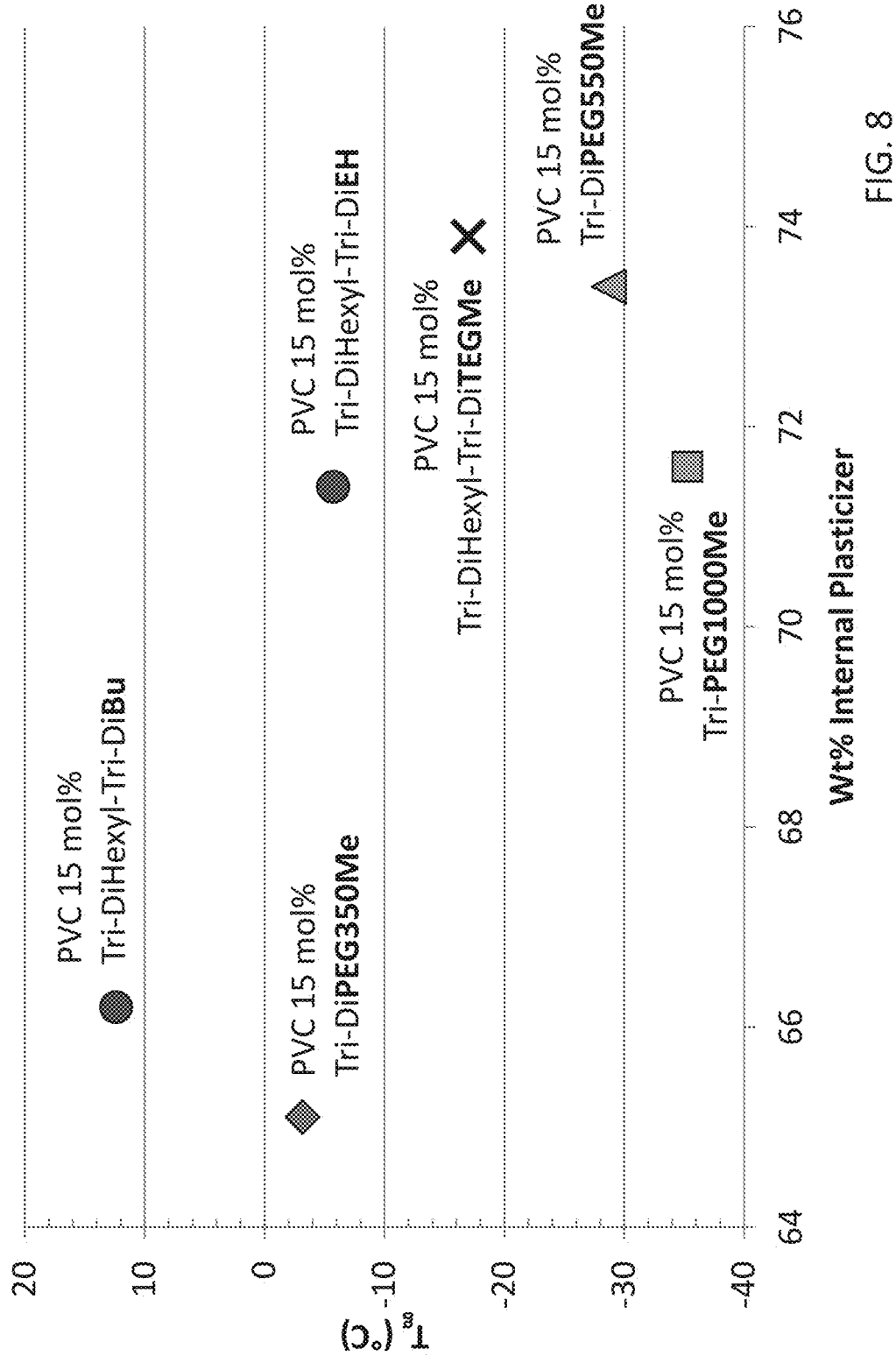
FIG. 8 shows a graph of the Tg measured for a functionalized PVC as a function of the total weight percentage (wt %) of the internal plasticizer in that functionalized PVC for several functionalized PVCs synthesized.

A graph showing the Tg measured for a functionalized PVC as a function of the total weight percentage (wt %) of the internal plasticizer in that functionalized PVC for several functionalized PVCs synthesized is shown in FIG. 8. The functionalized PVCs for which the data are shown each had 15 mol % (i.e., 0.15 mole fraction) of the chloride groups replaced by derivatized triazoles. The total weight percentage of the internal plasticizer differs for the various functionalized PVCs, because the molecular weight of the derivatized triazoles differs.

Data are shown for two functionalized PVCs in which the exterior chains were alkoxy: PVC with 15% di(di(n-butoxy-carbonyl)-triazole-hexyloxycarbonyl)triazole groups (PVC 15% Tri-DiHexyl-Tri-DiBu); and PVC with 15% di(di(2-ethylhexyloxycarbonyl)-triazole-hexyloxycarbonyl)triazole groups (PVC 15% Tri-DiHexyl-Tri-DiEH).

Data are shown for four functionalized PVCs in which the exterior chains were methoxy-poly(ethylene oxide): PVC with 15% methoxy-poly(ethylene glycol)1000-carbonyl triazole groups (PVC 15% Tri-PEG1000Me); PVC with 15% di(methoxy-poly(ethylene glycol)350-carbonyl)-triazole groups (PVC 15% Tri-DiPEG350Me); PVC with 15% di(methoxy-poly(ethylene glycol)550-carbonyl)-triazole groups (PVC 15% Tri-DiPEG550Me); and PVC with 15% di(di(methoxy-triethyleneglycol-carbonyl)-triazole-hexyloxy-carbonyl) triazole groups (PVC 15% Tri-DiHexyl-Tri-DiTEGMe).

For a similar total weight percentage of internal plasticizer, about 65 wt % to about 66 wt %, the PVC 15% Tri-DiPEG350Me had a substantially lower glass transition temperature ($T_g$) than did the PVC 15% Tri-DiHexyl-Tri-DiBu. For a similar total weight percentage of internal plasticizer, about 71 wt % to about 72 wt %, the PVC 15% Tri-PEG1000Me had a substantially lower $T_g$ than did the PVC 15% Tri-DiHexyl-Tri-DiEH. Thus, for both of these compared pairs, the functionalized PVC having methoxy-polyether external chains had a substantially lower $T_g$ than did the functionalized PVC having alkoxy external chains at a similar total weight percentage of internal plasticizer.

Further General Aspects of the Invention

Aspect 1. A polymer of a polyvinylchloride (PVC) backbone comprising the structure

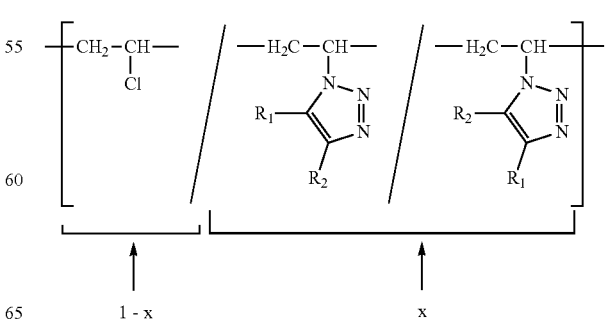

wherein $R_1$ comprises

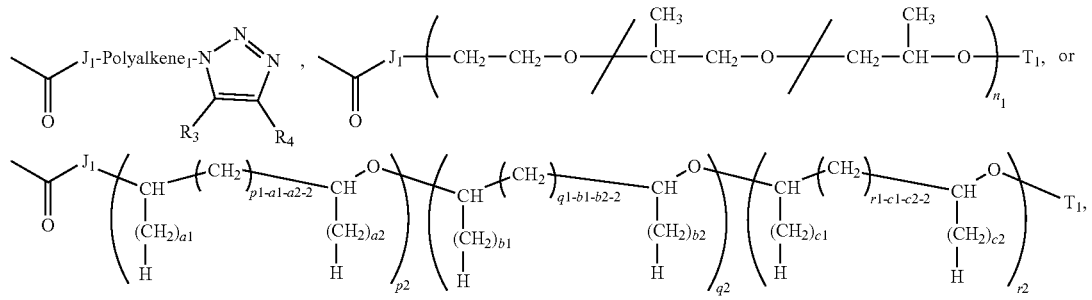

wherein $R_3$ is hydrogen (H),

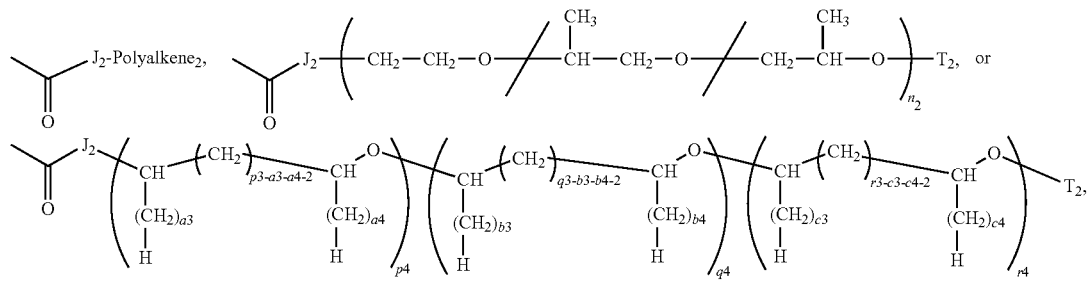

wherein $R_4$ is hydrogen (H),

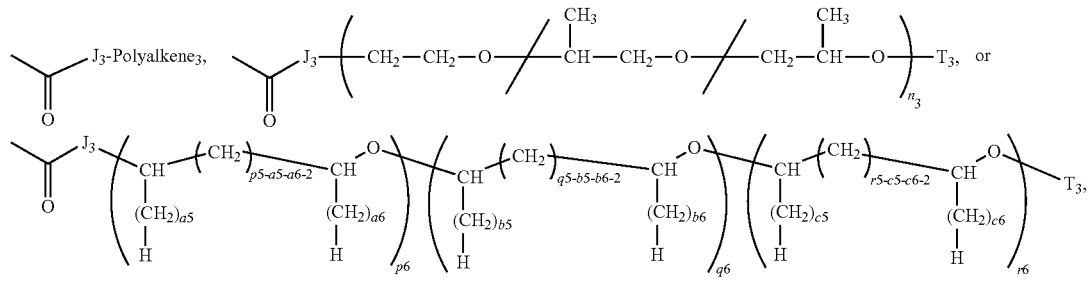

wherein $J_1$, $J_2$, and $J_3$ are each independently selected as oxygen (O) or NH, wherein $T_1$, $T_2$, and $T_3$ are each independently selected from the group consisting of hydrogen (H), methyl ($CH_3$), a linear or branched polyalkene of from 2 to 40 carbons, an acetyl ((C=O)$CH_3$), and a carbonyl (C=O) bound to a linear or branched polyalkene of from 2 to 40 carbons, wherein $n_1$, $n_2$, and $n_3$ are each independently selected as an integer that is at least 1, wherein Polyalkene$_1$ is methylene ($CH_2$) or a linear or branched polyalkene of from 2 to 40 carbons, wherein Polyalkene$_2$ and Polyalkene$_3$ are each independently selected from methyl ($CH_3$) or a linear or branched polyalkene of from 2 to 40 carbons, wherein $p_1$, $q_1$, and $r_1$ are each independently selected as 2, 3, or 4, wherein when $p_1$ is 2 or 4, then $a_1$ and $a_2$ are each 0, wherein when $p_1$ is 3, then $a_1$ and $a_2$ are each 0, or $a_1$ is 1 and $a_2$ is 0, or $a_1$ is 0 and $a_2$ is 1, wherein when $q_1$ is 2 or 4, then $b_1$ and $b_2$ are each 0, wherein when $q_1$ is 3, then $b_1$ and $b_2$ are each 0, or $b_1$ is 1 and $b_2$ is 0, or $b_1$ is 0 and $b_2$ is 1, wherein when $r_1$ is 2 or 4, then $c_1$ and $c_2$ are each 0, wherein when $r_1$ is 3, then $c_1$ and $c_2$ are each 0, or $c_1$ is 1 and $c_2$ is 0, or $c_1$ is 0 and $c_2$ is 1, wherein $p_2$, $q_2$, and $r_2$ are each independently selected as an integer that is at least 0, wherein the sum $p_2+q_2+r_2$ is at least 1, wherein $p_3$, $q_3$, and $r_3$ are each independently selected as 2, 3, or 4, wherein when $p_3$ is 2 or 4, then $a_3$ and $a_4$ are each 0, wherein when $p_3$ is 3, then $a_3$ and $a_4$ are each 0, or $a_3$ is 1 and $a_4$ is 0, or $a_3$ is 0 and $a_4$ is 1, wherein when $q_3$ is 2 or 4, then $b_3$ and $b_4$ are each 0, wherein when $q_3$ is 3, then $b_3$ and $b_4$ are each 0, or $b_3$ is 1 and $b_4$ is 0, or $b_3$ is 0 and $b_4$ is 1, wherein when $r_3$ is 2 or 4, then $c_3$ and $c_4$ are each 0, wherein when $r_3$ is 3, then $c_3$ and $c_4$ are each 0, or $c_3$ is 1 and $c_4$ is 0, or $c_3$ is 0 and $c_4$ is 1, wherein $p_4$, $q_4$, and $r_4$ are each independently selected as an integer that is at least 0, wherein the sum $p_4+q_4+r_4$ is at least 1, wherein $p_5$, $q_5$, and $r_5$ are each independently selected as 2, 3, or 4, wherein when $p_5$ is 2 or 4, then $a_5$ and $a_6$ are each 0, wherein when $p_5$ is 3, then $a_5$ and $a_6$ are each 0, or $a_5$ is 1 and $a_6$ is 0, or $a_5$ is 0 and $a_6$ is 1, wherein when $q_5$ is 2 or 4, then $b_5$ and $b_6$ are each 0, wherein when $q_5$ is 3, then $b_5$ and $b_6$ are each 0, or $b_5$ is 1 and $b_6$ is 0, or $b_5$ is 0 and $b_6$ is wherein when $r_5$ is 2 or 4, then $c_5$ and $c_6$ are each 0, wherein when $r_5$ is 3, then $c_5$ and $c_6$ are each 0, or $c_5$ is 1 and $c_6$ is 0, or $c_5$ is 0 and $c_6$ is 1, wherein $p_6$, $q_6$, and $r_6$ are each independently selected as an integer that is at least 0, wherein the sum $p_6+q_6+r_6$ is at least 1, wherein $R_2$ comprises hydrogen (H),

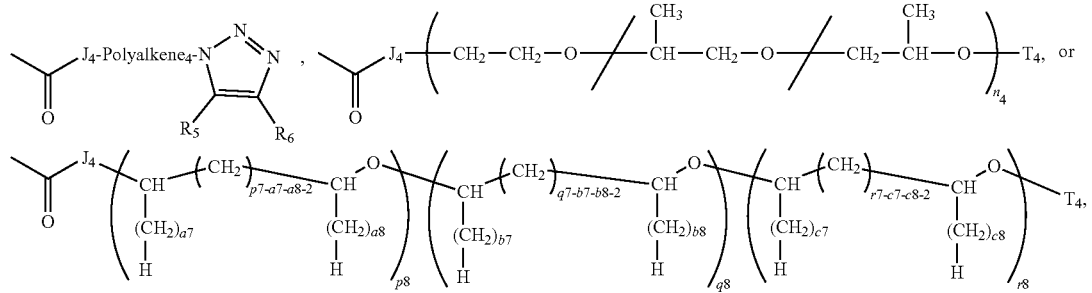

wherein $R_5$ is hydrogen,

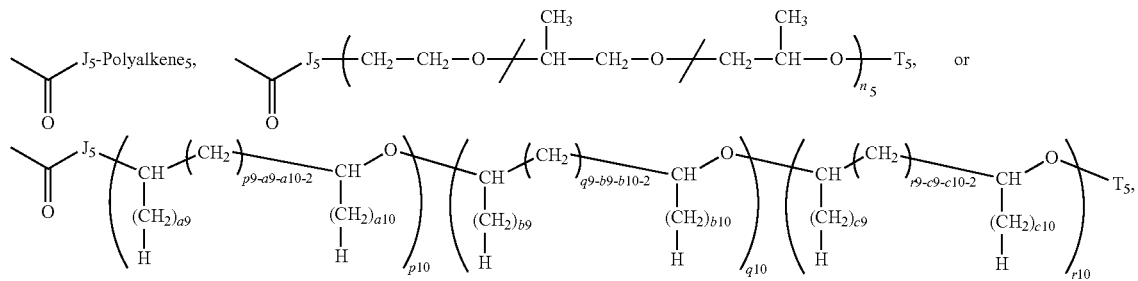

wherein $R_6$ is hydrogen,

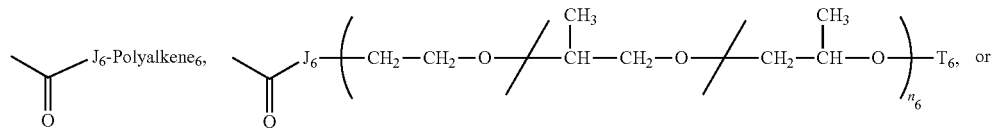

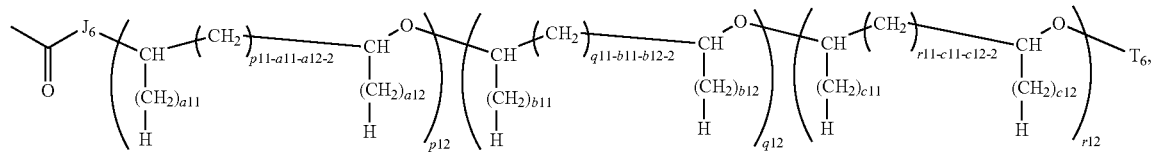

wherein $J_4$, $J_5$, and $J_6$ are each independently selected as oxygen (O) or NH, wherein $T_4$, $T_5$, and $T_6$ are each independently selected from the group consisting of hydrogen (H), methyl ($CH_3$), a linear or branched polyalkene of from 2 to 40 carbons, an acetyl ((C=O)$CH_3$), and a carbonyl (C=O) bound to a linear or branched polyalkene of from 2 to 40 carbons, wherein $n_4$, $n_5$, and $n_6$ are each independently selected as an integer that is at least 1, wherein Polyalkene$_4$ is methylene ($CH_2$) or a linear or branched polyalkene of from 2 to 40 carbons, wherein Polyalkene$_5$ and Polyalkene$_6$ are independently selected from methyl ($CH_3$) or a linear or branched polyalkene of from 2 to 40 carbons, wherein $p_7$, $q_7$, and $r_7$ are each independently selected as 2, 3, or 4, wherein when $p_7$ is 2 or 4, then $a_7$ and $a_8$ are each 0, wherein when $p_7$ is 3, then $a_7$ and as are each 0, or $a_7$ is 1 and as is 0, or $a_7$ is 0 and as is 1, wherein when $q_7$ is 2 or 4, then $b_7$ and $b_8$ are each 0, wherein when $q_7$ is 3, then $b_7$ and $b_8$ are each 0, or $b_7$ is 1 and $b_8$ is 0, or $b_7$ is 0 and $b_8$ is wherein when $r_7$ is 2 or 4, then $c_7$ and $c_8$ are each 0, wherein when $r_7$ is 3, then $c_7$ and $c_8$ are each 0, or $c_7$ is 1 and $c_8$ is 0, or $c_7$ is 0 and $c_8$ is 1, wherein $p_8$, $c_8$, and $r_8$ are each independently selected as an integer that is at least 0, wherein the sum $p_8+q_8+r_8$ is at least 1, wherein $p_9$, $q_9$, and $r_9$ are each independently selected as 2, 3, or 4, wherein when $p_9$ is 2 or 4, then $a_9$ and am are each 0, wherein when $p_9$ is 3, then $a_9$ and $a_{10}$ are each 0, or $a_9$ is 1 and $a_{10}$ is 0, or $a_9$ is 0 and $a_{10}$ is wherein when $q_9$ is 2 or 4, then $b_9$ and $b_{10}$ are each 0, wherein when $q_9$ is 3, then $b_9$ and $b_{10}$ are each 0, or $b_9$ is 1 and $b_{10}$ is 0, or $b_9$ is 0 and $b_{10}$ wherein when $r_9$ is 2 or 4, then $c_9$ and cm are each 0, wherein when $r_9$ is 3, then $c_9$ and $c_{10}$ are each 0, or $c_9$ is 1 and $c_{10}$ is 0, or $c_9$ is 0 and $c_{10}$ is wherein $p_{10}$, $q_{10}$, and $r_{10}$ are each independently selected as an integer that is at least 0, wherein the sum $p_{10}+q_{10}+r_{10}$ is at least 1, wherein $p_{11}$, $q_{11}$, and $r_{11}$ are each independently selected as 2, 3, or 4, wherein when $p_{11}$ is 2 or 4, then $a_{11}$ and $a_{12}$ are each 0, wherein when $p_{11}$ is 3, then $a_{11}$ and $a_{11}$ are each 0, or $a_{11}$ is 1 and $a_{12}$ is 0, or $a_{11}$ is 0 and $a_{12}$ is 1, wherein when $q_{11}$ is 2 or 4, then $b_{11}$ and $b_{12}$ are each 0, wherein when qui is 3, then $b_{11}$ and $b_{12}$ are each 0, or $b_{11}$ is 1 and $b_{12}$ is 0, or but is 0 and $b_{12}$ is 1, wherein when $r_{11}$ is 2 or 4, then $c_{11}$ and $c_{12}$ are each 0, wherein when $r_{11}$ is 3, then cut and $c_{12}$ are each 0, or cut is 1 and $c_{12}$ is 0, or $c_{11}$ is 0 and $c_{12}$ wherein $p_{12}$, $q_{12}$, and $r_{12}$ are each independently selected as an integer that is at least 0, wherein the sum $p_{12}+q_{12}+r_{12}$ is at least 1, wherein x is the fraction of groups substituted for chlorine atoms on the PVC backbone and is from 0.001 to 1, and wherein 1-x is the fraction of residual chlorine atoms on the PVC backbone.

Aspect 2. The polymer of aspect 1, wherein the sum $p_2+q_2+r_2$ is an integer in the range of from 1 to 200, wherein the sum $p_4+q_4+r_4$ is an integer in the range of from 1 to 200, wherein the sum $p_6+q_6+r_6$ is an integer in the range of from 1 to 200, wherein the sum $p_8+q_8+r_8$ is an integer in the range of from 1 to 200, wherein the sum $p_{10}+q_{10}+r_{10}$ is an integer in the range of from 1 to 200, wherein the sum $p_{12}+q_{12}+r_{12}$ is an integer in the range of from 1 to 200, and wherein $n_1$, $n_2$, $n_3$, $n_4$, $n_5$, and $n_6$ are each independently selected as an integer in the range of from 1 to 200.

Aspect 3. The polymer of aspect 1 or aspect 2, wherein x is from 0.001 to 0.5, from 0.01 to 0.4, or from 0.02 to 0.3.

Aspect 4. The polymer of any one of aspects 1 through 3, wherein $p_1$, $q_1$, and $r_1$ are each independently selected as 2 or 3, wherein $p_3$, $q_3$, and $r_3$ are each independently selected as 2 or 3, wherein $P_5$, $p_5$, and $r_5$ are each independently selected as 2 or 3, wherein $p_7$, $q_7$, and $r_7$ are each independently selected as 2 or 3, wherein $p_9$, $q_9$, and $r_9$ are each independently selected as 2 or 3, and wherein $p_{11}$, $q_{11}$, and $r_{11}$ are each independently selected as 2 or 3.

Aspect 5. The polymer of any one of aspects 1 through 4, wherein when $p_1$ is 3, then at is 1 and $a_2$ is 0, or $a_1$ is 0 and $a_2$ is 1, wherein when $q_1$ is 3, then $b_1$ is 1 and $b_2$ is 0, or $b_1$ is 0 and $b_2$ is 1, wherein when $r_1$ is 3, then $c_1$ is 1 and $c_2$ is 0, or $c_1$ is 0 and $c_2$ is 1, wherein when $p_3$ is 3, then $a_3$ is 1 and $a_4$ is 0, or $a_3$ is 0 and $a_4$ is 1, wherein when $q_3$ is 3, then $b_3$ is 1 and $b_4$ is 0, or $b_3$ is 0 and $b_4$ is 1, wherein when $r_1$ is 3, then $c_3$ is 1 and $c_4$ is 0, or $c_3$ is 0 and $c_4$ is 1, wherein when $p_5$ is 3, then $a_5$ is 1 and $a_6$ is 0, or $a_5$ is 0 and $a_6$ is 1, wherein when $q_5$ is 3, then $b_5$ is 1 and $b_6$ is 0, or $b_5$ is 0 and $b_6$ is 1, wherein when $r_5$ is 3, then $c_5$ is 1 and $c_6$ is 0, or $c_5$ is 0 and $c_6$ is 1, wherein when $p_7$ is 3, then $a_7$ is 1 and as is 0, or $a_7$ is 0 and as is 1, wherein when $q_7$ is 3, then $b_7$ is 1 and $b_8$ is 0, or $b_7$ is 0 and $b_8$ is 1, wherein when $r_7$ is 3, then $c_7$ is 1 and $c_5$ is 0, or $c_7$ is 0 and $c_4$ is 1, wherein when $p_9$ is 3, then $a_9$ is 1 and $a_{11}$ is 0, or $a_9$ is 0 and $a_{10}$ is 1, wherein when $q_9$ is 3, then $b_9$ is 1 and $b_{10}$ is 0, or $b_9$ is 0 and $b_{10}$ is 1, wherein when $r_9$ is 3, then $c_9$ is 1 and $c_{10}$ is 0, or $c_9$ is 0 and $c_{10}$ is 1, wherein when $p_{11}$ is 3, then $a_{11}$ is 1 and $a_{12}$ is 0, or $a_{11}$ is 0 and $a_{12}$ is 1, wherein when $q_{11}$ is 3, then $b_{11}$ is 1 and $b_{12}$ is 0, or $b_{11}$ is 0 and $b_{12}$ is 1, and wherein when $r_{11}$ is 3, then $c_{11}$ is 1 and $c_{12}$ is 0, or $c_{11}$ is 0 and $c_{12}$ is 1.

Aspect 6. The polymer of any one of aspects 1 through 4,
wherein $R_1$ is not

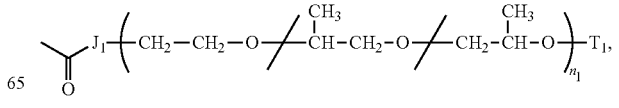

wherein $R_3$ is not

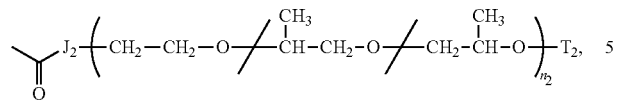

wherein $R_4$ is not

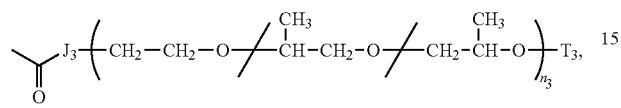

wherein $R_2$ is not

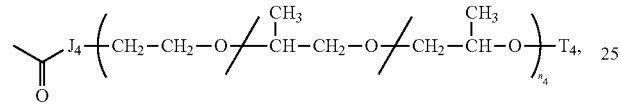

wherein $R_5$ is not

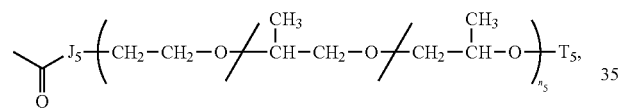

wherein $R_6$ is not

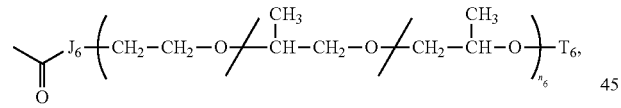

wherein $J_1$, $J_2$, $J_3$, $J_4$, $J_5$, and $J_6$ are each oxygen (O),
wherein $T_1$, $T_2$, $T_3$, $T_4$, $T_5$, and $T_6$ are each methyl ($CH_3$),
wherein $q_2$, $r_2$, $q_4$, $r_4$, $q_6$, $r_6$, $q_8$, $r_8$, $q_{10}$, $r_{10}$, $q_{12}$, and $r_{12}$ are each 0, and
wherein $a_1$, $a_2$, $a_3$, $a_4$, $a_5$, $a_6$, $a_7$, $a_8$, $a_9$, $a_{10}$, $a_{11}$, and $a_{11}$ are each 0.

Aspect 7. The polymer of any one of aspect 1 through 6, wherein $R_1$ is

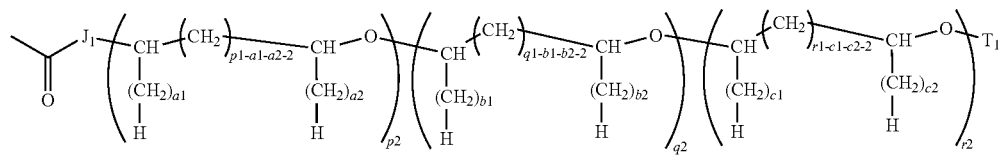

and
  wherein $R_2$ is

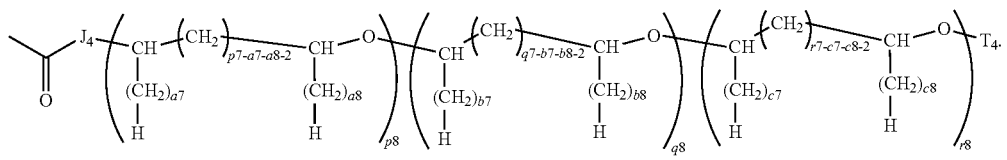

Aspect 8. The polymer of aspect 7, wherein $p_1$ and $p_7$ are each 2.

Aspect 9. The polymer of aspect 8,
  wherein $p_2$ and $p_8$ are each from 2 to 12 or from 4 to 20 or are each 7 or 12, and
  wherein $\underline{x}$ is 0.15 or $\underline{x}$ is greater than 0.15.

Aspect 10. The polymer of aspect 8,
  wherein $p_2$ and $p_8$ are each at least 4.

Aspect 11. The polymer of any one of aspects 1 through 6,
  wherein $R_1$ is

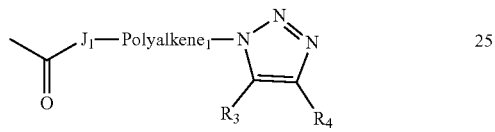

and
  wherein $R_2$ is hydrogen (H).

Aspect 12. The polymer of aspect 11,
  wherein $R_3$ is

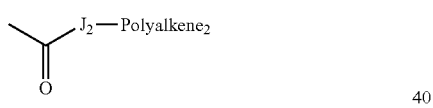

and
  wherein $R_4$ is

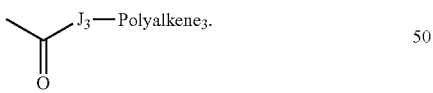

Aspect 13. The polymer of aspect 11,
  wherein $R_3$ is

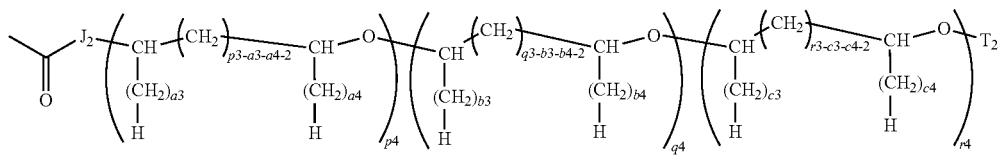

and
wherein $R_4$ is

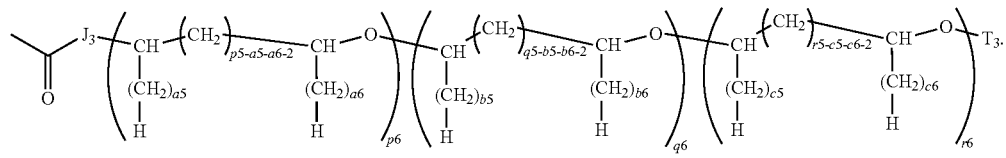

Aspect 14. The polymer of aspect 13, wherein $p_3$ and $q_5$ are each 2.

Aspect 15. The polymer of aspect 14,
wherein Polyalkene$_1$ is n-hexyl,
wherein $p_4$ and $p_6$ are each from 2 to 12 or are each 7, and
wherein $\underline{x}$ is 0.15 or $\underline{x}$ is greater than 0.15.

Aspect 16. The polymer of aspect 14,
wherein Polyalkene$_1$ is n-hexyl,
wherein $r_4$ and $p_6$ are each from 12 to 32 or are each 22, and
wherein $\underline{x}$ is 0.15 or $\underline{x}$ is greater than 0.15.

Aspect 17. The polymer of aspect 14,
wherein Polyalkene$_1$ is n-hexyl,
wherein $p_4$ and $p_6$ are each from 34 to 54 or are each 44, and
wherein $\underline{x}$ is 0.15 or $\underline{x}$ is greater than 0.15.

Aspect 18. The polymer of aspect 14,
wherein Polyalkene$_1$ is n-hexyl,
wherein $p_4$ and $p_6$ are each from 32 to 54, and
wherein $\underline{x}$ is 0.15 or $\underline{x}$ is greater than 0.15.

Aspect 19. The polymer of aspect 14,
wherein Polyalkene$_1$ is of at least 4 carbons and
wherein $p_4$ and $p_6$ are each at least 4.

Aspect 20. The polymer of any one of aspects 1 through 6,
wherein $R_1$ is

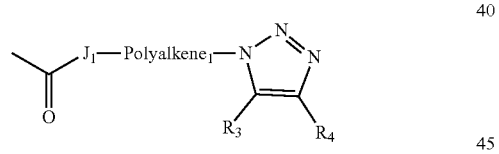

and
wherein $R_2$ is

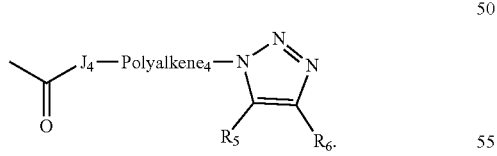

Aspect 21. The polymer of aspect 20,
wherein $R_3$ is

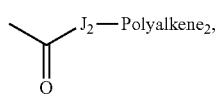

wherein R₄ is

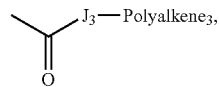

wherein R₅ is

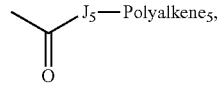

and
wherein R₆ is

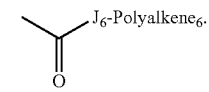

Aspect 22. The polymer of aspect 21,
wherein Polyalkene₁ is n-hexyl,
wherein Polyalkene₂ and Polyalkene₃ are each 2-ethylhexyl,
wherein Polyalkene₄ is n-hexyl,
wherein Polyalkene₅ and Polyalkene₆ are each 2-ethylhexyl, and
wherein $\underline{x}$ is 0.15 or $\underline{x}$ is greater than 0.15.

Aspect 23. The polymer of aspect 21,
wherein Polyalkene₁ is of at least 4 carbons,
wherein Polyalkene₂ and Polyalkene₃ are each 2-ethylhexyl,
wherein Polyalkene₄ is of at least 4 carbons, and
wherein Polyalkene₅ and Polyalkene₆ are each 2-ethylhexyl.

Aspect 24. The polymer of aspect 20,
wherein R₃ is

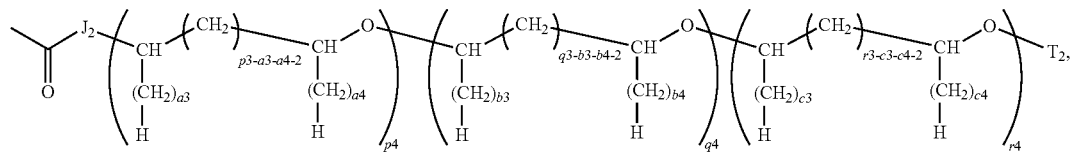

wherein R₄ is

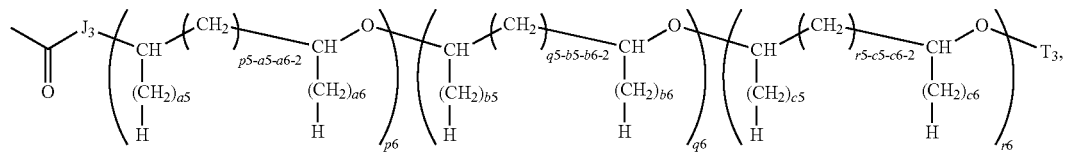

wherein $R_5$ is

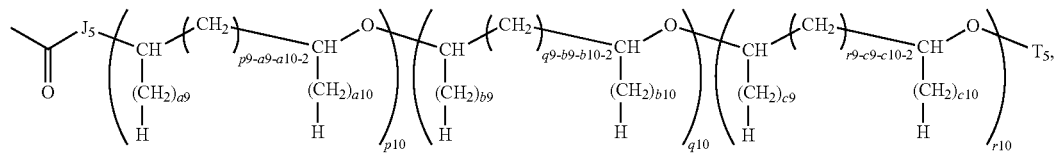

and
wherein $R_6$ is

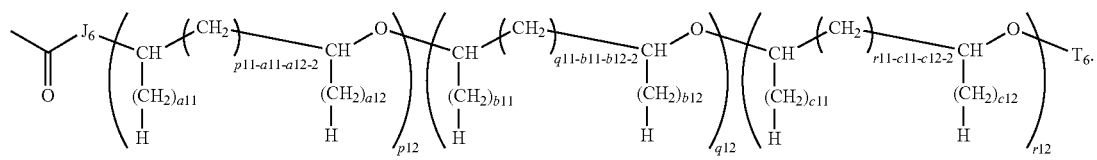

Aspect 25. The polymer of aspect 24, wherein $p_3$, $p_5$, $p_9$, and $p_{11}$ are each 2.

Aspect 26. The polymer of aspect 25,
wherein Polyalkene$_1$ is n-hexyl,
wherein $p_4$ and $p_6$ are each 3,
wherein Polyalkene$_4$ is n-hexyl,
wherein $p_{10}$ and pie are each 3, and
wherein $\underline{x}$ is 0.15 or $\underline{x}$ is greater than 0.15.

Aspect 27. The polymer of aspect 25,
wherein Polyalkene$_1$ is n-hexyl,
wherein $p_4$ and $p_6$ are each from 2 to 12 or from 4 to 20 or are each 7 or 12,
wherein Polyalkene$_4$ is n-hexyl,
wherein $p_{10}$ and $p_{12}$ are each from 2 to 12 or from 4 to 20 or are each 7 or 12, and
wherein $\underline{x}$ is 0.15 or $\underline{x}$ is greater than 0.15.

Aspect 28. The polymer of aspect 25,
wherein Polyalkene$_1$ is n-hexyl,
wherein $p_4$ and $p_6$ are each from 12 to 32 or are each 22,
wherein Polyalkene$_4$ is n-hexyl,
wherein $p_{10}$ and $p_{12}$ are each from 12 to 32 or are each 22, and
wherein $\underline{x}$ is 0.15 or $\underline{x}$ is greater than 0.15.

Aspect 29. The polymer of aspect 25,
wherein Polyalkene$_1$ is n-hexyl,
wherein $p_4$ and $p_6$ are each from 34 to 54 or are each 44,
wherein Polyalkene$_4$ is n-hexyl,
wherein $p_{10}$ and $p_{12}$ are each from 34 to 54 or are each 44, and
wherein $\underline{x}$ is 0.15 or $\underline{x}$ is greater than 0.15.

Aspect 30. The polymer of aspect 25,
wherein Polyalkene$_1$ is n-hexyl,
wherein $p_4$ and $p_6$ are each from 32 to 54,
wherein Polyalkene$_4$ is n-hexyl,
wherein $p_{10}$ and $p_{12}$ are each from 32 to 54, and
wherein $\underline{x}$ is 0.15 or $\underline{x}$ is greater than 0.15.

Aspect 31. The polymer of aspect 25,
wherein Polyalkene$_1$ is of at least 4 carbons and
wherein Polyalkene$_4$ is of at least 4 carbons.

Aspect 32. The polymer of any one of aspects 1 through 6, wherein $R_1$ is

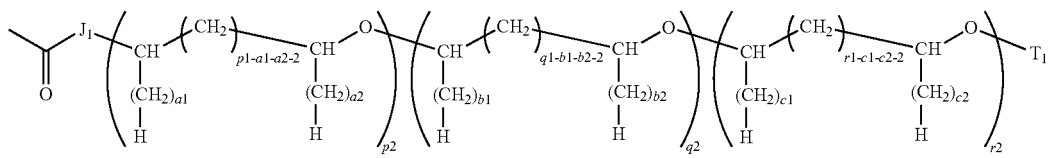

and wherein $R_2$ is hydrogen (H).

Aspect 33. The polymer of aspect 32, wherein $p_1$ is 2.

Aspect 34. The polymer of aspect 33,
wherein $p_2$ is from 4 to 20 or from 12 to 32 or from 34 to 54 or is 12, 22, or 44 and
wherein $\underline{x}$ is 0.15 or $\underline{x}$ is greater than 0.15.

Aspect 35. The polymer of aspect 33,
wherein $p_2$ is from 32 to 54 and
wherein $\underline{x}$ is 0.15 or $\underline{x}$ is greater than 0.15.

Aspect 36. The polymer of aspect 33,
wherein $p_2$ is at least 4.

Aspect 37. A composition comprising the polymer of any one of aspects 1 through 36 and (untreated) poly(vinyl chloride).

Aspect 38. The composition of aspect 37, wherein the polymer of any one of aspects 1 through 36 is from 5 to 99 wt % of the composition.

Aspect 39. The composition of aspect 37, wherein the polymer of any one of aspects 1 through 36 is from 0.01 to 99 wt % of the composition.

Aspect 40. The polymer of aspect 6 of a polyvinylchloride (PVC) backbone comprising the structure

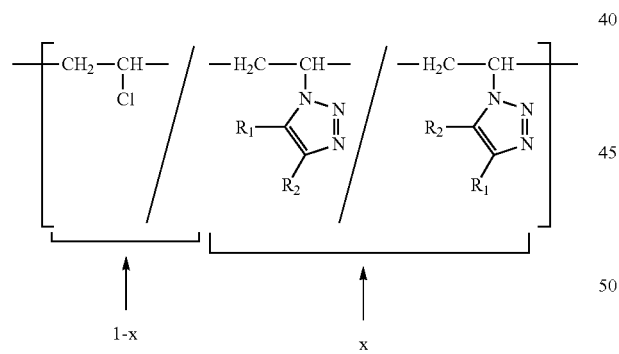

wherein $R_1$ comprises

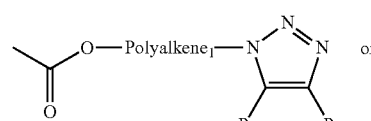

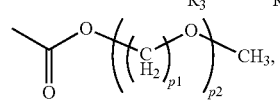

wherein $R_3$ is hydrogen,

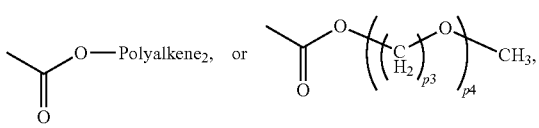

wherein $R_4$ is hydrogen,

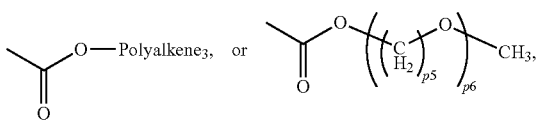

wherein Polyalkene$_1$ is methylene or a linear or branched polyalkene of from 2 to 40 carbons, wherein Polyalkene$_2$ and Polyalkene$_3$ are each independently selected from methyl or a linear or branched polyalkene of from 2 to 40 carbons, wherein $p_1$, $p_3$, and $p_5$ are each independently selected as 2, 3, or 4, wherein $p_2$, $p_4$, and $p_6$ are each independently selected as an integer that is at least 1, wherein $R_2$ comprises hydrogen,

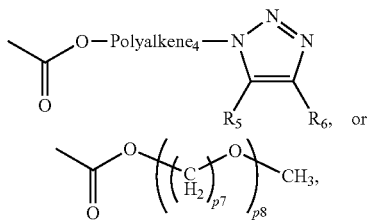

wherein $R_5$ is hydrogen,

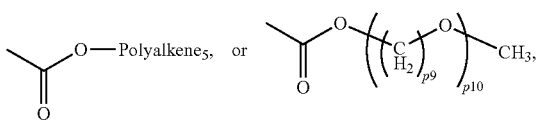

wherein $R_6$ is hydrogen,

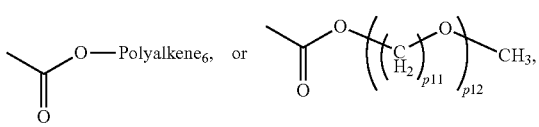

wherein Polyalkene$_4$ is methylene or a linear or branched polyalkene of from 2 to 40 carbons, wherein Polyalkene$_5$ and Polyalkene$_6$ are independently selected from methyl or a linear or branched polyalkene of from 2 to 40 carbons, wherein $p_7$, $p_9$, and $p_{11}$ are each independently selected as 2, 3, or 4, wherein $p_8$, $p_{10}$, and $p_{12}$ are each independently selected as an integer that is at least 1, wherein $\underline{x}$ is the fraction of groups substituted for chlorine atoms on the PVC backbone and is from 0.001 to 1, and wherein $1-\underline{x}$ is the fraction of residual chlorine atoms on the PVC backbone.

Aspect 41. The polymer of aspect 40, wherein $p_2$, $p_4$, $p_6$, $p_8$, $p_{10}$, and $p_{12}$ are each independently selected as an integer in the range of from 1 to 200.

Aspect 42. The polymer of aspect 40 or 41, wherein $\underline{x}$ is from 0.001 to 0.5, from 0.01 to 0.4, or from 0.02 to 0.3.

Aspect 43. The polymer of any one of aspects 40 through 42, wherein $R_1$ is

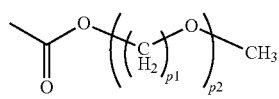

and
wherein $R_2$ is

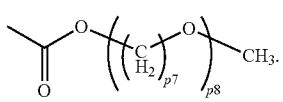

Aspect 44. The polymer of aspect 43, wherein $p_1$ and $p_7$ are each 2.

Aspect 45. The polymer of aspect 44,
wherein $p_2$ and $p_4$ are each from 2 to 12 or from 4 to 20 or are each 7 or 12, and
wherein $\underline{x}$ is 0.15 or $\underline{x}$ is greater than 0.15.

Aspect 46. The polymer of aspect 45, wherein $\underline{x}$ is 0.15.

Aspect 47. The polymer of aspect 44,
wherein $p_2$ and $p_4$ are each at least 4, and
wherein $\underline{x}$ is at least 0.15.

Aspect 48. The polymer of any one of aspects 40 through 42, wherein $R_1$ is

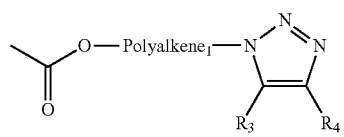

and
wherein $R_2$ is hydrogen.

Aspect 49. The polymer of aspect 48,
wherein $R_3$ is

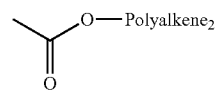

and

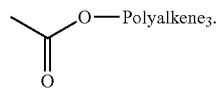

wherein R$_4$ is

Aspect 50. The polymer of aspect 48,
wherein R$_3$ is

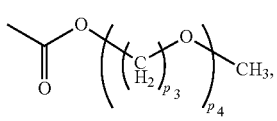

wherein R$_4$ is

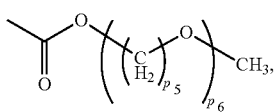

and
wherein p$_3$ and p$_5$ are each 2.

Aspect 51. The polymer of aspect 50,
wherein Polyalkene$_1$ is n-hexyl,
wherein p$_4$ and p$_6$ are each from 2 to 12 or are each 7, and
wherein $\underline{x}$ is 0.15 or $\underline{x}$ is greater than 0.15.

Aspect 52. The polymer of aspect 50,
wherein Polyalkene$_1$ is n-hexyl,
wherein p$_4$ and p$_6$ are each from 12 to 32 or are each 22, and
wherein $\underline{x}$ is 0.15 or $\underline{x}$ is greater than 0.15.

Aspect 53. The polymer of aspect 50,
wherein Polyalkene$_1$ is n-hexyl,
wherein p$_4$ and p$_6$ are each from 34 to 54 or are each 44, and
wherein $\underline{x}$ is 0.15 or $\underline{x}$ is greater than 0.15.

Aspect 54. The polymer of aspect 50,
wherein Polyalkene$_1$ is n-hexyl,
wherein p$_4$ and p$_6$ are each from 32 to 54, and
wherein $\underline{x}$ is 0.15 or $\underline{x}$ is greater than 0.15.

Aspect 55. The polymer of any one of aspects 51 through 54, wherein $\underline{x}$ is 0.15.

Aspect 56. The polymer of aspect 50,
wherein Polyalkene$_1$ is of at least 4 carbons,
wherein p$_4$ and p$_6$ are each at least 4, and
wherein $\underline{x}$ is at least 0.15.

Aspect 57. The polymer of any one of aspects 40 through 42,
wherein R$_1$ is

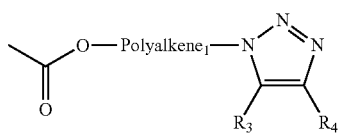

and
wherein R$_2$ is

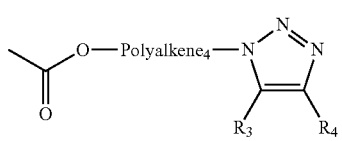

Aspect 58. The polymer of aspect 57,
wherein R$_3$ is

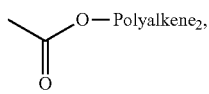

wherein R$_4$ is

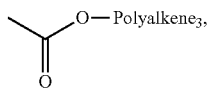

wherein R$_5$ is

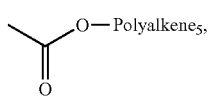

and
wherein R$_6$ is

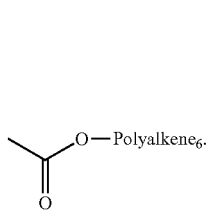

Aspect 59. The polymer of aspect 58,
wherein Polyalkene$_1$ is n-hexyl,
wherein Polyalkene$_2$ and Polyalkene$_3$ are each 2-ethylhexyl,
wherein Polyalkene$_4$ is n-hexyl,
wherein Polyalkene$_5$ and Polyalkene$_6$ are each 2-ethylhexyl, and
wherein $\underline{x}$ is 0.15 or $\underline{x}$ is greater than 0.15.

Aspect 60. The polymer of aspect 59, wherein $\underline{x}$ is 0.15.

Aspect 61. The polymer of aspect 58,
wherein Polyalkene$_1$ is of at least 4 carbons,
wherein Polyalkene$_2$ and Polyalkene$_3$ are each 2-ethylhexyl,
wherein Polyalkene$_4$ is of at least 4 carbons,
wherein Polyalkene$_5$ and Polyalkene$_6$ are each 2-ethylhexyl, and
wherein $\underline{x}$ is at least 0.15.

Aspect 62. The polymer of aspect 57,
wherein R$_3$ is

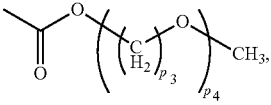

wherein R$_4$ is

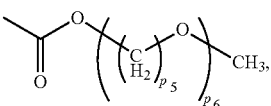

wherein $R_5$ is

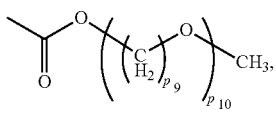

and
wherein $R_6$ is

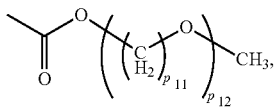

wherein $p_3$, $p_5$, $p_9$, and $p_{11}$ are each 2.
Aspect 63. The polymer of aspect 62,
wherein Polyalkene$_1$ is n-hexyl,
wherein $p_4$ and $p_6$ are each 3,
wherein Polyalkene$_4$ is n-hexyl,
wherein $p_{10}$ and $p_{12}$ are each 3, and
wherein $\underline{x}$ is 0.15 or $\underline{x}$ is greater than 0.15.
Aspect 64. The polymer of aspect 62,
wherein Polyalkene$_1$ is n-hexyl,
wherein $p_4$ and $p_6$ are each from 2 to 12 or from 4 to 20 or are each 7 or 12,
wherein Polyalkene$_4$ is n-hexyl,
wherein $p_{10}$ and $p_{12}$ are each from 2 to 12 or from 4 to 20 or are each 7 or 12, and
wherein $\underline{x}$ is 0.15 or $\underline{x}$ is greater than 0.15.
Aspect 65. The polymer of aspect 62,
wherein Polyalkene$_1$ is n-hexyl,
wherein $p_4$ and $p_6$ are each from 12 to 32 or are each 22,
wherein Polyalkene$_4$ is n-hexyl,
wherein $p_{10}$ and $p_{12}$ are each from 12 to 32 or are each 22, and
wherein $\underline{x}$ is 0.15 or $\underline{x}$ is greater than 0.15.
Aspect 66. The polymer of aspect 62,
wherein Polyalkene$_1$ is n-hexyl,
wherein $p_4$ and $p_6$ are each from 34 to 54 or are each 44,
wherein Polyalkene$_4$ is n-hexyl,
wherein $p_{10}$ and $p_{12}$ are each from 34 to 54 or are each 44, and
wherein $\underline{x}$ is 0.15 or $\underline{x}$ is greater than 0.15.
Aspect 67. The polymer of aspect 62,
wherein Polyalkene$_1$ is n-hexyl,
wherein $p_4$ and $p_6$ are each from 32 to 54,
wherein Polyalkene$_4$ is n-hexyl,
wherein $p_{10}$ and $p_{12}$ are each from 32 to 54, and
wherein $\underline{x}$ is 0.15 or $\underline{x}$ is greater than 0.15.
Aspect 68. The polymer of any one of aspects 63 through 67, wherein $\underline{x}$ is 0.15.
Aspect 69. The polymer of aspect 62,
wherein Polyalkene$_1$ is of at least 4 carbons,
wherein Polyalkene$_4$ is of at least 4 carbons, and
wherein $\underline{x}$ is at least 0.15.
Aspect 70. The polymer of any one of aspects 40 through 42,
wherein $R_1$ is

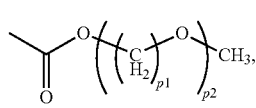

wherein $R_2$ is hydrogen, and
wherein $p_1$ is 2.
Aspect 71. The polymer of aspect 70,
wherein $p_2$ is from 4 to 20 or from 12 to 32 or from 34 to 54 or is 12, 22, or 44 and
wherein $\underline{x}$ is 0.15 or $\underline{x}$ is greater than 0.15.
Aspect 72. The polymer of aspect 70,
wherein $p_2$ is from 32 to 54 and
wherein $\underline{x}$ is 0.15 or $\underline{x}$ is greater than 0.15.
Aspect 73. The polymer of aspect 71 or aspect 72, wherein $\underline{x}$ is 0.15.
Aspect 74. The polymer of aspect 70,
wherein $p_2$ is at least 4 and
wherein $\underline{x}$ is at least 0.15.
Aspect 75. A composition comprising the polymer of any one of aspects 40 through 74 and (untreated) poly(vinyl chloride).
Aspect 76. The composition of aspect 75, wherein the polymer of any one of aspects 40 through 74 is from 5 to 99 wt % of the composition.
Aspect 77. The composition of aspect 75, wherein the polymer of any one of aspects 40 through 74 is from 0.01 to 99 wt % of the composition.
Aspect 78. A method for forming a triazole ester functionalized polyvinyl chloride (PVC) polymer, comprising
forming an azidified polyvinyl chloride by dissolving polyvinyl chloride in a first solvent and adding an alkali metal azide,
forming a propiolic ester HC≡C—(C═O)—OR by reacting propiolic acid with an alcohol HOR, and
dissolving the azidified polyvinyl chloride in a second solvent and adding the propiolic ester HC≡C—(C═O)—OR to form the triazole ester functionalized polyvinyl chloride polymer,
wherein the second solvent is the same as or different from the first solvent.
Aspect 79. The method of aspect 78, wherein the alcohol HOR is methoxy poly(ethylene glycol).
Aspect 80. A method for forming a di(methoxy-polyethylene-oxide-carbonyl) triazole functionalized polyvinyl chloride (PVC) polymer, comprising
forming an azidified polyvinyl chloride by dissolving polyvinyl chloride in a first solvent and adding an alkali metal azide,
forming a 1,4-bis-[methoxy poly(ethylene glycol)]-but-2-ynedioate by reacting but-2-ynedioic acid with a poly(ethylene glycol) monomethyl ether, and
dissolving the azidified polyvinyl chloride in a second solvent and adding the 1,4-bis-[methoxy poly(ethylene glycol)]-but-2-ynedioate to form the di(methoxy-polyethylene-oxide-carbonyl) triazole functionalized polyvinyl chloride polymer,
wherein the second solvent is the same as or different from the first solvent.

The embodiments illustrated and discussed in this specification are intended only to teach those skilled ways known to the inventors to make and use the invention. Nothing in this specification should be considered as limiting the scope of the present invention. All examples presented are representative and non-limiting. The above-described embodiments of the invention may be modified or varied, without departing from the invention, as appreciated by those skilled in the art in light of the above teachings. It is therefore to be understood that, within the scope of the claims and their equivalents, the invention may be practiced otherwise than as specifically described.

The invention claimed is:

1. A polymer of a polyvinylchloride (PVC) backbone comprising the structure

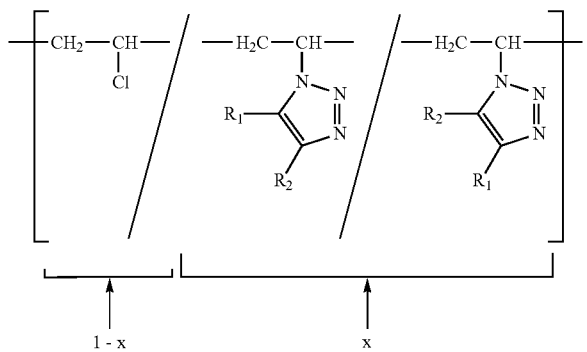

wherein $R_1$ comprises

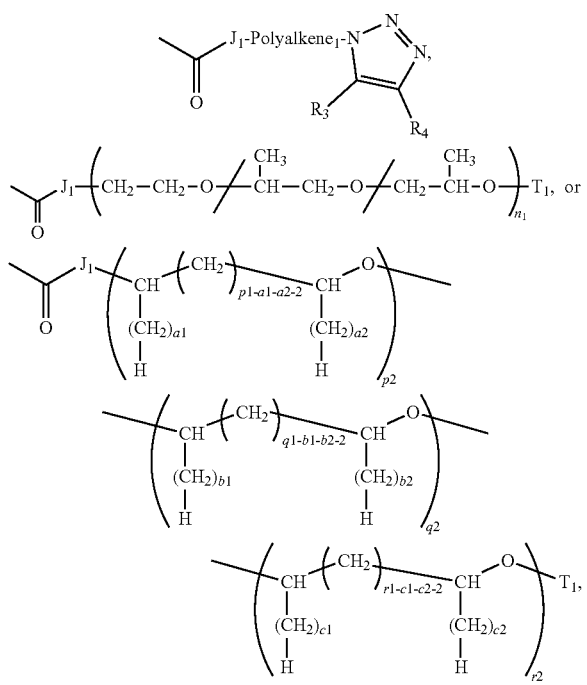

wherein $R_3$ is hydrogen (H),

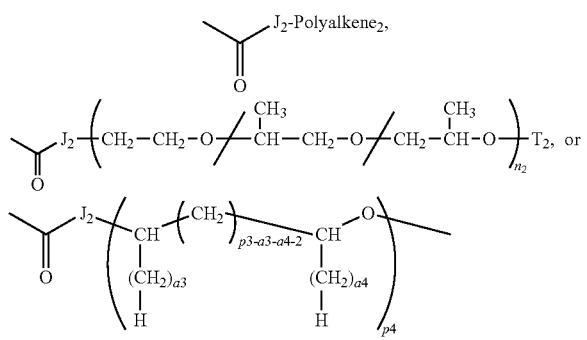

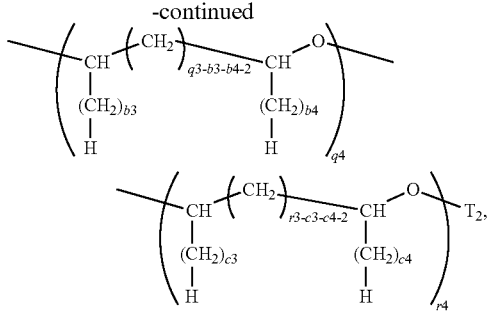

wherein $R_4$ is hydrogen (H),

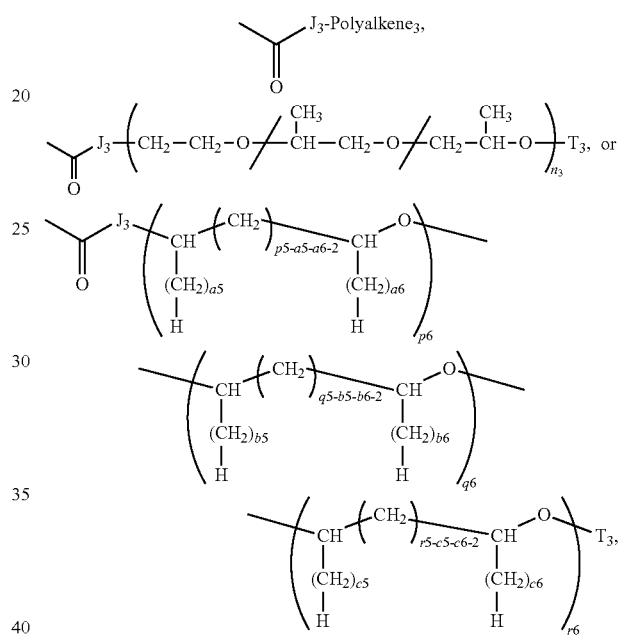

wherein $J_1$, $J_2$, and $J_3$ are each independently selected as oxygen (O) or NH, wherein $T_1$, $T_2$, and $T_3$ are each independently selected from the group consisting of hydrogen (H), methyl ($CH_3$), a linear or branched polyalkene of from 2 to 40 carbons, an acetyl (($C=O$)$CH_3$), and a carbonyl ($C=O$) bound to a linear or branched polyalkene of from 2 to 40 carbons, wherein $n_1$, $n_2$, and $n_3$ are each independently selected as an integer that is at least 1, wherein Polyalkene$_1$ is methylene ($CH_2$) or a linear or branched polyalkene of from 2 to 40 carbons, wherein Polyalkene$_2$ and Polyalkene$_3$ are each independently selected from methyl ($CH_3$) or a linear or branched polyalkene of from 2 to 40 carbons, wherein $p_1$, $q_1$, and $r_1$ are each independently selected as 2, 3, or 4, wherein when $p_1$ is 2 or 4, then $a_1$ and $a_2$ are each 0, wherein when $p_1$ is 3, then $a_1$ and $a_2$ are each 0, or $a_1$ is 1 and $a_2$ is 0, or $a_1$ is 0 and $a_2$ is 1, wherein when $q_1$ is 2 or 4, then $b_1$ and $b_2$ are each 0, wherein when $q_1$ is 3, then $b_1$ and $b_2$ are each 0, or $b_1$ is 1 and $b_2$ is 0, or $b_1$ is 0 and $b_2$ is 1, wherein when $r_1$ is 2 or 4, then $c_1$ and $c_2$ are each 0, wherein when $r_1$ is 3, then $c_1$ and $c_2$ are each 0, or $c_1$ is 1 and $c_2$ is 0, or $c_1$ is 0 and $c_2$ is 1, wherein $p_2$, $q_2$, and $r_2$ are each independently selected as an integer that is at least 0,
wherein the sum $p_2+q_2+r_2$ is at least 1,
wherein $p_3$, $q_3$, and $r_3$ are each independently selected as 2, 3, or 4,
wherein when $p_3$ is 2 or 4, then $a_3$ and $a_4$ are each 0,
wherein when $p_3$ is 3, then $a_3$ and $a_4$ are each 0, or $a_3$ is 1 and $a_4$ is 0, or $a_3$ is 0 and $a_4$ is 1,
wherein when $q_3$ is 2 or 4, then $b_3$ and $b_4$ are each 0,
wherein when $q_3$ is 3, then $b_3$ and $b_4$ are each 0, or $b_3$ is 1 and $b_4$ is 0, or $b_3$ is 0 and $b_4$ is 1,
wherein when $r_3$ is 2 or 4, then $c_3$ and $c_4$ are each 0,
wherein when $r_3$ is 3, then $c_3$ and $c_4$ are each 0, or $c_3$ is 1 and $c_4$ is 0, or $c_3$ is 0 and $c_4$ is 1,
wherein $p_4$, $q_4$, and $r_4$ are each independently selected as an integer that is at least 0,
wherein the sum $p_4+q_4+r_4$ is at least 1,
wherein $p_5$, $q_5$, and $r_5$ are each independently selected as 2, 3, or 4,
wherein when $p_5$ is 2 or 4, then $a_5$ and $a_6$ are each 0,
wherein when $p_5$ is 3, then $a_5$ and $a_6$ are each 0, or $a_5$ is 1 and $a_6$ is 0, or $a_5$ is 0 and $a_6$ is 1,
wherein when $q_5$ is 2 or 4, then $b_5$ and $b_6$ are each 0,
wherein when $q_5$ is 3, then $b_5$ and $b_6$ are each 0, or $b_5$ is 1 and $b_6$ is 0, or $b_5$ is 0 and $b_6$ is 1,
wherein when $r_5$ is 2 or 4, then $c_5$ and $c_6$ are each 0,
wherein when $r_5$ is 3, then $c_5$ and $c_6$ are each 0, or $c_5$ is 1 and $c_6$ is 0, or $c_5$ is 0 and $c_6$ is 1,
wherein $p_6$, $q_6$, and $r_6$ are each independently selected as an integer that is at least 0,
wherein the sum $p_6+q_6+r_6$ is at least 1,
wherein $R_2$ comprises hydrogen (H),

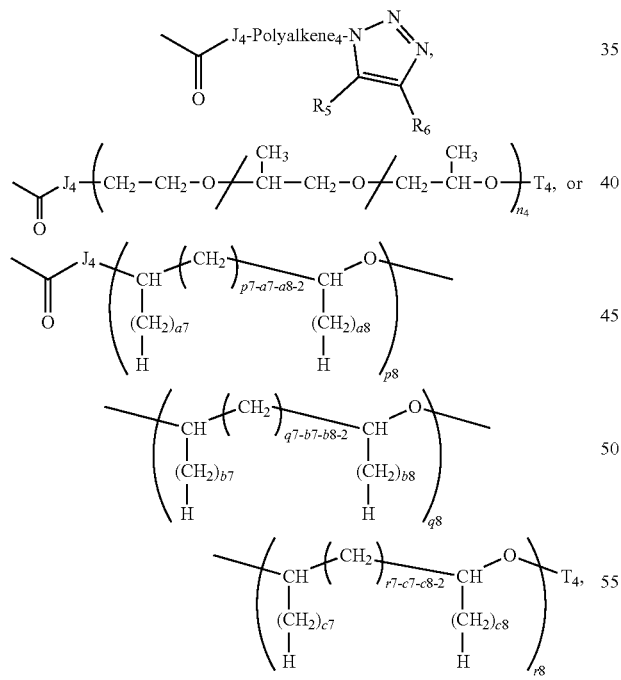

wherein $R_5$ is hydrogen,

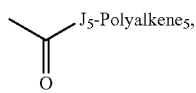

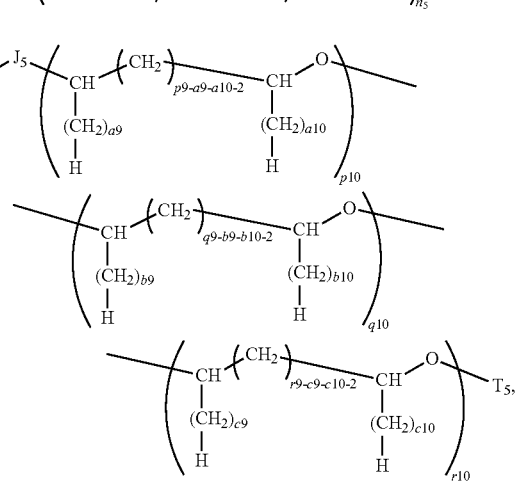

wherein $R_6$ is hydrogen,

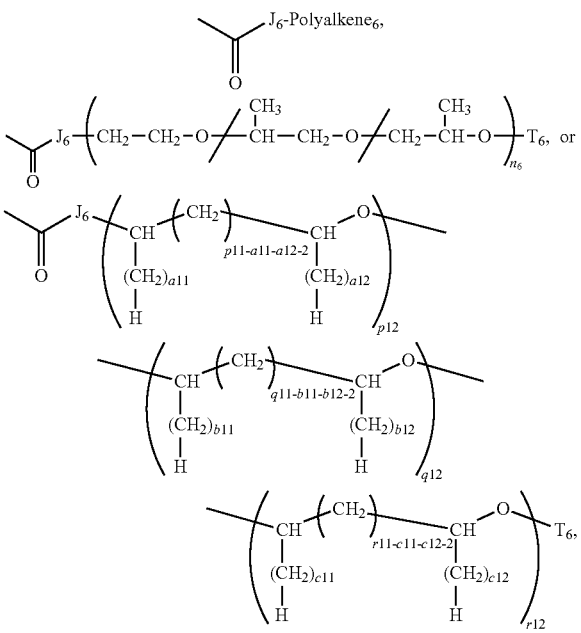

wherein $J_4$, $J_5$, and $J_6$ are each independently selected as oxygen (O) or NH,
wherein $T_4$, $T_5$, and $T_6$ are each independently selected from the group consisting of hydrogen (H), methyl ($CH_3$), a linear or branched polyalkene of from 2 to 40 carbons, an acetyl ((C=O)$CH_3$), and a carbonyl (C=O) bound to a linear or branched polyalkene of from 2 to 40 carbons,
wherein $n_4$, $n_5$, and $n_6$ are each independently selected as an integer that is at least 1,
wherein Polyalkene$_4$ is methylene ($CH_2$) or a linear or branched polyalkene of from 2 to 40 carbons,
wherein Polyalkene$_5$ and Polyalkene$_6$ are independently selected from methyl ($CH_3$) or a linear or branched polyalkene of from 2 to 40 carbons,
wherein $p_7$, $q_7$, and $r_7$ are each independently selected as 2, 3, or 4, wherein when $p_7$ is 2 or 4, then $a_7$ and $a_8$ are each 0,
wherein when $p_7$ is 3, then $a_7$ and $a_8$ are each 0, or $a_7$ is 1 and $a_8$ is 0, or $a_7$ is 0 and $a_8$ is 1,
wherein when $q_7$ is 2 or 4, then $b_7$ and $b_8$ are each 0,
wherein when $q_7$ is 3, then $b_7$ and $b_8$ are each 0, or $b_7$ is 1 and $b_8$ is 0, or $b_7$ is 0 and $b_8$ is 1,
wherein when $r_7$ is 2 or 4, then $c_7$ and $c_8$ are each 0,
wherein when $r_7$ is 3, then $c_7$ and $c_8$ are each 0, or $c_7$ is 1 and $c_8$ is 0, or $c_7$ is 0 and $c_8$ is 1,
wherein $p_8$, $q_8$, and $r_8$ are each independently selected as an integer that is at least 0,
wherein the sum $p_8+q_8+r_8$ is at least 1,
wherein $p_9$, $q_9$, and $r_9$ are each independently selected as 2, 3, or 4,
wherein when $p_9$ is 2 or 4, then $a_9$ and $a_{10}$ are each 0,
wherein when $p_9$ is 3, then $a_9$ and $a_{10}$ are each 0, or $a_9$ is 1 and $a_{10}$ is 0, or $a_9$ is 0 and $a_{10}$ is 1,
wherein when $q_9$ is 2 or 4, then $b_9$ and $b_{10}$ are each 0,
wherein when $q_9$ is 3, then $b_9$ and $b_{10}$ are each 0, or $b_9$ is 1 and $b_{10}$ is 0, or $b_9$ is 0 and $b_{10}$ is 1,
wherein when $r_9$ is 2 or 4, then $c_9$ and $c_{10}$ are each 0,
wherein when $r_9$ is 3, then $c_9$ and $c_{10}$ are each 0, or $c_9$ is 1 and $c_{10}$ is 0, or $c_9$ is 0 and $c_{10}$ is 1,
wherein $p_{10}$, $q_{10}$, and $r_{10}$ are each independently selected as an integer that is at least 0,
wherein the sum $p_{10}+q_{10}+r_{10}$ is at least 1,
wherein $p_{11}$, $q_{11}$, and $r_{11}$ are each independently selected as 2, 3, or 4,
wherein when $p_{11}$ is 2 or 4, then $a_{11}$ and $a_{12}$ are each 0,
wherein when $p_{11}$ is 3, then $a_{11}$ and $a_{12}$ are each 0, or $a_{11}$ is 1 and $a_{12}$ is 0, or $a_{11}$ is 0 and $a_{12}$ is 1,
wherein when $q_{11}$ is 2 or 4, then $b_{11}$ and $b_{12}$ are each 0,
wherein when $q_{11}$ is 3, then $b_{11}$ and $b_{12}$ are each 0, or $b_{11}$ is 1 and $b_{12}$ is 0, or $b_{11}$ is 0 and $b_{12}$ is 1,
wherein when $r_{11}$ is 2 or 4, then $c_{11}$ and $c_{12}$ are each 0,
wherein when $r_{11}$ is 3, then $c_{11}$ and $c_{12}$ are each 0, or $c_{11}$ is 1 and $c_{12}$ is 0, or $c_{11}$ is 0 and $c_{12}$
wherein $p_{12}$, $q_{12}$, and $r_{12}$ are each independently selected as an integer that is at least 0,
wherein the sum $p_{12}+q_{12}+r_{12}$ is at least 1,
wherein $\underline{x}$ is the fraction of groups substituted for chlorine atoms on the PVC backbone and is from 0.001 to 1, and
wherein $1-\underline{x}$ is the fraction of residual chlorine atoms on the PVC backbone.

2. The polymer of claim 1,
wherein the sum $p_2+q_2+r_2$ is an integer in the range of from 1 to 200,
wherein the sum $p_4+q_4+r_4$ is an integer in the range of from 1 to 200,
wherein the sum $p_6+q_6+r_6$ is an integer in the range of from 1 to 200,
wherein the sum $p_8+q_8+r_8$ is an integer in the range of from 1 to 200,
wherein the sum $p_{10}+q_{10}+r_{10}$ is an integer in the range of from 1 to 200,
wherein the sum $p_{12}+q_{12}+r_{12}$ is an integer in the range of from 1 to 200, and
wherein $n_1$, $n_2$, $n_3$, $n_4$, $n_5$, and $n_6$ are each independently selected as an integer in the range of from 1 to 200.

3. The polymer of claim 1, wherein $\underline{x}$ is from 0.01 to 0.4.

4. The polymer of claim 1,
wherein $p_1$, $q_1$, and $r_1$ are each independently selected as 2 or 3,
wherein $p_3$, $q_3$, and $r_3$ are each independently selected as 2 or 3,
wherein $p_5$, $q_5$, and $r_5$ are each independently selected as 2 or 3,
wherein $p_7$, $q_7$, and $r_7$ are each independently selected as 2 or 3,
wherein $p_9$, $q_9$, and $r_9$ are each independently selected as 2 or 3, and
wherein $p_{11}$, $q_{11}$, and $r_{11}$ are each independently selected as 2 or 3.

5. The polymer of claim 4,
wherein when $p_1$ is 3, then $a_1$ is 1 and $a_2$ is 0, or $a_1$ is 0 and $a_2$ is 1,
wherein when $q_1$ is 3, then $b_1$ is 1 and $b_2$ is 0, or $b_1$ is 0 and $b_2$ is 1,
wherein when $r_1$ is 3, then $c_1$ is 1 and $c_2$ is 0, or $c_1$ is 0 and $c_2$ is 1,
wherein when $p_3$ is 3, then $a_3$ is 1 and $a_4$ is 0, or $a_3$ is 0 and $a_4$ is 1,
wherein when $q_3$ is 3, then $b_3$ is 1 and $b_4$ is 0, or $b_3$ is 0 and $b_4$ is 1,
wherein when $r_3$ is 3, then $c_3$ is 1 and $c_4$ is 0, or $c_3$ is 0 and $c_4$ is 1,
wherein when $p_5$ is 3, then $a_5$ is 1 and $a_6$ is 0, or $a_5$ is 0 and $a_6$ is 1,
wherein when $q_5$ is 3, then $b_5$ is 1 and $b_6$ is 0, or $b_5$ is 0 and $b_6$ is 1,
wherein when $r_5$ is 3, then $c_5$ is 1 and $c_6$ is 0, or $c_5$ is 0 and $c_6$ is 1,
wherein when $p_7$ is 3, then $a_7$ is 1 and $a_8$ is 0, or $a_7$ is 0 and $a_8$ is 1,
wherein when $q_7$ is 3, then $b_7$ is 1 and $b_8$ is 0, or $b_7$ is 0 and $b_8$ is 1,
wherein when $r_7$ is 3, then $c_7$ is 1 and $c_8$ is 0, or $c_7$ is 0 and $c_8$ is 1,
wherein when $p_9$ is 3, then $a_9$ is 1 and $a_{10}$ is 0, or $a_9$ is 0 and $a_{10}$ is 1,
wherein when $q_9$ is 3, then $b_9$ is 1 and $b_{10}$ is 0, or $b_9$ is 0 and $b_{10}$ is 1,
wherein when $r_9$ is 3, then $c_9$ is 1 and $c_{10}$ is 0, or $c_9$ is 0 and $c_{10}$ is 1,
wherein when $p_{11}$ is 3, then $a_{11}$ is 1 and $a_{12}$ is 0, or $a_{11}$ is 0 and $a_{12}$ is 1,
wherein when $q_{11}$ is 3, then $b_{11}$ is 1 and $b_{12}$ is 0, or $b_{11}$ is 0 and $b_{12}$ is 1, and
wherein when $r_{11}$ is 3, then $c_{11}$ is 1 and $c_{12}$ is 0, or $c_{11}$ is 0 and $c_{12}$ is 1.

6. The polymer of claim 2,
wherein $R_1$ is not

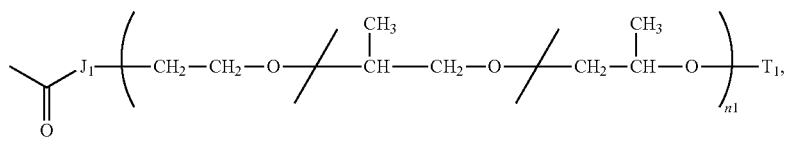

wherein $R_3$ is not

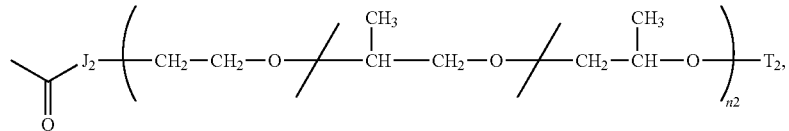

wherein $R_4$ is not

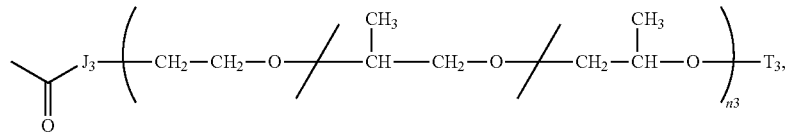

wherein $R_2$ is not

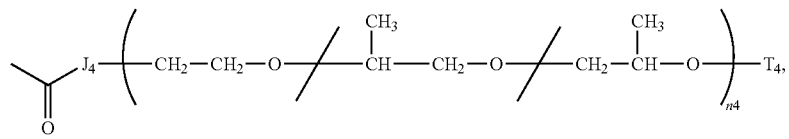

wherein $R_5$ is not

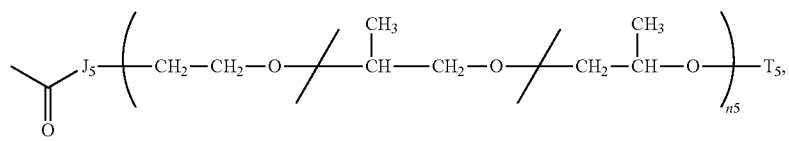

wherein $R_6$ is not

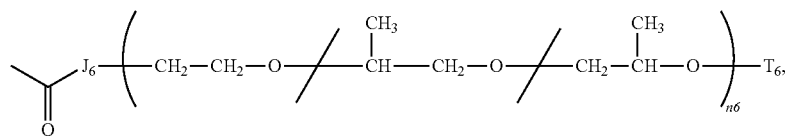

wherein $J_1$, $J_2$, $J_3$, $J_4$, $J_5$, and $J_6$ are each oxygen (O),
wherein $T_1$, $T_2$, $T_3$, $T_4$, $T_5$, and $T_6$ are each methyl ($CH_3$),
wherein $q_2$, $r_2$, $q_4$, $r_4$, $q_6$, $r_6$, $q_8$, $r_8$, $q_{10}$, $r_{10}$, $q_{12}$, and $r_{12}$ are each 0, and
wherein $a_1$, $a_2$, $a_3$, $a_4$, $a_5$, $a_6$, $a_7$, $a_8$, $a_9$, $a_{10}$, $a_{11}$, and $a_{12}$ are each 0.

7. The polymer of claim 6,
wherein $R_1$ is

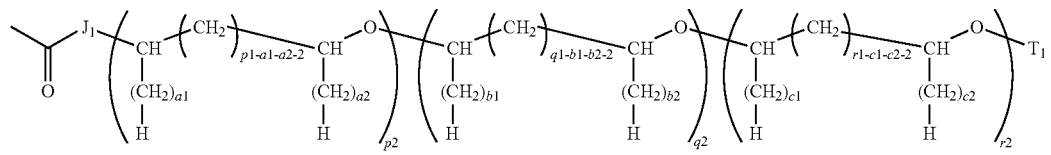

and
  wherein $R_2$ is

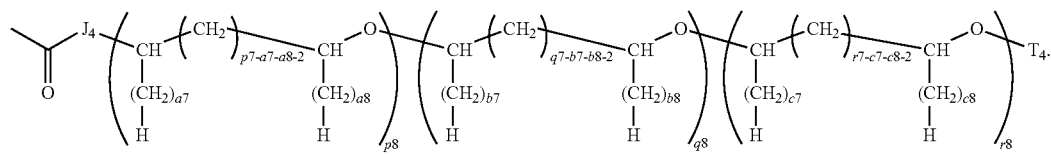

8. The polymer of claim 7, wherein $p_1$ and $p_7$ are each 2.
9. The polymer of claim 8,
wherein $p_2$ and $p_8$ are each from 2 to 12, and
wherein $\underline{x}$ is at least 0.15.
10. The polymer of claim 8,
wherein $p_2$ and $p_8$ are each from 4 to 20, and
wherein $\underline{x}$ is at least 0.15.
11. The polymer of claim 8,
wherein $p_2$ and $p_8$ are each at least 4.
12. The polymer of claim 6,
wherein $R_1$ is

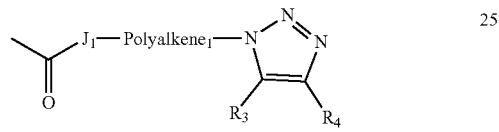

and
  wherein $R_2$ is hydrogen (H).
13. The polymer of claim 12,
wherein $R_3$ is

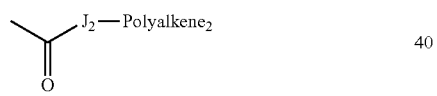

and
  wherein $R_4$ is

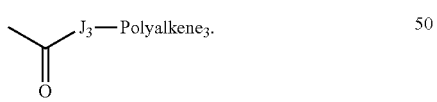

14. The polymer of claim 12,
wherein $R_3$ is

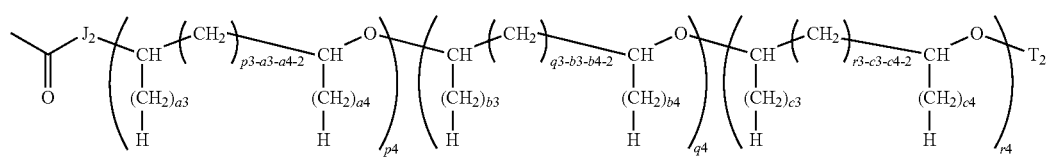

and
 wherein $R_4$ is

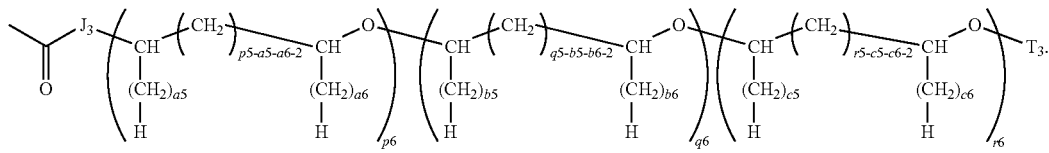

15. The polymer of claim 14, wherein $p_3$ and $p_5$ are each 2.

16. The polymer of claim 15,
 wherein Polyalkene$_1$ is n-hexyl,
 wherein $p_4$ and $p_6$ are each from 2 to 12, and
 wherein $\underline{x}$ is at least 0.15.

17. The polymer of claim 15,
 wherein Polyalkene$_1$ is n-hexyl,
 wherein $p_4$ and $p_6$ are each from 12 to 32, and
 wherein $\underline{x}$ is at least 0.15.

18. The polymer of claim 15,
 wherein Polyalkene$_1$ is n-hexyl,
 wherein $p_4$ and $p_6$ are each from 32 to 54, and
 wherein $\underline{x}$ is at least 0.15.

19. The polymer of claim 15,
 wherein Polyalkene$_1$ is of at least 4 carbons and
 wherein $p_4$ and $p_6$ are each at least 4.

20. The polymer of claim 6,
 wherein $R_1$ is

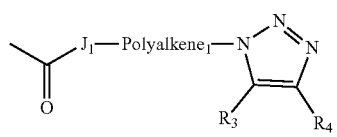

and
 wherein $R_2$ is

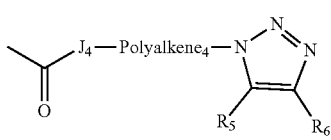

21. The polymer of claim 20,
 wherein $R_3$ is

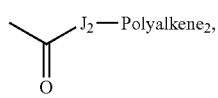

wherein $R_4$ is

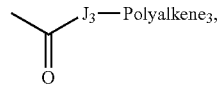

wherein $R_5$ is

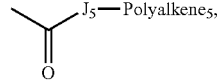

and
wherein $R_6$ is

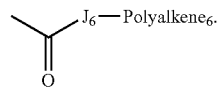

22. The polymer of claim 21,
wherein Polyalkene$_1$ is n-hexyl,
wherein Polyalkene$_2$ and Polyalkene$_3$ are each 2-ethylhexyl,
wherein Polyalkene$_4$ is n-hexyl,
wherein Polyalkene$_5$ and Polyalkene$_6$ are each 2-ethylhexyl, and
wherein $\underline{x}$ is at least 0.15.

23. The polymer of claim 21,
wherein Polyalkene$_1$ is of at least 4 carbons,
wherein Polyalkene$_2$ and Polyalkene$_3$ are each 2-ethylhexyl,
wherein Polyalkene$_4$ is of at least 4 carbons, and
wherein Polyalkene$_5$ and Polyalkene$_6$ are each 2-ethylhexyl.

24. The polymer of claim 20,
wherein $R_3$ is

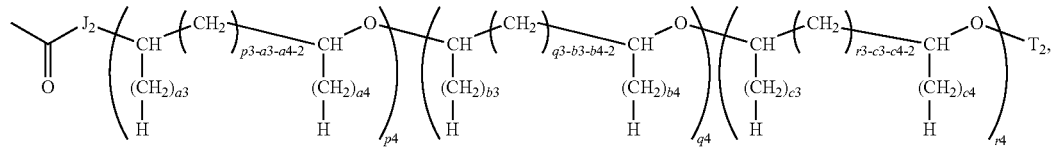

wherein $R_4$ is

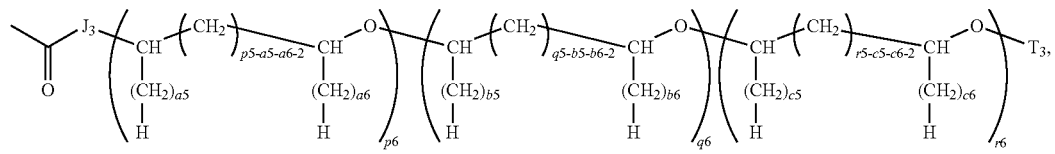

wherein $R_5$ is

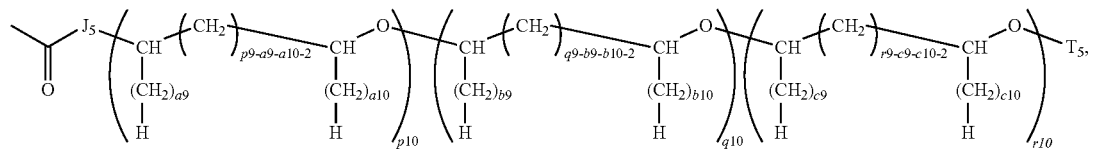

and
wherein $R_6$ is

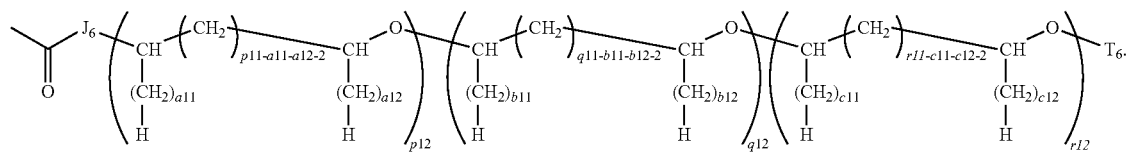

25. The polymer of claim 24, wherein $p_3$, $p_5$, $p_9$, and $p_{11}$ are each 2.

26. The polymer of claim 25,
wherein Polyalkene$_1$ is n-hexyl,
wherein $p_4$ and $p_6$ are each 3,
wherein Polyalkene$_4$ is n-hexyl,
wherein $p_{10}$ and $p_{12}$ are each 3, and
wherein $\underline{x}$ is at least 0.15.

27. The polymer of claim 25,
wherein Polyalkene$_1$ is n-hexyl,
wherein $p_4$ and $p_6$ are each from 2 to 12,
wherein Polyalkene$_4$ is n-hexyl,
wherein $p_{10}$ and $p_{12}$ are each from 2 to 12, and
wherein $\underline{x}$ is at least 0.15.

28. The polymer of claim 25,
wherein Polyalkene$_1$ is n-hexyl,
wherein $p_4$ and $p_6$ are each from 4 to 20,
wherein Polyalkene$_4$ is n-hexyl,
wherein $p_{10}$ and $p_{12}$ are each from 4 to 20, and
wherein $\underline{x}$ is at least 0.15.

29. The polymer of claim 25,
wherein Polyalkene$_1$ is n-hexyl,
wherein $p_4$ and $p_6$ are each from 12 to 32,
wherein Polyalkene$_4$ is n-hexyl,
wherein $p_{10}$ and $p_{12}$ are each from 12 to 32, and
wherein $\underline{x}$ is at least 0.15.

30. The polymer of claim 25,
wherein Polyalkene$_1$ is n-hexyl,
wherein $p_4$ and $p_6$ are each from 32 to 54,
wherein Polyalkene$_4$ is n-hexyl,
wherein $p_{10}$ and $p_{12}$ are each from 32 to 54, and
wherein $\underline{x}$ is at least 0.15.

31. The polymer of claim 25,
wherein Polyalkene$_1$ is of at least 4 carbons and
wherein Polyalkene$_4$ is of at least 4 carbons.

32. The polymer of claim 6,
wherein $R_1$ is

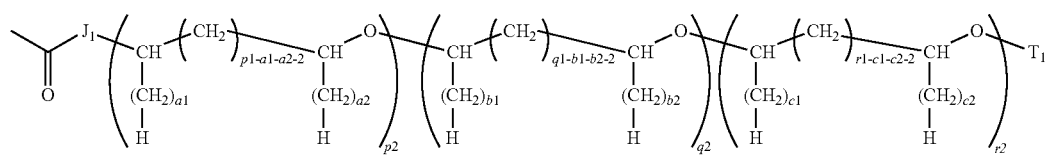

and
wherein $R_2$ is hydrogen (H).

33. The polymer of claim 32, wherein $p_1$ is 2.

34. The polymer of claim 33, wherein $p_2$ is from 4 to 20 and wherein $\underline{x}$ is at least 0.15.

35. The polymer of claim 33, wherein $p_2$ is from 12 to 32 and wherein $\underline{x}$ is at least 0.15.

36. The polymer of claim 33, wherein $p_2$ is from 32 to 54 and wherein $\underline{x}$ is at least 0.15.

37. The polymer of claim 33, wherein $p_2$ is at least 4.

38. A composition comprising the polymer of claim 6 and untreated poly(vinyl chloride).

39. The composition of claim 38, wherein the polymer is from 5 to 99 wt % of the composition.

\* \* \* \* \*